(12) United States Patent
Anthony et al.

(10) Patent No.: US 12,509,453 B2
(45) Date of Patent: Dec. 30, 2025

(54) BRM/BRG1 INHIBITORS AND USES THEREOF

(71) Applicant: Foghorn Therapeutics Inc., Cambridge, MA (US)

(72) Inventors: Neville John Anthony, Northborough, MA (US); Rishi G. Vaswani, Lexington, MA (US); David Simon Millan, Stow, MA (US); Shawn E. R. Schiller, Haverhill, MA (US)

(73) Assignee: FOGHORN THERAPEUTICS INC., Cambridge, MA (US)

( * ) Notice: Subject to any disclaimer, the term of this patent is extended or adjusted under 35 U.S.C. 154(b) by 1045 days.

(21) Appl. No.: 17/425,041

(22) PCT Filed: Jan. 29, 2020

(86) PCT No.: PCT/US2020/015605
§ 371 (c)(1),
(2) Date: Jul. 22, 2021

(87) PCT Pub. No.: WO2020/160100
PCT Pub. Date: Aug. 6, 2020

(65) Prior Publication Data
US 2022/0119378 A1 Apr. 21, 2022

Related U.S. Application Data

(60) Provisional application No. 62/881,059, filed on Jul. 31, 2019, provisional application No. 62/798,359, filed on Jan. 29, 2019.

(51) Int. Cl.
*C07D 417/14* (2006.01)
*A61P 35/00* (2006.01)
*C07D 471/04* (2006.01)

(52) U.S. Cl.
CPC ............ *C07D 417/14* (2013.01); *A61P 35/00* (2018.01); *C07D 471/04* (2013.01)

(58) Field of Classification Search
CPC ...... C07D 417/14; C07D 471/04; A61P 35/00
See application file for complete search history.

(56) References Cited

U.S. PATENT DOCUMENTS

| | | |
|---|---|---|
| 2,788,341 A | 4/1957 | Schwyzer et al. |
| 3,717,642 A | 2/1973 | Von Strandtmann |
| 4,109,496 A | 8/1978 | Allemann et al. |
| 4,650,796 A | 3/1987 | George et al. |
| 4,868,103 A | 9/1989 | Stavrianopoulos et al. |
| 5,223,409 A | 6/1993 | Ladner et al. |
| 5,225,422 A | 7/1993 | Nagata et al. |
| 5,283,317 A | 2/1994 | Saifer et al. |
| 5,631,169 A | 5/1997 | Lakowicz et al. |
| 5,677,158 A | 10/1997 | Zhou et al. |
| 5,801,030 A | 9/1998 | McVey et al. |
| 5,858,358 A | 1/1999 | June et al. |
| 5,883,223 A | 3/1999 | Gray |
| 6,180,612 B1 | 1/2001 | Hockensmith et al. |
| 6,309,634 B1 | 10/2001 | Bankiewicz et al. |
| 6,352,694 B1 | 3/2002 | June et al. |
| 6,551,786 B2 | 4/2003 | Manfredi |
| 6,683,058 B1 | 1/2004 | Tuszynski |
| 6,692,964 B1 | 2/2004 | June et al. |
| 6,716,662 B2 | 4/2004 | Akai |
| 6,797,514 B2 | 9/2004 | Berenson et al. |
| 6,867,041 B2 | 3/2005 | Berenson et al. |
| 6,887,466 B2 | 5/2005 | June et al. |
| 6,905,680 B2 | 6/2005 | June et al. |
| 6,905,681 B1 | 6/2005 | June et al. |
| 6,905,874 B2 | 6/2005 | Berenson et al. |
| 6,995,011 B2 | 2/2006 | Itoh et al. |
| 7,067,318 B2 | 6/2006 | June et al. |
| 7,144,575 B2 | 12/2006 | June et al. |
| 7,172,869 B2 | 2/2007 | June et al. |
| 7,175,843 B2 | 2/2007 | June et al. |
| 7,205,103 B2 | 4/2007 | Emerson |
| 7,232,566 B2 | 6/2007 | June et al. |
| 7,348,326 B2 | 3/2008 | DeSimone et al. |
| 7,572,631 B2 | 8/2009 | Berenson et al. |
| 8,324,367 B2 | 12/2012 | Kaemmerer et al. |

(Continued)

FOREIGN PATENT DOCUMENTS

| | | |
|---|---|---|
| CN | 103038231 A | 4/2013 |
| CN | 105473141 A | 4/2016 |

(Continued)

OTHER PUBLICATIONS

Ambinter SARL, "RN 1323542-96-6", 2011, Chemical Library (Year: 2011).*
Ambinter SARL, RN 1323331-37-8, CHEMCATS, Aug. 25, 2011 (Year: 2011).*
Ambinter SARL, RN 1323542-96-6, CHEMCATS, Aug. 26, 2011 (Year: 2011).*
Ambinter SARL, RN 1324163-01-0, CHEMCATS, Aug. 28, 2011 (Year: 2011).*
Ambinter SARL, RN 1327304-26-6, CHEMCATS, Sep. 2, 2011 (Year: 2011).*
Adam et al., International Application No. PCT/US2024/024407, filed Apr. 12, 2024 by applicant Foghorn Therapeutics Inc. (42 pages).
Adam et al., International Application No. PCT/US2024/024428, filed Apr. 12, 2024 by applicant Foghorn Therapeutics Inc. (40 pages).
Adamo et al., "The oncogene ERG: a key factor in prostate cancer," Oncogene 35(4):403-14 (Jan. 2, 20168).

(Continued)

*Primary Examiner* — Jeffrey H Murray
*Assistant Examiner* — Madeline E Braun
(74) *Attorney, Agent, or Firm* — Clark & Elbing LLP

(57) ABSTRACT

The compounds disclosed herein may be inhibitors of BRG1 (Brahma-related gene-1) and/or BRM (Brahma). The compounds or pharmaceutically acceptable salts thereof are useful for the treatment of disorders associated with an alteration in a BAF complex, e.g., a disorder associated with an alteration in one or both of the BRG1 and BRM proteins. Also disclosed are pharmaceutical compositions containing the compounds or pharmaceutically acceptable salts thereof and methods of their preparation and use.

19 Claims, 3 Drawing Sheets

(56) References Cited

U.S. PATENT DOCUMENTS

| | | |
|---|---|---|
| 8,642,660 B2 | 2/2014 | Goldfarb |
| 8,697,359 B1 | 4/2014 | Zhang |
| 8,703,761 B2 | 4/2014 | Forster et al. |
| 8,771,945 B1 | 7/2014 | Zhang |
| 8,795,965 B2 | 8/2014 | Zhang |
| 8,865,406 B2 | 10/2014 | Zhang et al. |
| 8,945,861 B2 | 2/2015 | Bomgarden et al. |
| 8,946,268 B2 | 2/2015 | Lau et al. |
| 9,072,052 B2 | 6/2015 | Griffin et al. |
| 9,126,985 B2 | 9/2015 | Kley et al. |
| 9,353,051 B2 | 5/2016 | Byrd et al. |
| 9,403,843 B2 | 8/2016 | Thatcher et al. |
| 9,410,943 B2 | 8/2016 | Kadoch et al. |
| 9,546,206 B2 | 1/2017 | Ring et al. |
| 9,546,296 B2 | 1/2017 | Wang et al. |
| 9,636,323 B2 | 5/2017 | Lin et al. |
| 9,656,959 B2 | 5/2017 | Ni et al. |
| 9,694,084 B2 | 7/2017 | Bradner et al. |
| 9,708,338 B2 | 7/2017 | Yukimasa et al. |
| 9,708,348 B2 | 7/2017 | Castro et al. |
| 9,850,543 B2 | 12/2017 | Jagani et al. |
| 9,919,998 B2 | 3/2018 | Ebright et al. |
| 9,932,340 B2 | 4/2018 | Dai et al. |
| 10,105,420 B2 | 10/2018 | Kadoch et al. |
| 10,131,637 B2 | 11/2018 | Abdel-Meguid et al. |
| 10,207,998 B2 | 2/2019 | Derbyshire et al. |
| 10,239,888 B2 | 3/2019 | Bradner et al. |
| 10,266,850 B2 | 4/2019 | Doudna et al. |
| 10,308,614 B2 | 6/2019 | Albrecht et al. |
| 10,464,925 B2 | 11/2019 | Bradner et al. |
| 10,472,376 B2 | 11/2019 | Yamamoto et al. |
| 10,646,575 B2 | 5/2020 | Phillips et al. |
| 10,660,968 B2 | 5/2020 | Phillips et al. |
| 10,669,253 B2 | 6/2020 | Bradner et al. |
| 10,849,982 B2 | 12/2020 | Phillips et al. |
| 10,905,768 B1 | 2/2021 | Phillips et al. |
| 10,976,320 B2 | 4/2021 | Dykhuizen et al. |
| 11,149,254 B2 | 10/2021 | Szalay et al. |
| 11,419,859 B2 | 8/2022 | Agresta |
| 11,485,732 B2 * | 11/2022 | Vaswani ............. A61P 35/00 |
| 11,497,752 B2 | 11/2022 | Anthony et al. |
| 11,639,345 B2 | 5/2023 | Bloch et al. |
| 11,773,085 B2 | 10/2023 | Zhou et al. |
| 11,793,802 B2 | 10/2023 | Bearss et al. |
| 11,851,445 B2 | 12/2023 | Ruppel et al. |
| 11,865,114 B2 | 1/2024 | Ramachandra et al. |
| 12,282,014 B2 | 4/2025 | Kadoch et al. |
| 2002/0022018 A1 | 2/2002 | Curiel et al. |
| 2002/0037281 A1 | 3/2002 | Davidson et al. |
| 2002/0106632 A1 | 8/2002 | Manfredi |
| 2003/0022375 A1 | 1/2003 | Itoh et al. |
| 2003/0027335 A1 | 2/2003 | Ruley et al. |
| 2004/0216178 A1 | 10/2004 | Jones et al. |
| 2005/0079512 A1 | 4/2005 | Emerson et al. |
| 2005/0130919 A1 | 6/2005 | Xu et al. |
| 2006/0058255 A1 | 3/2006 | Chen et al. |
| 2006/0121005 A1 | 6/2006 | Berenson et al. |
| 2007/0105181 A1 | 5/2007 | Pope et al. |
| 2008/0221157 A1 | 9/2008 | Chakravarty et al. |
| 2009/0163545 A1 | 6/2009 | Goldfarb |
| 2010/0048565 A1 | 2/2010 | Frenkel et al. |
| 2010/0197621 A1 | 8/2010 | Henry et al. |
| 2010/0284990 A1 | 11/2010 | Kaemmerer et al. |
| 2011/0003809 A1 | 1/2011 | Ahrendt |
| 2011/0230486 A1 | 9/2011 | Lau et al. |
| 2012/0034867 A1 | 2/2012 | Griffin et al. |
| 2012/0035244 A1 | 2/2012 | Chinnaiyan et al. |
| 2012/0308484 A1 | 12/2012 | Szalay et al. |
| 2013/0034867 A1 | 2/2013 | Bomgarden et al. |
| 2014/0068797 A1 | 3/2014 | Doudna et al. |
| 2014/0287931 A1 | 9/2014 | Bernards et al. |
| 2015/0018315 A1 | 1/2015 | Kley et al. |
| 2015/0057169 A1 | 2/2015 | Siu et al. |
| 2015/0376139 A1 | 12/2015 | Abdel-Meguid et al. |
| 2016/0032402 A1 | 2/2016 | Jagani et al. |
| 2016/0130663 A1 | 5/2016 | Kohno et al. |
| 2016/0176916 A1 | 6/2016 | Bradner et al. |
| 2016/0200721 A1 | 7/2016 | Yukimasa et al. |
| 2016/0347708 A1 | 12/2016 | Ebright et al. |
| 2017/0174688 A1 | 6/2017 | Dai et al. |
| 2018/0086720 A1 | 3/2018 | Albrecht et al. |
| 2018/0105500 A1 | 4/2018 | Derbyshire et al. |
| 2018/0140722 A1 | 5/2018 | Willis et al. |
| 2018/0258491 A1 | 9/2018 | Jagani et al. |
| 2018/0328913 A1 | 11/2018 | Kadoch et al. |
| 2020/0069669 A1 | 3/2020 | Grassian et al. |
| 2020/0206344 A1 | 7/2020 | Kadoch et al. |
| 2020/0261434 A1 | 8/2020 | Choe et al. |
| 2021/0009568 A1 | 1/2021 | Zhou et al. |
| 2021/0038611 A1 | 2/2021 | Anthony et al. |
| 2021/0171958 A1 | 6/2021 | Chan et al. |
| 2021/0230154 A1 | 7/2021 | Vaswani et al. |
| 2021/0230190 A1 | 7/2021 | Ruppel et al. |
| 2021/0251988 A1 | 8/2021 | Zhou et al. |
| 2021/0260171 A1 | 8/2021 | Zhou et al. |
| 2021/0388040 A1 | 12/2021 | Kadoch et al. |
| 2022/0016083 A1 | 1/2022 | Centore et al. |
| 2022/0079940 A1 | 3/2022 | Centore et al. |
| 2022/0098190 A1 | 3/2022 | Ruppel et al. |
| 2022/0396604 A1 | 12/2022 | Kadoch et al. |
| 2023/0035235 A1 | 2/2023 | Kadoch et al. |
| 2023/0079819 A1 | 3/2023 | Vaswani et al. |
| 2023/0121497 A1 | 4/2023 | Vaswani et al. |
| 2023/0129003 A1 | 4/2023 | Vaswani et al. |
| 2023/0138480 A1 | 5/2023 | Anthony et al. |
| 2023/0145003 A1 | 5/2023 | Wilson et al. |
| 2023/0149414 A1 | 5/2023 | Anthony et al. |
| 2024/0101550 A1 | 3/2024 | Vaswani et al. |
| 2024/0158387 A1 | 5/2024 | Vaswani et al. |
| 2024/0189318 A1 | 6/2024 | Huang |

FOREIGN PATENT DOCUMENTS

| | | |
|---|---|---|
| CN | 104530013 B | 6/2016 |
| CN | 107531668 A | 1/2018 |
| EA | 202192101 A1 | 12/2021 |
| EP | 0172096 A1 | 2/1986 |
| JP | 2000-095767 A | 4/2000 |
| JP | 2014-500303 A | 1/2014 |
| JP | 2021-512166 A | 5/2021 |
| WO | WO-94/10300 A1 | 5/1994 |
| WO | WO-95/30761 A2 | 11/1995 |
| WO | WO-2000/024392 A1 | 5/2000 |
| WO | WO-00/59888 A1 | 10/2000 |
| WO | WO-00/59905 A1 | 10/2000 |
| WO | WO-2005/039643 A2 | 5/2005 |
| WO | WO-2005/112620 A2 | 12/2005 |
| WO | WO-2006/005941 A1 | 1/2006 |
| WO | WO-2006/051063 A1 | 5/2006 |
| WO | WO-2006/070806 A1 | 7/2006 |
| WO | WO-2008/022396 A1 | 2/2008 |
| WO | WO-2008/157500 A1 | 12/2008 |
| WO | WO-2009/086303 A2 | 7/2009 |
| WO | WO-2009/111277 A1 | 9/2009 |
| WO | WO-2010/007046 A2 | 1/2010 |
| WO | WO-2011/115998 A2 | 9/2011 |
| WO | WO-2011/132175 A2 | 10/2011 |
| WO | WO-2012/085650 A1 | 6/2012 |
| WO | WO-2013/116663 A1 | 8/2013 |
| WO | WO-2013/116682 A1 | 8/2013 |
| WO | WO-2014/150395 A1 | 9/2014 |
| WO | WO-2015/002230 A1 | 1/2015 |
| WO | WO-2015/005473 A1 | 1/2015 |
| WO | WO-2015/103317 A1 | 7/2015 |
| WO | WO-2015/120320 A1 | 8/2015 |
| WO | WO-2015/121688 A1 | 8/2015 |
| WO | WO-2016/054491 A1 | 4/2016 |
| WO | WO-2016/138114 A1 | 9/2016 |
| WO | WO-2016/160718 A1 | 10/2016 |
| WO | WO-2016/207212 A1 | 12/2016 |
| WO | WO-2017/024318 A1 | 2/2017 |
| WO | WO-2017/060470 A1 | 4/2017 |
| WO | WO-2017/087885 A1 | 5/2017 |
| WO | WO-2017/118734 A1 | 7/2017 |

(56) References Cited

FOREIGN PATENT DOCUMENTS

| | | |
|---|---|---|
| WO | WO-2017/158381 A1 | 9/2017 |
| WO | WO-2018/148443 A1 | 8/2018 |
| WO | WO-2018/160636 A1 | 9/2018 |
| WO | WO-2018/175324 A1 | 9/2018 |
| WO | WO-2019/038215 A1 | 2/2019 |
| WO | WO-2019/040098 A1 | 2/2019 |
| WO | WO-2019/138017 A1 | 7/2019 |
| WO | WO-2019/142192 A1 | 7/2019 |
| WO | WO-2019/152437 A1 | 8/2019 |
| WO | WO-2019/152440 A1 | 8/2019 |
| WO | WO-2019/226915 A1 | 11/2019 |
| WO | WO-2020/035779 A1 | 2/2020 |
| WO | WO-2020/081556 A2 | 4/2020 |
| WO | WO-2020/081588 A1 | 4/2020 |
| WO | WO-2020/106915 A1 | 5/2020 |
| WO | WO-2020/127685 A1 | 6/2020 |
| WO | WO-2020/160100 A1 | 8/2020 |
| WO | WO-2020160180 A1 * | 8/2020 ........... A61K 31/427 |
| WO | WO-2021/081032 A1 | 4/2021 |
| WO | WO-2021/155262 A1 | 8/2021 |
| WO | WO-2021/155264 A1 | 8/2021 |
| WO | WO-2021/155316 A1 | 8/2021 |
| WO | WO-2021/155320 A1 | 8/2021 |
| WO | WO-2021/155321 A2 | 8/2021 |
| WO | WO-2021/183218 A1 | 9/2021 |
| WO | WO-2021/236080 A1 | 11/2021 |
| WO | WO-2022/192621 A1 | 9/2022 |
| WO | WO-2022/198043 A1 | 9/2022 |
| WO | WO-2023/009834 A2 | 2/2023 |
| WO | WO-2023/196560 A1 | 10/2023 |
| WO | WO-2023/196565 A1 | 10/2023 |
| WO | WO-2023/196567 A2 | 10/2023 |
| WO | WO-2024/024428 A1 | 2/2024 |
| WO | WO-2024/031875 A1 | 2/2024 |
| WO | WO-2024/086577 A1 | 4/2024 |
| WO | WO-2024/249769 A2 | 12/2024 |
| WO | WO-2025/080767 A1 | 4/2025 |
| WO | WO-2025/080769 A1 | 4/2025 |

OTHER PUBLICATIONS

Advani et al., "A Phase 1 study of imatinib mesylate in combination with cytarabine and daunorubicin for c-kit positive relapsed acute myeloid leukemia," Leuk Res. 34(12):1622-6 (Dec. 2010).

Alazawi, "Foghorn Therapeutics," Blackseed Bio, last updated Mar. 4, 2022, retrieved Jul. 24, 2023, from <https://blackseedbio.com/reports/fhtx#pipeline> (26 pages).

Anders et al., "HTSeq—a Python framework to work with high-throughput sequencing data," Bioinformatics 31(2):166-9 (Jan. 15, 2015).

Asangani et al., "Therapeutic targeting of BET bromodomain proteins in castration-resistant prostate cancer," available in PMC Dec. 12, 2014. Published in final edited form as: Nature. 510(7504):278-82 (2014) (44 pages).

Attard et al., "Duplication of the fusion of TMPRSS2 to ERG sequences identifies fatal human prostate cancer," available in PMC Feb. 24, 2009. Published in final edited form as: Oncogene. 27(3):253-63 (2008) (19 pages).

Basuyaux et al., "The Ets transcription factors interact with each other and with the c-Fos/c-Jun complex via distinct protein domains in a DNA-dependent and -independent manner," J Biol Chem. 272(42):26188-95 (1997).

Bendall et al., "Prevention of amino acid conversion in SILAC experiments with embryonic stem cells," Mol Cell Proteomics. 7(9):1587-97 (2008).

Berger et al., "Androgen-induced differentiation and tumorigenicity of human prostate epithelial cells," Cancer Res. 64(24):8867-75 (2004).

Börno et al., "Genome-wide DNA methylation events in TMPRSS2-ERG fusion-negative prostate cancers implicate an EZH2-dependent mechanism with miR-26a hypermethylation," Cancer Discov. 2(11):1024-35 (2012).

Camuzeaux et al., "Imaging Erg and Jun transcription factor interaction in living cells using fluorescence resonance energy transfer analyses," Biochem Biophys Res Commun. 332(4):1107-14 (2005).

Cancer Genome Atlas Research Network, "The Molecular Taxonomy of Primary Prostate Cancer," Cell. 163(4):1011-25 (2015) (16 pages).

Carell et al., "A novel procedure for the synthesis of libraries containing small organic molecules," Angew Chem Int Ed Engl. 33(20):2059-2061 (1994).

Carell et al., "A Solution-Phase Screening Procedure for the Isolation of Active Compounds from a Library of Molecules," Angewandte Chemie International Edition in English. 33(20): 2061-2064 (1994).

Centore et al., "Abstract 1224: Discovery of novel BAF inhibitors for the treatment of transcription factor-driven cancers," Poster Presentations—Proffered abstracts, Cancer Research 81(13_Supplement):1224 (Jul. 1, 2021) (2 pages).

Chen et al., "ETS factors reprogram the androgen receptor cistrome and prime prostate tumorigenesis in response to PTEN loss," available in PMC Feb. 1, 2014. Published in final edited form as: Nat Med. 19(8):1023-9 (2013) (21 pages).

Chng et al., "A transcriptional repressor co-regulatory network governing androgen response in prostate cancers," EMBO J. 31(12):2810-23 (2012).

Cho et al., "An unnatural biopolymer," Science. 261(5126):1303-1305 (1993).

Coban et al., "Synthesis, biological activity screening and molecular modeling study of acylaminoacetamide derivatives," Med Chem Res. 24(10):3710-29 (Jul. 25, 2015).

Cull et al., "Screening for receptor ligands using large libraries of peptides linked to the C terminus of the lac repressor," Proc Natl Acad Sci. 89(5):1865-1869. (1992).

Cwirla et al., "Peptides on phage: A vast library of peptides for identifying ligands," Proc Nati Acad Sci. 87:6378-6382 (1990).

Database Registry, RN 1004932-80-2, entered Feb. 21, 2008 (1 page).

Database Registry, RN 1175782-23-6, entered Aug. 26, 2009 (1 page).

Database Registry, RN 1315743-98-6, entered Aug. 11, 2011 (1 page).

Database Registry, RN 878254-76-3, entered Mar. 28, 2006 (1 page).

Delattre et al., "Gene fusion with an ETS DNA-binding domain caused by chromosome translocation in human tumours," Nature. 359(6391):162-5 (1992).

Demichelis et al., "TMPRSS2:ERG gene fusion associated with lethal prostate cancer in a watchful waiting cohort," Oncogene 26:4596-4599 (2007).

Devlin et al., "Random Peptide Libraries: a Source of Specific Protein Binding Molecules," Science. 249(4967):404-406 (1990).

DeWitt et al., "'Diversomers'": an approach to nonpeptide, nonoligomeric chemical diversity, Proc Natl Acad Sci. 90(15):6909-6913 (1993).

Dobin et al., "STAR: ultrafast universal RNA-seq aligner," Bioinformatics. 29(1):15-21 (2013).

Dominguez et al. "Beyond editing: Repurposing CRISPR-Cas9 for Precision Genome Regulation and Interrogation," available in PMC Jun. 27, 2016, published in final edited form as: Nat Rev Mol Cell Biol. 17(1):5-15 (Jan. 2016) (24 pages).

Donaldson et al., "Solution structure of the ETS domain from murine ETS-1: a winged helix-turn-helix DNA binding motif," EMBO J. 15(1):125-34 (1996).

Décor et al., "Design, synthesis and biological evaluation of novel aminothiazoles as antiviral compounds acting against human rhinovirus," Bioorg Med Chem Lett. 23(13):3841-7 (Jul. 1, 2013).

Erb et al., "Recursive deconvolution of combinatorial chemical libraries," Proc Natl Acad Sci. 91(24):11422-11426 (1994).

Extended European Search Report for European Application No. 19748410.8, dated Sep. 24, 2021 (10 pages).

Extended European Search Report for European Application No. 19887386.1, dated Dec. 5, 2022 (18 pages).

Extended European Search Report for European Application No. 20749261.2, dated Oct. 18, 2022 (8 pages).

(56) References Cited

OTHER PUBLICATIONS

Extended European Search Report for European Application No. 21748261.1, dated Jan. 29, 2024 (17 pages).
Fathi et al., "Differentiation syndrome with lower-intensity treatments for acute myeloid leukemia," Am J Hematol. 96(6):735-46 (Jun. 1, 2021) (13 Pages).
Felici et al., "Selection of antibody ligands from a large library of oligopeptides expressed on a multivalent exposition vector," J Mol Biol. 222(2):301-10 (1991).
Feng et al., "GFOLD: a generalized fold change for ranking differentially expressed genes from RNA-seq data," Bioinformatics. 28(21):2782-8 (2012).
Fodor et al., "Multiplexed biochemical assays with biological chips," Nature. 364:555-556 (1993).
Gaj et al. "ZFN, TALEN and CRISPR/Cas-based Methods for Genome Engineering," available in PMC Jul. 1, 2014, published in final edited form as: Trends Biotechnol. 31(7):397-405 (Jul. 2013) (20 pages).
Gallop et al., "Applications of Combinatorial Technologies to Drug Discovery. 1. Background and Peptide Combinatorial Libraries," J Med Chem 37(9):1233-51 (1994).
Gene Ontology Consortium, "Gene Ontology Consortium: going forward," Nucleic Acids Res. 43(Database issue):D1049-56 (2015).
Gingras et al., "Advances in protein complex analysis using mass spectrometry," J Physiol. 563(Pt 1):11-21 (Feb. 15, 2005).
Godwin et al., "Gemtuzumab ozogamicin in acute myeloid leukemia," Leukemia 31(9):1855-68 (Sep. 2017).
Helgeson et al., "Characterization of TMPRSS2:ETV5 and SLC45A3:ETV5 gene fusions in prostate cancer," Cancer Res. 68(1):73-80 (2008).
Ho et al., "An embryonic stem cell chromatin remodeling complex, esBAF, is essential for embryonic stem cell self-renewal and pluripotency," Proc Natl Acad Sci U S A. 106(13):5181-6 (2009).
Houghten et al., "The use of synthetic peptide combinatorial libraries for the identification of bioactive peptides," Biotechniques. 13(3):412-21 (1992).
Ichikawa et al., "An RNA-binding protein gene, TLS/FUS, is fused to ERG in human myeloid leukemia with t(16;21) chromosomal translocation," Cancer Res. 54(11):2865-8 (1994).
International Preliminary Report on Patentability for International Application No. PCT/US2016/062911 issued May 22, 2018 (13 pages).
International Preliminary Report on Patentability for International Application No. PCT/US2019/015722, issued Aug. 4, 2020 (6 pages).
International Preliminary Report on Patentability for International Application No. PCT/US2020/033829, issued Nov. 17, 2022 (6 pages).
International Preliminary Report on Patentability for International Application No. PCT/US2022/019506, issued Sep. 12, 2023 (6 pages).
International Preliminary Report on Patentability for International Application No. PCT/US2022/020943, issued Sep. 12, 2023 (5 pages).
International Search Report and Written Opinion for International Application No. PCT/US19/15722, mailed May 31, 2019 (12 pages).
International Search Report and Written Opinion for International Application No. PCT/US2016/062911 dated Mar. 3, 2017 (16 pages).
International Search Report and Written Opinion for International Application No. PCT/US2020/015605, mailed Jun. 16, 2020 (15 pages).
International Search Report and Written Opinion for International Application No. PCT/US2020/015723, mailed Jul. 2, 2020 (15 pages).
International Search Report and Written Opinion for International Application No. PCT/US2020/033829, mailed Aug. 17, 2020 (14 pages).
International Search Report and Written Opinion for International Application No. PCT/US2022/019506, dated Jun. 7, 2022 (9 pages).
International Search Report and Written Opinion for International Application No. PCT/US2023/017839, mailed Sep. 6, 2023 (11 pages).
International Search Report and Written Opinion for International Application No. PCT/US2023/077088, mailed Mar. 4, 2024 (17 pages).
International Search Report and Written Opinion for International Application No. PCT/US21/15876, mailed on Apr. 7, 2021 (23 pages).
International Search Report and Written Opinion for International Application No. PCT/US21/15878, dated Jun. 4, 2021 (10 pages).
International Search Report and Written Opinion for International Application No. PCT/US23/17821, mailed Jun. 30, 2023 (9 pages).
International Search Report and Written Opinion for International Application No. PCT/US23/17829, mailed Aug. 23, 2023 (15 pages).
International Search Report and Written Opinion for International Patent Application No. PCT/US2019/062525, mailed Feb. 18, 2020 (14 pages).
International Search Report and Written Opinion for PCT/US2022/020943, dated Jun. 14, 2022 (17 pages).
Jones et al., "A novel series of potent and selective ketone histone deacetylase inhibitors with antitumor activity in vivo," J Med Chem. 51(8):2350-3 (Apr. 24, 2008).
Kadoch et al., "Mammalian SWI/SNF chromatin remodeling complexes and cancer: Mechanistic insights gained from human genomics," Sci Adv. 1(5):e1500447 (2015) (17 pages).
Kadoch et al., "Proteomic and bioinformatic analysis of mammalian SWI/SNF complexes identifies extensive roles in human malignancy," Nat Genet. 45(6):592-601 (2013) (11 pages).
Kadoch et al., "Reversible Disruption of mSWI/SNF (BAF) Complexes by the SS18-SSX Oncogenic Fusion in Synovial Sarcoma," available in PMC May 16, 2013, published in final edited form as: Cell. 153(1):71-85 (2013) (26 pages).
Karim et al., "The ETS-domain: a new DNA-binding motif that recognizes a purine-rich core DNA sequence," Genes Dev. 4(9):1451-3 (1990).
Klezovitch et al., "A causal role for ERG in neoplastic transformation of prostate epithelium," Proc Natl Acad Sci U S A. 105(6):2105-10 (2008).
Kumar-Sinha et al., "Recurrent gene fusions in prostate cancer," available in PMC Jul. 16, 2009. Published in final edited form as: Nat Rev Cancer. 8(7):497-511 (2008) (29 pages).
Kunderfranco et al., "ETS transcription factors control transcription of EZH2 and epigenetic silencing of the tumor suppressor gene Nkx3.1 in prostate cancer," PLoS One. 5(5):e10547 (2010) (17 pages).
Lam et al., "A new type of synthetic peptide library for identifying ligand-binding activity," Nature. 354(6348):82-84 (1991).
Lam, "Application of combinatorial library methods in cancer research and drug discovery," Anticancer Drug Des. 12(3):145-67 (1997).
Langmead et al., "Fast gapped-read alignment with Bowtie 2," available in PMC Apr. 1, 2013. Published in final edited form as: Nat Methods. 9(4):357-9 (2012) (8 pages).
Link et al., "Targeting the BAF57 SWI/SNF subunit in prostate cancer: a novel platform to control androgen receptor activity," Cancer Res. 68(12):4551-8 (2008).
Love et al., "Moderated estimation of fold change and dispersion for RNA-seq data with DESeq2," Genome Biol. 15(12):550 (2014) (21 pages).
Lupien et al., "FoxA1 translates epigenetic signatures into enhancer-driven lineage-specific transcription," Cell. 132(6):958-70 (2008).
Machanick et al., "MEME-ChIP: motif analysis of large DNA datasets," Bioinformatics. 27(12):1696-7 (2011).
Mackereth et al., "Diversity in structure and function of the Ets family PNT domains," J Mol Biol. 342(4):1249-64 (2004).
Madura et al., "N-recognin/Ubc2 interactions in the N-end rule pathway," J Biol Chem. 268(16):12046-54 (1993).
McBride et al., "Disruption of mammalian SWI/SNF and polycomb complexes in human sarcomas: mechanisms and therapeutic opportunities," J Pathol. 244(5): 638-649 (Apr. 2018).

(56) References Cited

OTHER PUBLICATIONS

Melé et al., "The human transcriptome across tissues and individuals," available in PMC Aug. 24, 2015. Published in final edited form as: Science. 348(6235):660-5 (2015) (12 pages).
Mill et al., "RUNX1-targeted therapy for AML expressing somatic or germline mutation in RUNX1," Blood 134(1):59-73 (Jul. 4, 2019).
Mounir et al., "ERG signaling in prostate cancer is driven through PRMT5-dependent methylation of the Androgen Receptor," Elife. 5:e13964 (2016) (19 pages).
Nagaich et al., "Rapid periodic binding and displacement of the glucocorticoid receptor during chromatin remodeling," Mol Cell. 14(2):163-74 (2004).
Nam et al., "Expression of the TMPRSS2:ERG fusion gene predicts cancer recurrence after surgery for localised prostate cancer," Br J Cancer. 97(12):1690-5 (2007).
Office Action for Chinese Patent Application No. 201980023925.9, dated Apr. 20, 2022 (13 pages).
Ong et al., "A practical recipe for stable isotope labeling by amino acids in cell culture (SILAC)," Nat Protoc. 1(6):2650-60 (2006).
Papillon et al., "Discovery of Orally Active Inhibitors of Brahma Homolog (BRM)/SMARCA2 ATPase Activity for the Treatment of Brahma Related Gene 1 (BRG1)/SMARCA4-Mutant Cancers," J Med Chem. 61(22):10155-72 (Nov. 2018).
Partial Supplementary European Search Report for European Patent Application No. 19887386.1, dated Jul. 20, 2022 (23 pages).
Partial Supplementary European Search Report for European Patent Application No. 20936213.6, dated Feb. 8, 2024 (20 pages).
Paulo et al., "FLI1 is a novel ETS transcription factor involved in gene fusions in prostate cancer," Genes Chromosomes Cancer. 51(3):240-9 (2012).
Pescatore et al., "Optimization of a series of potent and selective ketone histone deacetylase inhibitors," Bioorg Med Chem Lett. 18(20):5528-32 (Oct. 15, 2008).
Petrovics et al., "Frequent overexpression of ETS-related gene-1 (ERG1) in prostate cancer transcriptome," Oncogene. 24(23):3847-52 (2005).
Piel et al., International Application No. PCT/US2024/031875, filed May 31, 2024 by applicant Foghorn Therapeutics Inc. (47 pages).
Pomerantz et al., "The androgen receptor cistrome is extensively reprogrammed in human prostate tumorigenesis," available in PMC May 1, 2016. Published in final edited form as: Nat Genet. 47(11):1346-51 (2015) (17 pages).
Prensner et al., "The long noncoding RNA SChLAP1 promotes aggressive prostate cancer and antagonizes the SWI/SNF complex," available in PMC May 1, 2014. Published in final edited form as: Nat Genet. 45(11):1392-8 (2013) (26 pages).
PubChem CID 117640569, "N-[2-[[4-(4-Methoxyphenyl)-1,3-thiazol-2-yl]amino]-2-oxoethyl]-1,3-thiazole-5-carboxamide," https://pubchem.ncbi.nlm.nih.gov/compound/117640569, created Feb. 23, 2016 (9 pages).
PubChem CID 56442706, "1-(4-Methoxyphenyl)-N-[2-oxo-2-[4-(1,2,4-triazol-1-yl)anilino]ethyl]pyrazole-3-carboxamide," https://pubchem.ncbi.nlm.nih.gov/compound/56442706, created Jan. 25, 2012 (8 pages).
PubChem CID 91946137, "N-[2-[(1-Ethylpyrazol-3-yl}amino]-2-oxoethyl]-1-methylpyrazole-3-carboxamide," https://pubchem.ncbi.nlm.nih.gov/compound/91946137, created Oct. 22, 2015 (8 pages).
PubChem Compound Summary for CID 155037309, dated Dec. 19, 2020 (9 pages).
PubChem Compound Summary for CID No. 136572628, "4-Chloro-N-[2-(cyclopentylamino)-2-oxoethyl]-5-nitro-1H-pyrazole-3-carboxamide," created Jan. 24, 2019, <https://pubchem.ncbi.nlm.nih.gov/compound/136572628>, (7 pages).
PubChem Compound Summary for CID No. 49726797, "N-Methyl-N-(2-oxo-2-((4-(pyridin-3-yl)thiazol-2-yl)amino)ethyl)-1H-indole-3-carboxamide," created Nov. 27, 2010, <https://pubchem.ncbi.nlm.nih.gov/compound/49726797>, (8 pages).
PubChem Compound Summary for CID No. 91945707, "N-[2-[(4,5-Dimethyl-1,3-thiazol-2-yl)amino]-2-oxoethyl]-1-methylpyrazole-3-carboxamide," created Oct. 22, 2015 <https://pubchem.ncbi.nlm.nih.gov/compound/91945707>, (8 pages).
PubChem Compound Summary for PubChem CID 49726798, "N-(2-((4-(Furan-2-yl)thiazol-2-yl) amino)-2-oxoethyl)-N-methyl-1H-indole-3-carboxamide," created Nov. 27, 2010 <https://pubchem.ncbi.nih.gov/compound/49726798> (8 pages).
PubChem Compound Summary for SID 172131678, dated Dec. 9, 2014 (8 pages).
Pubchem, "Compound Summary for CID 108452511," <https://pubchem.ncbi.nlm.nih.gov/compound/108452511>, created Jan. 15, 2016, retrieved Jan. 4, 2021 (7 pages).
Pubchem, "Compound Summary for CID 2955118," <https://pubchem.ncbi.nlm.nih.gov/compound/2955118>, created Jul. 29, 2005, retrieved Mar. 22, 2017 (13 pages).
Pubchem, "Compound Summary for CID 7325930," <https://pubchem.ncbi.nlm.nih.gov/compound/7325930>, created Jul. 29, 2006, retrieved Mar. 22, 2017 (11 pages).
Pubchem, "Compound Summary for CID 970466," <https://pubchem.ncbi.nlm.nih.gov/compound/970466>, created Jul. 9, 2005, retrieved Mar. 22, 2017 (11 pages).
Quinlan et al., "BEDTools: a flexible suite of utilities for comparing genomic features," Bioinformatics. 26(6):841-2 (2010).
Rajput et al., "Frequency of the TMPRSS2:ERG gene fusion is increased in moderate to poorly differentiated prostate cancers," J Clin Pathol. 60(11):1238-43 (2007).
Ramos et al., "Current Approaches in the Treatment of Relapsed and Refractory Acute Myeloid Leukemia," J Clin Med. 4(4):665-95 (Apr. 2015).
Rappsilber et al., "Protocol for micro-purification, enrichment, pre-fractionation and storage of peptides for proteomics using StageTips," Nat Protoc. 2(8):1896-906 (2007).
Schiefer et al., "Design, synthesis, and optimization of novel epoxide incorporating peptidomimetics as selective calpain inhibitors," J Med Chem. 56(15):6054-68 (Aug. 8, 2013).
Scott et al., "Searching for peptide ligands with an epitope library," Science. 249(4967):386-390 (1990).
Shen et al., "The SWI/SNF ATPase Brm is a gatekeeper of proliferative control in prostate cancer," Cancer Res. 68(24):10154-62 (Dec. 2008).
Shi et al., "Role of SWI/SNF in acute leukemia maintenance and enhancer-mediated Myc regulation," Genes Dev. 27(24):2648-62 (Dec. 2013).
Siegel et al., "Cancer statistics, 2015," CA Cancer J Clin. 65(1):5-29 (2015).
STN Registry Database, CAS RN 858073-83-3, Albany Molecular Research, Inc., entered Aug. 3, 2005 (1 page).
STN Registry Database, RN 1010893-05-6, entered Mar. 30, 2008 (2 pages).
STN Registry Database, RN 1049271-26-2, entered Sep. 14, 2008 (2 pages).
STN Registry Database, RN 1081662-32-9, entered Dec. 8, 2008 (2 pages).
STN Registry Database, RN 1209112-42-4, entered Mar. 12, 2010 (2 pages).
STN Registry Database, RN 1246047-75-5, entered Oct. 12, 2010 (2 pages).
STN Registry Database, RN 1308280-67-2, entered Jun. 9, 2011 (2 pages).
STN Registry Database, RN 1351682-19-3, entered Dec. 22, 2011 (2 pages).
STN Registry Database, RN 1401558-47-1, entered Oct. 22, 2012 (2 pages).
STN Registry Database, RN 1455783-72-8, entered Oct. 6, 2013 (2 pages).
STN Registry Database, RN 1576383-94-2, entered Mar. 31, 2014 (2 pages).
STN Registry Database, RN 1586193-45-4, entered Apr. 17, 2014 (2 pages).
STN Registry Database, RN 1827759-12-5, entered Dec. 13, 2015 (2 pages).
STN Registry Database, RN 1831899-24-1, entered Dec. 17, 2015 (2 pages).

(56) References Cited

OTHER PUBLICATIONS

STN Registry Database, RN 1839545-15-1, entered Dec. 31, 2015 (2 pages).
STN Registry Database, RN 923768-18-7, entered Feb. 28, 2007 (2 pages).
STN Registry Database, RN 923809-79-4, entered Feb. 28, 2007 (2 pages).
STN Registry Database, RN 931893-54-8, entered Apr. 23, 2007 (2 pages).
STN Registry Database, RN 932130-00-2, entered Apr. 24, 2007 (2 pages).
STN Registry Database, RN 938283-11-5, entered Jun. 22, 2007 (2 pages).
Subramanian et al., "Gene set enrichment analysis: a knowledge-based approach for interpreting genome-wide expression profiles," Proc Natl Acad Sci USA. 102(43):15545-50 (2005).
Sun et al., "TMPRSS2-ERG fusion, a common genomic alteration in prostate cancer activates C-MYC and abrogates prostate epithelial differentiation," available in PMC Oct. 4, 2020. Published in final edited form as: Oncogene. 27(40)5348-53 (2008) (12 pages).
Szabo et al., "Surface plasmon resonance and its use in biomolecular interaction analysis (BIA)," Curr Opin Struct Biol. 5(5):699-705 (1995).
Tikdari et al., "Reaction of 2-Aminothiazoles with 5-Oxazolones," ChemInform. 18(47):Abstract 199 (1987) (1 page).
Tikdari et al., "Reaction of 2-Aminothiazoles with 5-Oxazolones," Indian Journal of Chemistry 26B:478-9 (May 1987).
Tomlins et al., "Recurrent fusion of TMPRSS2 and ETS transcription factor genes in prostate cancer," Science.310(5748):644-8 (2005).
Tomlins et al., "Role of the TMPRSS2-ERG gene fusion in prostate cancer," Neoplasia. 10(2):177-88 (2008) (21 pages).
Tomlins et al., "TMPRSS2:ETV4 gene fusions define a third molecular subtype of prostate cancer," Cancer Res. 66(7):3396-400 (2006).
Tsai et al. "Dimeric CRISPR RNA-guided FokI Nucleases for Highly Specific Genome Editing," available in PMC Dec. 1, 2014, published in final edited form as: Nat Biotechnol. 32(6):569-576 (Jun. 2014) (22 pages).
Tuoc et al., "Chromatin regulation by BAF170 controls cerebral cortical size and thickness, " Dev Cell. 25(3):256-69 (May 2013).
Vachtenheim et al., "SWI/SNF chromatin remodeling complex is critical for the expression of microphthalmia-associated transcription factor in melanoma cells," Biochemical and Biophysical Research Communications. 392(3):454-459 (2010).
Varambally et al., "The polycomb group protein EZH2 is involved in progression of prostate cancer," Nature. 419(6907):624-9 (2002).
Vela et al., "Discovery of Enhancers of the Secretion of Leukemia Inhibitory Factor for the Treatment of Multiple Sclerosis," J Biomol Screen. 21(5):437-45 (Jun. 2016).
Verger et al., "Identification of amino acid residues in the ETS transcription factor Erg that mediate Erg-Jun/Fos-DNA ternary complex formation," J Biol Chem. 276(20):17181-9 (2001).
Wollenick et al., "Synthetic transactivation screening reveals ETV4 as broad coactivator of hypoxia-inducible factor signaling," Nucleic Acids Res. 40(5):1928-43 (2012).
Yang et al., "EZH2, an epigenetic driver of prostate cancer," Protein Cell. 4(5):331-41 (2013).
Yildirim et al., "Mbd3/NURD complex regulates expression of 5-hydroxymethylcytosine marked genes in embryonic stem cells," Cell. 147(7):1498-510 (2011).
Yu et al., "An integrated network of androgen receptor, polycomb, and TMPRSS2-ERG gene fusions in prostate cancer progression," Cancer Cell. 17(5):443-54 (2010).
Yu et al., "Direct recruitment of polycomb repressive complex 1 to chromatin by core binding transcription factors," Mol Cell. 45(3):330-43 (2012).
Zervos et al., "Mxi1, a protein that specifically interacts with Max to bind Myc-Max recognition sites," Cell. 72(2):223-32 (1993).
Zhang et al., "Discovery of novel dual-action antidiabetic agents that inhibit glycogen phosphorylase and activate glucokinase," Eur J Med Chem. 58:624-39 (Dec. 2012).
Zhang et al., "Model-based analysis of ChIP-Seq (MACS)," Genome Biol. 9(9):R137 (2008) (9 pages).
Zong et al., "ETS family transcription factors collaborate with alternative signaling pathways to induce carcinoma from adult murine prostate cells," Proc Natl Acad Sci U S A. 106(30):12465-70 (Jul. 2009).
Zuckermann et al., "Discovery of Nanomolar Ligands for 7-Transmembrane G-Protein-Coupled Receptors from a Diverse N-(Substituted)glycine Peptoid Library," J Med Chem. 37(17):2678-2685 (1994).
Zvarec et al., "5-Benzylidenerhodanine and 5-benzylidene-2-4-thiazolidinedione based antibacterials," Bioorg Med Chem Lett. 22(8):2720-2 (2012).
"FLI1 gene," MedlinePlus, published May 1, 2012, <https://medlineplus.gov/genetics/> (3 pages).
"Form S-1 Registration Statement: Foghorn Therapeutics Inc.," as filed with the United States Securities and Exchange Commission on Oct. 2, 2020 (230 pages).
Boulay et al., "Cancer-Specific Retargeting of BAF Complexes by a Prion-like Domain," Cell 171(1):163-78 (Sep. 21, 2017) (36 pages).
CAS RN: 1223164-86-0; STN entry date: May 14, 2010; N-[2-[[4-(3-Fluoro-4-methoxyphenyl)-2-thiazolyl]amino]-2-oxoethyl]-2-methyl-3-furancarboxamide (1page).
CAS RN: 1300403-14-8; STN entry date May 25, 2011; 5-Methyl-N-[2-oxo-2-[ (5-phenyl-2-pyridinyl)amino]ethyl]-2-thiophenecarboxamide (1 page).
CAS RN: 924410-17-3; STN entry date: Mar. 2, 2007; 5-Methyl-N-[2-oxo-2-[ (4-phenyl-2- thiazolyl)amino]ethyl]-2-thiophenecarboxamide (1 page).
CAS RN: 924420-04-2; STN entry date: Mar. 2, 2007; 5-Methyl-N-[2-oxo-2-[[4-(4-pyridinyl)-2-thiazolyl]amino]ethyl]-2-thiophenecarboxamide (1 page).
Chandler et al., "ARID1a-DNA interactions are required for promoter occupancy by SWI/SNF," Mol Cell Biol. 33(2):265-80 (Jan. 2013).
Chattopahdyay et al., "Uveal melanoma: From diagnosis to treatment and the science in between," Cancer. 122(15):2299-2312 (26 pages) (Aug. 2016).
Collins et al., "Abstract 2122: The dual BRM/BRG1 (SMARCA2/4) inhibitor FHD-286 induces differentiation in preclinical models of AML," Cancer Res. 83(7_Supplement) (Apr. 2023) (5 pages).
Danziger et al., Automated site-directed drug design: a general algorithm for knowledge acquisition about hydrogen-bonding regions at protein surfaces, Proc R Soc Lond B Biol Sci. 236(1283): 101-113 (Mar. 1989) (14 pages).
Fadul et al., "EWS/FLI utilizes NKX2-2 to repress mesenchymal features of Ewing sarcoma," Genes Cancer 6(3-4):129-43 (Mar. 2015).
Fiskus et al., "Pre-Clinical Efficacy of Targeting Baf Complexes through Inhibition of the Dual Atpases BRG1 and BRM By FHD-286 in Cellular Models of AML of Diverse Genetic Background," Blood. 140(Supplement 1):8819-20 (Nov. 2022) (15 pages).
Grohar et al., "Ecteinascidin 743 interferes with the activity of EWS-FLI1 in Ewing sarcoma cells," Neoplasia 13(2):145-53 (Feb. 2011).
Hentemann, "Abstract ND14: Pharmacological profile and antitumor properties of FHD-286: A novel BAF inhibitor for the treatment of transcription factor-driven cancers," Cancer Res. 82(12_Supplement): ND14 (Jun. 2022) (4 pages).
Herrero-Martín et al., "Stable interference of EWS-FLI1 in an Ewing sarcoma cell line impairs IGF-1/IGF-1R signalling and reveals TOPK as a new target," Br J Cancer 101(1):80-90 (Jul. 7, 2009).
Hohmann et al., "Sensitivity and engineered resistance of myeloid leukemia cells to BRD9 inhibition," Nat Chem Biol. 12(9): 672-679 (Sep. 2016) (12 pages).
International Preliminary Report on Patentability for International Application No. PCT/US2019/056312, mailed Jan. 14, 2020 (10 pages).

(56) References Cited

OTHER PUBLICATIONS

International Search Report and Written Opinion for International Application No. PCT/US18/000339 dated Jan. 28, 2019 (13 pages).
International Search Report and Written Opinion for International Application No. PCT/US19/56312, dated Jan. 14, 2020 (14 pages).
International Search Report and Written Opinion for International Application No. PCT/US19/56365 dated Jan. 30, 2020 (8 pages).
International Search Report and Written Opinion for International Application No. PCT/US2024/024407, mailed Jun. 24, 2024 (15 pages).
International Search Report and Written Opinion for International Application No. PCT/US2024/024428, mailed Jul. 16, 2024 (18 pages).
International Search Report and Written Opinion for International Patent Application No. PCT/US2024/031875, mailed Oct. 18, 2024 (15 pages).
International Search Report and Written Opinion for PCT/US2024/050660, mailed Nov. 26, 2024 (12 pages).
Kedage et al., "An Interaction with Ewing's Sarcoma Breakpoint Protein EWS Defines a Specific Oncogenic Mechanism of ETS Factors Rearranged in Prostate Cancer," Cell Rep. 17(5):1289-301 (Oct. 2, 20165) (14 pages).
Michel et al., "Abstract PR15: BRD9 defines a novel mammalian Swi/Snf (Baf) complex configuration which supports proliferation in AML," Clin Cancer Res. 23(24_Suppl) Abstract PR15 (2017) (4 pages).
Rago et al., "Exquisite Sensitivity to Dual BRG1/BRM ATPase Inhibitors Reveals Broad SWI/SNF Dependencies in Acute Myeloid Leukemia," Mol Cancer Res. 20(3):361-72 (Mar. 1, 2022).
Riggi et al., "EWS-FLI1 utilizes divergent chromatin remodeling mechanisms to directly activate or repress enhancer elements in Ewing sarcoma," Cancer Cell 26(5):668-81 (Nov. 10, 2014) (28 pages).
Sankar et al., "Promiscuous partnerships in Ewing's sarcoma," Cancer Genet. 204(7):351-65 (Jul. 2011) (28 pages).
Selleck Chemicals, "Safety Data Sheet: FHD-286," <https://www.selleckchem.com/msds/MSDS_E1178.pdf>, revised May 1, 2014 (2 pages).
Simone, Part XIV: Oncology: Introduction, Textbook of Medicine, Bennett et al., 20(1), 1004-1010 (1997).
Takigami et al., "Synthetic siRNA targeting the breakpoint of EWS/Fli-1 inhibits growth of Ewing sarcoma xenografts in a mouse model," Int J Cancer 128(1):216-26 (Jan. 1, 2011).
Wu et al., "Targeting the chromatin remodeling enzyme BRG1 increases the efficacy of chemotherapy drugs in breast cancer cells," Oncotarget 7(19):27158-75 (May 1, 20160).
U.S. Appl. No. 63/543,464, Wan et al.
U.S. Appl. No. 63/543,467, Piel et al.
U.S. Appl. No. 63/707,938, Adam et al.
"Compound Summary: N-[(S)-1-[[4-[6-[(2R,6S)-2,6-Dimethylmorpholino]-2-pyridyl]-2-thiazolyl]amino]-3-methoxy-1-oxo-2-propyl]-1-(methylsulfonyl)-1H-pyrrole-3-carboxamide," PubChem. CID: 156818027, <https://pubchem.ncbi.nlm.nih.gov/compound/156818027>, created Nov. 10, 2021, accessed Jan. 19, 2025 (9 pages).
Caira, Mino R. "Crystalline polymorphism of organic compounds." Design of Organic Solids (1998): 163-208 (46 pages).
Kumar et al., "Diazanaphthalen-3-yl carboxamides as inhibitors of proteins of the Wnt pathway and their preparation," Database Caplus. (Jan. 2019) (12 pages).

\* cited by examiner

BRM/BRG1 INHIBITORS AND USES THEREOF

BACKGROUND

The invention relates to compounds useful for modulating BRG1- or BRM-associated factors (BAF) complexes. In particular, the invention relates to compounds useful for treatment of disorders associated with BAF complex function.

Chromatin regulation is essential for gene expression, and ATP-dependent chromatin remodeling is a mechanism by which such gene expression occurs. The human Switch/Sucrose Non-Fermentable (SWI/SNF) chromatin remodeling complex, also known as BAF complex, has two SWI2-like ATPases known as BRG1 (Brahma-related gene-1) and BRM (Brahma). The transcription activator BRG1, also known as ATP-dependent chromatin remodeler SMARCA4, is encoded by the SMARCA4 gene on chromosome 19. BRG1 is overexpressed in some cancer tumors and is needed for cancer cell proliferation. BRM, also known as probable global transcription activator SNF2L2 and/or ATP-dependent chromatin remodeler SMARCA2, is encoded by the SMARCA2 gene on chromosome 9 and has been shown to be essential for tumor cell growth in cells characterized by loss of BRG1 function mutations. Deactivation of BRG and/or BRM results in downstream effects in cells, including cell cycle arrest and tumor suppression.

SUMMARY

The present invention features compounds useful for modulating a BAF complex. In some embodiments, the compounds are useful for the treatment of disorders associated with an alteration in a BAF complex, e.g., a disorder associated with an alteration in one or both of the BRG1 and BRM proteins. The compounds of the invention, alone or in combination with other pharmaceutically active agents, can be used for treating such disorders.

In an aspect, the invention features a compound having the structure:

Formula I

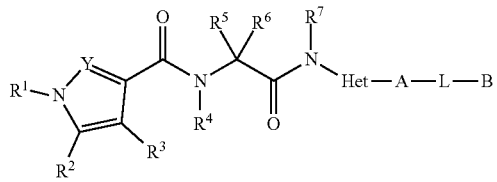

wherein Y is N or CH;

$R^1$ is hydrogen, optionally substituted $C_1$-$C_6$ acyl, optionally substituted $C_1$-$C_6$ alkyl, optionally substituted $C_1$-$C_6$ heteroalkyl, optionally substituted $C_2$-$C_9$ heterocyclyl, or —$SO_2R^8$;

$R^2$ and $R^3$ are, independently, hydrogen, halo, or optionally substituted $C_1$-$C_6$ alkyl, or $R^2$ and $R^3$ combine with the carbons to which they are attached to form a 5- or 6-membered ring;

$R^4$, $R^5$, and $R^7$ are, independently, hydrogen or optionally substituted $C_1$-$C_6$ alkyl;

$R^6$ is hydrogen, optionally substituted $C_1$-$C_6$ alkyl, optionally substituted $C_1$-$C_6$ alkyl $C_6$-$C_{10}$ aryl, optionally substituted $C_1$-$C_6$ alkyl $C_2$-$C_9$ heteroaryl, or optionally substituted $C_1$-$C_6$ heteroalkyl;

$R^8$ is optionally substituted $C_1$-$C_6$ alkyl or —$NR^9R^{10}$;

$R^9$ and $R^{10}$ are, independently, optionally substituted $C_1$-$C_6$ alkyl;

Het is a 5- or 6-membered heteroaryl;

A is optionally substituted $C_6$-$C_{10}$ aryl, optionally substituted $C_2$-$C_9$ heterocyclyl, or optionally substituted $C_2$-$C_9$ heteroaryl;

L is absent, optionally substituted $C_1$-$C_6$ alkyl, optionally substituted $C_1$-$C_6$ alkenyl, or optionally substituted $C_1$-$C_6$ heteroalkyl; and B is hydrogen, cyano, optionally substituted $C_6$-$C_{10}$ aryl, optionally substituted $C_6$-$C_{10}$ cycloalkyl, optionally substituted $C_2$-$C_9$ heterocyclyl, or optionally substituted $C_2$-$C_9$ heteroaryl, or a pharmaceutically acceptable salt thereof.

In some embodiments, $R^5$ is hydrogen. In some embodiments, Het is

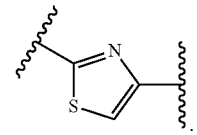

In some embodiments, A is optionally substituted $C_6$-$C_{10}$ aryl. In some embodiments, A is optionally substituted $C_6$-$C_{10}$ heteroaryl. In some embodiments A is

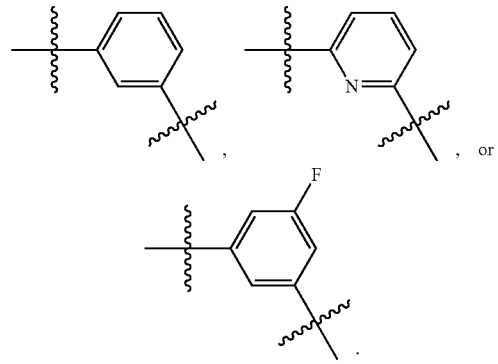

In some embodiments, L is absent.

In some embodiments, the compound has the structure:

Formula II

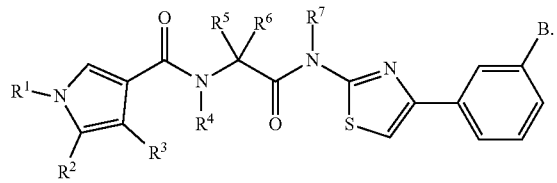

In some embodiments, B is optionally substituted $C_2$-$C_9$ heterocyclyl, or optionally substituted $C_2$-$C_9$ heteroaryl. In some embodiments, B is optionally substituted $C_2$-$C_9$ heterocyclyl (e.g.,

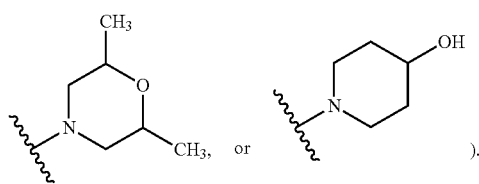

In some embodiments, B is optionally substituted $C_2$-$C_5$ heteroaryl (e.g., N CH$_3$

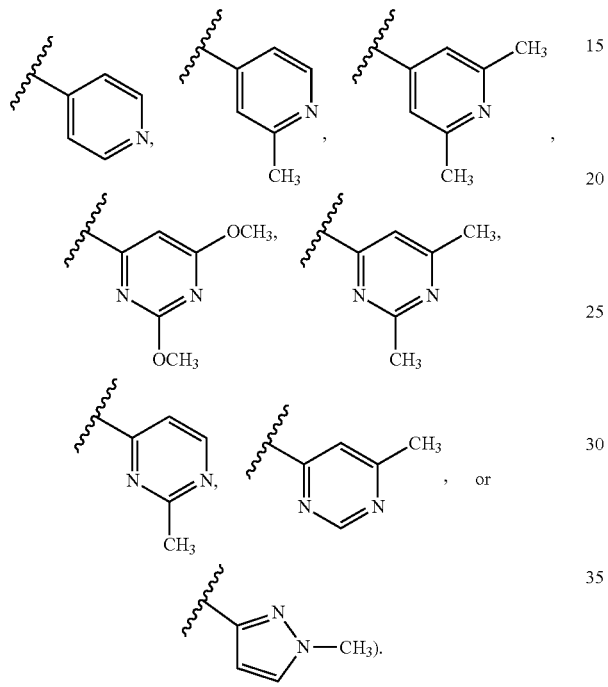

In some embodiments, R$^4$ is hydrogen. In some embodiments, R$^7$ is hydrogen. In some embodiments, R$^1$ is —SO$_2$R$^8$. In some embodiments, R$^8$ is optionally substituted C$_1$-C$_6$ alkyl (e.g., methyl, ethyl, or iso-propyl). In some embodiments, R$^2$ is hydrogen. In some embodiments, R$^2$ is optionally substituted C$_1$-C$_6$ alkyl (e.g., methyl). In some embodiments, R$^3$ is hydrogen. In some embodiments, R$^3$ is optionally substituted C$_1$-C$_6$ alkyl (e.g., methyl).

In some embodiments, R$^2$ and R$^3$ combine with the carbons to which they are attached to form a 5- or 6-membered ring. In some embodiments, the compound has the structure:

Formula III wherein X$^1$ and X$^2$ are N or CH.

In some embodiments, X$^1$ is CH. In some embodiments, X$^1$ is N. In some embodiments, X$^2$ is N. In some embodiments, X$^2$ is CH.

In some embodiments, the compound has the structure:

Formula IV

In some embodiments, the compound is any one of compounds 1-47 in Table 1.

In an aspect, the invention features a pharmaceutical composition comprising any of the foregoing compounds and a pharmaceutically acceptable excipient.

TABLE 1

Compounds of the invention

1

TABLE 1-continued
Compounds of the invention
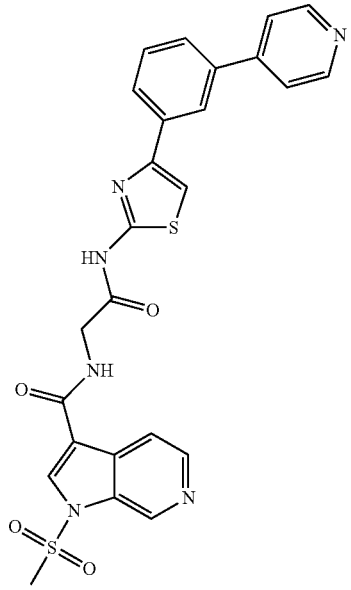 [SMILES: CS(=O)(=O)n1cc(C(=O)NCC(=O)Nc2nc(-c3cccc(-c4ccncc4)c3)cs2)c2ccncc21]
2
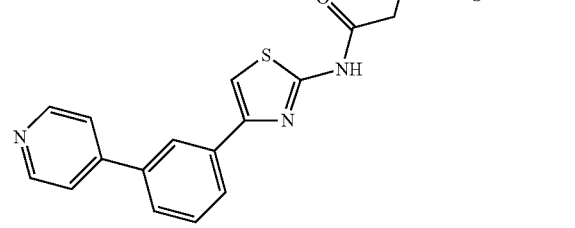
3
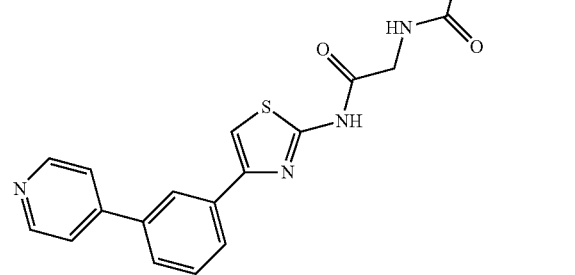
4

TABLE 1-continued
Compounds of the invention
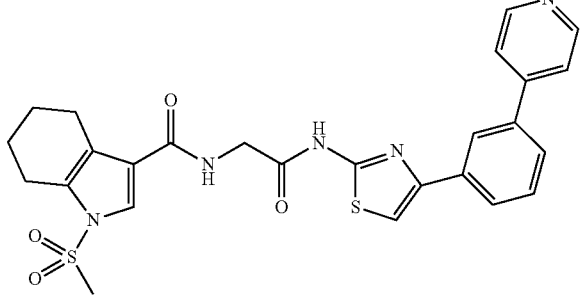
5
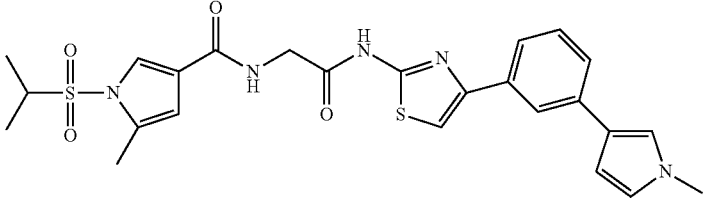 [SMILES: Cc1cc(C(=O)NCC(=O)Nc2nc(-c3cccc(-c4ccn(C)c4)c3)cs2)cn1S(=O)(=O)C(C)C]
6
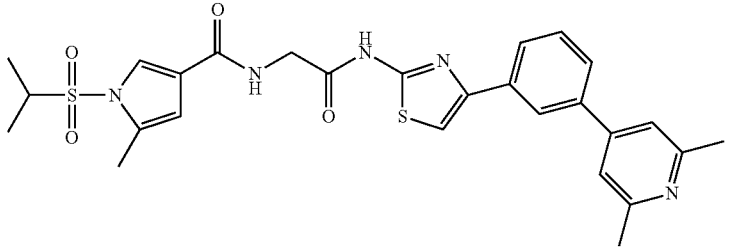 [SMILES: Cc1cc(-c2cccc(-c3csc(NC(=O)CNC(=O)c4cc(C)n(S(=O)(=O)C(C)C)c4)n3)c2)cc(C)n1]
7
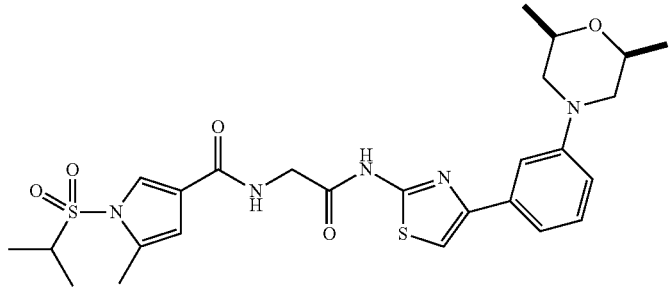 [SMILES: Cc1cc(C(=O)NCC(=O)Nc2nc(-c3cccc(N4C[C@@H](C)O[C@@H](C)C4)c3)cs2)cn1S(=O)(=O)C(C)C]
8
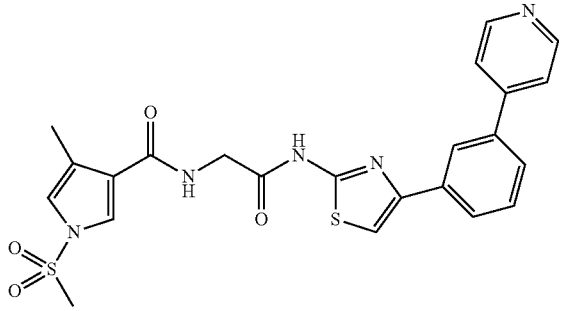 [SMILES: Cc1cn(S(C)(=O)=O)cc1C(=O)NCC(=O)Nc1nc(-c2cccc(-c3ccncc3)c2)cs1]
9

TABLE 1-continued
Compounds of the invention
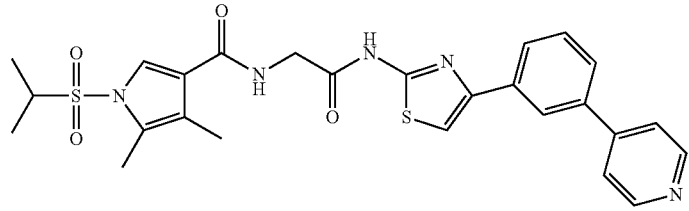 [SMILES: Cc1c(C(=O)NCC(=O)Nc2nc(-c3cccc(-c4ccncc4)c3)cs2)cn(S(=O)(=O)C(C)C)c1C]
10
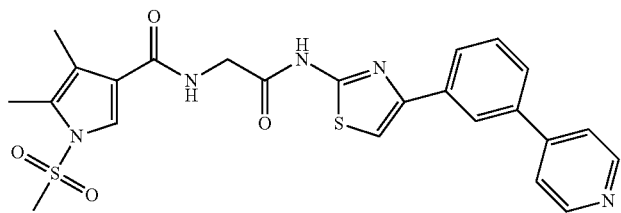 [SMILES: Cc1c(C(=O)NCC(=O)Nc2nc(-c3cccc(-c4ccncc4)c3)cs2)cn(S(C)(=O)=O)c1C]
11
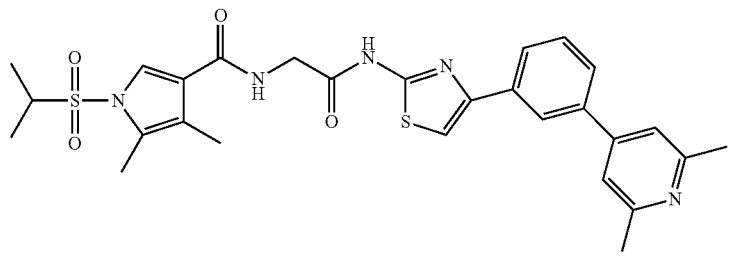
12
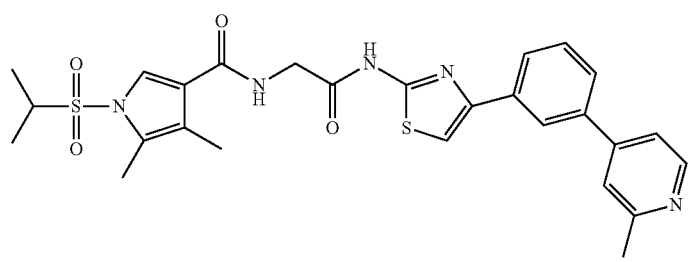
13
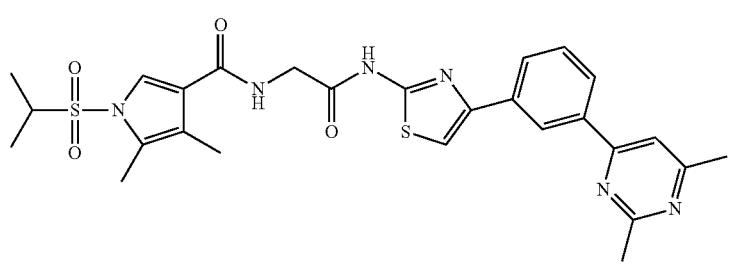 [SMILES: Cc1cc(-c2cccc(-c3csc(NC(=O)CNC(=O)c4cn(S(=O)(=O)C(C)C)c(C)c4C)n3)c2)cc(C)n1]
14
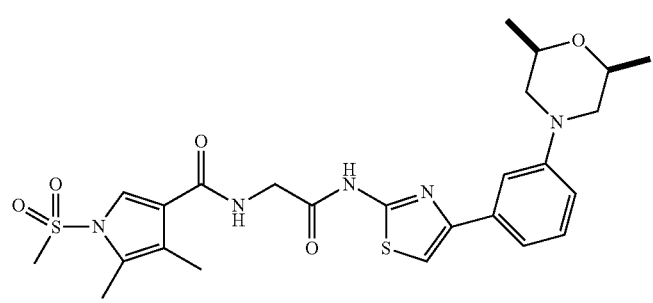 [SMILES: Cc1c(C(=O)NCC(=O)Nc2nc(-c3cccc(N4C[C@@H](C)O[C@@H](C)C4)c3)cs2)cn(S(C)(=O)=O)c1C]
15

TABLE 1-continued
Compounds of the invention
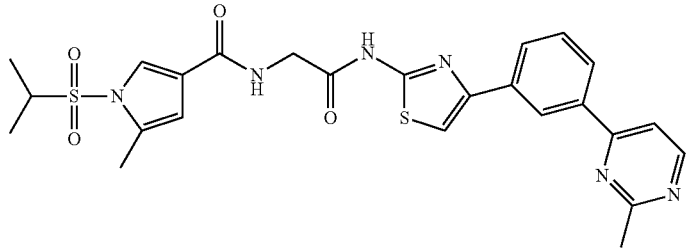 [SMILES: Cc1nccc(-c2cccc(-c3csc(NC(=O)CNC(=O)c4cc(C)n(S(=O)(=O)C(C)C)c4)n3)c2)n1]
16
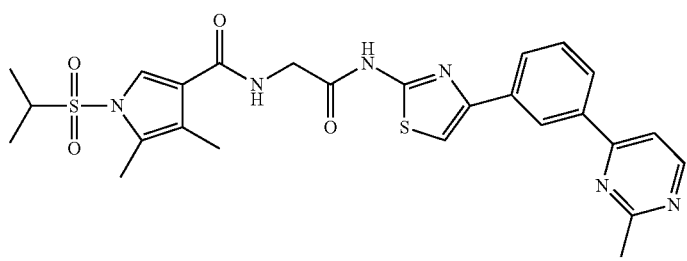 [SMILES: Cc1nccc(-c2cccc(-c3csc(NC(=O)CNC(=O)c4cn(S(=O)(=O)C(C)C)c(C)c4C)n3)c2)n1]
17
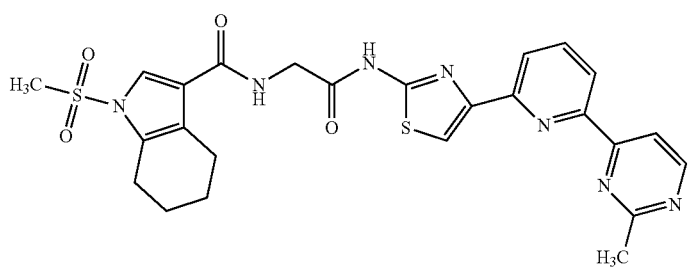 [SMILES: Cc1nccc(-c2cccc(-c3csc(NC(=O)CNC(=O)c4cn(S(C)(=O)=O)c5c4CCCC5)n3)n2)n1]
18
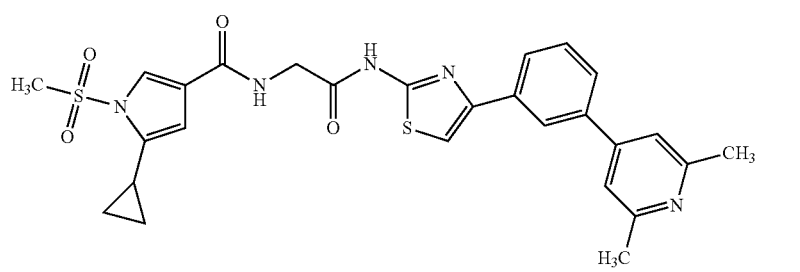
19
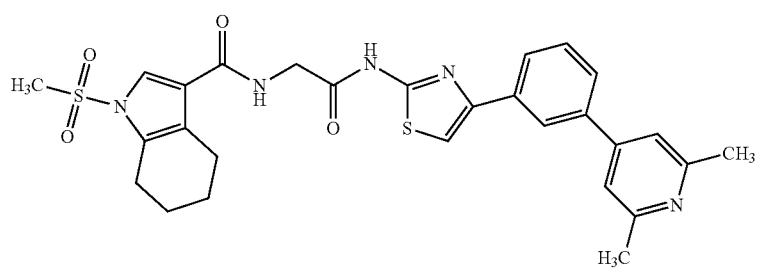
20

TABLE 1-continued
Compounds of the invention
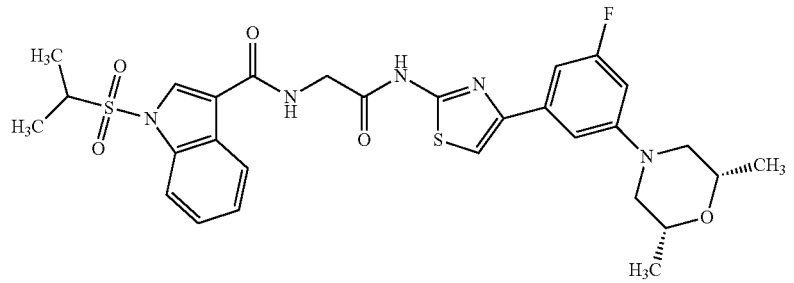 [SMILES: CC(C)S(=O)(=O)n1cc(C(=O)NCC(=O)Nc2nc(-c3cc(F)cc(N4C[C@@H](C)O[C@@H](C)C4)c3)cs2)c2ccccc21]
21
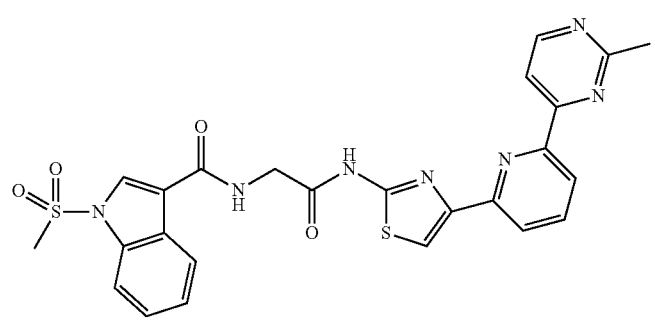 [SMILES: Cc1nccc(-c2cccc(-c3csc(NC(=O)CNC(=O)c4cn(S(C)(=O)=O)c5ccccc45)n3)n2)n1]
22
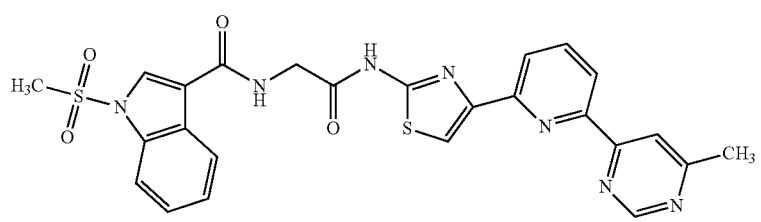
23
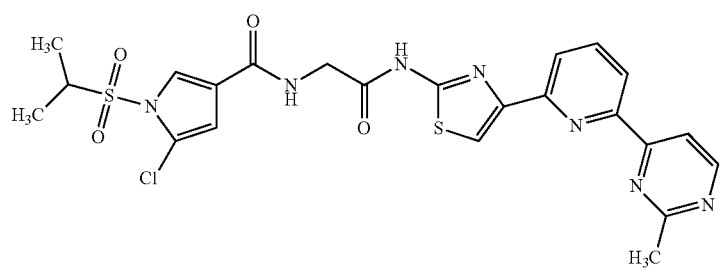 [SMILES: Cc1nccc(-c2cccc(-c3csc(NC(=O)CNC(=O)c4cc(Cl)n(S(=O)(=O)C(C)C)c4)n3)n2)n1]
24
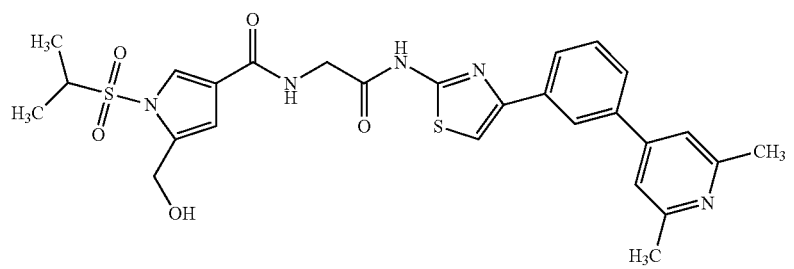 [SMILES: Cc1cc(-c2cccc(-c3csc(NC(=O)CNC(=O)c4cc(CO)n(S(=O)(=O)C(C)C)c4)n3)c2)cc(C)n1]
25

TABLE 1-continued
Compounds of the invention
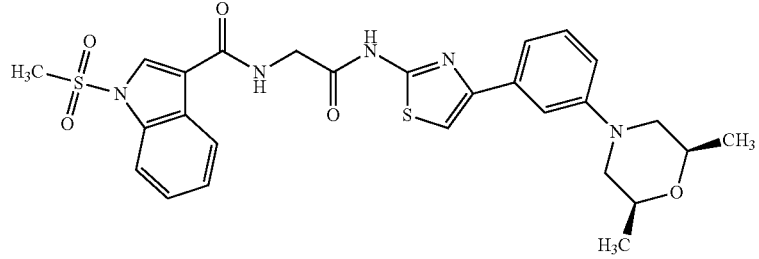
26
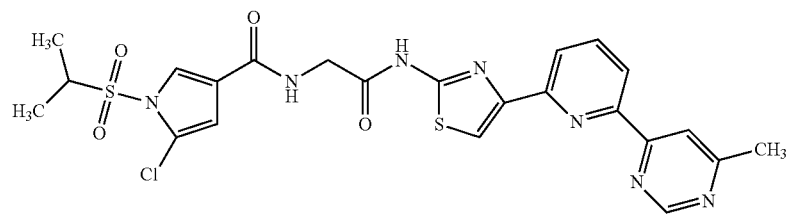 [SMILES: Cc1cc(-c2cccc(-c3csc(NC(=O)CNC(=O)c4cc(Cl)n(S(=O)(=O)C(C)C)c4)n3)n2)ncn1]
27
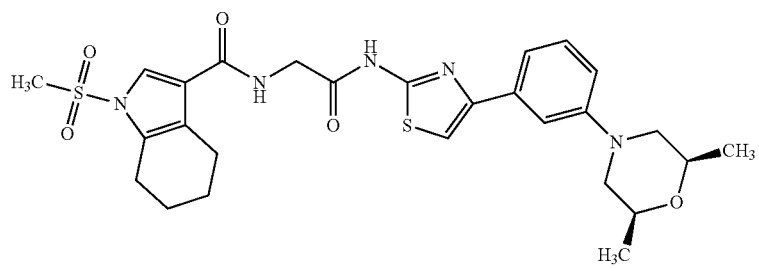
28
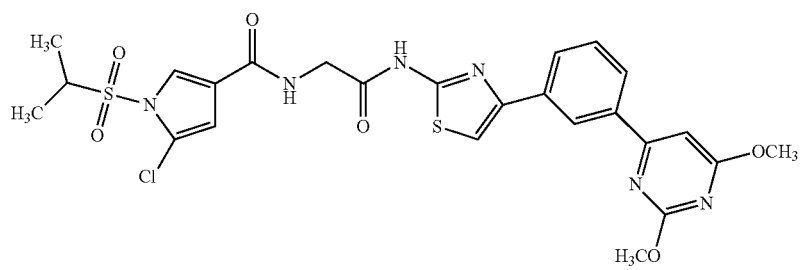 [SMILES: COc1cc(-c2cccc(-c3csc(NC(=O)CNC(=O)c4cc(Cl)n(S(=O)(=O)C(C)C)c4)n3)c2)nc(OC)n1]
29
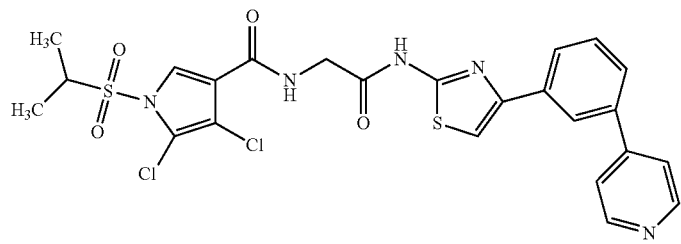 [SMILES: CC(C)S(=O)(=O)n1cc(C(=O)NCC(=O)Nc2nc(-c3cccc(-c4ccncc4)c3)cs2)c(Cl)c1Cl]
30
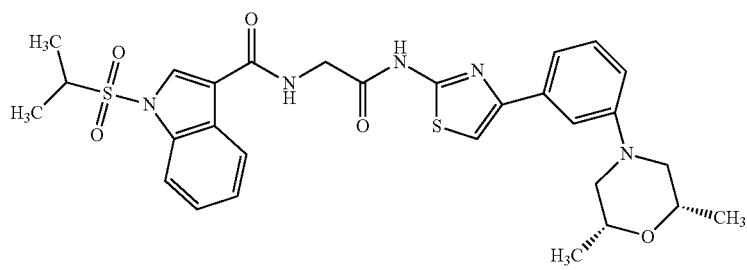 [SMILES: CC(C)S(=O)(=O)n1cc(C(=O)NCC(=O)Nc2nc(-c3cccc(N4C[C@@H](C)O[C@@H](C)C4)c3)cs2)c2ccccc21]
31

TABLE 1-continued
Compounds of the invention
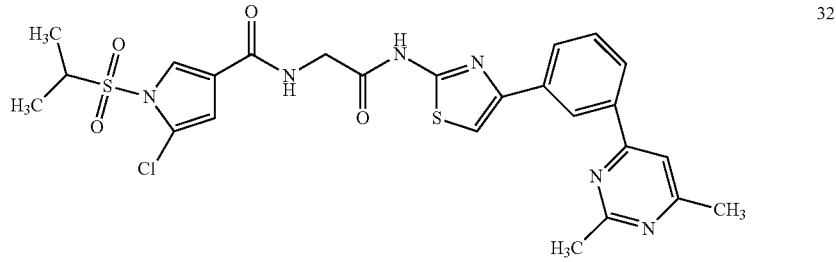 32
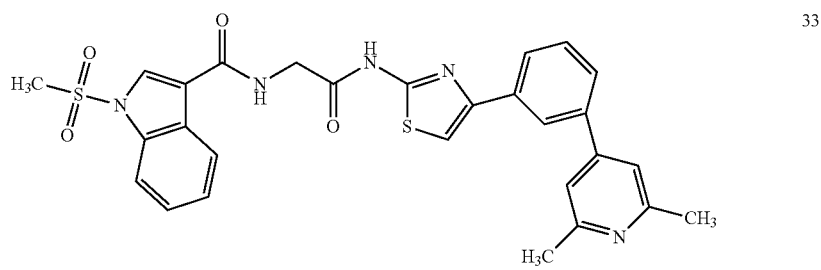 33
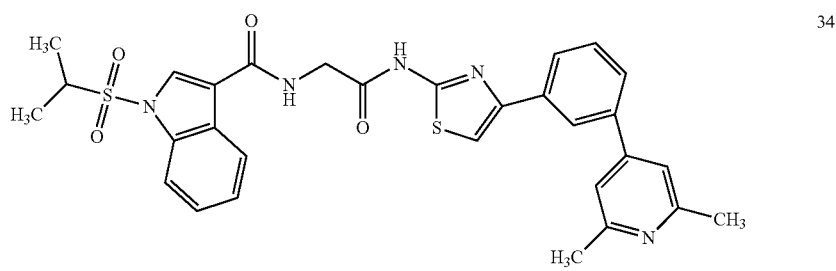 34
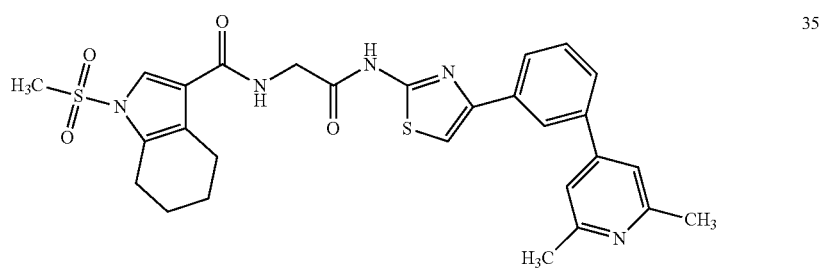 35
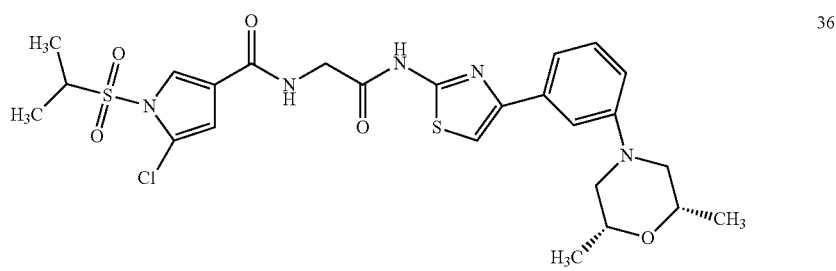 36

TABLE 1-continued
Compounds of the invention
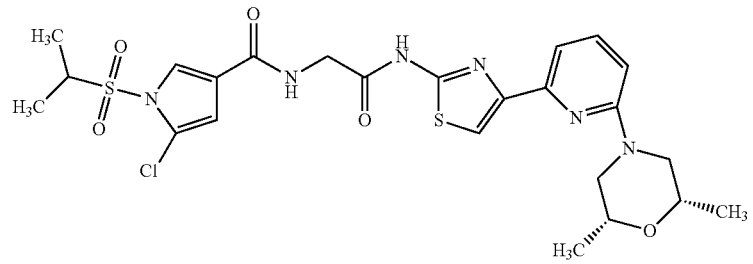 [SMILES: CC(C)S(=O)(=O)n1cc(C(=O)NCC(=O)Nc2nc(-c3cccc(N4C[C@@H](C)O[C@@H](C)C4)c3)cs2)cc1Cl]
37
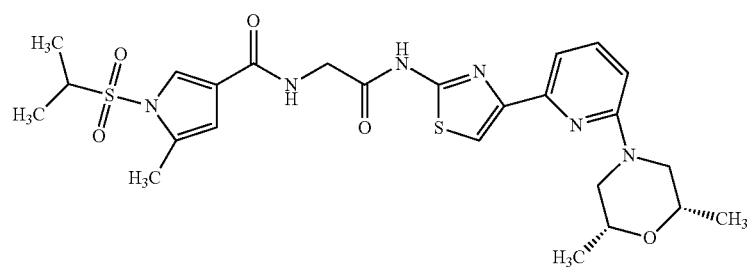 [SMILES: Cc1cc(C(=O)NCC(=O)Nc2nc(-c3cccc(N4C[C@@H](C)O[C@@H](C)C4)n3)cs2)cn1S(=O)(=O)C(C)C]
38
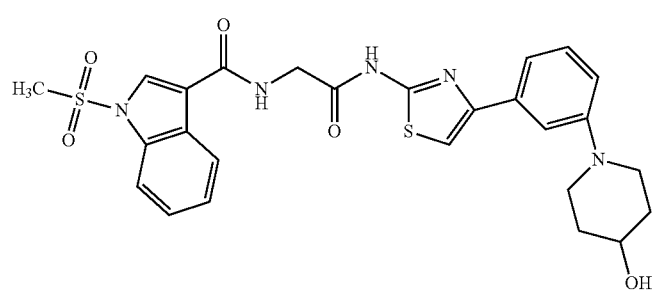 [SMILES: CS(=O)(=O)n1cc(C(=O)NCC(=O)Nc2nc(-c3cccc(N4CCC(O)CC4)c3)cs2)c2ccccc21]
39
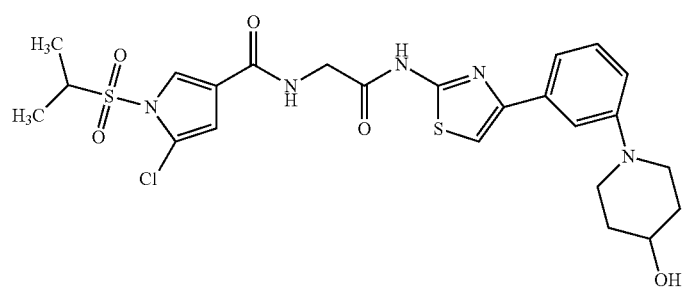 [SMILES: CC(C)S(=O)(=O)n1cc(C(=O)NCC(=O)Nc2nc(-c3cccc(N4CCC(O)CC4)c3)cs2)cc1Cl]
40
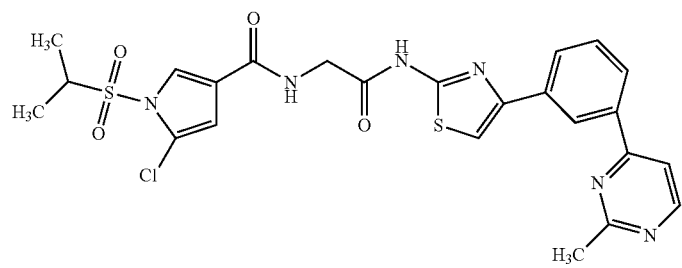 [SMILES: Cc1nccc(-c2cccc(-c3csc(NC(=O)CNC(=O)c4cc(Cl)n(S(=O)(=O)C(C)C)c4)n3)c2)n1]
41

TABLE 1-continued
Compounds of the invention
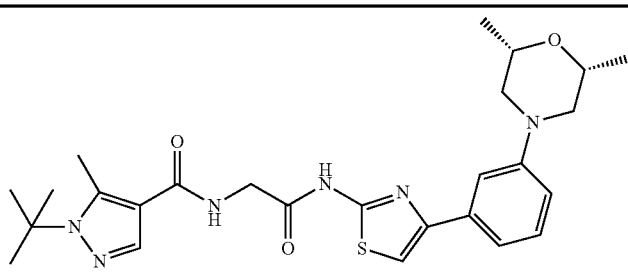
42
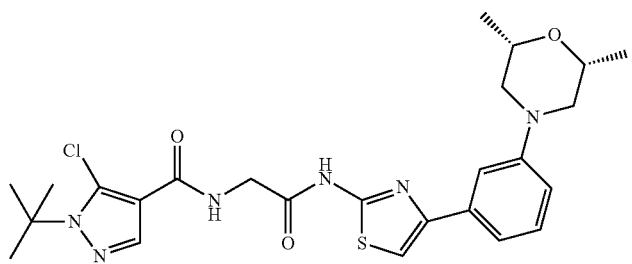 [SMILES: C[C@@H]1CN(c2cccc(-c3csc(NC(=O)CNC(=O)c4cnn(C(C)(C)C)c4Cl)n3)c2)C[C@H](C)O1]
43
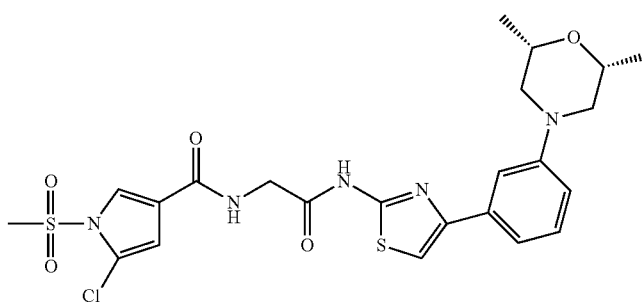
44
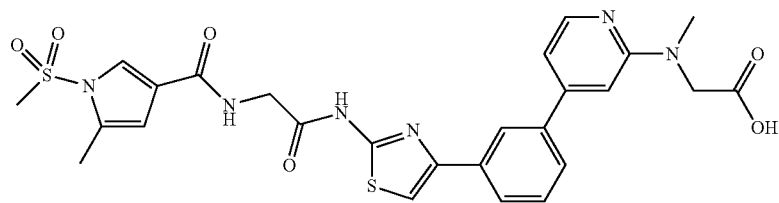 [SMILES: Cc1cc(C(=O)NCC(=O)Nc2nc(-c3cccc(-c4ccnc(N(C)CC(=O)O)c4)c3)cs2)cn1S(C)(=O)=O]
45
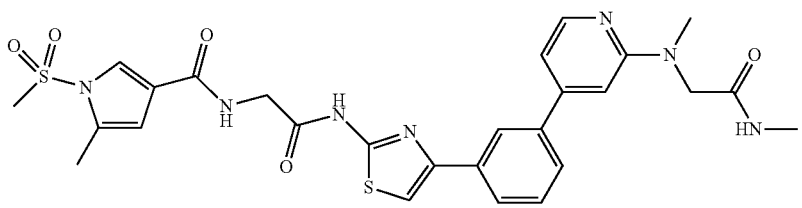
46
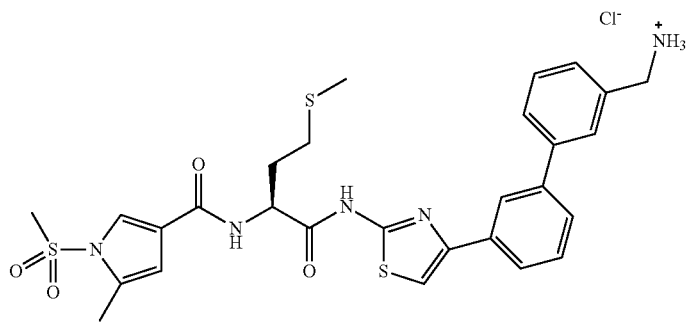 [SMILES: [Cl-] ; CSCC[C@H](NC(=O)c1cc(C)n(S(C)(=O)=O)c1)C(=O)Nc1nc(-c2cccc(-c3cccc(C[NH3+])c3)c2)cs1]
47

In another aspect, the invention features a method of decreasing the activity of a BAF complex in a cell, the method involving contacting the cell with an effective amount of any of the foregoing compounds or a pharmaceutical composition thereof.

In some embodiments, the cell is a cancer cell.

In another aspect, the invention features a method of treating a BAF complex-related disorder in a subject in need thereof, the method involving administering to the subject an effective amount of any of the foregoing compounds (e.g., a BRM/BRG1 dual inhibitor compound or a BRM-selective compound) or a pharmaceutical composition thereof.

In some embodiments, the BAF complex-related disorder is cancer.

In a further aspect, the invention features a method of inhibiting BRM, the method involving contacting a cell with an effective amount of any of the foregoing compounds (e.g., a BRM/BRG1 dual inhibitor compound or a BRM-selective compound) or a pharmaceutical composition thereof.

In some embodiments, the cell is a cancer cell.

In another aspect, the invention features a method of inhibiting BRG1, the method involving contacting the cell with an effective amount of any of the foregoing compounds or a pharmaceutical composition thereof.

In some embodiments, the cell is a cancer cell.

In a further aspect, the invention features a method of inhibiting BRM and BRG1, the method involving contacting the cell with an effective amount of any of the foregoing compounds or a pharmaceutical composition thereof.

In some embodiments, the cell is a cancer cell.

In another aspect, the invention features a method of treating a disorder related to a BRG1 loss of function mutation in a subject in need thereof, the method involving administering to the subject an effective amount of any of the foregoing compounds (e.g., a BRM/BRG1 dual inhibitor compound or a BRM-selective compound) or a pharmaceutical composition thereof.

In some embodiments, the disorder related to a BRG1 loss of function mutation is cancer. In other embodiments, the subject is determined to have a BRG1 loss of function disorder, for example, is determined to have a BRG1 loss of function cancer (for example, the cancer has been determined to include cancer cells with loss of BRG1 function).

In another aspect, the invention features a method of inducing apoptosis in a cell, the method involving contacting the cell with an effective amount of any of the foregoing compounds (e.g., a BRM/BRG1 dual inhibitor compound or a BRM-selective compound) or a pharmaceutical composition thereof.

In some embodiments, the cell is a cancer cell.

In a further aspect, the invention features a method of treating cancer in a subject in need thereof, the method including administering to the subject an effective amount of any of the foregoing compounds (e.g., a BRM/BRG1 dual inhibitor compound or a BRM-selective compound) or a pharmaceutical composition thereof.

In some embodiments of any of the foregoing methods, the cancer is non-small cell lung cancer, colorectal cancer, bladder cancer, cancer of unknown primary, glioma, breast cancer, melanoma, non-melanoma skin cancer, endometrial cancer, esophagogastric cancer, pancreatic cancer, hepatobiliary cancer, soft tissue sarcoma, ovarian cancer, head and neck cancer, renal cell carcinoma, bone cancer, non-Hodgkin lymphoma, small-cell lung cancer, prostate cancer, embryonal tumor, germ cell tumor, cervical cancer, thyroid cancer, salivary gland cancer, gastrointestinal neuroendocrine tumor, uterine sarcoma, gastrointestinal stromal tumor, CNS cancer, thymic tumor, Adrenocortical carcinoma, appendiceal cancer, small bowel cancer, or penile cancer.

In some embodiments of any of the foregoing methods, the cancer is non-small cell lung cancer, colorectal cancer, bladder cancer, cancer of unknown primary, glioma, breast cancer, melanoma, non-melanoma skin cancer, endometrial cancer, or penile cancer.

In some embodiments of any of the foregoing methods, the cancer is a drug resistant cancer or has failed to respond to a prior therapy (e.g., vemurafenib, dacarbazine, a CTLA4 inhibitor, a PD1 inhibitor, interferon therapy, a BRAF inhibitor, a MEK inhibitor, radiotherapy, temozolimide, irinotecan, a CAR-T therapy, herceptin, perjeta, tamoxifen, xeloda, docetaxol, platinum agents such as carboplatin, taxanes such as paclitaxel and docetaxel, ALK inhibitors, MET inihibitors, alimta, abraxane, Adriamycin®, gemcitabine, avastin, halaven, neratinib, a PARP inhibitor, ARN810, an mTOR inhibitor, topotecan, gemzar, a VEGFR2 inhibitor, a folate receptor antagonist, demcizumab, fosbretabulin, or a PDL1 inhibitor).

In some embodiments of any of the foregoing methods, the cancer has or has been determined to have BRG1 mutations. In some embodiments of any of the foregoing methods, the BRG1 mutations are homozygous. In some embodiments of any of the foregoing methods, the cancer does not have, or has been determined not to have, an epidermal growth factor receptor (EGFR) mutation. In some embodiments of any of the foregoing methods, the cancer does not have, or has been determined not to have, an anaplastic lymphoma kinase (ALK) driver mutation. In some embodiments of any of the foregoing methods, the cancer has, or has been determined to have, a KRAS mutation. In some embodiments of any of the foregoing methods, the BRG1 mutation is in the ATPase catalytic domain of the protein. In some embodiments of any of the foregoing methods, the BRG1 mutation is a deletion at the C-terminus of BRG1.

In another aspect, the disclosure provides a method treating a disorder related to BAF (e.g., cancer or viral infections) in a subject in need thereof. This method includes contacting a cell with an effective amount of any of the foregoing compounds (e.g., a BRM/BRG1 dual inhibitor compound or a BRM-selective compound), or pharmaceutically acceptable salts thereof, or any of the foregoing pharmaceutical compositions. In some embodiments, the disorder is a viral infection is an infection with a virus of the Retroviridae family such as the lentiviruses (e.g., Human immunodeficiency virus (HIV) and deltaretroviruses (e.g., human T cell leukemia virus I (HTLV-1), human T cell leukemia virus II (HTLV-II)), Hepadnaviridae family (e.g., hepatitis B virus (HBV)), Flaviviridae family (e.g., hepatitis C virus (HCV)), Adenoviridae family (e.g., Human Adenovirus), Herpesviridae family (e.g., Human cytomegalovirus (HCMV), Epstein-Barr virus, herpes simplex virus 1 (HSV-1), herpes simplex virus 2 (HSV-2), human herpesvirus 6 (HHV-6), Herpesvitus K*, CMV, varicella-zoster virus), Papillomaviridae family (e.g., Human Papillomavirus (HPV, HPV E1)), Parvoviridae family (e.g., Parvovirus B19), Polyomaviridae family (e.g., JC virus and BK virus), Paramyxoviridae family (e.g., Measles virus), Togaviridae family (e.g., Rubella virus). In some embodiments, the disorder is Coffin Siris, Neurofibromatosis (e.g., NF-1, NF-2, or Schwannomatosis), or Multiple Meningioma.

In another aspect, the disclosure provides a method for treating a viral infection in a subject in need thereof. This method includes administering to the subject an effective amount of any of the foregoing compounds (e.g., a BRM/BRG1 dual inhibitor compound or a BRM-selective compound), or pharmaceutically acceptable salts thereof, or any of the foregoing pharmaceutical compositions. In some embodiments, the viral infection is an infection with a virus of the Retroviridae family such as the lentiviruses (e.g., Human immunodeficiency virus (HIV) and deltaretroviruses (e.g., human T cell leukemia virus I (HTLV-1), human T cell leukemia virus II (HTLV-II)), Hepadnaviridae family (e.g., hepatitis B virus (HBV)), Flaviviridae family (e.g., hepatitis C virus (HCV)), Adenoviridae family (e.g., Human Adenovirus), Herpesviridae family (e.g., Human cytomegalovirus (HCMV), Epstein-Barr virus, herpes simplex virus 1 (HSV-1), herpes simplex virus 2 (HSV-2), human herpesvirus 6 (HHV-6), Herpesvitus K*, CMV, varicella-zoster virus), Papillomaviridae family (e.g., Human Papillomavirus (HPV, HPV E1)), Parvoviridae family (e.g., Parvovirus B19), Polyomaviridae family (e.g., JC virus and BK virus), Paramyxoviridae family (e.g., Measles virus), or Togaviridae family (e.g., Rubella virus).

In some embodiments of any of the foregoing aspects, the compound is a BRM-selective compound. In some embodiments, the BRM-selective compound inhibits the level and/or activity of BRM at least 10-fold greater than the compound inhibits the level and/or activity of BRG1 and/or the compound binds to BRM at least 10-fold greater than the compound binds to BRG1. For example, in some embodiments, a BRM-selective compound has an $IC_{50}$ or $IP_{50}$ that is at least 10-fold lower than the $IC_{50}$ or $IP_{50}$ against BRG1. In some embodiments of any of the foregoing aspects, the compound is a BRM/BRG1 dual inhibitor compound. In some embodiments, the BRM/BRG1 dual inhibitor compound has similar activity against both BRM and BRG1 (e.g., the activity of the compound against BRM and BRG1 with within 10-fold (e.g., less than 5-fold, less than 2-fold). In some embodiments, the activity of the BRM/BRG1 dual inhibitor compound is greater against BRM. In some embodiments, the activity of the BRM/BRG1 dual inhibitor compound is greater against BRG1. For example, in some embodiments, a BRM/BRG1 dual inhibitor compound has an $IC_{50}$ or $IP_{50}$ against BRM that is within 10-fold of the $IC_{50}$ or $IP_{50}$ against BRG1.

In another aspect, the invention features a method of treating melanoma, prostate cancer, breast cancer, bone cancer, renal cell carcinoma, or a hematologic cancer in a subject in need thereof, the method including administering to the subject an effective amount of any of the foregoing compounds or pharmaceutical compositions thereof.

In another aspect, the invention features a method of reducing tumor growth of melanoma, prostate cancer, breast cancer, bone cancer, renal cell carcinoma, or a hematologic cancer in a subject in need thereof, the method including administering to the subject an effective amount of any of the foregoing compounds or pharmaceutical compositions thereof.

In another aspect, the invention features a method of suppressing metastatic progression of melanoma, prostate cancer, breast cancer, bone cancer, renal cell carcinoma, or a hematologic cancer in a subject, the method including administering an effective amount of any of the foregoing compounds or pharmaceutical compositions thereof.

In another aspect, the invention features a method of suppressing metastatic colonization of melanoma, prostate cancer, breast cancer, bone cancer, renal cell carcinoma, or a hematologic cancer in a subject, the method including administering an effective amount of any of the foregoing compounds or pharmaceutical compositions thereof.

In another aspect, the invention features a method of reducing the level and/or activity of BRG1 and/or BRM in a melanoma, prostate cancer, breast cancer, bone cancer, renal cell carcinoma, or hematologic cancer cell, the method including contacting the cell with an effective amount of any of the foregoing compounds or pharmaceutical compositions thereof.

In some embodiments of any of the above aspects, the melanoma, prostate cancer, breast cancer, bone cancer, renal cell carcinoma, or hematologic cell is in a subject.

In some embodiments of any of the above aspects, the effective amount of the compound reduces the level and/or activity of BRG1 by at least 5% (e.g., 6%, 7%, 8%, 9%, 10%, 15%, 20%, 25%, 30%, 35%, 40%, 45%, 50%, 55%, 60%, 65%, 70%, 75%, 80%, 85%, 90%, or 95%) as compared to a reference. In some embodiments, the effective amount of the compound that reduces the level and/or activity of BRG1 by at least 50% (e.g., 55%, 60%, 65%, 70%, 75%, 80%, 85%, 90%, or 95%) as compared to a reference. In some embodiments, the effective amount of the compound that reduces the level and/or activity of BRG1 by at least 90% (e.g., 91%, 92%, 93%, 94%, 95%, 96%, 97%, 98%, or 99%).

In some embodiments, the effective amount of the compound reduces the level and/or activity of BRG1 by at least 5% (e.g., 6%, 7%, 8%, 9%, 10%, 15%, 20%, 25%, 30%, 35%, 40%, 45%, 50%, 55%, 60%, 65%, 70%, 75%, 80%, 85%, 90%, or 95%) as compared to a reference for at least 12 hours (e.g., 14 hours, 16 hours, 18 hours, 20 hours, 22 hours, 24 hours, 30 hours, 36 hours, 48 hours, 72 hours, or more). In some embodiments, the effective amount of the compound that reduces the level and/or activity of BRG1 by at least 5% (e.g., 6%, 7%, 8%, 9%, 10%, 15%, 20%, 25%, 30%, 35%, 40%, 45%, 50%, 55%, 60%, 65%, 70%, 75%, 80%, 85%, 90%, or 95%) as compared to a reference for at least 4 days (e.g., 5 days, 6 days, 7 days, 14 days, 28 days, or more).

In some embodiments of any of the above aspects, the effective amount of the compound reduces the level and/or activity of BRM by at least 5% (e.g., 6%, 7%, 8%, 9%, 10%, 15%, 20%, 25%, 30%, 35%, 40%, 45%, 50%, 55%, 60%, 65%, 70%, 75%, 80%, 85%, 90%, or 95%) as compared to a reference. In some embodiments, the effective amount of the compound that reduces the level and/or activity of BRM by at least 50% (e.g., 55%, 60%, 65%, 70%, 75%, 80%, 85%, 90%, or 95%) as compared to a reference. In some embodiments, the effective amount of the compound that reduces the level and/or activity of BRM by at least 90% (e.g., 91%, 92%, 93%, 94%, 95%, 96%, 97%, 98%, or 99%).

In some embodiments, the effective amount of the compound reduces the level and/or activity of BRM by at least 5% (e.g., 6%, 7%, 8%, 9%, 10%, 15%, 20%, 25%, 30%, 35%, 40%, 45%, 50%, 55%, 60%, 65%, 70%, 75%, 80%, 85%, 90%, or 95%) as compared to a reference for at least 12 hours (e.g., 14 hours, 16 hours, 18 hours, 20 hours, 22 hours, 24 hours, 30 hours, 36 hours, 48 hours, 72 hours, or more). In some embodiments, the effective amount of the compound that reduces the level and/or activity of BRM by at least 5% (e.g., 6%, 7%, 8%, 9%, 10%, 15%, 20%, 25%, 30%, 35%, 40%, 45%, 50%, 55%, 60%, 65%, 70%, 75%, 80%, 85%, 90%, or 95%) as compared to a reference for at least 4 days (e.g., 5 days, 6 days, 7 days, 14 days, 28 days, or more).

In some embodiments, the subject has cancer. In some embodiments, the cancer expresses BRG1 and/or BRM protein and/or the cell or subject has been identified as expressing BRG1 and/or BRM. In some embodiments, the cancer expresses BRG1 protein and/or the cell or subject has been identified as expressing BRG1. In some embodiments, the cancer expresses BRM protein and/or the cell or subject has been identified as expressing BRM. In some embodiments, the cancer is melanoma (e.g., uveal melanoma, mucosal melanoma, or cutaneous melanoma). In some embodiments, the cancer is prostate cancer. In some embodiments, the cancer is a hematologic cancer, e.g., multiple myeloma, large cell lymphoma, acute T-cell leukemia, acute myeloid leukemia, myelodysplastic syndrome, immunoglobulin A lambda myeloma, diffuse mixed histiocytic and lymphocytic lymphoma, B-cell lymphoma, acute lymphoblastic leukemia (e.g., T-cell acute lymphoblastic leukemia or B-cell acute lymphoblastic leukemia), diffuse large cell lymphoma, or non-Hodgkin's lymphoma. In some embodiments, the cancer is breast cancer (e.g., an ER positive breast cancer, an ER negative breast cancer, triple positive breast cancer, or triple negative breast cancer). In some embodiments, the cancer is a bone cancer (e.g., Ewing's sarcoma). In some embodiments, the cancer is a renal cell carcinoma (e.g., a Microphthalmia Transcription Factor (MITF) family translocation renal cell carcinoma (tRCC)). In some embodiments, the cancer is metastatic (e.g., the cancer has spread to the liver). The metastatic cancer can include cells exhibiting migration and/or invasion of migrating cells and/or include cells exhibiting endothelial recruitment and/or angiogenesis. In other embodiments, the migrating cancer is a cell migration cancer. In still other embodiments, the cell migration cancer is a non-metastatic cell migration cancer. The metastatic cancer can be a cancer spread via seeding the surface of the peritoneal, pleural, pericardial, or subarachnoid spaces. Alternatively, the metastatic cancer can be a cancer spread via the lymphatic system, or a cancer spread hematogenously. In some embodiments, the effective amount of an agent that reduces the level and/or activity of BRG1 and/or BRM is an amount effective to inhibit metastatic colonization of the cancer to the liver.

In some embodiments the cancer harbors a mutation in GNAQ. In some embodiments the cancer harbors a mutation in GNA11. In some embodiments the cancer harbors a mutation in PLCB4. In some embodiments the cancer harbors a mutation in CYSLTR2. In some embodiments the cancer harbors a mutation in BAP1. In some embodiments the cancer harbors a mutation in SF3B1. In some embodiments the cancer harbors a mutation in EIF1AX. In some embodiments the cancer harbors a TFE3 translocation. In some embodiments the cancer harbors a TFEB translocation. In some embodiments the cancer harbors a MITF translocation. In some embodiments the cancer harbors an EZH2 mutation. In some embodiments the cancer harbors a SUZ12 mutation. In some embodiments the cancer harbors an EED mutation.

In some embodiments, the method further includes administering to the subject or contacting the cell with an anticancer therapy, e.g., a chemotherapeutic or cytotoxic agent, immunotherapy, surgery, radiotherapy, thermotherapy, or photocoagulation. In some embodiments, the anticancer therapy is a chemotherapeutic or cytotoxic agent, e.g., an antimetabolite, antimitotic, antitumor antibiotic, asparagine-specific enzyme, bisphosphonates, antineoplastic, alkylating agent, DNA-Repair enzyme inhibitor, histone deacetylase inhibitor, corticosteroid, demethylating agent, immunomodulatory, janus-associated kinase inhibitor, phosphinositide 3-kinase inhibitor, proteasome inhibitor, or tyrosine kinase inhibitor.

In some embodiments, the compound of the invention is used in combination with another anti-cancer therapy used for the treatment of uveal melanoma such as surgery, a MEK inhibitor, and/or a PKC inhibitor. For example, in some embodiments, the method further comprises performing surgery prior to, subsequent to, or at the same time as administration of the compound of the invention. In some embodiments, the method further comprises administration of a MEK inhibitor and/or a PKC inhibitor prior to, subsequent to, or at the same time as administration of the compound of the invention.

In some embodiments, the anticancer therapy and the compound of the invention are administered within 28 days of each other and each in an amount that together are effective to treat the subject.

In some embodiments, the subject or cancer has and/or has been identified as having a BRG1 loss of function mutation. In some embodiments, the subject or cancer has and/or has been identified as having a BRM loss of function mutation.

In some embodiments, the cancer is resistant to one or more chemotherapeutic or cytotoxic agents (e.g., the cancer has been determined to be resistant to chemotherapeutic or cytotoxic agents such as by genetic markers, or is likely to be resistant, to chemotherapeutic or cytotoxic agents such as a cancer that has failed to respond to a chemotherapeutic or cytotoxic agent). In some embodiments, the cancer has failed to respond to one or more chemotherapeutic or cytotoxic agents. In some embodiments, the cancer is resistant or has failed to respond to dacarbazine, temozolomide, cisplatin, treosulfan, fotemustine, IMCgp100, a CTLA-4 inhibitor (e.g., ipilimumab), a PD-1 inhibitor (e.g., Nivolumab or pembrolizumab), a PD-L1 inhibitor (e.g., atezolizumab, avelumab, or durvalumab), a mitogen-activated protein kinase (MEK) inhibitor (e.g., selumetinib, binimetinib, or tametinib), and/or a protein kinase C (PKC) inhibitor (e.g., sotrastaurin or IDE196).

In some embodiments, the cancer is resistant to or failed to respond to a previously administered therapeutic used for the treatment of uveal melanoma such as a MEK inhibitor or PKC inhibitor. For example, in some embodiments, the cancer is resistant to or failed to respond to a mitogen-activated protein kinase (MEK) inhibitor (e.g., selumetinib, binimetinib, or tametinib), and/or a protein kinase C (PKC) inhibitor (e.g., sotrastaurin or IDE196).

Chemical Terms The terminology employed herein is for the purpose of describing particular embodiments and is not intended to be limiting.

For any of the following chemical definitions, a number following an atomic symbol indicates that total number of atoms of that element that are present in a particular chemical moiety. As will be understood, other atoms, such as H atoms, or substituent groups, as described herein, may be present, as necessary, to satisfy the valences of the atoms. For example, an unsubstituted $C_2$ alkyl group has the formula —$CH_2CH_3$.

When used with the groups defined herein, a reference to the number of carbon atoms includes the divalent carbon in acetal and ketal groups but does not include the carbonyl carbon in acyl, ester, carbonate, or carbamate groups. A reference to the number of oxygen, nitrogen, or sulfur atoms in a heteroaryl group only includes those atoms that form a part of a heterocyclic ring.

The term "acyl," as used herein, represents a H or an alkyl group that is attached to a parent molecular group through a carbonyl group, as defined herein, and is exemplified by formyl (i.e., a carboxyaldehyde group), acetyl, trifluoroacetyl, propionyl, and butanoyl. Exemplary unsubstituted acyl groups include from 1 to 6, from 1 to 11, or from 1 to 21 carbons.

The term "alkyl," as used herein, refers to a branched or straight-chain monovalent saturated aliphatic hydrocarbon radical of 1 to 20 carbon atoms (e.g., 1 to 16 carbon atoms, 1 to 10 carbon atoms, 1 to 6 carbon atoms, or 1 to 3 carbon atoms).

An alkylene is a divalent alkyl group. The term "alkenyl," as used herein, alone or in combination with other groups, refers to a straight chain or branched hydrocarbon residue having a carbon-carbon double bond and having 2 to 20 carbon atoms (e.g., 2 to 16 carbon atoms, 2 to 10 carbon atoms, 2 to 6 carbon atoms, or 2 carbon atoms).

The term "alkynyl," as used herein, alone or in combination with other groups, refers to a straight chain or branched hydrocarbon residue having a carbon-carbon triple bond and having 2 to 20 carbon atoms (e.g., 2 to 16 carbon atoms, 2 to 10 carbon atoms, 2 to 6 carbon atoms, or 2 carbon atoms).

The term "amino," as used herein, represents $-N(R^{N1})_2$, wherein each $R^{N1}$ is, independently, H, OH, $NO_2$, $N(R^{N2})_2$, $SO_2OR^{N2}$, $SO_2R^{N2}$, $SOR^{N2}$, an N-protecting group, alkyl, alkoxy, aryl, arylalkyl, cycloalkyl, acyl (e.g., acetyl, trifluoroacetyl, or others described herein), wherein each of these recited $R^{N1}$ groups can be optionally substituted; or two $R^{N1}$ combine to form an alkylene or heteroalkylene, and wherein each $R^{N2}$ is, independently, H, alkyl, or aryl. The amino groups of the invention can be an unsubstituted amino (i.e., $-NH_2$) or a substituted amino (i.e., $-N(R^{N1})_2$).

The term "aryl," as used herein, refers to an aromatic mono- or polycarbocyclic radical of 6 to 12 carbon atoms having at least one aromatic ring. Examples of such groups include, but are not limited to, phenyl, naphthyl, 1,2,3,4-tetrahydronaphthyl, 1,2-dihydronaphthyl, indanyl, and 1 H-indenyl.

The term "arylalkyl," as used herein, represents an alkyl group substituted with an aryl group. Exemplary unsubstituted arylalkyl groups are from 7 to 30 carbons (e.g., from 7 to 16 or from 7 to 20 carbons, such as $C_1$-$C_6$ alkyl $C_6$-$C_{10}$ aryl, $C_1$-$C_{10}$ alkyl $C_6$-$C_{10}$ aryl, or $C_1$-$C_{20}$ alkyl $C_6$-$C_{10}$ aryl), such as, benzyl and phenethyl. In some embodiments, the alkyl and the aryl each can be further substituted with 1, 2, 3, or 4 substituent groups as defined herein for the respective groups.

The term "azido," as used herein, represents a $-N_3$ group.

The term "bridged polycycloalkyl," as used herein, refers to a bridged polycyclic group of 5 to 20 carbons, containing from 1 to 3 bridges.

The term "cyano," as used herein, represents a $-CN$ group.

The term "carbocyclyl," as used herein, refers to a non-aromatic $C_3$-$C_{12}$ monocyclic, bicyclic, or tricyclic structure in which the rings are formed by carbon atoms. Carbocyclyl structures include cycloalkyl groups and unsaturated carbocyclyl radicals.

The term "cycloalkyl," as used herein, refers to a saturated, non-aromatic, and monovalent mono- or polycarbocyclic radical of 3 to 10, preferably 3 to 6 carbon atoms. This term is further exemplified by radicals such as cyclopropyl, cyclobutyl, cyclopentyl, cyclohexyl, cycloheptyl, norbornyl, and adamantyl.

The term "halo," as used herein, means a fluorine (fluoro), chlorine (chloro), bromine (bromo), or iodine (iodo) radical.

The term "heteroalkyl," as used herein, refers to an alkyl group, as defined herein, in which one or more of the constituent carbon atoms have been replaced by nitrogen, oxygen, or sulfur. In some embodiments, the heteroalkyl group can be further substituted with 1, 2, 3, or 4 substituent groups as described herein for alkyl groups. Examples of heteroalkyl groups are an "alkoxy" which, as used herein, refers alkyl-O— (e.g., methoxy and ethoxy). A heteroalkylene is a divalent heteroalkyl group. The term "heteroalkenyl," as used herein, refers to an alkenyl group, as defined herein, in which one or more of the constituent carbon atoms have been replaced by nitrogen, oxygen, or sulfur. In some embodiments, the heteroalkenyl group can be further substituted with 1, 2, 3, or 4 substituent groups as described herein for alkenyl groups. Examples of heteroalkenyl groups are an "alkenoxy" which, as used herein, refers alkenyl-O—. A heteroalkenylene is a divalent heteroalkenyl group. The term "heteroalkynyl," as used herein, refers to an alkynyl group, as defined herein, in which one or more of the constituent carbon atoms have been replaced by nitrogen, oxygen, or sulfur. In some embodiments, the heteroalkynyl group can be further substituted with 1, 2, 3, or 4 substituent groups as described herein for alkynyl groups. Examples of heteroalkynyl groups are an "alkynoxy" which, as used herein, refers alkynyl-O—. A heteroalkynylene is a divalent heteroalkynyl group.

The term "heteroaryl," as used herein, refers to an aromatic mono- or polycyclic radical of 5 to 12 atoms having at least one aromatic ring containing 1, 2, or 3 ring atoms selected from nitrogen, oxygen, and sulfur, with the remaining ring atoms being carbon. One or two ring carbon atoms of the heteroaryl group may be replaced with a carbonyl group. Examples of heteroaryl groups are pyridyl, pyrazoyl, benzooxazolyl, benzoimidazolyl, benzothiazolyl, imidazolyl, oxaxolyl, and thiazolyl.

The term "heteroarylalkyl," as used herein, represents an alkyl group substituted with a heteroaryl group. Exemplary unsubstituted heteroarylalkyl groups are from 7 to 30 carbons (e.g., from 7 to 16 or from 7 to 20 carbons, such as $C_1$-$C_6$ alkyl $C_2$-$C_8$ heteroaryl, $C_1$-$C_{10}$ alkyl $C_2$-$C_8$ heteroaryl, or $C_1$-$C_{20}$ alkyl $C_2$-$C_9$ heteroaryl). In some embodiments, the alkyl and the heteroaryl each can be further substituted with 1, 2, 3, or 4 substituent groups as defined herein for the respective groups.

The term "heterocyclyl," as used herein, refers a mono- or polycyclic radical having 3 to 12 atoms having at least one non-aromatic ring containing 1, 2, 3, or 4 ring atoms selected from N, O or S and no aromatic ring containing any N, O, or S atoms. Examples of heterocyclyl groups include, but are not limited to, morpholinyl, thiomorpholinyl, furyl, piperazinyl, piperidinyl, pyranyl, pyrrolidinyl, tetrahydropyranyl, tetrahydrofuranyl, and 1,3-dioxanyl.

The term "heterocyclylalkyl," as used herein, represents an alkyl group substituted with a heterocyclyl group. Exemplary unsubstituted heterocyclylalkyl groups are from 7 to 30 carbons (e.g., from 7 to 16 or from 7 to 20 carbons, such as $C_1$-$C_6$ alkyl $C_2$-$C_8$ heterocyclyl, $C_1$-$C_{10}$ alkyl $C_2$-$C_8$ heterocyclyl, or $C_1$-$C_{20}$ alkyl $C_2$-$C_9$ heterocyclyl). In some embodiments, the alkyl and the heterocyclyl each can be further substituted with 1, 2, 3, or 4 substituent groups as defined herein for the respective groups.

The term "hydroxyalkyl," as used herein, represents alkyl group substituted with an —OH group.

The term "hydroxyl," as used herein, represents an —OH group.

The term "N-protecting group," as used herein, represents those groups intended to protect an amino group against undesirable reactions during synthetic procedures. Commonly used N-protecting groups are disclosed in Greene, "Protective Groups in Organic Synthesis," 3rd Edition (John Wiley & Sons, New York, 1999). N-protecting groups include, but are not limited to, acyl, aryloyl, or carbamyl groups such as formyl, acetyl, propionyl, pivaloyl, t-butylacetyl, 2-chloroacetyl, 2-bromoacetyl, trifluoroacetyl, trichloroacetyl, phthalyl, o-nitrophenoxyacetyl, a-chlorobutyryl, benzoyl, 4-chlorobenzoyl, 4-bromobenzoyl, 4-nitrobenzoyl, and chiral auxiliaries such as protected or unprotected D, L, or D, L-amino acids such as alanine, leucine, and phenylalanine; sulfonyl-containing groups such as benzenesulfonyl, and p-toluenesulfonyl; carbamate forming groups such as benzyloxycarbonyl, p-chlorobenzyloxycarbonyl, p-methoxybenzyloxycarbonyl, p-nitrobenzyloxycarbonyl, 2-nitrobenzyloxycarbonyl, p-bromobenzyloxycarbonyl, 3,4-dimethoxybenzyloxycarbonyl, 3,5-dimethoxybenzyloxycarbonyl, 2,4-dimethoxybenzyloxycarbonyl, 4-methoxybenzyloxycarbonyl, 2-nitro-4,5-dimethoxybenzyloxycarbonyl, 3,4,5-trimethoxybenzyloxycarbonyl, 1-(p-biphenylyl)-1-methylethoxycarbonyl, α,α-dimethyl-3,5-dimethoxybenzyloxycarbonyl, benzhydryloxy carbonyl, t-butyloxycarbonyl, diisopropylmethoxycarbonyl, isopropyloxycarbonyl, ethoxycarbonyl, methoxycarbonyl, allyloxycarbonyl, 2,2,2,-trichloroethoxycarbonyl, phenoxycarbonyl, 4-nitrophenoxy carbonyl, fluorenyl-9-methoxycarbonyl, cyclopentyloxycarbonyl, adamantyloxycarbonyl, cyclohexyloxycarbonyl, and phenylthiocarbonyl, arylalkyl groups such as benzyl, triphenylmethyl, and benzyloxymethyl, and silyl groups, such as trimethylsilyl. Preferred N-protecting groups are alloc, formyl, acetyl, benzoyl, pivaloyl, t-butylacetyl, alanyl, phenylsulfonyl, benzyl, t-butyloxycarbonyl (Boc), and benzyloxycarbonyl (Cbz).

The term "nitro," as used herein, represents an $-NO_2$ group.

The term "oxo," as used herein, represents an $=O$ group.

The term "thiol," as used herein, represents an $-SH$ group.

The alkyl, alkenyl, alkynyl, heteroalkyl, heteroalkenyl, heteroalkynyl, carbocyclyl (e.g., cycloalkyl), aryl, heteroaryl, and heterocyclyl groups may be substituted or unsubstituted. When substituted, there will generally be 1 to 4 substituents present, unless otherwise specified. Substituents include, for example: alkyl (e.g., unsubstituted and substituted, where the substituents include any group described herein, e.g., aryl, halo, hydroxy), aryl (e.g., substituted and unsubstituted phenyl), carbocyclyl (e.g., substituted and unsubstituted cycloalkyl), halo (e.g., fluoro), hydroxyl, heteroalkyl (e.g., substituted and unsubstituted methoxy, ethoxy, or thioalkoxy), heteroaryl, heterocyclyl, amino (e.g., $NH_2$ or mono- or dialkyl amino), azido, cyano, nitro, oxo, or thiol. Aryl, carbocyclyl (e.g., cycloalkyl), heteroaryl, and heterocyclyl groups may also be substituted with alkyl (unsubstituted and substituted such as arylalkyl (e.g., substituted and unsubstituted benzyl)).

Compounds of the invention can have one or more asymmetric carbon atoms and can exist in the form of optically pure enantiomers, mixtures of enantiomers such as, for example, racemates, optically pure diastereoisomers, mixtures of diastereoisomers, diastereoisomeric racemates, or mixtures of diastereoisomeric racemates. The optically active forms can be obtained for example by resolution of the racemates, by asymmetric synthesis or asymmetric chromatography (chromatography with a chiral adsorbents or eluant). That is, certain of the disclosed compounds may exist in various stereoisomeric forms.

Stereoisomers are compounds that differ only in their spatial arrangement. Enantiomers are pairs of stereoisomers whose mirror images are not superimposable, most commonly because they contain an asymmetrically substituted carbon atom that acts as a chiral center. "Enantiomer" means one of a pair of molecules that are mirror images of each other and are not superimposable. Diastereomers are stereoisomers that are not related as mirror images, most commonly because they contain two or more asymmetrically substituted carbon atoms and represent the configuration of substituents around one or more chiral carbon atoms. Enantiomers of a compound can be prepared, for example, by separating an enantiomer from a racemate using one or more well-known techniques and methods, such as, for example, chiral chromatography and separation methods based thereon. The appropriate technique and/or method for separating an enantiomer of a compound described herein from a racemic mixture can be readily determined by those of skill in the art. "Racemate" or "racemic mixture" means a compound containing two enantiomers, wherein such mixtures exhibit no optical activity; i.e., they do not rotate the plane of polarized light. "Geometric isomer" means isomers that differ in the orientation of substituent atoms in relationship to a carbon-carbon double bond, to a cycloalkyl ring, or to a bridged bicyclic system. Atoms (other than H) on each side of a carbon-carbon double bond may be in an E (substituents are on opposite sides of the carbon-carbon double bond) or Z (substituents are oriented on the same side) configuration. "R," "S," "S*," "R*," "E," "Z," "cis," and "trans," indicate configurations relative to the core molecule. Certain of the disclosed compounds may exist in atropisomeric forms. Atropisomers are stereoisomers resulting from hindered rotation about single bonds where the steric strain barrier to rotation is high enough to allow for the isolation of the conformers. The compounds of the invention may be prepared as individual isomers by either isomer-specific synthesis or resolved from an isomeric mixture. Conventional resolution techniques include forming the salt of a free base of each isomer of an isomeric pair using an optically active acid (followed by fractional crystallization and regeneration of the free base), forming the salt of the acid form of each isomer of an isomeric pair using an optically active amine (followed by fractional crystallization and regeneration of the free acid), forming an ester or amide of each of the isomers of an isomeric pair using an optically pure acid, amine or alcohol (followed by chromatographic separation and removal of the chiral auxiliary), or resolving an isomeric mixture of either a starting material or a final product using various well known chromatographic methods. When the stereochemistry of a disclosed compound is named or depicted by structure, the named or depicted stereoisomer is at least 60%, 70%, 80%, 90%, 99%, or 99.9% by weight relative to the other stereoisomers. When a single enantiomer is named or depicted by structure, the depicted or named enantiomer is at least 60%, 70%, 80%, 90%, 99%, or 99.9% by weight optically pure. When a single diastereomer is named or depicted by structure, the depicted or named diastereomer is at least 60%, 70%, 80%, 90%, 99%, or 99.9% by weight pure. Percent optical purity is the ratio of the weight of the enantiomer or over the weight of the enantiomer plus the weight of its optical isomer. Diastereomeric purity by weight is the ratio of the weight of one diastereomer or over the weight of all the diastereomers. When the stereochemistry of a disclosed compound is named or depicted by structure, the named or depicted stereoisomer is at least 60%, 70%, 80%, 90%, 99%, or 99.9% by mole fraction pure relative to the other stereoisomers. When a single enantiomer is named or depicted by structure, the depicted or named enantiomer is at least 60%, 70%, 80%, 90%, 99%, or 99.9% by mole fraction pure. When a single diastereomer is named or depicted by structure, the depicted or named diastereomer is at least 60%, 70%, 80%, 90%, 99%, or 99.9% by mole fraction pure. Percent purity by mole fraction is the ratio of the moles of the enantiomer or over the moles of the enantiomer plus the moles of its optical isomer. Similarly, percent purity by moles fraction is the ratio of the moles of the diastereomer or over the moles of the diastereomer plus the moles of its isomer. When a disclosed compound is named or depicted by structure without indicating the stereochemistry, and the compound has at least one chiral center, it is to be understood that the name or structure encompasses either enantiomer of the compound free from the corresponding optical isomer, a racemic mixture of the compound, or mixtures enriched in one enantiomer relative to its corresponding optical isomer. When a disclosed compound is named or depicted by structure without indicating the stereochemistry and has two or more chiral centers, it is to be understood that the name or structure encompasses a diastereomer free of other diastereomers, a number of diastereomers free from other diastereomeric pairs, mixtures of diastereomers, mixtures of diastereomeric pairs, mixtures of diastereomers in which one diastereomer is enriched relative to the other diastereomer(s), or mixtures of diastereomers in which one or more diastereomer is enriched relative to the other diastereomers. The invention embraces all of these forms.

Compounds of the present disclosure also include all of the isotopes of the atoms occurring in the intermediate or final compounds. "Isotopes" refers to atoms having the same atomic number but different mass numbers resulting from a different number of neutrons in the nuclei. For example, isotopes of hydrogen include tritium and deuterium.

Unless otherwise stated, structures depicted herein are also meant to include compounds that differ only in the presence of one or more isotopically enriched atoms. Exemplary isotopes that can be incorporated into compounds of the present invention include isotopes of hydrogen, carbon, nitrogen, oxygen, phosphorus, sulfur, fluorine, chlorine, and iodine, such as $^2$H, $^3$H, $^{11}$C, $^{13}$C, $^{14}$C, $^{13}$N, $^{15}$N, $^{15}$O, $^{17}$O, $^{18}$O, $^{32}$P, $^{33}$P, $^{35}$S, $^{18}$F, $^{36}$Cl, $^{123}$I and $^{125}$I. Isotopically-labeled compounds (e.g., those labeled with $^3$H and $^{14}$C) can be useful in compound or substrate tissue distribution assays. Tritiated (i.e., $^3$H) and carbon-14 (i.e., $^{14}$C) isotopes can be useful for their ease of preparation and detectability. Further, substitution with heavier isotopes such as deuterium (i.e., $^2$H) may afford certain therapeutic advantages resulting from greater metabolic stability (e.g., increased in vivo half-life or reduced dosage requirements). In some embodiments, one or more hydrogen atoms are replaced by $^2$H or $^3$H, or one or more carbon atoms are replaced by $^{13}$C- or $^{14}$C-enriched carbon. Positron emitting isotopes such as $^{15}$O, $^{13}$N, $^{11}$C, and $^{18}$F are useful for positron emission tomography (PET) studies to examine substrate receptor occupancy. Preparations of isotopically labelled compounds are known to those of skill in the art. For example, isotopically labeled compounds can generally be prepared by following procedures analogous to those disclosed for compounds of the present invention described herein, by substituting an isotopically labeled reagent for a non-isotopically labeled reagent.

Unless otherwise defined, all technical and scientific terms used herein have the same meaning as commonly understood by one of ordinary skill in the art to which this invention belongs. Methods and materials are described herein for use in the present disclosure; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Definitions

In this application, unless otherwise clear from context, (i) the term "a" may be understood to mean "at least one"; (ii) the term "or" may be understood to mean "and/or"; and (iii) the terms "comprising" and "including" may be understood to encompass itemized components or steps whether presented by themselves or together with one or more additional components or steps.

As used herein, the terms "about" and "approximately" refer to a value that is within 10% above or below the value being described. For example, the term "about 5 nM" indicates a range of from 4.5 to 5.5 nM.

As used herein, the term "administration" refers to the administration of a composition (e.g., a compound or a preparation that includes a compound as described herein) to a subject or system. Administration to an animal subject (e.g., to a human) may be by any appropriate route. For example, in some embodiments, administration may be bronchial (including by bronchial instillation), buccal, enteral, interdermal, intra-arterial, intradermal, intragastric, intramedullary, intramuscular, intranasal, intraperitoneal, intrathecal, intratumoral, intravenous, intraventricular, mucosal, nasal, oral, rectal, subcutaneous, sublingual, topical, tracheal (including by intratracheal instillation), transdermal, vaginal, and vitreal.

As used herein, the term "BAF complex" refers to the BRG1- or HRBM-associated factors complex in a human cell.

As used herein, the term "BAF complex-related disorder" refers to a disorder that is caused or affected by the level of activity of a BAF complex.

As used herein, the term "BRG1 loss of function mutation" refers to a mutation in BRG1 that leads to the protein having diminished activity (e.g., at least 1% reduction in BRG1 activity, for example 2%, 5%, 10%, 25%, 50%, or 100% reduction in BRG1 activity). Exemplary BRG1 loss of function mutations include, but are not limited to, a homozygous BRG1 mutation and a deletion at the C-terminus of BRG1.

As used herein, the term "BRG1 loss of function disorder" refers to a disorder (e.g., cancer) that exhibits a reduction in BRG1 activity (e.g., at least 1% reduction in BRG1 activity, for example 2%, 5%, 10%, 25%, 50%, or 100% reduction in BRG1 activity).

The term "cancer" refers to a condition caused by the proliferation of malignant neoplastic cells, such as tumors, neoplasms, carcinomas, sarcomas, leukemias, and lymphomas.

As used herein, a "combination therapy" or "administered in combination" means that two (or more) different agents or treatments are administered to a subject as part of a defined treatment regimen for a particular disease or condition. The treatment regimen defines the doses and periodicity of administration of each agent such that the effects of the separate agents on the subject overlap. In some embodiments, the delivery of the two or more agents is simultaneous or concurrent and the agents may be co-formulated. In some embodiments, the two or more agents are not co-formulated and are administered in a sequential manner as part of a prescribed regimen. In some embodiments, administration of two or more agents or treatments in combination is such that the reduction in a symptom, or other parameter related to the disorder is greater than what would be observed with one agent or treatment delivered alone or in the absence of the other. The effect of the two treatments can be partially additive, wholly additive, or greater than additive (e.g., synergistic). Sequential or substantially simultaneous administration of each therapeutic agent can be effected by any appropriate route including, but not limited to, oral routes, intravenous routes, intramuscular routes, and direct absorption through mucous membrane tissues. The therapeutic agents can be administered by the same route or by different routes. For example, a first therapeutic agent of the combination may be administered by intravenous injection while a second therapeutic agent of the combination may be administered orally.

By "determining the level" of a protein or RNA is meant the detection of a protein or an RNA, by methods known in the art, either directly or indirectly. "Directly determining" means performing a process (e.g., performing an assay or test on a sample or "analyzing a sample" as that term is defined herein) to obtain the physical entity or value. "Indirectly determining" refers to receiving the physical entity or value from another party or source (e.g., a third party laboratory that directly acquired the physical entity or value). Methods to measure protein level generally include, but are not limited to, western blotting, immunoblotting, enzyme-linked immunosorbent assay (ELISA), radioimmunoassay (RIA), immunoprecipitation, immunofluorescence, surface plasmon resonance, chemiluminescence, fluorescent polarization, phosphorescence, immunohistochemical analysis, matrix-assisted laser desorption/ionization time-of-flight (MALDI-TOF) mass spectrometry, liquid chromatography (LC)-mass spectrometry, microcytometry, microscopy, fluorescence activated cell sorting (FACS), and flow cytometry, as well as assays based on a property of a protein including, but not limited to, enzymatic activity or interaction with other protein partners. Methods to measure RNA levels are known in the art and include, but are not limited to, quantitative polymerase chain reaction (qPCR) and Northern blot analyses.

By a "decreased level" or an "increased level" of a protein or RNA is meant a decrease or increase, respectively, in a protein or RNA level, as compared to a reference (e.g., a decrease or an increase by about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 100%, about 150%, about 200%, about 300%, about 400%, about 500%, or more; a decrease or an increase of more than about 10%, about 15%, about 20%, about 50%, about 75%, about 100%, or about 200%, as compared to a reference; a decrease or an increase by less than about 0.01-fold, about 0.02-fold, about 0.1-fold, about 0.3-fold, about 0.5-fold, about 0.8-fold, or less; or an increase by more than about 1.2-fold, about 1.4-fold, about 1.5-fold, about 1.8-fold, about 2.0-fold, about 3.0-fold, about 3.5-fold, about 4.5-fold, about 5.0-fold, about 10-fold, about 15-fold, about 20-fold, about 30-fold, about 40-fold, about 50-fold, about 100-fold, about 1000-fold, or more). A level of a protein may be expressed in mass/vol (e.g., g/dL, mg/mL, pg/mL, ng/mL) or percentage relative to total protein in a sample.

By "decreasing the activity of a BAF complex" is meant decreasing the level of an activity related to a BAF complex, or a related downstream effect. A non-limiting example of decreasing an activity of a BAF complex is Sox2 activation. The activity level of a BAF complex may be measured using any method known in the art, e.g., the methods described in Kadoch et al. Cell, 2013, 153, 71-85, the methods of which are herein incorporated by reference.

As used herein, the term "inhibiting BRM" refers to blocking or reducing the level or activity of the ATPase catalytic binding domain or the bromodomain of the protein. BRM inhibition may be determined using methods known in the art, e.g., a BRM ATPase assay, a Nano DSF assay, or a BRM Luciferase cell assay.

The term "pharmaceutical composition," as used herein, represents a composition containing a compound described herein formulated with a pharmaceutically acceptable excipient and appropriate for administration to a mammal, for example a human. Typically, a pharmaceutical composition is manufactured or sold with the approval of a governmental regulatory agency as part of a therapeutic regimen for the treatment of disease in a mammal. Pharmaceutical compositions can be formulated, for example, for oral administration in unit dosage form (e.g., a tablet, capsule, caplet, gelcap, or syrup); for topical administration (e.g., as a cream, gel, lotion, or ointment); for intravenous administration (e.g., as a sterile solution free of particulate emboli and in a solvent system suitable for intravenous use); or in any other pharmaceutically acceptable formulation.

A "pharmaceutically acceptable excipient," as used herein, refers to any ingredient other than the compounds described herein (for example, a vehicle capable of suspending or dissolving the active compound) and having the properties of being substantially nontoxic and non-inflammatory in a patient. Excipients may include, for example: antiadherents, antioxidants, binders, coatings, compression aids, disintegrants, dyes (colors), emollients, emulsifiers, fillers (diluents), film formers or coatings, flavors, fragrances, glidants (flow enhancers), lubricants, preservatives, printing inks, sorbents, suspending or dispersing agents, sweeteners, and waters of hydration. Exemplary excipients include, but are not limited to: butylated hydroxytoluene (BHT), calcium carbonate, calcium phosphate (dibasic), calcium stearate, croscarmellose, crosslinked polyvinyl pyrrolidone, citric acid, crospovidone, cysteine, ethylcellulose, gelatin, hydroxypropyl cellulose, hydroxypropyl methylcellulose, lactose, magnesium stearate, maltitol, mannitol, methionine, methylcellulose, methyl paraben, microcrystalline cellulose, polyethylene glycol, polyvinyl pyrrolidone, povidone, pregelatinized starch, propyl paraben, retinyl palmitate, shellac, silicon dioxide, sodium carboxymethyl cellulose, sodium citrate, sodium starch glycolate, sorbitol, starch (corn), stearic acid, sucrose, talc, titanium dioxide, vitamin A, vitamin E, vitamin C, and xylitol.

As used herein, the term "pharmaceutically acceptable salt" means any pharmaceutically acceptable salt of a compound, for example, any compound of Formula I. Pharmaceutically acceptable salts of any of the compounds described herein may include those that are within the scope of sound medical judgment, suitable for use in contact with the tissues of humans and animals without undue toxicity, irritation, allergic response and are commensurate with a reasonable benefit/risk ratio. Pharmaceutically acceptable salts are well known in the art. For example, pharmaceutically acceptable salts are described in: Berge et al., J. Pharmaceutical Sciences 66:1-19, 1977 and in Pharmaceutical Salts: Properties, Selection, and Use, (Eds. P. H. Stahl and C.G. Wermuth), Wiley-VCH, 2008. The salts can be prepared in situ during the final isolation and purification of the compounds described herein or separately by reacting a free base group with a suitable organic acid.

The compounds of the invention may have ionizable groups so as to be capable of preparation as pharmaceutically acceptable salts. These salts may be acid addition salts involving inorganic or organic acids or the salts may, in the case of acidic forms of the compounds of the invention be prepared from inorganic or organic bases. Frequently, the compounds are prepared or used as pharmaceutically acceptable salts prepared as addition products of pharmaceutically acceptable acids or bases. Suitable pharmaceutically acceptable acids and bases and methods for preparation of the appropriate salts are well-known in the art. Salts may be prepared from pharmaceutically acceptable non-toxic acids and bases including inorganic and organic acids and bases. Representative acid addition salts include acetate, adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, fumarate, glucoheptonate, glycerophosphate, hemisulfate, heptonate, hexanoate, hydrobromide, hydrochloride, hydroiodide, 2-hydroxyethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, toluenesulfonate, undecanoate, and valerate salts. Representative alkali or alkaline earth metal salts include sodium, lithium, potassium, calcium, and magnesium, as well as nontoxic ammonium, quaternary ammonium, and amine cations, including, but not limited to ammonium, tetramethylammonium, tetraethylammonium, methylamine, dimethylamine, trimethylamine, triethylamine, and ethylamine.

By a "reference" is meant any useful reference used to compare protein or RNA levels. The reference can be any sample, standard, standard curve, or level that is used for comparison purposes. The reference can be a normal reference sample or a reference standard or level. A "reference sample" can be, for example, a control, e.g., a predetermined negative control value such as a "normal control" or a prior sample taken from the same subject; a sample from a normal healthy subject, such as a normal cell or normal tissue; a sample (e.g., a cell or tissue) from a subject not having a disease; a sample from a subject that is diagnosed with a disease, but not yet treated with a compound of the invention; a sample from a subject that has been treated by a compound of the invention; or a sample of a purified protein or RNA (e.g., any described herein) at a known normal concentration. By "reference standard or level" is meant a value or number derived from a reference sample. A "normal control value" is a pre-determined value indicative of non-disease state, e.g., a value expected in a healthy control subject. Typically, a normal control value is expressed as a range ("between X and Y"), a high threshold ("no higher than X"), or a low threshold ("no lower than X"). A subject having a measured value within the normal control value for a particular biomarker is typically referred to as "within normal limits" for that biomarker. A normal reference standard or level can be a value or number derived from a normal subject not having a disease or disorder (e.g., cancer); a subject that has been treated with a compound of the invention. In preferred embodiments, the reference sample, standard, or level is matched to the sample subject sample by at least one of the following criteria: age, weight, sex, disease stage, and overall health. A standard curve of levels of a purified protein or RNA, e.g., any described herein, within the normal reference range can also be used as a reference.

As used herein, the term "subject" refers to any organism to which a composition in accordance with the invention may be administered, e.g., for experimental, diagnostic, prophylactic, and/or therapeutic purposes. Typical subjects include any animal (e.g., mammals such as mice, rats, rabbits, non-human primates, and humans). A subject may seek or be in need of treatment, require treatment, be receiving treatment, be receiving treatment in the future, or be a human or animal who is under care by a trained professional for a particular disease or condition.

As used herein, the terms "treat," "treated," or "treating" mean therapeutic treatment or any measures whose object is to slow down (lessen) an undesired physiological condition, disorder, or disease, or obtain beneficial or desired clinical results. Beneficial or desired clinical results include, but are not limited to, alleviation of symptoms; diminishment of the extent of a condition, disorder, or disease; stabilized (i.e., not worsening) state of condition, disorder, or disease; delay in onset or slowing of condition, disorder, or disease progression; amelioration of the condition, disorder, or disease state or remission (whether partial or total); an amelioration of at least one measurable physical parameter, not necessarily discernible by the patient; or enhancement or improvement of condition, disorder, or disease. Treatment includes eliciting a clinically significant response without excessive levels of side effects. Treatment also includes prolonging survival as compared to expected survival if not receiving treatment. Compounds of the invention may also be used to "prophylactically treat" or "prevent" a disorder, for example, in a subject at increased risk of developing the disorder.

As used herein, the terms "variant" and "derivative" are used interchangeably and refer to naturally-occurring, synthetic, and semi-synthetic analogues of a compound, peptide, protein, or other substance described herein. A variant or derivative of a compound, peptide, protein, or other substance described herein may retain or improve upon the biological activity of the original material.

The details of one or more embodiments of the invention are set forth in the description below. Other features, objects, and advantages of the invention will be apparent from the description and from the claims.

DETAILED DESCRIPTION

Figure 1:
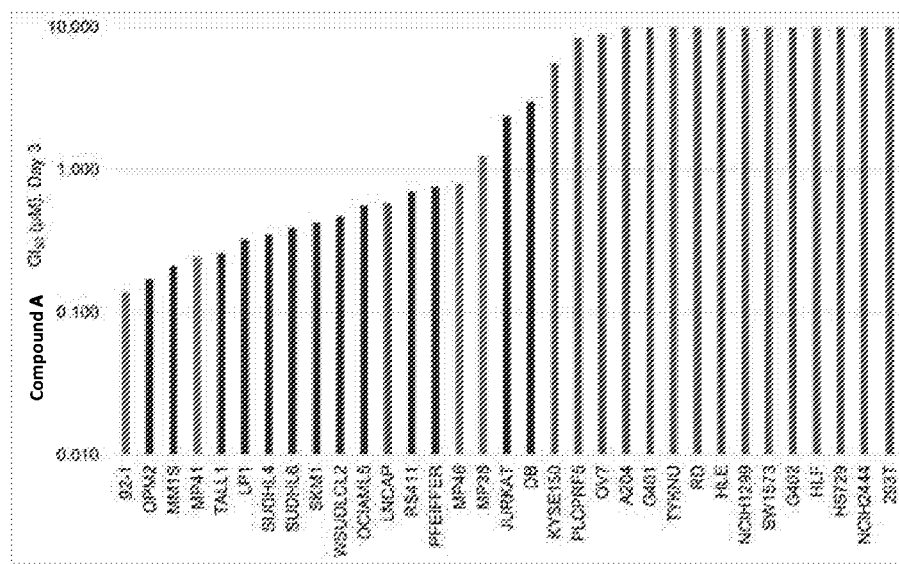
FIG. 1 is a graph illustrating inhibition of cell proliferation of several cancer cell lines by a BRG1/BRM inhibitor (Compound A).

The present disclosure features compounds useful for the inhibition of BRG1 and/or BRM. These compounds may be used to modulate the activity of a BAF complex, for example, for the treatment of a BAF-related disorder, such as cancer. Exemplary compounds described herein include compounds having a structure according to Formula I:

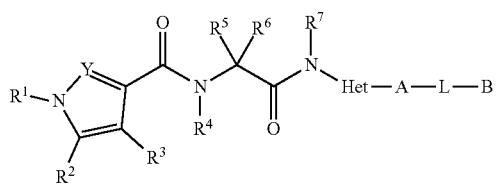

Formula I wherein Y is N or CH;
R$^1$ is hydrogen, optionally substituted C$_1$-C$_6$ acyl, optionally substituted C$_1$-C$_6$ alkyl, optionally substituted C$_1$-C$_6$ heteroalkyl, optionally substituted C$_2$-C$_9$ heterocyclyl, or —SO$_2$R$^8$;
R$^2$ and R$^3$ are, independently, hydrogen or optionally substituted C$_1$-C$_6$ alkyl, or R$^2$ and R$^3$ combine with the carbons to which they are attached to form a 5- or 6-membered ring;
R$^4$, R$^5$, and R$^7$ are, independently, hydrogen or optionally substituted C$_1$-C$_6$ alkyl;
R$^6$ is hydrogen, optionally substituted C$_1$-C$_6$ alkyl, or optionally substituted C$_1$-C$_6$ heteroalkyl;
R$^8$ is optionally substituted C$_1$-C$_6$ alkyl or —NR$^9$R$^{10}$;
R$^9$ and R$^{10}$ are, independently, optionally substituted C$_1$-C$_6$ alkyl;
Het is a 5- or 6-membered heteroaryl;
A is optionally substituted C$_6$-C$_{10}$ aryl, optionally substituted C$_2$-C$_9$ heterocyclyl, or optionally substituted C$_2$-C$_9$ heteroaryl;
L is absent, optionally substituted C$_1$-C$_6$ alkyl, optionally substituted C$_1$-C$_6$ alkenyl, or optionally substituted C$_1$-C$_6$ heteroalkyl; and
B is hydrogen, cyano, optionally substituted C$_6$-C$_{10}$ aryl, optionally substituted C$_6$-C$_{10}$ cycloalkyl, optionally substituted C$_2$-C$_9$ heterocyclyl, or optionally substituted C$_2$-C$_9$ heteroaryl,
or a pharmaceutically acceptable salt thereof.

In some embodiments, the compound, or pharmaceutically acceptable salt thereof, has the structure of any one of compounds 1-47 in Table 1.

Other embodiments, as well as exemplary methods for the synthesis of production of these compounds, are described herein.

Pharmaceutical Uses

The compounds described herein are useful in the methods of the invention and, while not bound by theory, are believed to exert their ability to modulate the level, status, and/or activity of a BAF complex, i.e., by inhibiting the activity of the BRG1 and/or BRM proteins within the BAF complex in a mammal. BAF complex-related disorders include, but are not limited to, BRG1 loss of function mutation-related disorders.

An aspect of the present invention relates to methods of treating disorders related to BRG1 loss of function mutations such as cancer (e.g., non-small cell lung cancer, colorectal cancer, bladder cancer, cancer of unknown primary, glioma, breast cancer, melanoma, non-melanoma skin cancer, endometrial cancer, or penile cancer) in a subject in need thereof. In some embodiments, the compound is administered in an amount and for a time effective to result in one or more (e.g., two or more, three or more, four or more) of: (a) reduced tumor size, (b) reduced rate of tumor growth, (c) increased tumor cell death (d) reduced tumor progression, (e) reduced number of metastases, (f reduced rate of metastasis, (g) decreased tumor recurrence (h) increased survival of subject, (i) increased progression free survival of subject.

Treating cancer can result in a reduction in size or volume of a tumor. For example, after treatment, tumor size is reduced by 5% or greater (e.g., 10%, 20%, 30%, 40%, 50%, 60%, 70%, 80%, 90%, or greater) relative to its size prior to treatment. Size of a tumor may be measured by any reproducible means of measurement. For example, the size of a tumor may be measured as a diameter of the tumor.

Treating cancer may further result in a decrease in number of tumors. For example, after treatment, tumor number is reduced by 5% or greater (e.g., 10%, 20%, 30%, 40%, 50%, 60%, 70%, 80%, 90%, or greater) relative to number prior to treatment. Number of tumors may be measured by any reproducible means of measurement, e.g., the number of tumors may be measured by counting tumors visible to the naked eye or at a specified magnification (e.g., 2x, 3x, 4x, 5x, 10x, or 50x).

Treating cancer can result in a decrease in number of metastatic nodules in other tissues or organs distant from the primary tumor site. For example, after treatment, the number of metastatic nodules is reduced by 5% or greater (e.g., 10%, 20%, 30%, 40%, 50%, 60%, 70%, 80%, 90% or greater) relative to number prior to treatment. The number of metastatic nodules may be measured by any reproducible means of measurement. For example, the number of metastatic nodules may be measured by counting metastatic nodules visible to the naked eye or at a specified magnification (e.g., 2x, 10x, or 50x).

Treating cancer can result in an increase in average survival time of a population of subjects treated according to the present invention in comparison to a population of untreated subjects. For example, the average survival time is increased by more than 30 days (more than 60 days, 90 days, or 120 days). An increase in average survival time of a population may be measured by any reproducible means. An increase in average survival time of a population may be measured, for example, by calculating for a population the average length of survival following initiation of treatment with the compound of the invention. An increase in average survival time of a population may also be measured, for example, by calculating for a population the average length of survival following completion of a first round of treatment with a pharmaceutically acceptable salt of the invention.

Treating cancer can also result in a decrease in the mortality rate of a population of treated subjects in comparison to an untreated population. For example, the mortality rate is decreased by more than 2% (e.g., more than 5%, 10%, or 25%). A decrease in the mortality rate of a population of treated subjects may be measured by any reproducible means, for example, by calculating for a population the average number of disease-related deaths per unit time following initiation of treatment with a pharmaceutically acceptable salt of the invention. A decrease in the mortality rate of a population may also be measured, for example, by calculating for a population the average number of disease-related deaths per unit time following completion of a first round of treatment with a pharmaceutically acceptable salt of the invention.

Exemplary cancers that may be treated by the invention include, but are not limited to, non-small cell lung cancer, small-cell lung cancer, colorectal cancer, bladder cancer, glioma, breast cancer, melanoma, non-melanoma skin cancer, endometrial cancer, esophagostric cancer, pancreatic cancer, hepatobiliary cancer, soft tissue sarcoma, ovarian cancer, head and neck cancer, renal cell carcinoma, bone cancer, non-Hodgkin lymphoma, prostate cancer, embryonal tumor, germ cell tumor, cervical cancer, thyroid cancer, salivary gland cancer, gastrointestinal neuroendocrine tumor, uterine sarcoma, gastrointestinal stromal tumor, CNS cancer, thymic tumor, Adrenocortical carcinoma, appendiceal cancer, small bowel cancer and penile cancer.

Combination Formulations and Uses Thereof

The compounds of the invention can be combined with one or more therapeutic agents. In particular, the therapeutic agent can be one that treats or prophylactically treats any cancer described herein.

Combination Therapies

A compound of the invention can be used alone or in combination with an additional therapeutic agent, e.g., other agents that treat cancer or symptoms associated therewith, or in combination with other types of treatment to treat cancer. In combination treatments, the dosages of one or more of the therapeutic compounds may be reduced from standard dosages when administered alone. For example, doses may be determined empirically from drug combinations and permutations or may be deduced by isobolographic analysis (e.g., Black et al., Neurology 65:S3-S6, 2005). In this case, dosages of the compounds when combined should provide a therapeutic effect.

In some embodiments, the second therapeutic agent is a chemotherapeutic agent (e.g., a cytotoxic agent or other chemical compound useful in the treatment of cancer). These include alkylating agents, antimetabolites, folic acid analogs, pyrimidine analogs, purine analogs and related inhibitors, *vinca* alkaloids, epipodopyyllotoxins, antibiotics, L-Asparaginase, topoisomerase inhibitors, interferons, platinum coordination complexes, anthracenedione substituted urea, methyl hydrazine derivatives, adrenocortical suppressant, adrenocorticosteroides, progestins, estrogens, antiestrogen, androgens, antiandrogen, and gonadotropin-releasing hormone analog. Also included is 5-fluorouracil (5-FU), leucovorin (LV), irenotecan, oxaliplatin, capecitabine, paclitaxel and doxetaxel. Non-limiting examples of chemotherapeutic agents include alkylating agents such as thiotepa and cyclosphosphamide; alkyl sulfonates such as busulfan, improsulfan and piposulfan; aziridines such as benzodopa, carboquone, meturedopa, and uredopa; ethylenimines and methylamelamines including altretamine, triethylenemelamine, trietylenephosphoramide, triethiiylenethiophosphoramide and trimethylolomelamine; acetogenins (especially bullatacin and bullatacinone); a camptothecin (including the synthetic analogue topotecan); bryostatin; callystatin; CC-1065 (including its adozelesin, carzelesin and bizelesin synthetic analogues); cryptophycins (particularly cryptophycin 1 and cryptophycin 8); dolastatin; duocarmycin (including the synthetic analogues, KW-2189 and CB1-TM1); eleutherobin; pancratistatin; a sarcodictyin; spongistatin; nitrogen mustards such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, and ranimnustine; antibiotics such as the enediyne antibiotics (e.g., calicheamicin, especially calicheamicin gammall and calicheamicin omegall (see, e.g., Agnew, Chem. Intl. Ed Engl. 33:183-186 (1994)); dynemicin, including dynemicin A; bisphosphonates, such as clodronate; an esperamicin; as well as neocarzinostatin chromophore and related chromoprotein enediyne antibiotic chromophores), aclacinomysins, actinomycin, authramycin, azaserine, bleomycins, cactinomycin, carabicin, caminomycin, carzinophilin, chromomycinis, dactinomycin, daunorubicin, detorubicin, 6-diazo-5-oxo-L-norleucine, Adriamycin® (doxorubicin, including morpholino-doxorubicin, cyanomorpholino-doxorubicin, 2-pyrrolino-doxorubicin and deoxydoxorubicin), epirubicin, esorubicin, idarubicin, marcellomycin, mitomycins such as mitomycin C, mycophenolic acid, nogalamycin, olivomycins, peplomycin, potfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogues such as denopterin, methotrexate, pteropterin, trimetrexate; purine analogs such as fludarabine, 6-mercaptopurine, thiamiprine, thioguanine; pyrimidine analogs such as ancitabine, azacitidine, 6-azauridine, carmofur, cytarabine, dideoxyuridine, doxifluridine, enocitabine, floxuridine; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; eniluracil; amsacrine; bestrabucil; bisantrene; edatraxate; defofamine; demecolcine; diaziquone; elfomithine; elliptinium acetate; an epothilone; etoglucid; gallium nitrate; hydroxyurea; lentinan; lonidainine; maytansinoids such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; PSK@polysaccharide complex (JHS Natural Products, Eugene, Oreg.); razoxane; rhizoxin; sizofuran; spirogermanium; tenuazonic acid; triaziquone; 2,2',2"-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; thiotepa; taxoids, e.g., Taxol® paclitaxel (Bristol-Myers Squibb Oncology, Princeton, N.J.), ABraxane®, cremophor-free, albumin-engineered nanoparticle formulation of paclitaxel (American Pharmaceutical Partners, Schaumberg, Ill.), and Taxotere® doxetaxel (Rhone-Poulenc Rorer, Antony, France); chloranbucil; Gemzar® gemcitabine; 6-thioguanine; mercaptopurine; methotrexate; platinum coordination complexes such as cisplatin, oxaliplatin and carboplatin; vinblastine; platinum; etoposide (VP-16); ifosfamide; mitoxantrone; vincristine; Navelbine® vinorelbine; novantrone; teniposide; edatrexate; daunomycin; aminopterin; xeloda; ibandronate; irinotecan (e.g., CPT-11); topoisomerase inhibitor RFS 2000; difluoromethylornithine (DMFO); retinoids such as retinoic acid; capecitabine; and pharmaceutically acceptable salts, acids or derivatives of any of the above. Two or more chemotherapeutic agents can be used in a cocktail to be administered in combination with the first therapeutic agent described herein. Suitable dosing regimens of combination chemotherapies are known in the art and described in, for example, Saltz et al. (1999) Proc ASCO 18:233a and Douillard et al. (2000) Lancet 355:1041-7.

In some embodiments, the second therapeutic agent is a therapeutic agent which is a biologic such a cytokine (e.g., interferon or an interleukin (e.g., IL-2)) used in cancer treatment. In some embodiments the biologic is an anti-angiogenic agent, such as an anti-VEGF agent, e.g., bevacizumab (Avastin®). In some embodiments the biologic is an immunoglobulin-based biologic, e.g., a monoclonal antibody (e.g., a humanized antibody, a fully human antibody, an Fc fusion protein or a functional fragment thereof) that agonizes a target to stimulate an anti-cancer response, or antagonizes an antigen important for cancer. Such agents include Rituxan (Rituximab); Zenapax (Daclizumab); Simulect (Basiliximab); Synagis (Palivizumab); Remicade (Infliximab); Herceptin (Trastuzumab); Mylotarg (Gemtuzumab ozogamicin); Campath (Alemtuzumab); Zevalin (Ibritumomab tiuxetan); Humira (Adalimumab); Xolair (Omalizumab); Bexxar (Tositumomab-1-131); Raptiva (Efalizumab); Erbitux (Cetuximab); Avastin (Bevacizumab); Tysabri (Natalizumab); Actemra (Tocilizumab); Vectibix (Panitumumab); Lucentis (Ranibizumab); Soliris (Eculizumab); Cimzia (Certolizumab pegol); Simponi (Golimumab); Ilaris (Canakinumab); Stelara (Ustekinumab); Arzerra (Ofatumumab); Prolia (Denosumab); Numax (Motavizumab); ABThrax (Raxibacumab); Benlysta (Belimumab); Yervoy (Ipilimumab); Adcetris (Brentuximab Vedotin); Perjeta (Pertuzumab); Kadcyla (Ado-trastuzumab emtansine); and Gazyva (Obinutuzumab). Also included are antibody-drug conjugates.

The second agent may be a therapeutic agent which is a non-drug treatment. For example, the second therapeutic agent is radiation therapy, cryotherapy, hyperthermia and/or surgical excision of tumor tissue.

The second agent may be a checkpoint inhibitor. In one embodiment, the inhibitor of checkpoint is an inhibitory antibody (e.g., a monospecific antibody such as a monoclonal antibody). The antibody may be, e.g., humanized or fully human. In some embodiments, the inhibitor of checkpoint is a fusion protein, e.g., an Fc-receptor fusion protein. In some embodiments, the inhibitor of checkpoint is an agent, such as an antibody, that interacts with a checkpoint protein. In some embodiments, the inhibitor of checkpoint is an agent, such as an antibody, that interacts with the ligand of a checkpoint protein. In some embodiments, the inhibitor of checkpoint is an inhibitor (e.g., an inhibitory antibody or small molecule inhibitor) of CTLA-4 (e.g., an anti-CTLA4 antibody such as ipilimumab/Yervoy or tremelimumab). In some embodiments, the inhibitor of checkpoint is an inhibitor (e.g., an inhibitory antibody or small molecule inhibitor) of PD-1 (e.g., nivolumab/Opdivo®; pembrolizumab/Keytruda®; pidilizumab/CT-011). In some embodiments, the inhibitor of checkpoint is an inhibitor (e.g., an inhibitory antibody or small molecule inhibitor) of PDL1 (e.g., MPDL3280A/RG7446; MEDI4736; MSB0010718C; BMS 936559). In some embodiments, the inhibitor of checkpoint is an inhibitor (e.g., an inhibitory antibody or Fc fusion or small molecule inhibitor) of PDL2 (e.g., a PDL2/Ig fusion protein such as AMP 224). In some embodiments, the inhibitor of checkpoint is an inhibitor (e.g., an inhibitory antibody or small molecule inhibitor) of B7-H3 (e.g., MGA271), B7-H4, BTLA, HVEM, TIM3, GAL9, LAG3, VISTA, KIR, 2B4, CD160, CGEN-15049, CHK 1, CHK2, A2aR, B-7 family ligands, or a combination thereof.

In any of the combination embodiments described herein, the first and second therapeutic agents are administered simultaneously or sequentially, in either order. The first therapeutic agent may be administered immediately, up to 1 hour, up to 2 hours, up to 3 hours, up to 4 hours, up to 5 hours, up to 6 hours, up to 7 hours, up to, 8 hours, up to 9 hours, up to 10 hours, up to 11 hours, up to 12 hours, up to 13 hours, 14 hours, up to hours 16, up to 17 hours, up 18 hours, up to 19 hours up to 20 hours, up to 21 hours, up to 22 hours, up to 23 hours up to 24 hours or up to 1-7, 1-14, 1-21 or 1-30 days before or after the second therapeutic agent.

Pharmaceutical Compositions

The compounds of the invention are preferably formulated into pharmaceutical compositions for administration to a mammal, preferably, a human, in a biologically compatible form suitable for administration in vivo. Accordingly, in an aspect, the present invention provides a pharmaceutical composition comprising a compound of the invention in admixture with a suitable diluent, carrier, or excipient.

The compounds of the invention may be used in the form of the free base, in the form of salts, solvates, and as prodrugs. All forms are within the scope of the invention. In accordance with the methods of the invention, the described compounds or salts, solvates, or prodrugs thereof may be administered to a patient in a variety of forms depending on the selected route of administration, as will be understood by those skilled in the art. The compounds of the invention may be administered, for example, by oral, parenteral, buccal, sublingual, nasal, rectal, patch, pump, or transdermal administration and the pharmaceutical compositions formulated accordingly. Parenteral administration includes intravenous, intraperitoneal, subcutaneous, intramuscular, transepithelial, nasal, intrapulmonary, intrathecal, rectal, and topical modes of administration. Parenteral administration may be by continuous infusion over a selected period of time.

A compound of the invention may be orally administered, for example, with an inert diluent or with an assimilable edible carrier, or it may be enclosed in hard or soft shell gelatin capsules, or it may be compressed into tablets, or it may be incorporated directly with the food of the diet. For oral therapeutic administration, a compound of the invention may be incorporated with an excipient and used in the form of ingestible tablets, buccal tablets, troches, capsules, elixirs, suspensions, syrups, and wafers. A compound of the invention may also be administered parenterally. Solutions of a compound of the invention can be prepared in water suitably mixed with a surfactant, such as hydroxypropylcellulose. Dispersions can also be prepared in glycerol, liquid polyethylene glycols, DMSO, and mixtures thereof with or without alcohol, and in oils. Under ordinary conditions of storage and use, these preparations may contain a preservative to prevent the growth of microorganisms. Conventional procedures and ingredients for the selection and preparation of suitable formulations are described, for example, in Remington's Pharmaceutical Sciences (2003, 20th ed.) and in The United States Pharmacopeia: The National Formulary (USP 24 NF19), published in 1999. The pharmaceutical forms suitable for injectable use include sterile aqueous solutions or dispersions and sterile powders for the extemporaneous preparation of sterile injectable solutions or dispersions. In all cases the form must be sterile and must be fluid to the extent that may be easily administered via syringe. Compositions for nasal administration may conveniently be formulated as aerosols, drops, gels, and powders. Aerosol formulations typically include a solution or fine suspension of the active substance in a physiologically acceptable aqueous or non-aqueous solvent and are usually presented in single or multidose quantities in sterile form in a sealed container, which can take the form of a cartridge or refill for use with an atomizing device. Alternatively, the sealed container may be a unitary dispensing device, such as a single dose nasal inhaler or an aerosol dispenser fitted with a metering valve which is intended for disposal after use. Where the dosage form comprises an aerosol dispenser, it will contain a propellant, which can be a compressed gas, such as compressed air or an organic propellant, such as fluorochlorohydrocarbon. The aerosol dosage forms can also take the form of a pump-atomizer. Compositions suitable for buccal or sublingual administration include tablets, lozenges, and pastilles, where the active ingredient is formulated with a carrier, such as sugar, acacia, tragacanth, gelatin, and glycerine. Compositions for rectal administration are conveniently in the form of suppositories containing a conventional suppository base, such as cocoa butter. A compound described herein may be administered intratumorally, for example, as an intratumoral injection. Intratumoral injection is injection directly into the tumor vasculature and is specifically contemplated for discrete, solid, accessible tumors. Local, regional, or systemic administration also may be appropriate. A compound described herein may advantageously be contacted by administering an injection or multiple injections to the tumor, spaced for example, at approximately, 1 cm intervals. In the case of surgical intervention, the present invention may be used preoperatively, such as to render an inoperable tumor subject to resection. Continuous administration also may be applied where appropriate, for example, by implanting a catheter into a tumor or into tumor vasculature.

The compounds of the invention may be administered to an animal, e.g., a human, alone or in combination with pharmaceutically acceptable carriers, as noted herein, the proportion of which is determined by the solubility and chemical nature of the compound, chosen route of administration, and standard pharmaceutical practice.

Dosages

The dosage of the compounds of the invention, and/or compositions comprising a compound of the invention, can vary depending on many factors, such as the pharmacodynamic properties of the compound; the mode of administration; the age, health, and weight of the recipient; the nature and extent of the symptoms; the frequency of the treatment, and the type of concurrent treatment, if any; and the clearance rate of the compound in the animal to be treated. One of skill in the art can determine the appropriate dosage based on the above factors. The compounds of the invention may be administered initially in a suitable dosage that may be adjusted as required, depending on the clinical response. In general, satisfactory results may be obtained when the compounds of the invention are administered to a human at a daily dosage of, for example, between 0.05 mg and 3000 mg (measured as the solid form). Dose ranges include, for example, between 10-1000 mg (e.g., 50-800 mg). In some embodiments, 50, 100, 150, 200, 250, 300, 350, 400, 450, 500, 550, 600, 650, 700, 750, 800, 850, 900, 950, or 1000 mg of the compound is administered.

Alternatively, the dosage amount can be calculated using the body weight of the patient. For example, the dose of a compound, or pharmaceutical composition thereof, administered to a patient may range from 0.1-100 mg/kg (e.g., 0.1-50 mg/kg, 0.25-25 mg/kg). In exemplary, non-limiting embodiments, the dose may range from 0.5-5.0 mg/kg (e.g., 0.5, 1.0, 1.5, 2.0, 2.5, 3.0, 3.5, 4.0, 4.5, or 5.0 mg/kg) or from 5.0-20 mg/kg (e.g., 5.5, 6.0, 6.5, 7.0, 7.5, 8.0, 8.5, 9.0, 9.5, 10, 11, 12, 13, 14, 15, 16, 17, 18, 19, or 20 mg/kg).

EXAMPLES

Example 1. Preparation of 2-amino-N-(4-(3-bromophenyl)thiazol-2-yl)acetamide

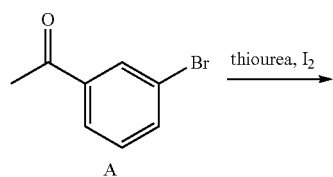

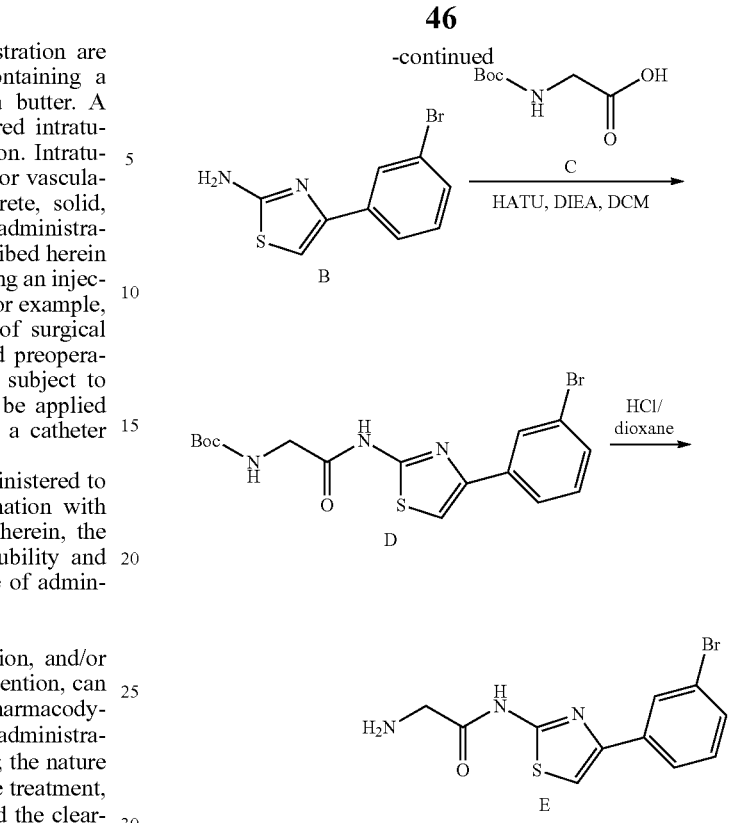

Step 1: Preparation of 4-(3-bromophenyl)thiazol-2-amine

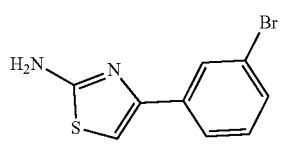

B

To a mixture of 1-(3-bromophenyl)ethanone A (473 g, 2.38 mol, 313.25 mL) and thiourea (361.78 g, 4.75 mol) was added 12 (603.14 g, 2.38 mol, 478.68 mL, 1 eq). The mixture was stirred at 110° C. for 16 hours. After cooling, the reaction mixture was triturated with methyl-tert-butyl ether (5 L), and then filtered to remove any unreacted iodine and acetophenone. The filter cake was put in ice water (4 L) and treated with 25% $NH_3.H_2O$ to pH=9-10. The suspension was stirred at 25° C. for 15 minutes, then filtered and washed with water (1 L) to give wet solid. The wet solid was dissolved in ethyl acetate (4 L) and washed with saturated $NaHCO_3$ (1 L*2) and brine (1 L). The ethyl acetate layer was dried over $Na_2SO_4$, filtered and concentrated under reduced pressure to give a residue. The residue was triturated with petrol ether/ethyl acetate=100:1 (4 L) at 25° C. for 3 hours, then the suspension was filtered, the filter cake was washed with petrol ether (1 L) and dried in vacuum to give intermediate B (450 g, 1.69 mol, 71.20% yield, 95.93% purity) as a pink solid. 1H NMR (400 MHz, DMSO-$d_6$) δ=7.98-7.97 (m, 1H), 7.80-7.77 (m, 1H), 7.43-7.42 (m, 1H), 7.34-7.30 (m, 1H), 7.15 (s, 1H), 7.10 (s, 2H) LCMS (ESI) m/z: $[^{79}BrM+H+]^+$=254.9.

Step 2: Preparation of tert-butyl N-[2-[[4-(3-bromophenyl)thiazol-2-yl]amino]-2-oxo-ethyl]carbamate

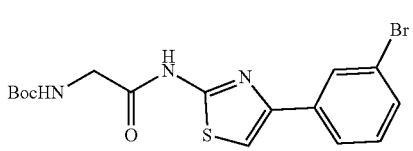

To a solution of 2-(tert-butoxycarbonylamino)acetic acid (82.40 g, 470.34 mmol), 1-[Bis(dimethylamino)methylene]-1H-1,2,3-triazolo[4,5-b]pyridinium 3-oxid hexafluorophosphate (HATU) (178.84 g, 470.34 mmol) and di-isoproylethyl amine (151.97 g, 1.18 mol, 204.81 mL) in dichloromethane (1000 mL) was added intermediate B (100 g, 391.95 mmol), the mixture was stirred at 30° C. for 16 hours.

The reaction mixture was washed with saturated citric acid (500 mL*4) and brine (500 mL), dried over $Na_2SO_4$, filtered and concentrated under reduced pressure to give a residue. The residue was triturated with MeOH (200 mL), filtered and dried in vacuum to give Intermediate D (100 g, 241.89 mmol, 61.71% yield) as a white solid.

1H NMR (400 MHz, DMSO-$d_6$) δ=12.29 (s, 1H), 8.09-8.09 (m, 1H), 7.89 (d, J=7.6 Hz, 1H), 7.76 (s, 1H), 7.52-7.49 (m, 1H), 7.41-7.37 (m, 1H), 7.16-7.13 (m, 1H), 3.87-3.81 (m, 2H), 1.39 (s, 9H) ppm.

LCMS (ESI) m/z: [$^{81}$BrM+H]$^+$=413.8.

Step 3: Preparation of 2-amino-N-(4-(3-bromophenyl)thiazol-2-yl)acetamide

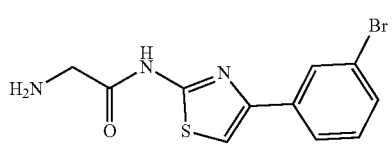

A mixture of intermediate D (10 g, 24.25 mmol) in hydrochloric acid/dioxane (100 mL) was stirred at 30° C. for 2 hours. The reaction mixture was concentrated in vacuum to give intermediate E (8.4 g, crude, HCl) as a white solid, which was used for next step directly.

LCMS (ESI) m/z: [M+H]$^+$=313.8

Example 2. Preparation of 2-amino-N-[4-[3-(4-pyridyl)phenyl]thiazol-2-yl]acetamide

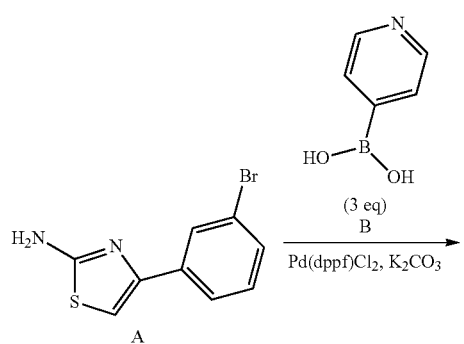

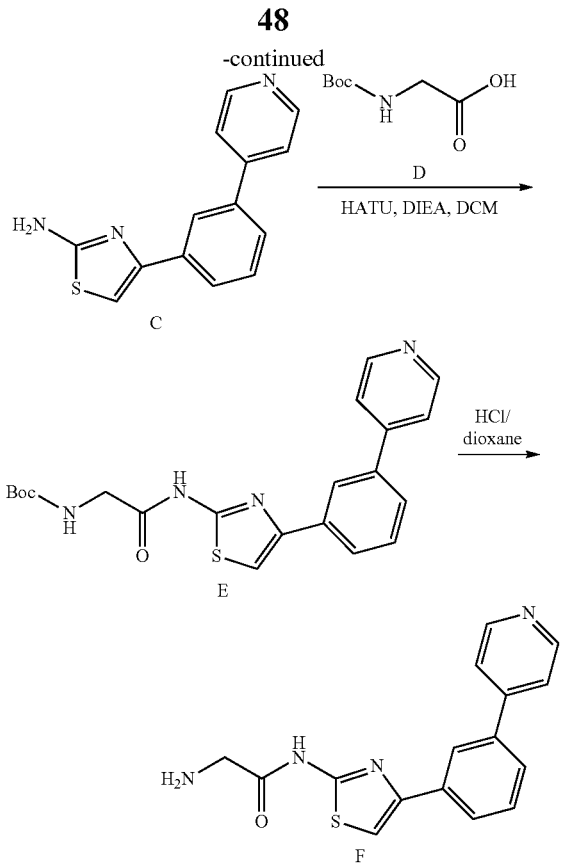

Step 1: Preparation of 4-[3-(4-pyridyl)phenyl]thiazol-2-amine

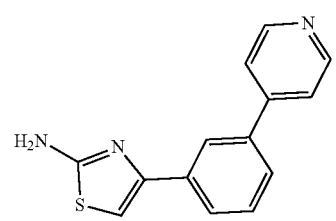

To a solution of 4-(3-bromophenyl)thiazol-2-amine (10 g, 39.20 mmol), 4-pyridylboronic acid (14.45 g, 117.59 mmol) and $K_2CO_3$ (16.25 g, 117.59 mmol) in dioxane (120 mL) and water (30 mL) was added Pd(dppf)$C_{12}$ (1 g, 1.37 mmol) under $N_2$, the mixture was stirred at 100° C. for 4 hours. The reaction mixture was diluted with water (500 mL), extracted with ethyl acetate (500 mL) and concentrated under reduced pressure to give a residue. The residue was purified by crystallization from dichloromethane/methyl-tert-butyl ether=1:20 (200 mL) and filtered to give intermediate C (9.5 g, 36.33 mmol, 92.69% yield) as a brown solid.

$^1$H NMR (400 MHz, DMSO-$d_6$) δ 8.66 (d, J=6.0 Hz, 2H), 8.19 (s, 1H), 7.90 (d, J=8.0 Hz, 1H), 7.76-7.70 (m, 2H), 7.68 (d, J=8.0 Hz, 1H), 7.52 (t, J=8.0 Hz, 1H), 7.21 (s, 1H), 7.11 (s, 2H) ppm.

LCMS (ESI) m/z: [M+H]$^+$=254.2

Step 2: Preparation of tert-butyl N-[2-oxo-2-[[4-[3-(4-pyridyl)phenyl]thiazol-2-yl]amino]ethyl]carbamate

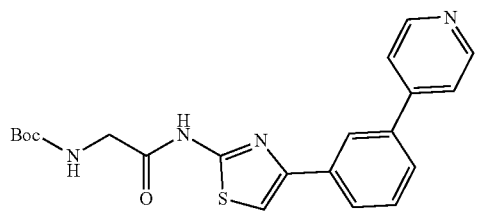

To a solution of 2-(tert-butoxycarbonylamino)acetic acid (9.85 g, 56.25 mmol), 1-[Bis(dimethylamino)methylene]-1H-1,2,3-triazolo[4,5-b]pyridinium 3-oxid hexafluorophosphate (HATU) (21.39 g, 56.25 mmol) and di-iso-proyl-ethyl amine (14.54 g, 112.51 mmol) in dichloromethane (200 mL) was added intermediate C (9.5 g, 37.50 mmol, 1 equivalents), the mixture was stirred at 30° C. for 16 hours. A precipitate was formed. The reaction mixture was filtered to give a yellow solid. The crude product was triturated with ethyl acetate (300 mL) and methanol (50 mL) and dried in vacuum to give intermediate E (11 g, 25.89 mmol, 69.03% yield) as a white solid.

$^1$H NMR (400 MHz, DMSO-$d_6$) δ 12.32 (br s, 1H), 8.69-8.67 (m, 2H), 8.30 (s, 1H), 8.01 (d, J=7.8 Hz, 1H), 7.83 (s, 1H), 7.80-7.76 (m, 3H), 7.64-7.60 (m, 1H), 7.20-7.15 (m, 1H), 3.88 (d, J=6.4 Hz, 2H), 1.44 (s, 9H) ppm.

LCMS (ESI) m/z: [M+H]$^+$=411.3

Step 3: Preparation of 2-amino-N-[4-[3-(4-pyridyl)phenyl]thiazol-2-yl]acetamide

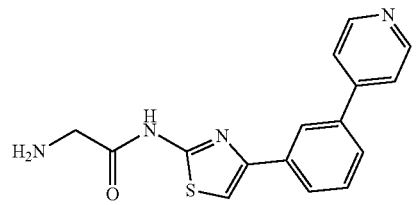

To a solution of int E (11 g, 26.80 mmol) in methanol (20 mL) was added 4 M hydrochloric acid/ethyl acetate (20 mL). The mixture was stirred at 20° C. for 2 hours. The reaction mixture was concentrated under reduced pressure to give a residue. The residue was purified by triturated with ethyl acetate (200 mL) and methyl-tert-butyl ether (50 mL) and dried in vacuum to give intermediate F (12 g, HCl salt) a light yellow solid.

$^1$H NMR 1H NMR (400 MHz, methanol-d4) δ8.92 (d, J=6.8 Hz, 2H), 8.52-8.47 (m, 3H), 8.22 (d, J=8.0 Hz, 1H), 7.94 (m, J=8.4 Hz, 1H), 7.75-7.66 (m, 2H), 4.04 (s, 2H) ppm.

LCMS (ESI) m/z: [M+H]$^+$=311.3.

Example 3. Preparation of 2-amino-N-(4-(3-((2S,6R)-2,6-dimethylmorpholino)phenyl)thiazol-2-yl)acetamide

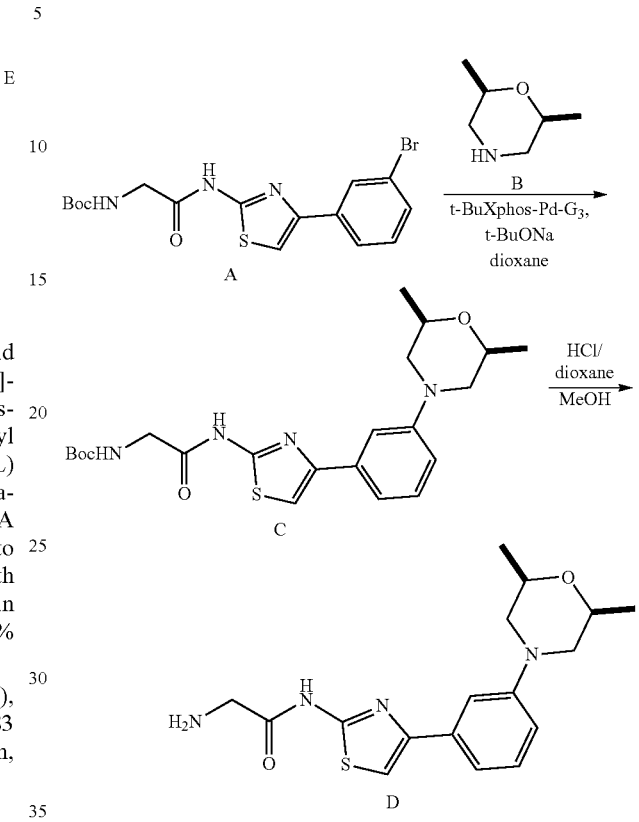

Step 1: Preparation of tert-butyl (2-((4-(3-((2S,6R)-2,6-dimethylmorpholino)phenyl)thiazol-2-yl)amino)-2-oxoethyl)carbamate

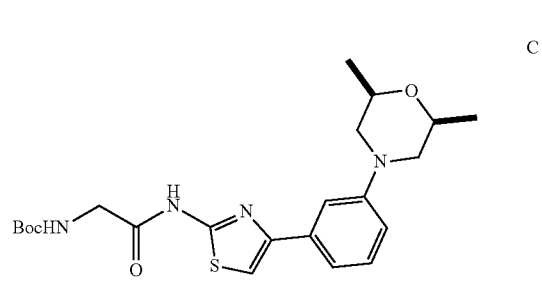 [SMILES: C[C@@H]1CN(c2cccc(-c3csc(NC(=O)CNC(=O)OC(C)(C)C)n3)c2)C[C@H](C)O1]

A mixture of tert-butyl N-[2-[[4-(3-bromophenyl)thiazol-2-yl]amino]-2-oxo-ethyl]carbamate (1.5 g, 3.64 mmol,), (2S,6R)-2,6-dimethylmorpholine (628.52 mg, 5.46 mmol), [2-(2-aminophenyl)phenyl]-methylsulfonyloxy-palladium; ditert-butyl-[2-(2,4,6-triisopropylphenyl)phenyl]phosphane (289.00 mg, 363.81 µmol) and t-BuONa (1.05 g, 10.91 mmol) in dioxane (15 mL) was degassed and purged with $N_2$ for 3 times, and then the mixture was stirred at 60° C. for 5 hours under $N_2$ atmosphere. Water (40 mL) was added and the reaction mixture was extracted with ethyl acetate (100 mL*2). The combined organic layers were washed with brine (40 mL), dried over $Na_2SO_4$, filtered and concentrated under reduced pressure to give a residue. The residue was purified by flash silica gel chromatography (ISCO@; 40 g SepaFlash@Silica Flash Column, Eluent of 10-60% Ethylacetate/Petroleum ether gradient @50 mL/min) and concentrated in vacuum to give Intermediate C (800 mg, 1.61 mmol, 44.32% yield) as a white solid.

LCMS (ESI) m/z: $[M+H]^+=447.4$.

Step 2: Preparation of 2-amino-N-(4-(3-((2S,6R)-2,6-dimethylmorpholino)phenyl)thiazol-2-yl)acetamide

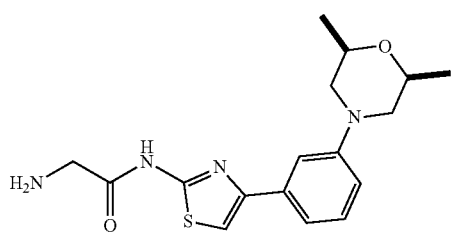

To a solution of Intermediate C (700 mg, 1.57 mmol) in methanol (5 mL) was added hydrochlorice acid/dioxane (5 mL). The mixture was stirred at 25° C. for 2 hours. The reaction mixture was concentrated under reduced pressure to give Intermediate D (700 mg, crude, HCl) as a yellow solid, which was used into the next step without further purification.

LCMS (ESI) m/z: $[M+H]^+=347.2$.

Example 4. Preparation of 1-(methylsulfonyl)-N-(2-oxo-2-((4-(3-(pyridin-4-yl)phenyl)thiazol-2-yl)amino)ethyl)-1H-indole-3-carboxamide (Compound 1)

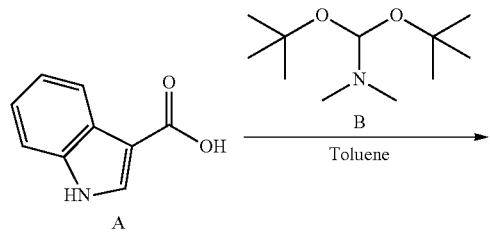

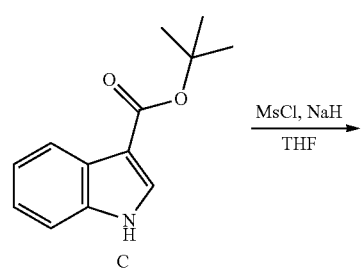

Step 1: Preparation of tert-butyl H-indole-3-carboxylate

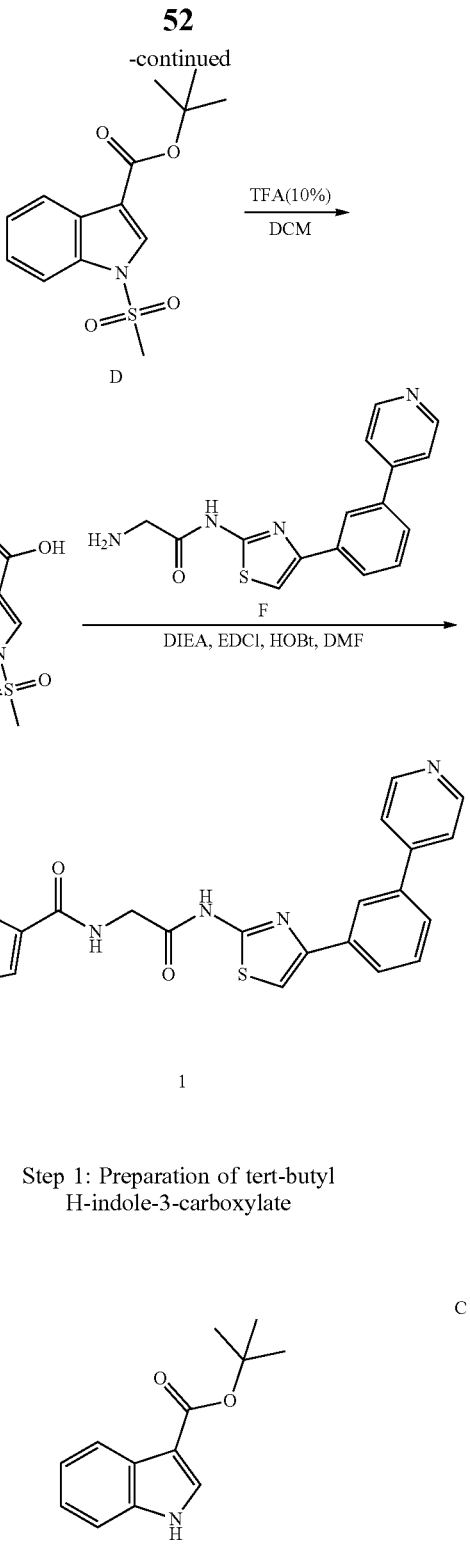

To a solution of 1H-indole-3-carboxylic acid (500 mg, 3.10 mmol) in toluene (15 mL) was added 1,1-ditertbutoxy-N,N-dimethyl-methanamine (2.52 g, 12.41 mmol, 2.98 mL) at 80° C. The mixture was stirred at 80° C. for 0.5 hour. The reaction mixture was diluted with water (20 mL) and extracted with ethyl acetate (20 mL*2). The combined organic layers were dried over anhydrous $Na_2SO_4$, filtered and concentrated under reduced pressure to give a residue. The residue was purified by column chromatography ($SiO_2$, Petroleum ether/Ethyl acetate=I/O to 1:1) and concentrated in vacuum to give Intermediate C (300 mg, 1.38 mmol, 44.51% yield) as yellow oil.

LCMS (ESI) m/z: [M-56+H]⁺=162.0.

¹HNMR (400 MHz, CDCl₃) δ=8.60 (br s, 1H), 8.19-8.16 (m, 1H), 7.89 (d, J=2.8 Hz, 1H), 7.43-7.41 (m, 1H), 7.28-7.26 (m, 3H), 1.67 (s, 9H) ppm.

Step 2: Preparation of tert-butyl 1-(methylsulfonyl)-1H-indole-3-carboxylate

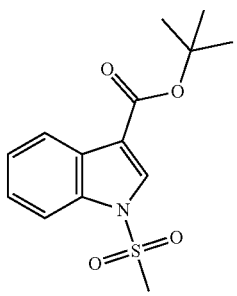

D

To a solution of Intermediate C (150 mg, 690.40 μmol) in tetrahydrofuran (10 mL) was added sodium hydride (165.68 mg, 4.14 mmol, 60% purity) at 0° C. and stirred for 1 hour. Then methansulfonyl chloride (158.17 mg, 1.38 mmol, 106.87 μL) was added at 0° C. The mixture was stirred at 30° C. for 16 hours. The reaction mixture was quenched by addition water (20 mL) and extracted with ethyl acetate (10 mL*2). The combined organic layers were dried over anhydrous Na₂SO₄, filtered and concentrated under reduced pressure to give Intermediate D (180 mg, 609.44 μmol, 88.27% yield) as yellow oil.

LCMS (ESI) m/z: [M-56+H]⁺=240.0.

¹HNMR (400 MHz, CDCl₃) δ=8.23-8.20 (m, 1H), 8.07 (s, 1H), 7.91-7.89 (m, 1H), 7.43-7.27 (m, 2H), 3.21 (s, 3H), 1.64 (s, 9H) ppm.

Step 3: Preparation of 1-(methylsulfonyl)-1H-indole-3-carboxylic acid

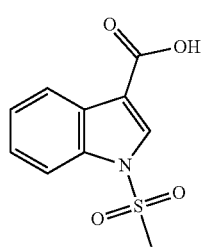

E

To a solution of Intermediate D (160 mg, 541.72 μmol) in dichloromethane (5 mL) was added trifluoroacetic acid (770 mg, 6.75 mmol, 0.5 mL) slowly. Then the mixture was stirred at 30° C. for 2 hours. The reaction mixture was diluted with aqueous NaHCO₃ (10 mL) and extracted with ethyl acetate (10 mL*2). The combined organic layers were dried over anhydrous Na₂SO₄, filtered and concentrated under reduced pressure to give the residue. The residue was purified by reversed phase (0.1% FA condition) and lyophilized to give Intermediate E (120 mg, 501.57 μmol, 92.59% yield) as a white solid.

LCMS (ESI) m/z: [M+H]⁺=240.0.

¹H NMR (400 MHz, DMSO-d₆) δ=12.88 (br s, 1H), 8.14-8.12 (m, 1H), 8.10 (s, 1H), 7.90 (d, J=7.6 Hz, 1H), 7.46-7.41 (m, 2H), 3.62 (s, 3H) ppm.

Step 4: Preparation of 1-(methylsulfonyl)-N-(2-oxo-2-((4-(3-(pyridin-4-yl)phenyl)thiazol-2-yl)amino)ethyl)-1H-indole-3-carboxamide

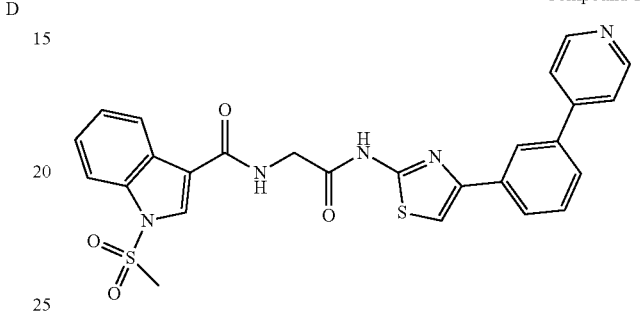

Compound 1

To a solution of 2-amino-N-[4-[3-(4-pyridyl)phenyl]thiazol-2-yl]acetamide (50 mg, 144.16 μmol, HCl) in DMF (1 mL) was added Intermediate E (34.49 mg, 144.16 μmol) and di-isoproyl-ethyl amine (93.16 mg, 720.81 μmol, 125.55 μL), then 1-Ethyl-3-(3-dimethylaminopropyl)carbodiimide (41.45 mg, 216.24 μmol) and hydroxybenzotriazole (29.22 mg, 216.24 μmol) was added to the mixture. The mixture was stirred at 30° C. for 3 hours. To the reaction mixture was added two drops of water. A white solid was formed. The precipitate was collected by filtration, the solid was washed with ethyl acetate (5 mL) and dried under high vacuum to give Compound 1 (38.44 mg, 71.76 μmol, 49.78% yield, 99.24% purity) as a white solid.

LCMS (ESI) m/z: [M+H]⁺=532.0.

¹HNMR (400 MHz, DMSO-d₆) δ=12.63-12.34 (m, 1H), 8.90-8.68 (m, 1H), 8.68-8.67 (m, 2H), 8.45 (s, 1H), 8.31 (m, 1H), 8.25 (d, J=7.6 Hz, 1H), 8.02 (d, J=7.6 Hz, 1H), 7.87 (d, J=8.0 Hz, 1H), 7.84 (s, 1H), 7.77-7.75 (m, 3H), 7.60 (m, 1H), 7.38-7.34 (m, 2H), 4.23 (d, J=5.6 Hz, 2H), 3.58 (s, 3H) ppm.

Example 5. Preparation of 1-(methylsulfonyl)-N-(2-oxo-2-((4-(3-(pyridin-4-yl)phenyl)thiazol-2-yl)amino)ethyl)-1H-pyrrolo[2,3-c]pyridine-3-carboxamide (Compound 2)

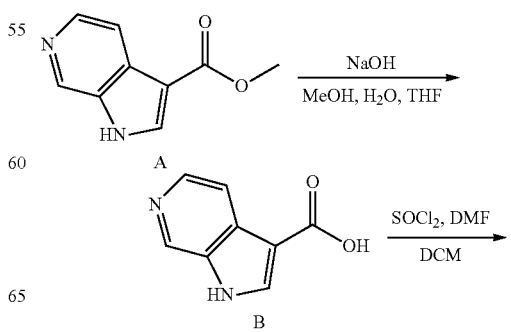

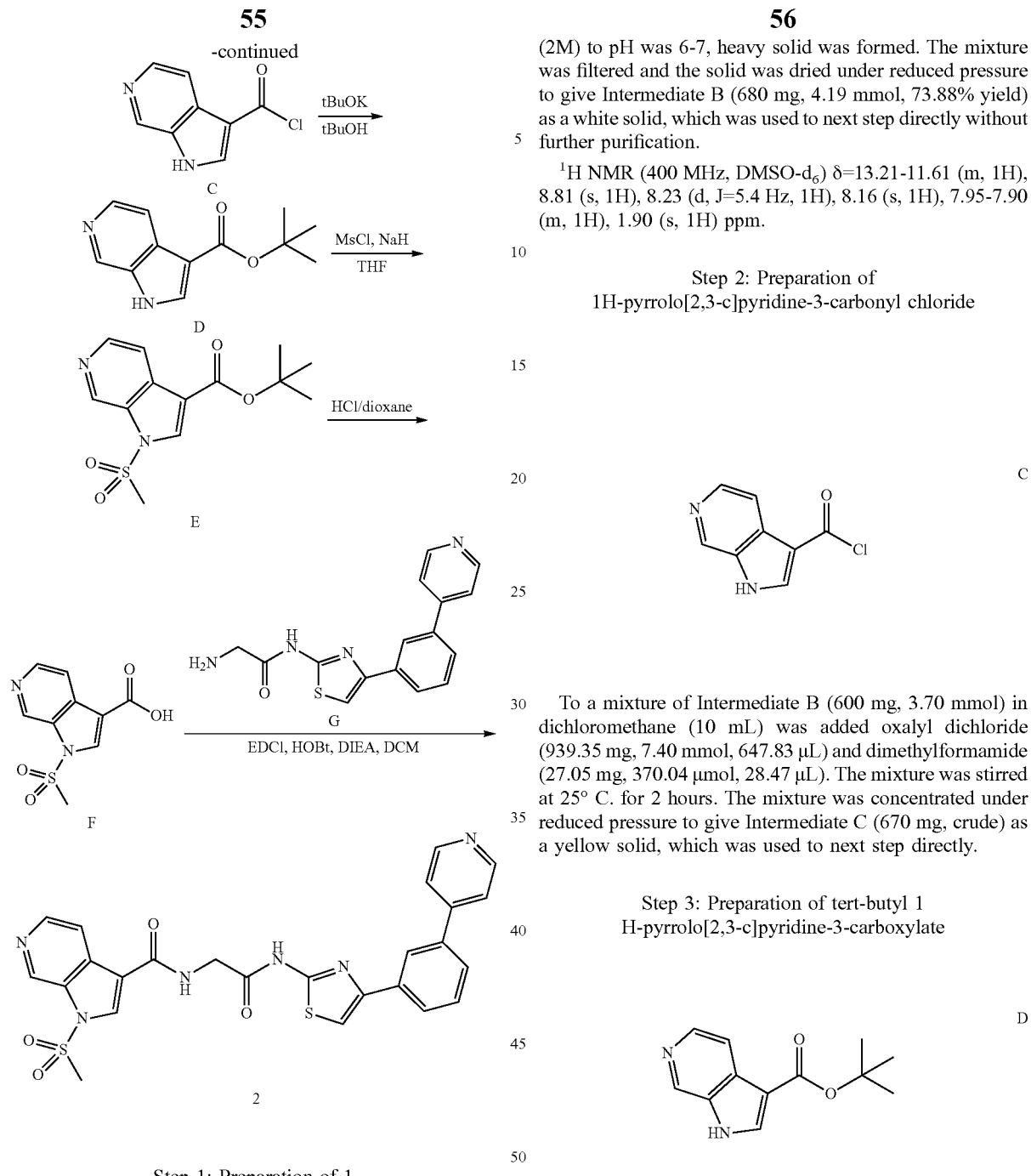

Step 1: Preparation of 1 H-pyrrolo[2,3-c]pyridine-3-carboxylic acid

To a solution of methyl 1 H-pyrrolo[2,3-c]pyridine-3-carboxylate (500 mg, 2.84 mmol) in methanol (3 mL) was added water (1 mL), THF (1 mL) and NaOH (340.58 mg, 8.51 mmol). The mixture was stirred at 30° C. for 2 hours. The reaction solution was treated with hydrochloric acid (2M) to pH was 6-7, heavy solid was formed. The mixture was filtered and the solid was dried under reduced pressure to give Intermediate B (680 mg, 4.19 mmol, 73.88% yield) as a white solid, which was used to next step directly without further purification.

$^1$H NMR (400 MHz, DMSO-d$_6$) δ=13.21-11.61 (m, 1H), 8.81 (s, 1H), 8.23 (d, J=5.4 Hz, 1H), 8.16 (s, 1H), 7.95-7.90 (m, 1H), 1.90 (s, 1H) ppm.

Step 2: Preparation of 1H-pyrrolo[2,3-c]pyridine-3-carbonyl chloride

To a mixture of Intermediate B (600 mg, 3.70 mmol) in dichloromethane (10 mL) was added oxalyl dichloride (939.35 mg, 7.40 mmol, 647.83 μL) and dimethylformamide (27.05 mg, 370.04 μmol, 28.47 μL). The mixture was stirred at 25° C. for 2 hours. The mixture was concentrated under reduced pressure to give Intermediate C (670 mg, crude) as a yellow solid, which was used to next step directly.

Step 3: Preparation of tert-butyl 1 H-pyrrolo[2,3-c]pyridine-3-carboxylate

To a mixture of Intermediate C (660 mg, 3.65 mmol) in 2-methylpropan-2-ol (13.54 g, 182.73 mmol, 17.48 mL) was added potassium; 2-methylpropan-2-olate (820.20 mg, 7.31 mmol). The mixture was stirred at 25° C. for 2 hours. The mixture was treated by saturated NaHCO$_3$ solution to pH was 7-8, then extracted with ethyl acetate (5 mL*5). The combined organic layer was washed with water (10 mL*3) and brine (10 mL*2), then dried over Na$_2$SO$_4$, filtered and concentrated under vacuum to give Intermediate D (800 mg, crude) as a yellow solid which was used to next step directly without further purification.

LCMS (ESI) m/z: [M+H]$^+$=219.0.

$^1$H NMR (400 MHz, DMSO-d$_6$) δ=12.32 (br s, 1H), 8.81 (d, J=0.8 Hz, 1H), 8.26 (d, J=5.6 Hz, 1H), 8.18 (s, 1H), 7.85-7.83 (m, 1H), 1.58 (s, 9H) ppm.

Step 4: Preparation of tert-butyl 1-(methylsulfonyl)-1H-pyrrolo[2,3-c]pyridine-3-carboxylate

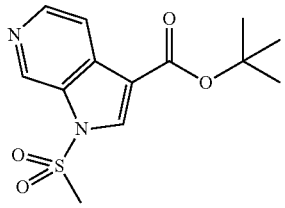

E

Step 6: Preparation of 1-(methylsulfonyl)-N-(2-oxo-2-((4-(3-(pyridin-4-yl)phenyl)thiazol-2-yl)amino)ethyl)-1H-pyrrolo[2,3-c]pyridine-3-carboxamide (Compound 2)

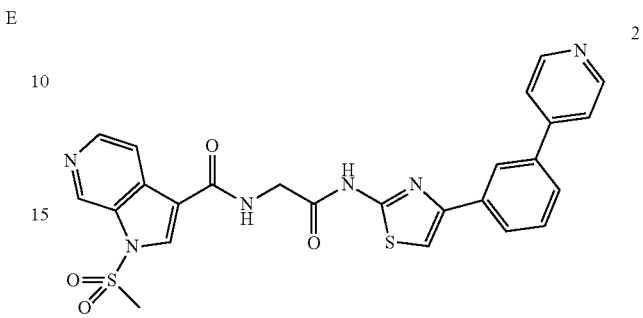

To a solution of Intermediate D (500 mg, 2.29 mmol) in tetrahydrofuran (5 mL) was added sodium hydride (183.26 mg, 4.58 mmol, 60% purity) at 0° C. The mixture was stirred at 30° C. for 30 minutes, then methansulfonyl chloride (393.64 mg, 3.44 mmol, 265.98 µL) was added. The suspension was stirred at 30° C. for 2 hours. The reaction was quenched by water (10 mL) and extracted with ethyl acetate (5 mL*5). The combined organic layer was washed with water (5 mL*3) and brine (5 mL*2), then dried over Na$_2$SO$_4$, filtered and concentrated under vacuum. The crude product was purified by reverse phase flash and lyophilized to give Intermediate E (110 mg, 311.01 µmol, 13.58% yield, 96.8% purity, FA) as a yellow solid.

LCMS (ESI) m/z: [M+H]$^+$=297.2.

$^1$H NMR (400 MHz, CHLOROFORM-d) δ=9.27 (d, J=0.8 Hz, 1H), 8.62 (d, J=5.6 Hz, 1H), 8.18 (s, 1H), 8.11-8.10 (m, 1H), 3.32 (s, 3H), 1.66 (s, 9H) ppm.

Step 5: Preparation of Intermediate F 1-(methylsulfonyl)-1H-pyrrolo[2,3-c]pyridine-3-carboxylic acid To a mixture of Intermediate F (45.72 mg, 190.29 µmol) in DCM (3 mL) was added di-isopropyl-ehtyl amine (67.07 mg, 518.98 µmol, 90.39 µL), 1-Ethyl-3-(3-dimethylamino-propyl)carbodiimide (49.74 mg, 259.49 µmol) and hydroxybenzotriazole (35.06 mg, 259.49 µmol), then 2-amino-N-[4-[3-(4-pyridyl)phenyl]thiazol-2-yl]acetamide (60 mg, 172.99 µmol, HCl) was added. The mixture was stirred at 30° C. for 2 hours. The mixture was diluted with dichloromethane (20 mL) and washed with saturated NaHCO$_3$ solution (5 mL*3), water (5 mL*3) and brine (5 mL*2) in turn, then dried over Na$_2$SO$_4$, filtered and concentrated under vacuum to give crude product as yellow oil. The residue was purified by Pre-HPLC (column: Luna C18 150*25 5u; mobile phase: [water(0.075% TFA)-ACN];B %: 5%-35%,9 min) and lyophilized to give Compound 2 (3.15 mg, 4.94 µmol, 13.15% yield, 90.68% purity, FA) as an off-white solid.

LCMS (ESI) m/z: [M+H]$^+$=533.0.

$^1$H NMR (400 MHz, DMSO-d$_6$) δ=9.17 (s, 1H), 9.05-9.02 (m, 1H), 8.70-8.65 (m, 3H), 8.51 (d, J=5.4 Hz, 1H), 8.38-8.30 (m, 2H), 8.17 (d, J=5.2 Hz, 1H), 8.02 (d, J=7.2 Hz, 1H), 7.84 (s, 1H), 7.77 (d, J=5.6 Hz, 4H), 7.62-758 (m, 1H), 4.25 (d, J=5.4 Hz, 2H), 3.75 (s, 3H) ppm.

Example 6. Preparation of 3-(hydroxymethyl)-5-(isopropylsulfonyl)-N-(2-oxo-2-((4-(3-(pyridin-4-yl)phenyl)thiazol-2-yl)amino)ethyl)benzamide (Compound 3)

F

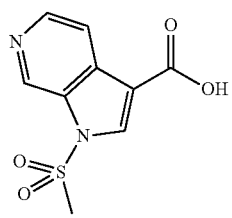

A solution of Intermediate E (100 mg, 292.08 µmol, FA)) in hydrochloric acid/dioxane (4 M, 3.25 mL) was stirred at 30° C. for 12 hours. The reaction mixture was concentrated under vacuum to give Intermediate F (80 mg, crude) as a yellow solid, which was used to next step directly without further purification.

LCMS (ESI) m/z: [M+H]$^+$=241.1.

$^1$H NMR (400 MHz, DMSO-d$_6$) δ=9.37 (s, 1H), 8.75 (s, 1H), 8.68 (d, J=6.0 Hz, 1H), 8.42 (d, J=6.0 Hz, 1H), 3.92 (s, 4H) ppm.

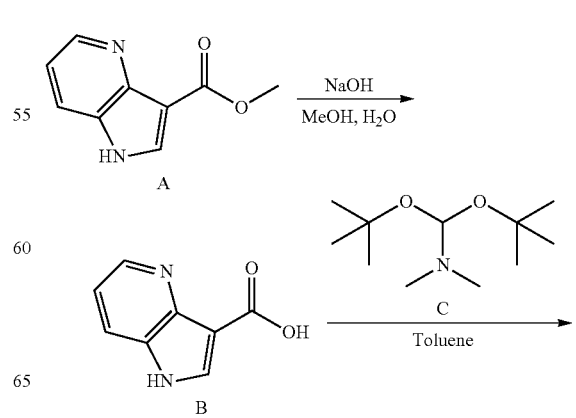

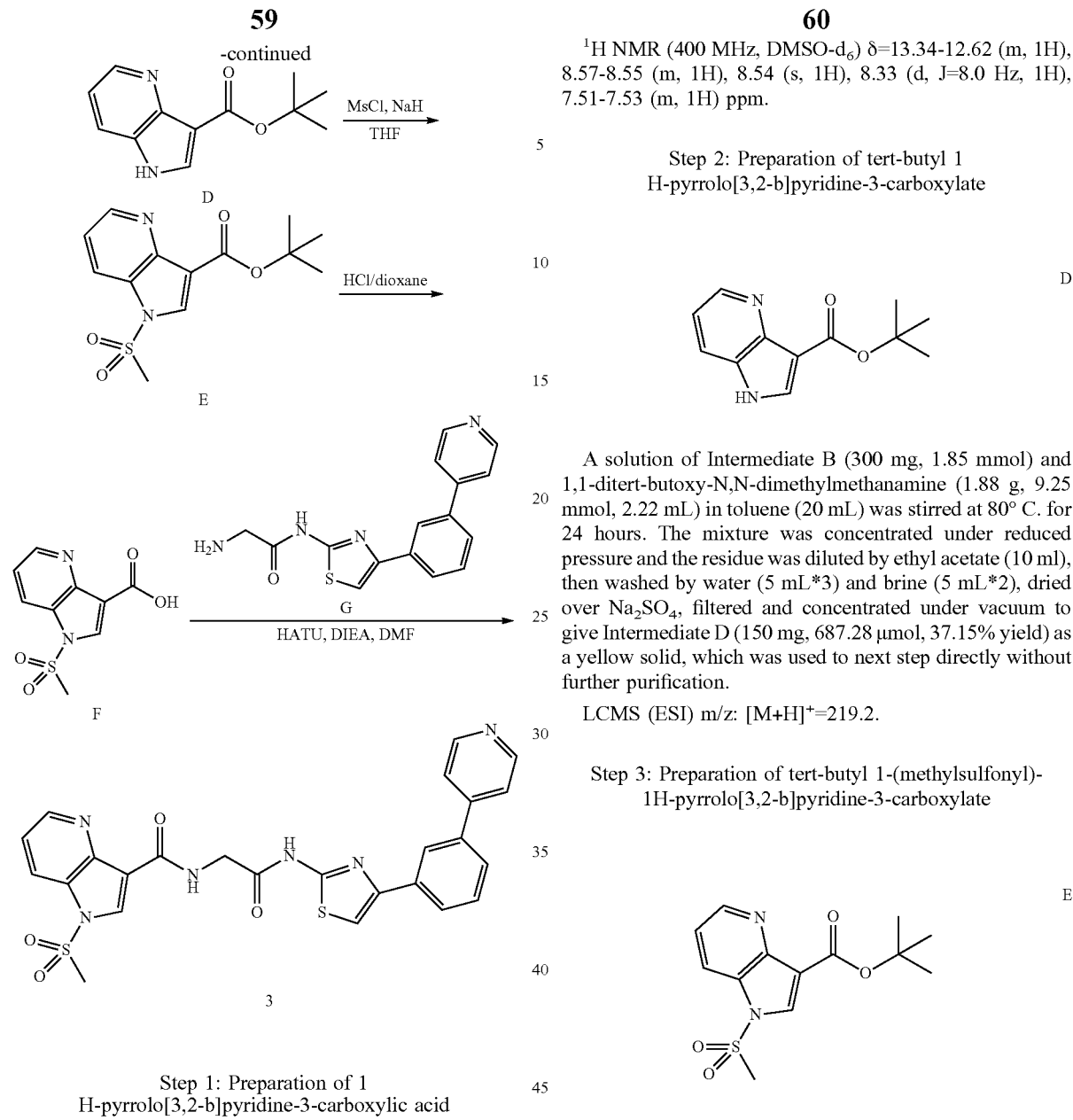

¹H NMR (400 MHz, DMSO-d₆) δ=13.34-12.62 (m, 1H), 8.57-8.55 (m, 1H), 8.54 (s, 1H), 8.33 (d, J=8.0 Hz, 1H), 7.51-7.53 (m, 1H) ppm.

Step 2: Preparation of tert-butyl 1 H-pyrrolo[3,2-b]pyridine-3-carboxylate

A solution of Intermediate B (300 mg, 1.85 mmol) and 1,1-ditert-butoxy-N,N-dimethylmethanamine (1.88 g, 9.25 mmol, 2.22 mL) in toluene (20 mL) was stirred at 80° C. for 24 hours. The mixture was concentrated under reduced pressure and the residue was diluted by ethyl acetate (10 ml), then washed by water (5 mL*3) and brine (5 mL*2), dried over Na₂SO₄, filtered and concentrated under vacuum to give Intermediate D (150 mg, 687.28 µmol, 37.15% yield) as a yellow solid, which was used to next step directly without further purification.

LCMS (ESI) m/z: [M+H]⁺=219.2.

Step 3: Preparation of tert-butyl 1-(methylsulfonyl)-1H-pyrrolo[3,2-b]pyridine-3-carboxylate Step 1: Preparation of 1 H-pyrrolo[3,2-b]pyridine-3-carboxylic acid

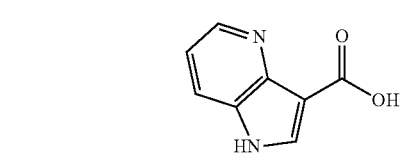

To a solution of methyl 1 H-pyrrolo[3,2-b]pyridine-3-carboxylate (500 mg, 2.84 mmol) in methanol (5 mL) was added water (2 mL) and sodium hydroxide (227.05 mg, 5.68 mmol). The mixture was stirred at 30° C. for 24 hours. The reaction solution was treated with hydrochloric acid (1M) to pH was 6-7, white solid was formed. The mixture was filtered and the solid was dried under vacuum to give Intermediate B (440 mg, 2.71 mmol, 95.61% yield) as a white solid, which was used to next step directly without further purification.

LCMS (ESI) m/z: [M+H]⁺=163.1.

To a solution of Intermediate D (130 mg, 595.64 µmol) in tetrahydrofuran (5 mL) was added sodium hydride (47.65 mg, 1.19 mmol, 60% purity) at 0° C. The mixture was stirred at 25° C. for 30 minutes, then methansulfonyl chloride (204.70 mg, 1.79 mmol, 138.31 µL) was added. The reaction solution was stirred at 25° C. for 2 hours. The reaction was quenched by water (10 mL) and extracted with ethyl acetate (5 mL*5).

The combined organic layer was washed with water (5 mL*3) and brine (5 mL*2), then dried over Na₂SO₄, filtered and concentrated under vacuum to give Intermediate E (155 mg, 523.05 µmol, 87.81% yield) as a yellow solid, which was used to next step directly without further purification.

LCMS (ESI) m/z: [M+H]⁺=297.2.

¹H NMR (400 MHz, DMSO-d₆) δ=8.77-8.71 (m, 1H), 8.51-8.43 (m, 2H), 7.66-7.59 (m, 1H), 2.35-2.34 (m, 3H), 1.62-1.57 (m, 9H) ppm.

Step 4: Preparation of 1-(methylsulfonyl)-1H-pyrrolo[3,2-b]pyridine-3-carboxylic acid

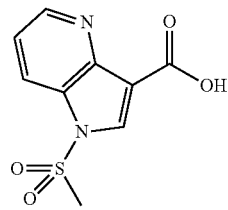
F

A solution of Intermediate E (150 mg, 506.17 μmol) in hydrochloric acid/dioxane (4 M, 5 mL) was stirred at 30° C. for 2 hours. The mixture was concentrated under vacuum to give Intermediate F (165 mg, crude) as a light yellow solid, which was used to next step directly without further purification.

LCMS (ESI) m/z: [M+H]$^+$=241.2.

$^1$H NMR (400 MHz, DMSO-d$_6$) δ=8.76-8.74 (m, 1H), 8.60-8.55 (m, 2H), 7.74-7.67 (m, 1H), 2.36-2.32 (m, 3H) ppm.

Step 5: Preparation of 1-(methylsulfonyl)-N-(2-oxo-2-((4-(3-(pyridin-4-yl)phenyl)thiazol-2-yl)amino)ethyl)-1H-pyrrolo[3,2-b]pyridine-3-carboxamide (Compound 3)

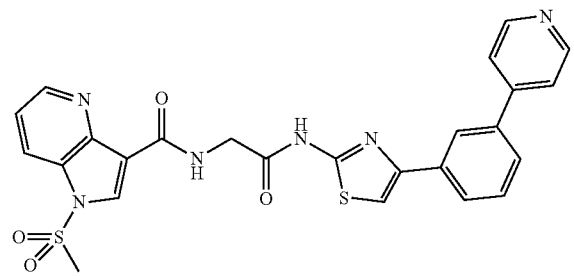
3

To a mixture of Intermediate F (135.07 mg, 562.23 μmol) and 2-amino-N-[4-[3-(4-pyridyl)phenyl]thiazol-2-yl]acetamide (150 mg, 432.48 μmol, HCl) in dimethylformamide (10 mL) was added 1-[Bis(dimethylamino)methylene]-1H-1,2,3-triazolo[4,5-b]pyridinium 3-oxid hexafluorophosphate (246.66 mg, 648.73 μmol) and di-isopropyl-ethyl amine (167.68 mg, 1.30 mmol, 225.99 μL). The mixture was stirred at 30° C. for 2 hours. The mixture was diluted with dichloromethane (20 mL) and washed with saturated NaHCO$_3$ solution (5 mL*3), water (5 mL*3) and brine (5 mL*2) in turn, then dried over Na$_2$SO$_4$, filtered and concentrated under vacuum. The residue was purified by reverse phase flash (FA condition), then followed by Pre-HPLC (column: Luna C18 150*25 5u;mobile phase: [water (0.075% TFA)-ACN];B %: 18%-48%,9 min) and lyophilized to give Compound 3 (6.46 mg, 9.99 μmol, 2.31% yield, 100% purity, TFA) as a white solid.

LCMS (ESI) m/z: [M+H]$^+$=533.3.

$^1$H NMR (400 MHz, DMSO-d$_6$) δ=12.58 (s, 1H), 9.28-9.25 (m, 1H), 8.84-8.75 (m, 3H), 8.42-8.33 (m, 3H), 8.07 (d, J=8.4 Hz, 1H), 8.01-7.95 (m, 2H), 7.88 (s, 1H), 7.84 (d, J=8.0 Hz, 1H), 7.67-7.62 (m, 1H), 7.60-7.56 (m, 1H), 4.45 (d, J=5.6 Hz, 2H), 3.74 (s, 3H) ppm.

Example 7. Preparation of 1-(isopropylsulfonyl)-N-(2-oxo-2-((4-(3-(pyridin-4-yl)phenyl)thiazol-2-yl)amino)ethyl)-1H-indole-3-carboxamide (Compound 4)

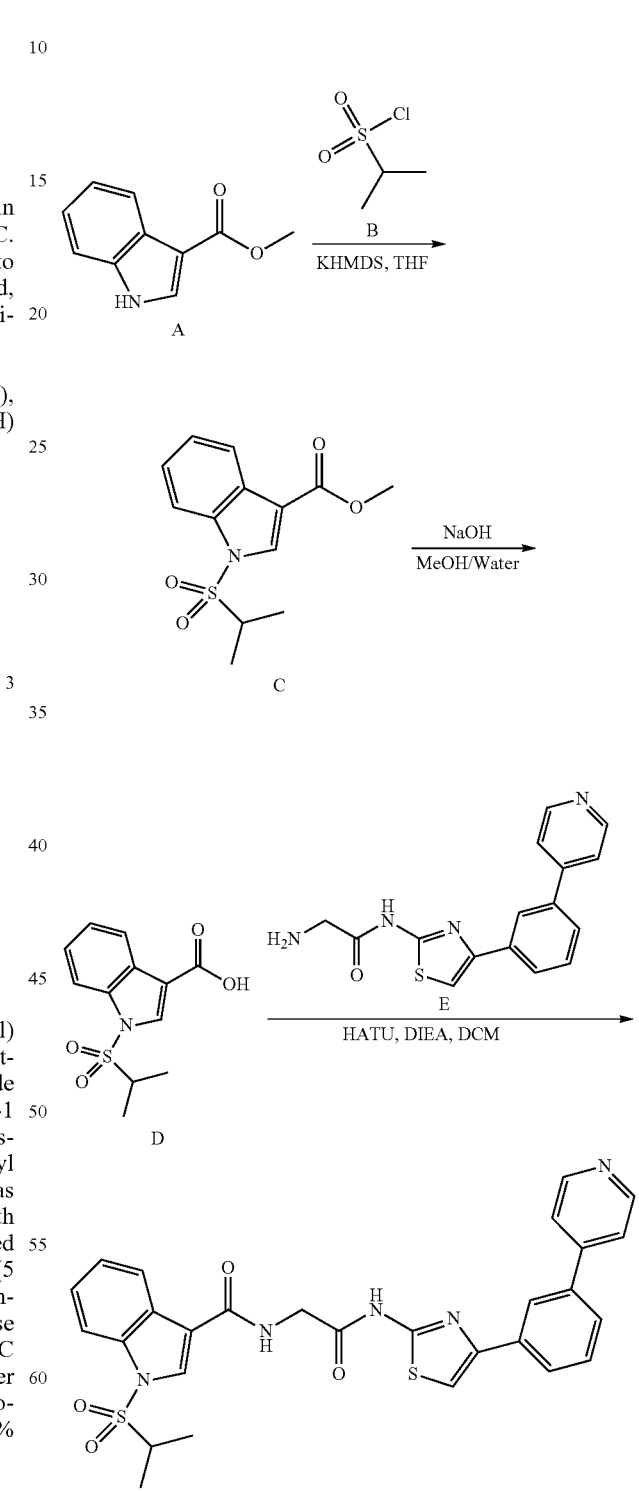

Step 1: Preparation of methyl 1-(isopropylsulfonyl)-1H-indole-3-carboxylate

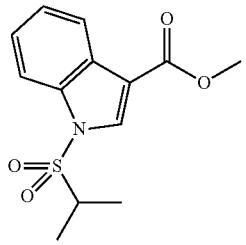

C

To a solution of methyl 1H-indole-3-carboxylate (200 mg, 1.14 mmol) in tetrahydrofuran (8 mL) was added potassium bis(trimethylsilyl)amide (1 M, 2.28 mL) slowly at 0° C. under N₂, then stirred at 0° C. for 30 minutes. propane-2-sulfonyl chloride (195.37 mg, 1.37 mmol, 152.63 µL) was added into the mixture slowly at 0° C. under N₂, then the reaction solution was warmed to 30° C. and stirred at 30° C. for 2 hours. The reaction mixture was quenched by addition saturated NH₄Cl (10 mL) and then extracted with ethyl acetate (10 mL*3).

The combined organic layers were washed with brine (30 mL), dried over Na₂SO₄, filtered and concentrated under reduced pressure to give Intermediate C (400 mg, crude) as a yellow oil, which was used to the next step without purification.

LCMS (ESI) m/z: [M+H]⁺=282.0.

Step 2: Preparation of 1-(isopropylsulfonyl)-1H-indole-3-carboxylic acid

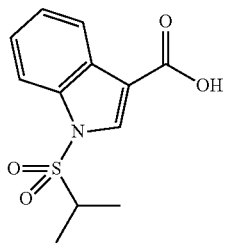

D

To a solution of methyl Intermediate C (100 mg, 355.46 µmol) in methanol (1 mL) and water (0.2 mL) was added sodium hydroxide (21.33 mg, 533.19 µmol), the mixture was stirred at 30° C. for 1 hour. The reaction mixture was diluted with water (5 mL) and extracted with ethyl acetate (5 mL*3). The organic layers were discarded and the aqueous was acidified to pH 4.0 with hydrochloric acid (1M), then extracted with ethyl acetate (5 mL*3). The combined organic layers were washed with brine (10 mL), dried over Na₂SO₄, filtered and concentrated under reduced pressure to give Intermediate D (60 mg, crude) as a white solid, which was used to the next step without further purification.

LCMS (ESI) m/z: [M+H]⁺=268.1.

Step 3: Preparation of 1-(isopropylsulfonyl)-N-(2-oxo-2-((4-(3-(pyridin-4-yl)phenyl)thiazol-2-yl)amino)e thyl)-1H-indole-3-carboxamide (Compound 4)

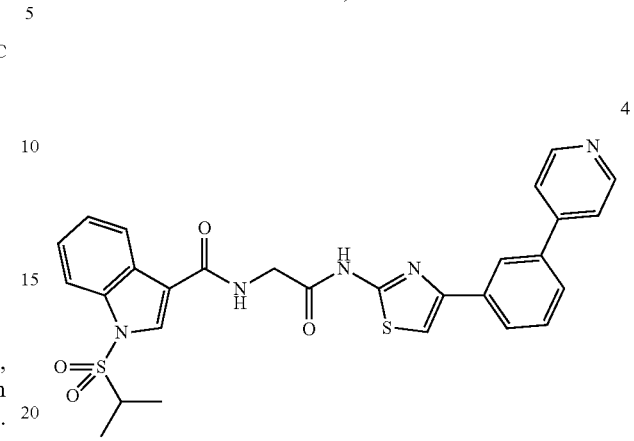

4

To a solution of Intermediate D (60 mg, 224.47 µmol), 1-[Bis(dimethylamino)methylene]-1 H-1,2,3-triazolo[4,5-b]pyridinium 3-oxid hexafluorophosphate (170.70 mg, 448.93 µmol) and di-isopropyl-ethyl amine (145.05 mg, 1.12 mmol, 195.49 µL) in dichloromethane (1 mL) was added 2-amino-N-[4-[3-(4-pyridyl)phenyl]thiazol-2-yl]acetamide (93.42 mg, 269.36 µmol, HCl). The mixture was stirred at 30° C. for 1 hour. The reaction mixture was concentrated under reduced pressure to give a residue. The residue was purified by reverse phase and lyophilized to give Compound 4 (18.83 mg, 31.09 µmol, 13.85% yield, 100% purity, FA) as a white solid.

LCMS (ESI) m/z: [M+H]⁺=560.2.

¹HNMR (400 MHz, DMSO-d₆) δ=12.48 (s, 1H), 8.93-8.90 (m, 1H), 8.68-8.67 (m, 2H), 8.44 (s, 1H), 8.31 (s, 1H), 8.25 (d, J=7.6 Hz, 1H), 8.01 (d, J=7.6 Hz, 1H), 7.89-7.84 (m, 2H), 7.77-7.75 (m, 3H), 7.62-7.58 (m, 1H), 7.44-7.36 (m, 2H), 4.22 (d, J=5.6 Hz, 2H), 3.95-3.88 (m, 1H), 1.26 (d, J=6.8 Hz, 6H) ppm.

Example 8. Preparation of 1-(methylsulfonyl)-N-(2-oxo-2-((4-(3-(pyridin-4-yl)phenyl)thiazol-2-yl)amino)ethyl)-4,5,6,7-tetrahydro-1 H-indole-3-carboxamide (Compound 5)

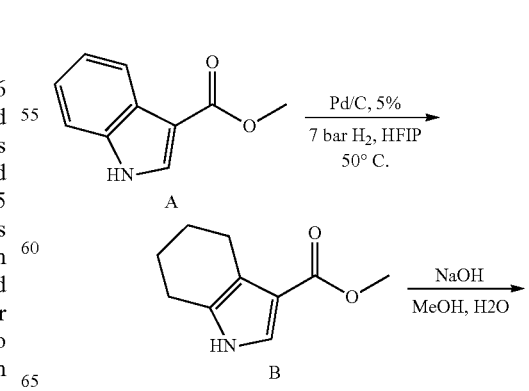

-continued

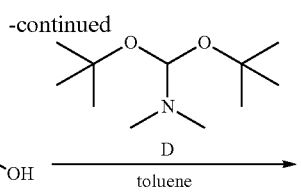

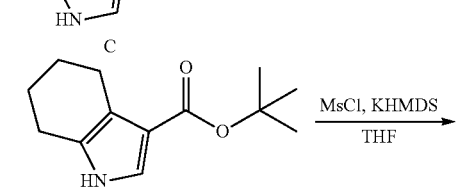

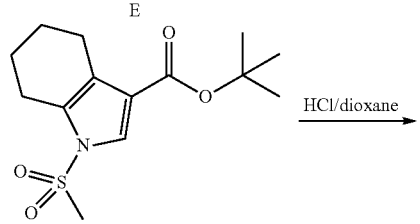

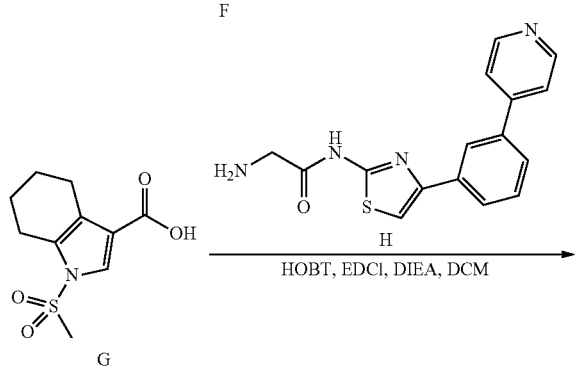

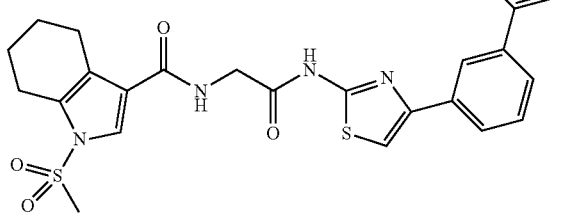

Step 1: Preparation of methyl 4,5,6,7-tetrahydro-1H-indole-3-carboxylate

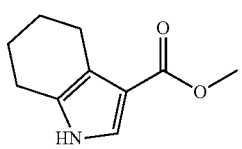

To a solution of methyl 1H-indole-3-carboxylate (2 g, 11.42 mmol) in hexafluoroisopropanol (10 mL) was added Pd/C (100 mg, 11.42 mmol, 10% purity), the mixture was stirred under H$_2$ (1 MPa) at 50° C. for 48 hours in a autoclave. The reaction mixture was filtered and concentrated under reduced pressure to give a residue. The residue was purified by flash silica gel chromatography (ISCO; X g SepaFlash Silica Flash Column, Eluent of 30-50% Ethylacetate/Petroleum ethergradient 65 mL/min) and concentrated in vacuum to give Intermediate B (500 mg, 2.79 mmol, 24.44% yield) as a white solid.

LCMS (ESI) m/z: [M+H]$^+$=180.2.

Step 2: Preparation of 4,5,6,7-tetrahydro-1H-indole-3-carboxylic acid

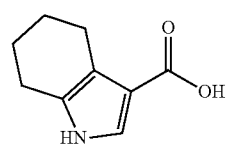

To a solution of Intermediate B (200 mg, 1.12 mmol) in methanol (4 mL) was added a solution of sodium hydroxide (89.27 mg, 2.23 mmol) in water (1 mL). The mixture was stirred at 55° C. for 48 hours. The pH was adjusted to 7 with hydrochloric acid (2 M, 5 mL). Water (20 mL) was added and the reaction mixture was extracted with ethyl acetate (50 mL*2). The combined organic layers were washed with brine (10 mL), dried over Na$_2$SO$_4$, filtered and concentrated under reduced pressure to give a residue. The crude product Intermediate C (220 mg, crude) was used into the next step without further purification as a red solid.

LCMS (ESI) m/z: [M+H]$^+$=166.2.

Step 3: Preparation of tert-butyl 4,5,6,7-tetrahydro-1H-indole-3-carboxylate

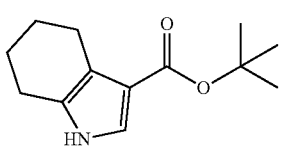

To a solution of Intermediate C (200 mg, 1.21 mmol) in toluene (5 mL) was added 1,1-ditert-butoxy-N,N-dimethylmethanamine (984.67 mg, 4.84 mmol, 1.16 mL). The mixture was stirred at 80° C. for 2 hours. Water (20 mL) was added and extracted with ethyl acetate (50 mL*2). The combined organic layers were washed with brine (20 mL), dried over Na$_2$SO$_4$, filtered and concentrated under reduced pressure to give a residue. The residue was purified by flash silica gel chromatography (ISCO; SepaFlash Silica Flash Column, Eluent of 0-90% Ethylacetate/Petroleum ethergradient 65 mL/min) and concentrated in vacuum to give Intermediate D (65 mg, 293.73 μmol, 24.26% yield) as a red solid.

LCMS (ESI) m/z: [M+H-56]$^+$=166.2.

$^1$H NMR (400 MHz, CDCl$_3$) δ=8.01 (s, 1H), 7.22 (d, J=3.0 Hz, 1H), 2.72-2.70 (m, 2H), 2.55-2.53 (m, 2H), 1.85-1.71 (m, 4H), 1.55 (s, 9H) ppm.

Step 4: Preparation of tert-butyl 1-(methylsulfonyl)-4,5,6,7-tetrahydro-1H-indole-3-carboxylate

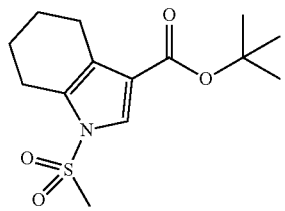

F

To a solution of Intermediate D (65 mg, 293.73 µmol) in tetrahydrofuran (2 mL) was added potassium bis(trimethylsilyl)amide (1 M, 881.18 µL) at 0° C. under $N_2$. After half an hour, methansulfonyl chloride (67.29 mg, 587.45 µmol, 45.47 µL) was added at 0° C. The mixture was stirred at 25° C. for 2 hours. Water (20 mL) was added and the reaction mixture was extracted with ethyl acetate (50 mL*2). The combined organic layers were washed with brine (20 mL), dried over $Na_2SO_4$, filtered and concentrated under reduced pressure to give a residue. The residue was purified by flash silica gel chromatography (ISCO; SepaFlash Silica Flash Column, Eluent of 0-90% Ethylacetate/Petroleum ethergradient 65 mL/min) and concentrated in vacuum to give Intermediate F (30 mg, 90.18 µmol, 30.70% yield) as a white solid.

LCMS (ESI) m/z: $[M+H-56]^+$=244.0.

Step 5: Preparation of 1-(methylsulfonyl)-4,5,6,7-tetrahydro-1H-indole-3-carboxylic acid

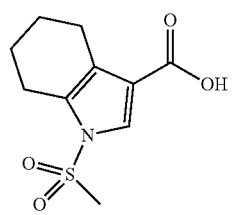

To a solution of Intermediate F (30 mg, 100.21 µmol) in dioxane (2 mL) was added hydrochloric acid/dioxane (0.5 mL). The mixture was stirred at 25° C. for 12 hours. The reaction mixture was concentrated under reduced pressure to remove dioxane. The crude product Intermediate G (30 mg, crude) was used into the next step without further purification as a white solid.

$^1$H NMR (400 MHz, MeOD) δ=7.63 (s, 1H), 3.29 (s, 3H), 2.78-2.68 (m, 4H), 1.84-1.73 (m, 4H) ppm.

Step 6: Preparation of 1-(methylsulfonyl)-N-(2-oxo-2-((4-(3-(pyridin-4-yl)phenyl)thiazol-2-yl)amino)ethyl)-4,5,6,7-tetrahydro-1H-indole-3-carboxamide (Compound 5)

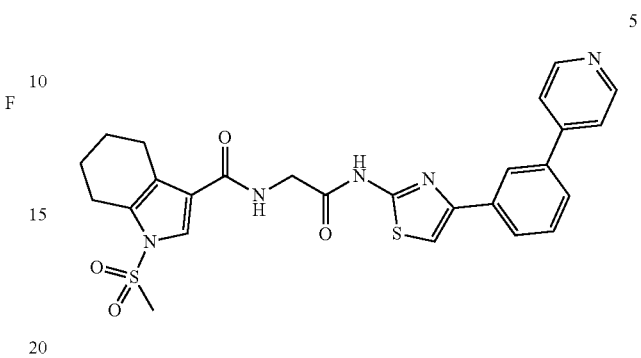

To a solution of Intermediate G (29.46 mg, 121.10 µmol) in dichloromethane (2 mL) was added 1-Ethyl-3-(3-dimethylaminopropyl)carbodiimide (29.02 mg, 151.37 µmol), hydroxybenzotriazole (20.45 mg, 151.37 µmol), di-isopropyl-ethyl amine (39.13 mg, 302.74 µmol, 52.73 µL), then 2-amino-N-[4-[3-(4-pyridyl)phenyl]thiazol-2-yl]acetamide (35 mg, 100.91 µmol, HCl salt) was added. The mixture was stirred at 25° C. for 2 hours. The reaction mixture was concentrated under reduced pressure to remove dichloromethane. The residue was purified by Prep-HPLC (TFA condition; column: Luna C18 150*25 5u; mobile phase: [water (0.075% TFA)-ACN]; B %: 20%-50%, 9 min) and lyophilized to give Compound 5 (16 mg, 24.63 µmol, 24.41% yield, TFA salt) as a white solid.

LCMS (ESI) m/z=$[M+H]^+$=536.4.

$^1$H NMR (400 MHz, DMSO) δ=12.42 (s, 1H), 8.79 (d, J=6.0 Hz, 2H), 8.47-8.44 (m, 1H), 8.37-8.36 (m, 1H), 8.06 (d, J=8.0 Hz, 1H), 8.01 (d, J=6.0 Hz, 2H), 7.85-7.82 (m, 2H), 7.78 (s, 1H), 7.65-7.61 (m, 1H), 4.09 (d, J=6.0 Hz, 2H), 3.47 (s, 3H), 2.75-2.72 (m, 2H), 2.64-2.61 (m, 2H), 1.75-1.63 (m, 4H) ppm.

Example 9. Preparation of 1-(isopropylsulfonyl)-5-methyl-N-(2-((4-(3-(1-methyl-1H-pyrazol-3-yl)phenyl)thiazol-2-yl)amino)-2-oxoethyl)-1H-pyrrole-3-carboxamide (Compound 6)

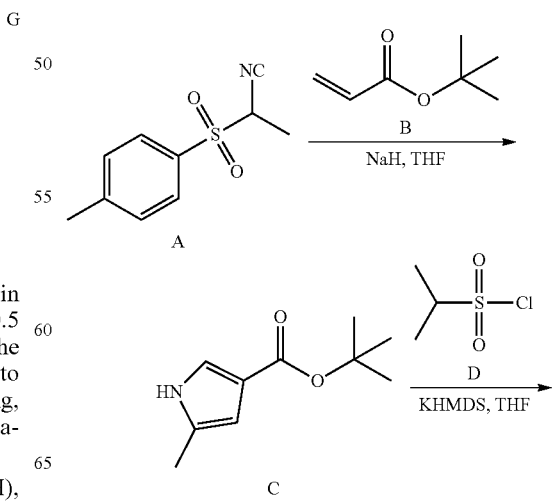

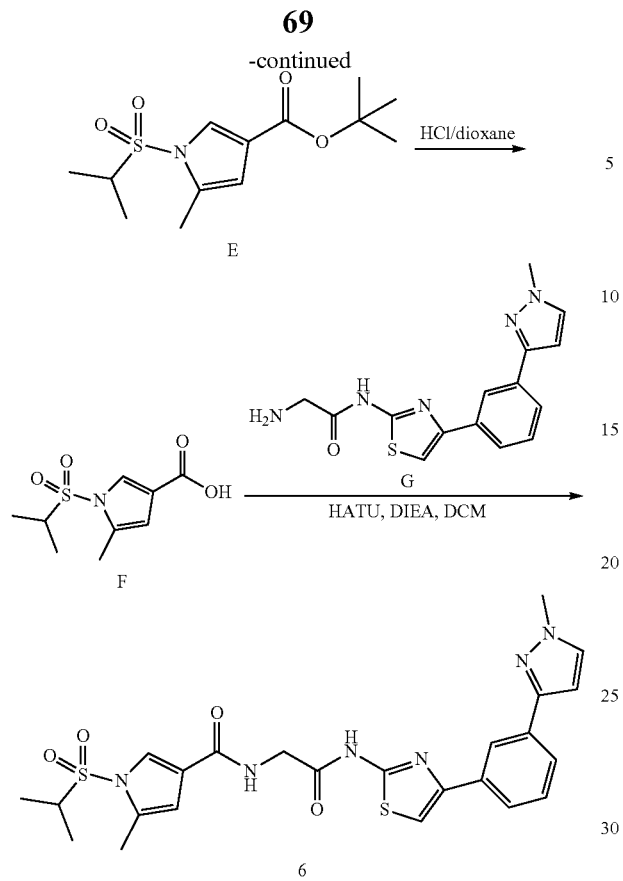

Step 1: Preparation of tert-butyl 5-methyl-1H-pyrrole-3-carboxylate

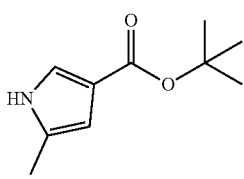

C

To a mixture of 1-(1-isocyanoethylsulfonyl)-4-methylbenzene (500 mg, 2.39 mmol) and tert-butyl prop-2-enoate (306.24 mg, 2.39 mmol, 346.81 μL) in tetrahydrofuran (10 mL) was added sodium hydride (114.68 mg, 2.87 mmol, 60% purity) at 30° C., then the mixture was heated to 70° C. and stirred at 70° C. for 1 hour. The reaction mixture was quenched by addition saturated NH$_4$Cl (20 mL), and then extracted with ethyl acetate (20 mL*3). The combined organic layers were washed with brine (50 Ml), dried over Na$_2$SO$_4$, filtered and concentrated under reduced pressure to give a residue. The residue was purified by column chromatography (SiO$_2$, Petroleum ether/Ethyl acetate=3/1 to 2/1) and concentrated in vacuum to give Intermediate C (350 mg, 1.78 mmol, 74.34% yield, 91.97% purity) as a light yellow oil.

LCMS (ESI) m/z: [M-56+H]$^+$=126.2.

$^1$HNMR (400 MHz, DMSO-d$_6$) δ=11.05 (br s, 1H), 7.10 (d, J=1.8 Hz, 1H), 6.01 (s, 1H), 2.13 (s, 3H), 1.45 (s, 9H) ppm.

Step 2: Preparation of tert-butyl 1-(isopropylsulfonyl)-5-methyl-1H-pyrrole-3-carboxylate

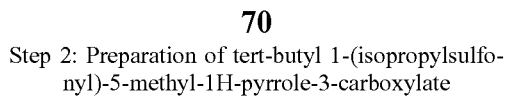

E

To a solution of Intermediate C (200 mg, 1.10 mmol) in tetrahydrofuran (8 mL) was added potassium bis(trimethylsilyl)amide (1 M, 2.21 mL) slowly at 0° C. under N$_2$, then stirred at 0° C. for 30 minutes. Then propane-2-sulfonyl chloride (188.85 mg, 1.32 mmol, 147.54 μL) was added into the mixture slowly at 0° C. under N$_2$. The reaction solution was warmed to 30° C. and stirred at 30° C. for 2 hours. The reaction mixture was poured into saturated NH$_4$Cl (20 mL) and then extracted with ethyl acetate (20 mL*3). The combined organic layers were washed with brine (30 mL), dried over Na$_2$SO$_4$, filtered and concentrated under reduced pressure to give a residue. The residue was purified by column chromatography (SiO$_2$, Petroleum ether/Ethyl acetate=3:1) and concentrated under reduced pressure to give Intermediate E (220 mg, 765.55 μmol, 69.37% yield) as a light yellow oil.

LCMS (ESI) m/z: [M-56+H]$^+$=232.2.

$^1$HNMR (400 MHz, methanol-d$_4$) δ=7.52 (d, J=1.6 Hz, 1H), 6.37-6.36 (m, 1H), 2.40 (s, 3H), 1.53 (s, 9H), 1.30 (d, J=6.8 Hz, 6H) ppm.

Step 3: Preparation of 1-(isopropylsulfonyl)-5-methyl-1H-pyrrole-3-carboxylic acid

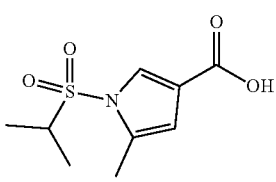

F

A solution of Intermediate E (220 mg, 765.55 μmol) in 4M hydrochloric acid/dioxane (3 mL) was stirred at 30° C. for 1 hour. The reaction mixture was concentrated under reduced pressure to give a brown solid. The solid was triturated with methyl-tert-butyl ether (2.0 mL), filtered and dried in vacuum to give Intermediate F (120 mg, crude) as a brown solid.

LCMS (ESI) m/z: [M+H]$^+$=232.1.

Step 4: Preparation of 1-(isopropylsulfonyl)-5-methyl-N-(2-((4-(3-(1-methyl-1H-pyrazol-3-yl)phenyl)thiazol-2-yl)amino)-2-oxoethyl)-1H-pyrrole-3-carboxamide (Compound 6)

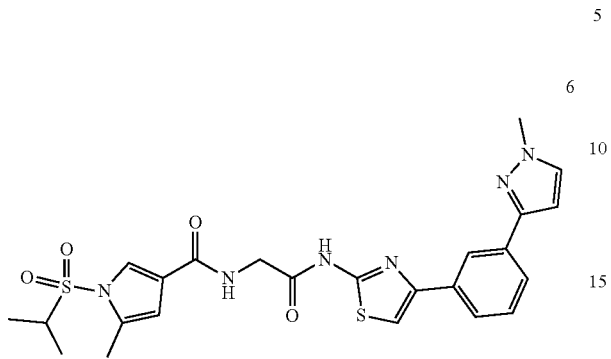

To a solution of Intermediate F (60 mg, 259.44 μmol), 1-[Bis(dimethylamino)methylene]-1H-1,2,3-triazolo[4,5-b]pyridinium 3-oxid hexafluorophosphate (147.97 mg, 389.16 μmol) and di-isopropyl-ethyl amine (167.65 mg, 1.30 mmol, 225.95 μL) in dichloromethane (2 mL) was added 2-amino-N-[4-[3-(1-methylpyrazol-3-yl)phenyl]thiazol-2-yl]acetamide (90.76 mg, 259.44 μmol, HCl), the mixture was stirred at 30° C. for 1 hour.

The reaction mixture was concentrated under reduced pressure to give a residue. The residue was purified by reverse phase and lyophilized to give Compound 6 (41.78 mg, 79.06 μmol, 30.48% yield) as an off-white solid.

LCMS (ESI) m/z: [M+H]$^+$=527.2.

$^1$HNMR (400 MHz, DMSO-d$_6$) δ=12.41 (s, 1H), 8.63-8.60 (m, 1H), 8.38-8.38 (m, 1H), 7.81-7.75 (m, 1H), 7.72-7.69 (m, 4H), 7.46-7.42 (m, 1H), 6.72 (d, J=2.4 Hz, 1H), 6.51 (d, J=0.8 Hz, 1H), 4.11 (d, J=5.6 Hz, 2H), 3.90 (s, 3H), 3.83-3.79 (m, 1H), 2.38 (s, 3H), 1.25-1.23 (m, 6H) ppm.

Example 10. Preparation of N-(2-((4-(3-(2,6-dimethylpyridin-4-yl)phenyl)thiazol-2-yl)amino)-2-oxoethyl)-1-(isopropylsulfonyl)-5-methyl-1H-pyrrole-3-carboxamide (Compound 7)

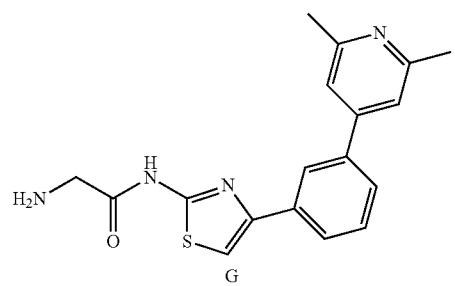

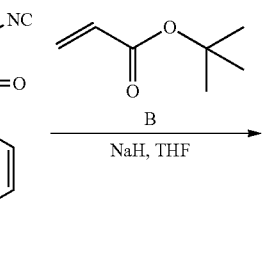

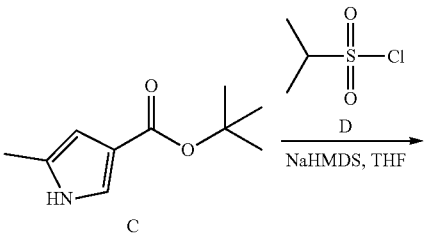

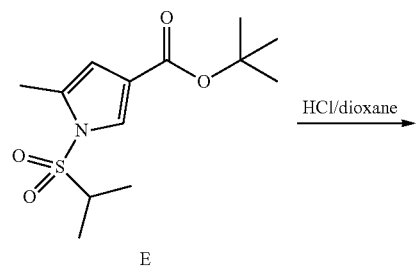

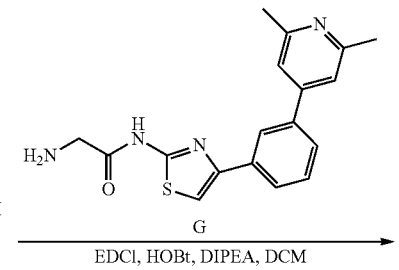

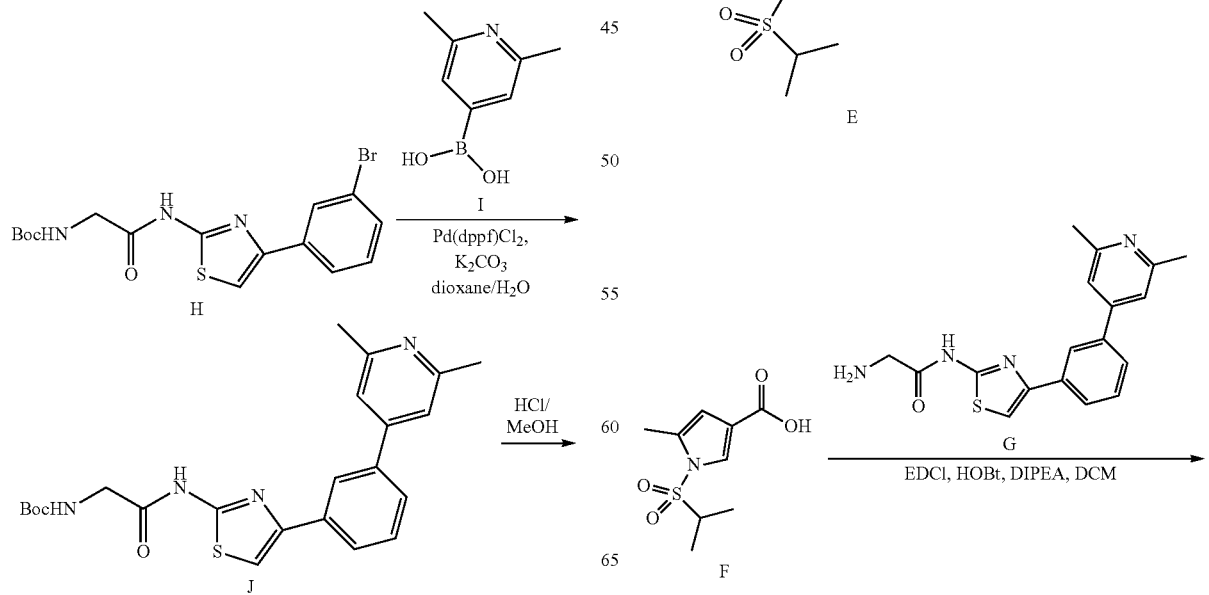

-continued

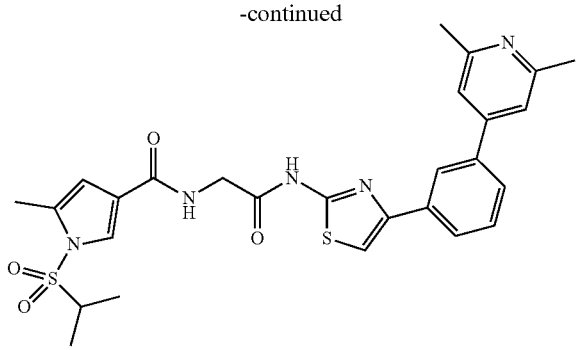

7

Step 1: Preparation of tert-butyl 5-methyl-1H-pyrrole-3-carboxylate

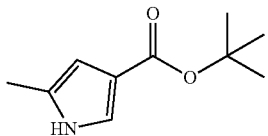

C

To a solution of 1-(1-isocyanoethylsulfonyl)-4-methylbenzene (1 g, 4.78 mmol) in tetrahydrofuran (15 mL) was added tert-butyl prop-2-enoate (612.47 mg, 4.78 mmol, 693.63 μL) and added sodium hydride (229.37 mg, 5.73 mmol, 60% purity) at 20° C. The mixture was stirred at 70° C. for 1 hour. The reaction mixture was quenched by addition saturated NH$_4$Cl (20 mL), and then extracted with ethyl acetate (20 mL* 3). The combined organic layers were washed with brine (50 mL), dried over Na$_2$SO$_4$, filtered and concentrated under reduced pressure to give Intermediate C (0.85 g, crude) as yellow oil, which was used in next step without further purification.

LCMS (ESI) m/z: [M-56+H]$^+$=126.1.

Step 2: Preparation of tert-butyl 1-(isopropylsulfonyl)-5-methyl-1H-pyrrole-3-carboxylate

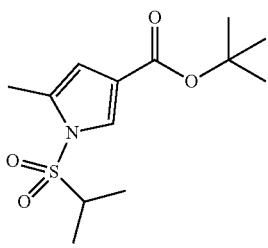

E

To a solution of Intermediate C (0.8 g, 4.41 mmol) in tetrahydrofuran (10 mL) was added Sodium Bis(trimethylsilyl)amide (1 M, 8.83 mL) at 0° C. The mixture was stirred at 0° C. for 30 minutes. propane-2-sulfonyl chloride (818.34 mg, 5.74 mmol, 639.33 μL) was added and the mixture was stirred at 20° C. for 16 hours. The reaction mixture was quenched by addition saturated NH$_4$Cl (20 mL), and then extracted with ethyl acetate (20 mL*3). The combined organic layers were washed with brine (50 mL), dried over Na$_2$SO$_4$, filtered and concentrated under reduced pressure to give a residue. The residue was purified by column chromatography (SiO$_2$, Petroleum ether/Ethyl acetate=3/1) to give Intermediate E (0.9 g, 3.13 mmol, 70.95% yield) as yellow oil.

LCMS (ESI) m/z: [M-56+H]$^+$=232.0.

$^1$H NMR (400 MHz, CHLOROFORM-d) δ=7.57 (d, J=2.0 Hz, 1H), 6.38 (m, 1H), 3.41 (m, 1H), 2.42 (m, 3H), 1.54 (s, 9H),1.36 (d, J=6.8 Hz, 6H) ppm.

Step 3: Preparation of 1-(isopropylsulfonyl)-5-methyl-1H-pyrrole-3-carboxylic acid

F

To a mixture of Intermediate E (0.35 g, 1.22 mmol) was added hydrochloric acid/dioxane (4 M, 6.09 mL) at 20° C. The mixture was stirred at 20° C. for 30 minutes. The reaction mixture was concentrated in vacuum to give Intermediate F (0.28 g, crude) as a green solid, which was used in next step without further purification.

LCMS (ESI) m/z: [M+H]$^+$=231.9.

Step 4: Preparation of tert-butyl (2-((4-(3-(2,6-dimethylpyridin-4-yl)phenyl)thiazol-2-yl)amino)-2-oxoethyl)carbamate

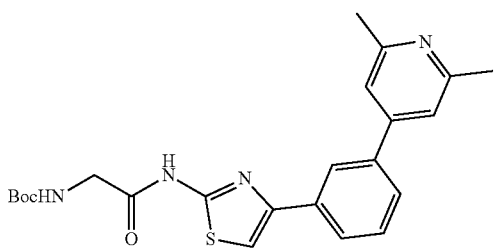

J

A mixture of tert-butyl N-[2-[[4-(3-bromophenyl)thiazol-2-yl]amino]-2-oxo-ethyl]carbamate (1.5 g, 3.64 mmol), (2,6-dimethyl-4-pyridyl)boronic acid (659.10 mg, 4.37 mmol), K$_2$CO$_3$ (1.51 g, 10.91 mmol), Pd(dppf)Cl$_2$ (266.20 mg, 363.81 μmol) in dioxane (6 mL) and water (2 mL) was degassed and purged with N$_2$ for 3 times, and then the mixture was stirred at 100° C. for 3 hour sunder N$_2$ atmosphere. The reaction mixture was concentrated under reduced pressure to give a residue. The residue was purified by column chromatography (SiO$_2$, Petroleum ether/Ethyl acetate=1/1) to give Intermediate J (1.2 g, 2.74 mmol, 75.21% yield) as a yellow solid.

LCMS (ESI) m/z: [M+H]$^+$=439.2.

¹H NMR (400 MHz, DMSO-d₆) δ=12.31 (s, 1H), 8.26 (s, 1H), 7.98 (d, J=7.6 Hz, 1H), 7.82 (s, 1H), 7.71 (d, J=7.6 Hz, 1H), 7.42 (s, 2H), 7.61-7.54 (m, 1H), 7.17 (m, 1H), 3.88 (m, 2H), 1.41 (s, 9H) ppm.

Step 5: Preparation of 2-amino-N-(4-(3-(2,6-dimethylpyridin-4-yl)phenyl)thiazol-2-yl)acetamide

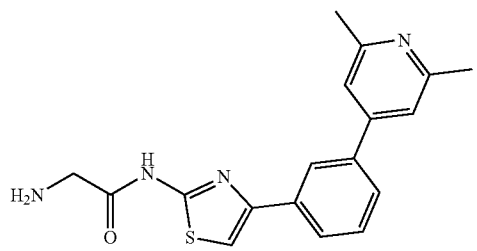

G

To a solution of Intermediate J (0.2 g, 456.06 μmol) in MeOH (1 mL) was added hydrochloric acid/methanol (4 M, 1.14 mL). The mixture was stirred at 20° C. for 0.5 hour. The reaction mixture was concentrated under reduced pressure to give Intermediate G (0.18 g, crude, HCl) as a white solid, which was used in next step without further purification.

Step 6: Preparation of N-(2-((4-(3-(2,6-dimethylpyridin-4-yl)phenyl)thiazol-2-yl)amino)-2-oxoethyl)-1-(isopropylsulfonyl)-5-methyl-1H-pyrrole-3-carboxamide

7

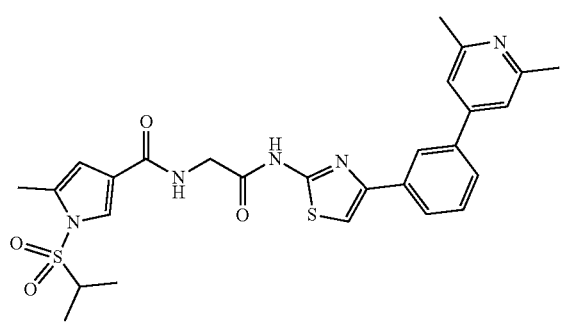

To a solution of Intermediate F (125.85 mg, 544.16 μmol) in dichloromethane (5 mL) were added Intermediate G (0.17 g, 453.47 μmol, HCl), di-isopropyl-ethyl amine (293.03 mg, 2.27 mmol, 394.92 μL), hydroxybenzotriazole (61.27 mg, 453.47 μmol) and 1-Ethyl-3-(3-dimethylaminopropyl)carbodiimide (130.40 mg, 680.20 μmol). The mixture was stirred at 20° C. for 16 hours. The reaction mixture was poured into water (10 mL), and then diluted with dichloromethane (10 mL) and extracted with dichloromethane (10 mL). The combined organic layers were washed with water (10 mL), dried over Na₂SO₄, filtered and concentrated under reduced pressure to give the crude product. The crude product was triturated with tert-butyl-methyl ether (10 mL) at 20° C. for 30 min and the mixture was filtered and the filtration cake was washed with tert-butyl-methyl ether (3 mL), dried in vacuum to give Compound 7 (117 mg, 207.41 μmol, 45.74% yield, 97.80% purity) as a white solid..

LCMS (ESI) m/z: [M+H]⁺=552.2.
¹H NMR (400 MHz, DMSO-d₆) δ=12.41 (s, 1H), 8.62 (m, 1H), 8.27 (s, 1H), 7.99 (d, J=7.6 Hz, 1H), 7.82 (s, 1H), 7.75-7.69 (m, 2H), 7.62-7.54 (m, 1H), 7.42 (s, 2H), 6.52 (s, 1H), 4.13 (m, 2H), 3.82 (m, 1H), 2.53 (br s, 6H), 2.39 (s, 3H), 1.25 (d, J=6.6 Hz, 6H) ppm.

Example 11. Preparation of N-(2-((4-(3-((2S,6R)-2,6-dimethylmorpholino)phenyl)thiazol-2-yl)amino)-2-oxoethyl)-1-(isopropylsulfonyl)-5-methyl-1H-pyrrole-3-carboxamide

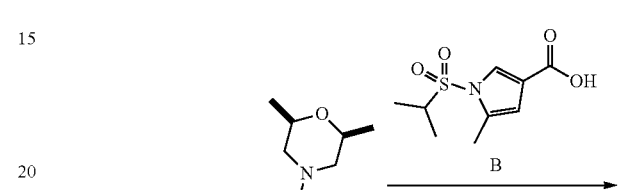

B

EDCl, HOBT, DIEA, DCM

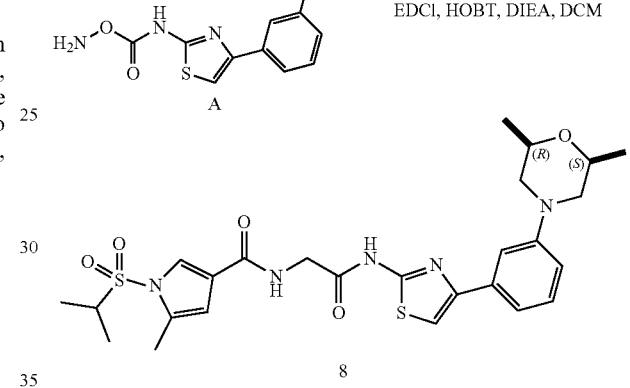

8

Step 1: Preparation of N-(2-((4-(3-((2S,6R)-2,6-dimethylmorpholino)phenyl)thiazol-2-yl)amino)-2-oxoethyl)-1-(isopropylsulfonyl)-5-methyl-1H-pyrrole-3-carboxamide (Compound 8)

8

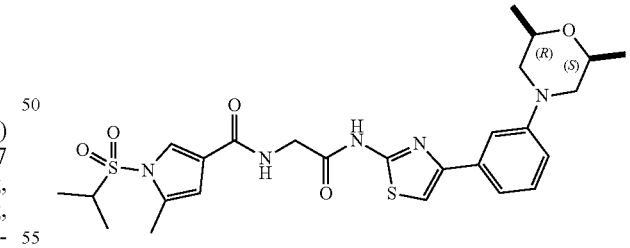

To a solution of 1-isopropylsulfonyl-5-methyl-pyrrole-3-carboxylic acid (50.73 mg, 219.37 μmol) in dichloromethane (2 mL) were added 1-Ethyl-3-(3-dimethylaminopropyl)carbodiimide (52.57 mg, 274.22 μmol), di-isopropyl-ethyl amine (70.88 mg, 548.44 μmol, 95.53 μL) and hydroxybenzotriazole (37.05 mg, 274.22 μmol), then 2-amino-N-[4-[3-[(2R,6S)-2,6-dimethylmorpholin-4-yl]phenyl]thiazol-2-yl]acetamide (70 mg, 182.81 μmol, HCl) was added. The mixture was stirred at 25° C. for 2 hours. The reaction mixture was concentrated under reduced pressure to remove dichloromethane. The residue was purified by prep-HPLC (TFA condition; column: Luna C18 150*25 5u;mobile phase: [water(0.075% TFA)-ACN];B %: 35%-65%,2 min) and lyophilized to give Compound 8 (34 mg, 50.14 μmol, 27.43% yield, 99.36% purity, TFA) as a white solid.

LCMS (ESI) m/z: [M+H]⁺=560.2.

¹H NMR (400 MHz, DMSO+D₂O) δ=12.35 (s, 1H), 8.67-8.64 (m, 1H), 7.84 (s, 1H), 7.61 (s, 1H), 7.44 (s, 1H), 7.33-7.30 (m, 2H), 7.28-7.24 (m, 1H), 6.93 (d, J=8.0 Hz, 1H), 6.77-6.76 (m, 1H), 4.13 (d, J=5.6 Hz, 2H), 3.73-3.69 (m, 2H), 3.62 (d, J=11.2 Hz, 2H), 3.57 (s, 3H), 2.28-2.26 (m, 2H), 1.17 (d, J=6.0 Hz, 6H) ppm.

Chiral HPLC: OJ-3-MeOH (DEA)-40-3 mL-35T.lcm, t=1.316 min, ee %=100%.

Example 12. Preparation of 4-methyl-1-(methylsulfonyl)-N-(2-oxo-2-((4-(3-(pyridin-4-yl)phenyl)thiazol-2-yl)amino)ethyl)-1H-pyrrole-3-carboxamide (Compound 9)

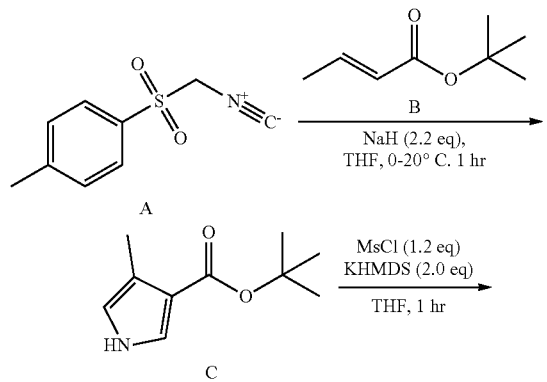

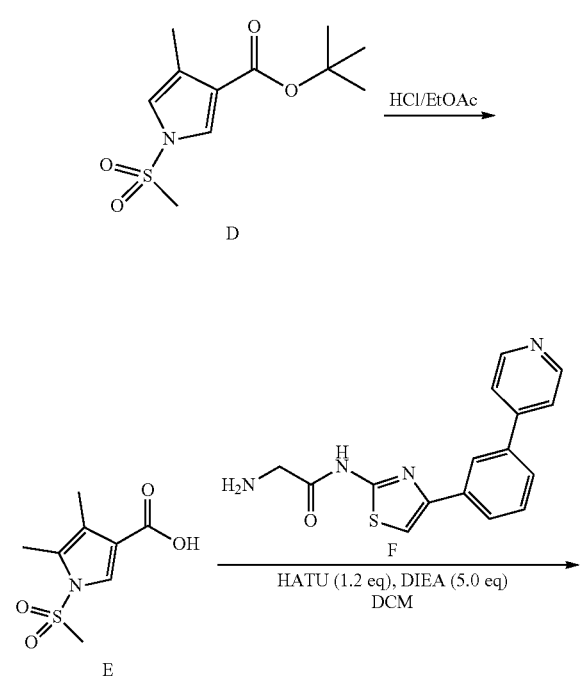

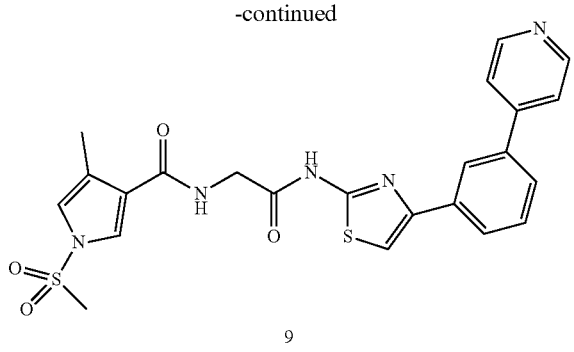

9

Step 1: Preparation of tert-butyl 4-methyl-1H-pyrrole-3-carboxylate

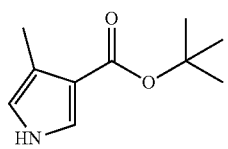

C

To a mixture of sodium hydride (409.72 mg, 10.24 mmol, 60% purity) in tetrahydrofuran (10 mL) was added the solution of 1-(isocyanomethylsulfonyl)-4-methyl-benzene (1 g, 5.12 mmol) and tert-butyl (E)-but-2-enoate (662.11 mg, 4.66 mmol) in tetrahydrofuran (10 mL) dropwise under N₂. The mixture was stirred at 30° C. for 1 hour. The reaction mixture was poured into ice water (20 mL), the solution was extracted with ethyl acetate (20 mL*3). The combined organic layer was washed with brine (50 mL), dried over Na₂SO₄, filtered and concentrated in vacuum to give Intermediate C (800 mg, 3.84 mmol, 82.54% yield) as brown oil, which was used for next step directly.

LCMS (ESI) m/z:[M+H-56]⁺=126.3.

¹H NMR (400 MHz, MeOD) δ=7.23 (s, 1H), 6.48 (m, 1H), 2.19 (s, 3H), 1.54 (s, 9H) ppm.

Step 2: Preparation of tert-butyl 4-methyl-1-(methylsulfonyl)-1H-pyrrole-3-carboxylate

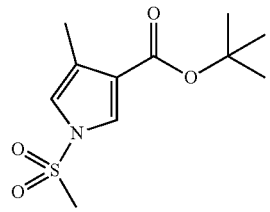

D

To a solution of Intermediate C (200 mg, 1.10 mmol) in tetrahydrofuran (5 mL) was added sodium bis(trimethylsilyl)amide (1 M, 2.21 mL) at 0° C. and stirred for 30 minutes. Then methanesulfonyl chloride (151.70 mg, 1.32 mmol, 102.50 μL) was added at 0° C. under N₂, the mixture was stirred at 30° C. for 1 hour. The reaction mixture was poured into NH₄Cl (5 mL) solution and extracted with ethyl acetate (5 mL), the combined organic layer was washed with brine (20 mL), dried over Na₂SO₄ and filtered. The filtrate was concentrated in vacuum. The residue was purified by reverse phase (FA condition) and lyophilized to give Intermediate D (50 mg, 168.75 μmol, 15.29% yield) as colorless oil.

LCMS (ESI) m/z: [M+H-56]⁺=204.1.

¹H NMR (400 MHz, CDCl₃) δ=7.60 (d, J=2.8 Hz, 1H), 6.86 (dd, J=1.2, 2.4 Hz, 1H), 3.17 (s, 3H), 2.25-2.23 (m, 3H), 1.55 (s, 9H) ppm.

Step 3: Preparation of 4-methyl-1-(methylsulfonyl)-1H-pyrrole-3-carboxylic acid

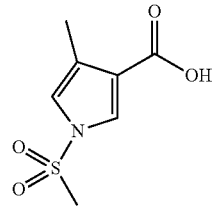

A solution of Intermediate D (50 mg, 168.75 μmol) in hydrochloric acid/ethyl acetate (2 mL) was astirred at 30° C. for 3 hours. The reaction mixture was concentrated to give Intermediate E (30 mg, 127.30 μmol, 75.44% yield) as a yellow solid.

LCMS (ESI) m/z:[M+H]⁺=204.1.

Step 4: Preparation of 4-methyl-1-(methylsulfonyl)-N-(2-oxo-2-((4-(3-(pyridin-4-yl)phenyl)thiazol-2-yl)amino)ethyl)-1H-pyrrole-3-carboxamide (Compound 9)

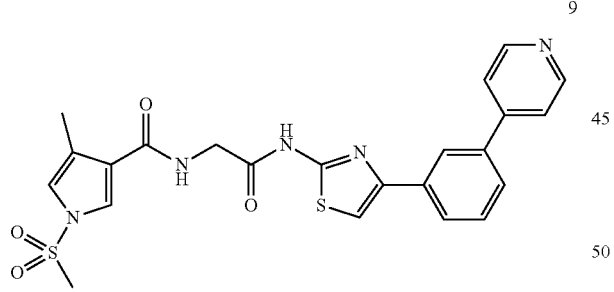

To a solution of Intermediate E (30 mg, 127.30 μmol) and 2-amino-N-[4-[3-(4-pyridyl)phenyl]thiazol-2-yl]acetamide (51.20 mg, 147.62 μmol, HCl salt) in dichloromethane (2 mL) was added 1-[Bis(dimethylamino)methylene]-1H-1,2,3-triazolo[4,5-b]pyridinium 3-oxid hexafluorophosphate (67.36 mg, 177.16 μmol) and di-isopropyl-ethyl amine (114.48 mg, 885.77 μmol, 154.29 μL). The mixture was stirred at 30° C. for 2 hours. The reaction mixture was filtered to give a residue. The residue was purified by Prep-HPLC (column: Phenomenex luna C18 150*25 10u; mobile phase: [water (0.225% FA)-ACN]; B %: 13%-43%, 7.8 min) and lyophilized to give Compound 9 (17.35 mg, 35.01 μmol, 27.50% yield) as a white solid.

LCMS (ESI) m/z=[M+H]⁺=496.2.

¹H NMR (400 MHz, DMSO) δ=12.90-11.88 (m, 1H), 8.72-8.66 (m, 2H), 8.52-8.49 (im, 1H), 8.31 (s, 1H), 8.02 (d, J=7.6 Hz, 1H), 7.87 (d, J=2.4 Hz, 1H), 7.83 (s, 1H), 7.77-7.76 (m, 3H), 7.62-7.58 (m, 1H), 7.11 (dd, J=0.8, 1.2 Hz, 1H), 4.12 (d, J=6.0 Hz, 2H), 3.51 (s, 3H), 2.19 (d, J=1.2 Hz, 3H) ppm.

Example 13. Preparation of 1-(isopropylsulfonyl)-4,5-dimethyl-N-(2-oxo-2-((4-(3-(pyridin-4-yl)phenyl)thiazol-2-yl)amino)ethyl)-1H-pyrrole-3-carboxamide (Compound 10)

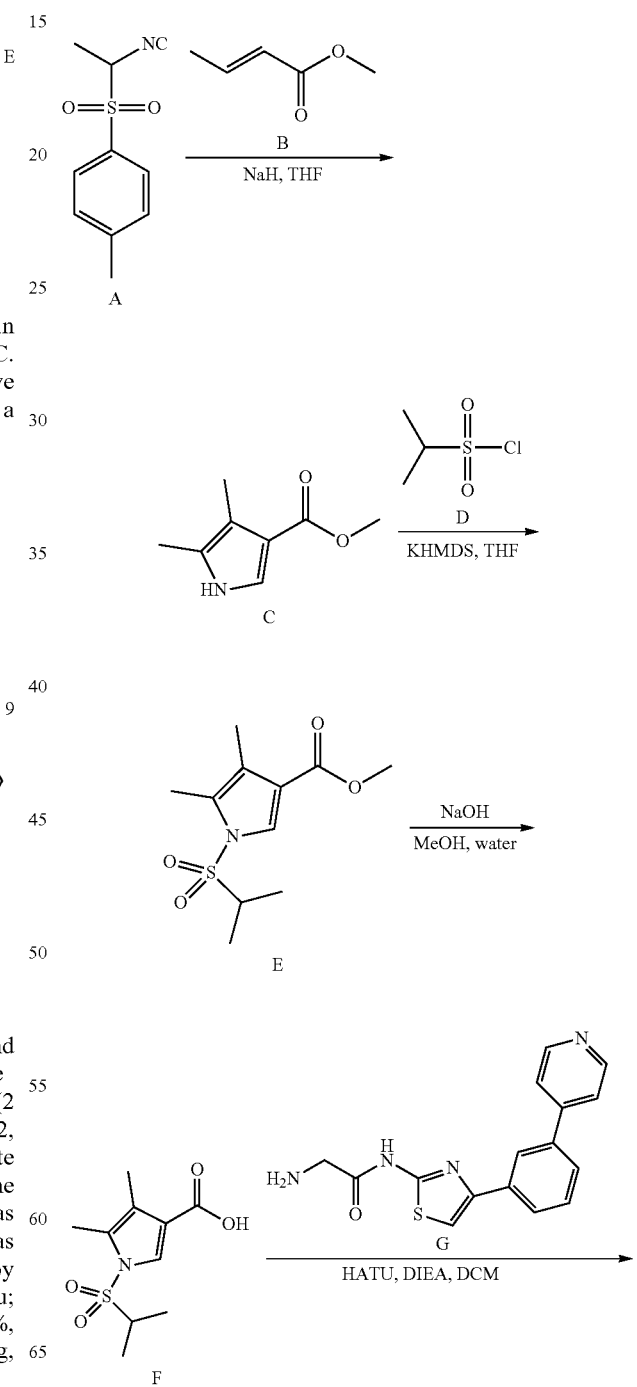

-continued

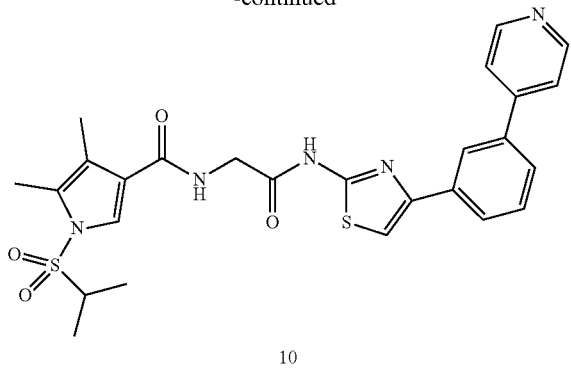

10

Step 1: Preparation of methyl 4,5-dimethyl-1H-pyrrole-3-carboxylate

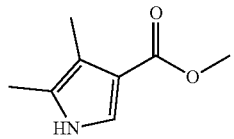

C

To a mixture of 1-(1-isocyanoethylsulfonyl)-4-methylbenzene (3000 mg, 14.34 mmol) and methyl (E)-but-2-enoate (1.44 g, 14.34 mmol, 1.52 mL) in tetrahydrofuran (60 mL) was added sodium hydride (688.06 mg, 17.20 mmol, 60% purity) at 30° C., then the mixture was stirred at 70° C. for 1 hour. The reaction mixture was quenched by addition saturated NH$_4$Cl (100 mL), and then extracted with ethyl acetate (100 mL* 3). The combined organic layers were washed with brine (200 mL), dried over Na$_2$SO$_4$, filtered and concentrated under reduced pressure to give a residue. The residue was purified by column chromatography (SiO$_2$, Petroleum ether/Ethyl acetate=3/1) and concentrated in vacuo to give Intermediate C (1.8 g, 10.69 mmol, 74.59% yield, 91% purity) as a yellow solid.

LCMS (ESI) m/z: [M+H]$^+$=154.2.

$^1$H NMR (400 MHz, DMSO-d$_6$) δ=10.97 (br s, 1H), 7.18 (d, J=3.2 Hz, 1H), 3.64 (s, 3H), 2.07 (d, J=2.8 Hz, 6H) ppm.

Step 2: Preparation of Intermediate E methyl 1-(isopropylsulfonyl)-4,5-dimethyl-1H-pyrrole-3-carboxylate

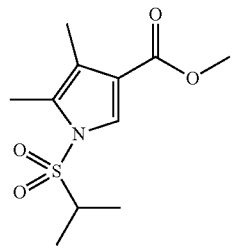

E

To a solution of Intermediate C (200 mg, 1.31 mmol) in tetrahydrofuran (8 mL) was added potassium bis(trimethylsilyl)amide (1 M, 2.61 mL) slowly at 0° C. under N$_2$, then stirred at 0° C. for 30 minutes. propane-2-sulfonyl chloride (223.43 mg, 1.57 mmol, 174.56 μL, 1.2 eq) was added into the mixture slowly at 0° C. under N$_2$. The reaction mixture was warmed to 30° C. and stirred at 30° C. for 2 hours. The reaction mixture was poured into saturated NH$_4$Cl (20 mL) and then extracted with ethyl acetate (20 mL*3). The combined organic layers were washed with brine (30 mL), dried over Na$_2$SO$_4$, filtered and concentrated under reduced pressure to give a residue. The residue was purified by column chromatography (SiO$_2$, Petroleum ether/Ethyl acetate=3:1) and concentrated under reduced pressure to give Intermediate E (180 mg, 694.12 μmol, 53.16% yield) as light yellow oil.

LCMS (ESI) m/z: [M+H]$^+$=260.2.

$^1$H NMR (400 MHz, methanol-d$_4$) δ=7.63 (s, 1H), 3.79 (s, 3H), 2.34 (s, 3H), 2.18 (s, 3H), 1.28 (d, J=6.4 Hz, 6H) ppm.

Step 3: Preparation of 1-(isopropylsulfonyl)-4,5-dimethyl-1H-pyrrole-3-carboxylic acid

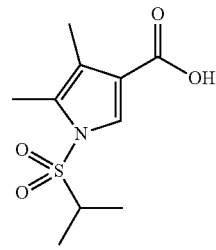

F

To a solution of Intermediate E (180 mg, 694.12 μmol) in methanol (2 mL) and water (0.5 mL) was added sodium hydroxide (41.64 mg, 1.04 mmol), the mixture was stirred at 30° C. for 3 hours. The reaction mixture was concentrated under reduced pressure to give a residue. The residue was diluted with water (5.0 mL), acidized with 1 N hydrochloric acid (2.0 mL) to pH=4 and extracted with ethyl acetate (10 mL*3). The combined organic layers were washed with brine (20 mL), dried over Na$_2$SO$_4$, filtered and concentrated under reduced pressure to give Intermediate F (140 mg, crude) as a white solid, which was used for the next step without further purification.

LCMS (ESI) m/z: [M+H]$^+$=246.2.

Step 4: Preparation of 1-(isopropylsulfonyl)-4,5-dimethyl-N-(2-oxo-2-((4-(3-(pyridin-4-yl)phenyl)thiazol-2-yl)amino)ethyl)-1H-pyrrole-3-carboxamide (Compound 10)

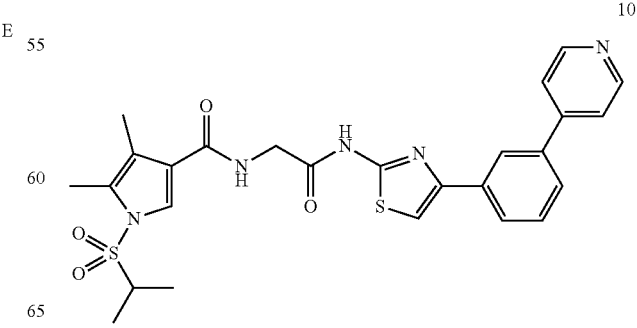

10

To a solution of Intermediate F (80 mg, 326.14 µmol), 1-[Bis(dimethylamino)methylene]-1H-1,2,3-triazolo[4,5-b]pyridinium 3-oxid hexafluorophosphate (248.01 mg, 652.28 µmol) and di-isoproyl-ethyl amine (210.76 mg, 1.63 mmol, 284.04 µL) in dichloromethane (1 mL) was added 2-amino-N-[4-[3-(4-pyridyl)phenyl]thiazol-2-yl]acetamide (113.12 mg, 326.14 µmol, HCl), the mixture was stirred at 30° C. for 1 hour. The reaction mixture was concentrated under reduced pressure to give a residue. The residue was purified by reverse phase and lyophilized to give Compound 10 (28.83 mg, 49.15 µmol, 15.07% yield, 99.51% purity, FA) as an off-white solid.

LCMS (ESI) m/z: [M+H]$^+$=538.3.

$^1$H NMR (400 MHz, DMSO-d$_6$) δ=12.39 (s, 1H), 8.68-8.67 (m, 2H), 8.53-8.50 (m, 1H), 8.30-8.30 (m, 1H), 8.01 (d, J=7.6 Hz, 1H), 7.83 (s, 1H), 7.77-7.75 (m, 4H), 7.61-7.57 (m, 1H), 4.09 (d, J=6.0 Hz, 2H), 3.78-3.71 (m, 1H), 2.29 (s, 3H), 2.11 (s, 3H), 1.23 (d, J=6.8 Hz, 6H) ppm.

Example 14. Preparation of 4,5-dimethyl-1-(methylsulfonyl)-N-(2-oxo-2-((4-(3-(pyridin-4-yl)phenyl)thiazol-2-yl)amino)ethyl)-1H-pyrrole-3-carboxamide (Compound 11)

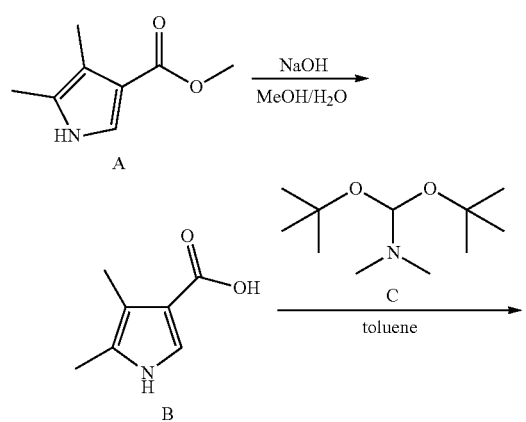

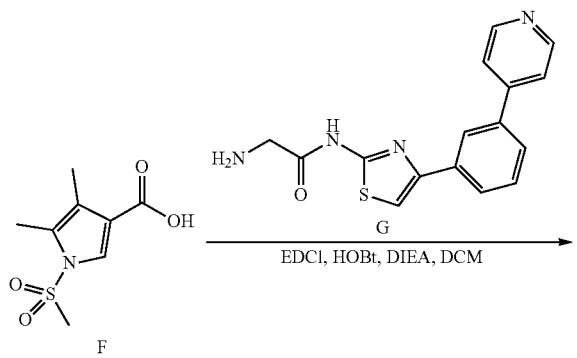

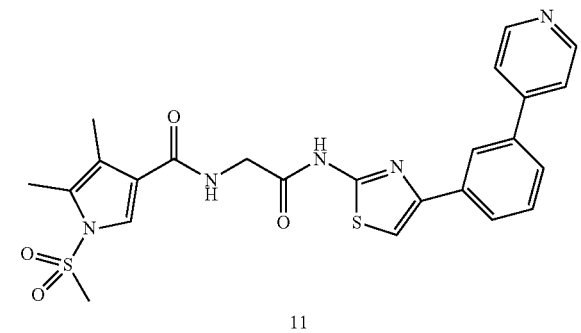

Step 1: Preparation of 4,5-dimethyl-1H-pyrrole-3-carboxylic acid

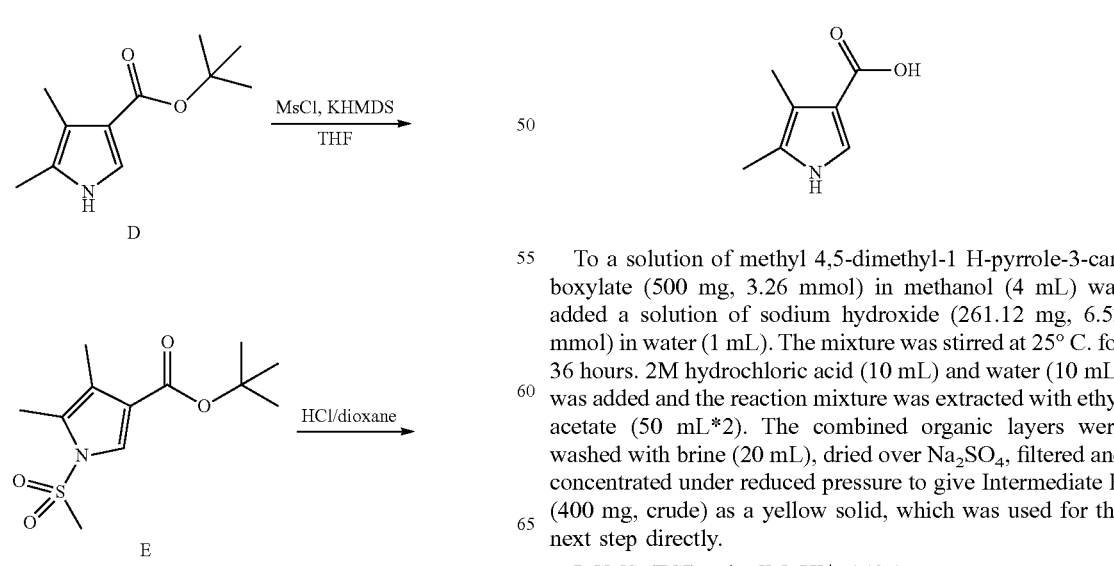

To a solution of methyl 4,5-dimethyl-1H-pyrrole-3-carboxylate (500 mg, 3.26 mmol) in methanol (4 mL) was added a solution of sodium hydroxide (261.12 mg, 6.53 mmol) in water (1 mL). The mixture was stirred at 25° C. for 36 hours. 2M hydrochloric acid (10 mL) and water (10 mL) was added and the reaction mixture was extracted with ethyl acetate (50 mL*2). The combined organic layers were washed with brine (20 mL), dried over Na$_2$SO$_4$, filtered and concentrated under reduced pressure to give Intermediate B (400 mg, crude) as a yellow solid, which was used for the next step directly.

LCMS (ESI) m/z: [M+H]$^+$=140.1.

Step 2: Preparation of tert-butyl 4,5-dimethyl-1 H-pyrrole-3-carboxylate

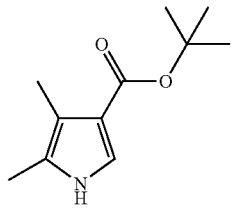

D

To a solution of Intermediate B (400 mg, 2.87 mmol) in toluene (10 mL) was added 1,1-ditertbutoxy-N,N-dimethyl-methanamine (2.92 g, 14.37 mmol, 3.45 mL). The mixture was stirred at 80° C. for 2 hours. Water (20 mL) was added and the reaction mixture was extracted with ethyl acetate (50 mL*2). The combined organic layers were washed with brine (20 mL), dried over $Na_2SO_4$, filtered and concentrated under reduced pressure to give a residue. The residue was purified by flash silica gel chromatography (ISCO; 12 g SepaFlash Silica Flash Column, Eluent of 0-80% Ethylacetate/Petroleum ethergradient 35 mL/min) and concentrated in vacuum to give Intermediate D (200 mg, 983.32 µmol, 34.21% yield) as red oil.

LCMS (ESI) m/z: $[M+H]^+$=196.2.

Step 3: Preparation of tert-butyl 4,5-dimethyl-1-(methylsulfonyl)-1H-pyrrole-3-carboxylate

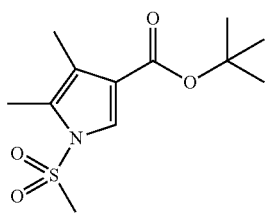

E

To a solution of Intermediate D (120 mg, 614.57 µmol) in terahydrofuran (3 mL) was added potassium bis(trimethylsilyl)amide (1 M, 1.84 mL) at 0° C. under $N_2$. After a half hour, methansulfonyl chloride (140.80 mg, 1.23 mmol, 95.14 µL) was added. The mixture was stirred at 25° C. for 2 hours. Water (20 mL) was added and the reaction mixture was extracted with ethyl acetate (50 mL*2). The combined organic layers were washed with brine (20 mL), dried over $Na_2SO_4$, filtered and concentrated under reduced pressure to give a residue. The residue was purified by flash silica gel chromatography (ISCO; X g SepaFlash Silica Flash Column, Eluent of 0-50% Ethylacetate/Petroleum ethergradient 60 mL/min) and concentrated in vacuum to give Intermediate E (80 mg, 263.40 µmol, 42.86% yield) as a red solid.

LCMS (ESI) m/z: $[M+H-56]^+$=218.1.

Step 4: Preparation of 4,5-dimethyl-1-(methylsulfonyl)-1H-pyrrole-3-carboxylic acid

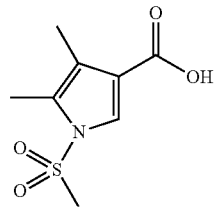

F

To a solution of Intermediate E (80 mg, 292.67 µmol) in dioxane (2 mL) was added hydrochloric acid/dioxane (2 mL). The mixture was stirred at 25° C. for 12 hours. The reaction mixture was concentrated under reduced pressure to give Intermediate F (50 mg, crude, HCl salt) as a purple solid.

LCMS (ESI) m/z=$[M+H]^+$=218.2.

Step 5: Preparation of 4,5-dimethyl-1-(methylsulfonyl)-N-(2-oxo-2-((4-(3-(pyridin-4-yl)phenyl)thiazol-2-y I)amino)ethyl)-1H-pyrrole-3-carboxamide (Compound 11)

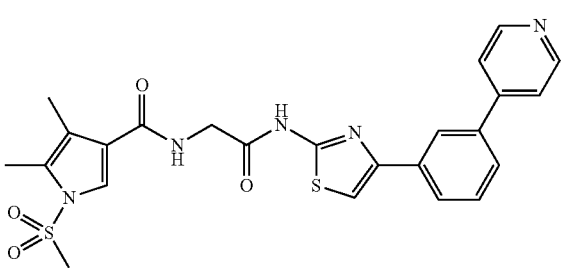

11

To a solution of Intermediate F (37.58 mg, 172.99 µmol) in dichlormethane (2 mL) was added 1-Ethyl-3-(3-dimethylaminopropyl)carbodiimide (49.74 mg, 259.49 µmol), di-isopropyl-ethyl amine (89.43 mg, 691.97 µmol, 120.53 µL) and hydroxybenzotriazole (23.38 mg, 172.99 µmol), then 2-amino-N-[4-[3-(4-pyridyl)phenyl]thiazol-2-yl]acetamide (60 mg, 172.99 µmol, HCl salt) was added. The mixture was stirred at 25° C. for 2 hours. The reaction mixture was concentrated under reduced pressure to remove dichloromethane. The residue was purified by Prep-HPLC (TFA condition; column: Luna C18 150*25 5u; mobile phase: [water(0.075% TFA)-ACN]; B %: 15%-45%, 9 min) and lyophilized to give Compound 11 (24 mg, 38.48 µmol, 22.25% yield, TFA salt) as a white solid.

LCMS (ESI) m/z=$[M+H]^+$=510.1.

$^1$H NMR (400 MHz, DMSO) δ=12.40 (s, 1H) 8.79 (d, J=6.4 Hz, 2H), 8.49-8.46 (m, 1H), 8.36 (s, 1H), 8.06 (d, J=8.0 Hz, 1H), 8.00 (s, 2H), 7.85-7.82 (m, 2H), 7.79 (s, 1H), 7.65-7.61 (m, 1H), 4.09 (d, J=6.0 Hz, 2H), 3.47 (s, 3H), 2.32-2.31 (m, 3H), 2.11 (s, 3H) ppm.

Example 15. Preparation of N-(2-((4-(3-(2,6-dimethylpyridin-4-yl)phenyl)thiazol-2-yl)amino)-2-oxoethyl)-1-(isopropylsulfonyl)-4,5-dimethyl-1H-pyrrole-3-carboxamide (Compound 12)

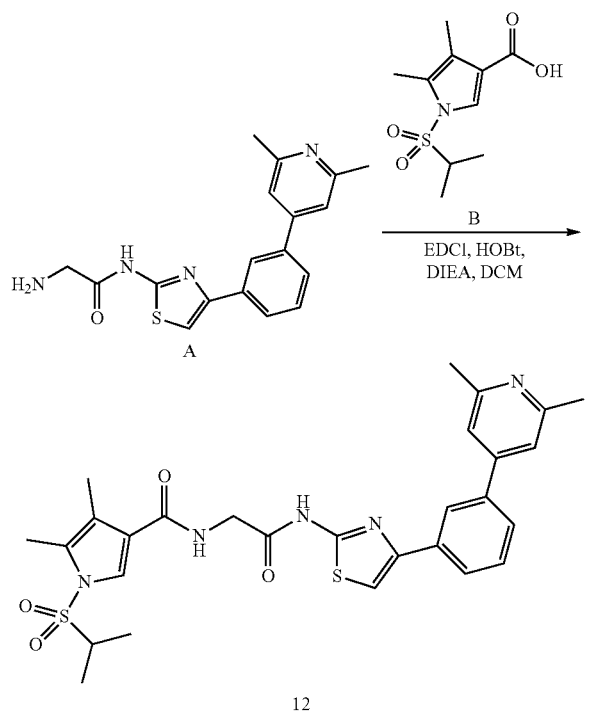

Step 1: Preparation of N-(2-((4-(3-(2,6-dimethylpyridin-4-yl)phenyl)thiazol-2-yl)amino)-2-oxoethyl)-1-(isopropylsulfonyl)-4,5-dimethyl-1H-pyrrole-3-carboxamide

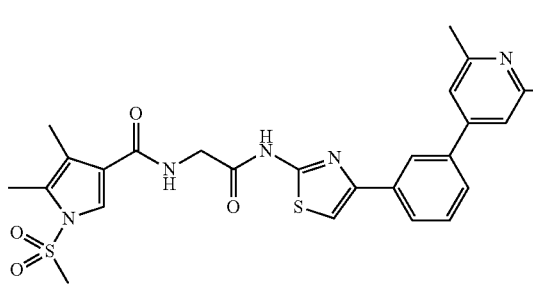

To a solution of 1-isopropylsulfonyl-4,5-dimethyl-pyrrole-3-carboxylic acid (170.12 mg, 693.54 µmol) in dichloromethane (10 mL) was added 2-amino-N-[4-[3-(2,6-dimethyl-4-pyridyl)phenyl]thiazol-2-yl]acetamide (0.26 g, 693.54 µmol, HCl), di-isopropyl-ethyl amine (448.17 mg, 3.47 mmol, 604.00 µL), hydroxybenzotriazole (93.71 mg, 693.54 µmol) and 1-Ethyl-3-(3-dimethylaminopropyl)carbodiimide (199.43 mg, 1.04 mmol). The mixture was stirred at 20° C. for 16 hours. The reaction mixture was poured into water (10 mL), and then extracted with dichloromethane (10 mL). The organic layer was washed with water (10 mL), dried over Na$_2$SO$_4$, filtered and concentrated under reduced pressure to give the crude product. The crude product was triturated with tert-butyl-methyl ether (10 mL) at 20° C. for 30 minutes, the mixture was filtered and the filter cake was washed with tert-butyl-methyl ether (3 mL), dried in vacuum to give Compound 12 (185.70 mg, 313.06 µmol, 45.14% yield) as a white solid.

LCMS (ESI) m/z: [M+H]$^+$=483.4.

$^1$H NMR (400 MHz, DMSO-d$_6$) δ=12.41 (s, 1H), 8.52 (m, 1H), 8.27 (s, 1H), 7.99 (d, J=7.6 Hz, 1H), 7.78 (s, 1H), 7.82 (s, 1H), 7.72 (d, J=7.6 Hz, 1H), 7.60-7.54 (m, 1H), 7.42 (s, 2H), 4.11 (m, 2H), 3.76 (m, 1H), 2.53 (s, 6H), 2.30 (s, 3H), 2.13 (s, 3H), 1.24 (m, 6H) ppm.

Example 16. Preparation of 1-(isopropylsulfonyl)-4,5-dimethyl-N-(2-((4-(3-(2-methylpyridin-4-yl)phenyl)thiazol-2-yl)amino)-2-oxoethyl)-1H-pyrrole-3-carboxamide (Compound 13)

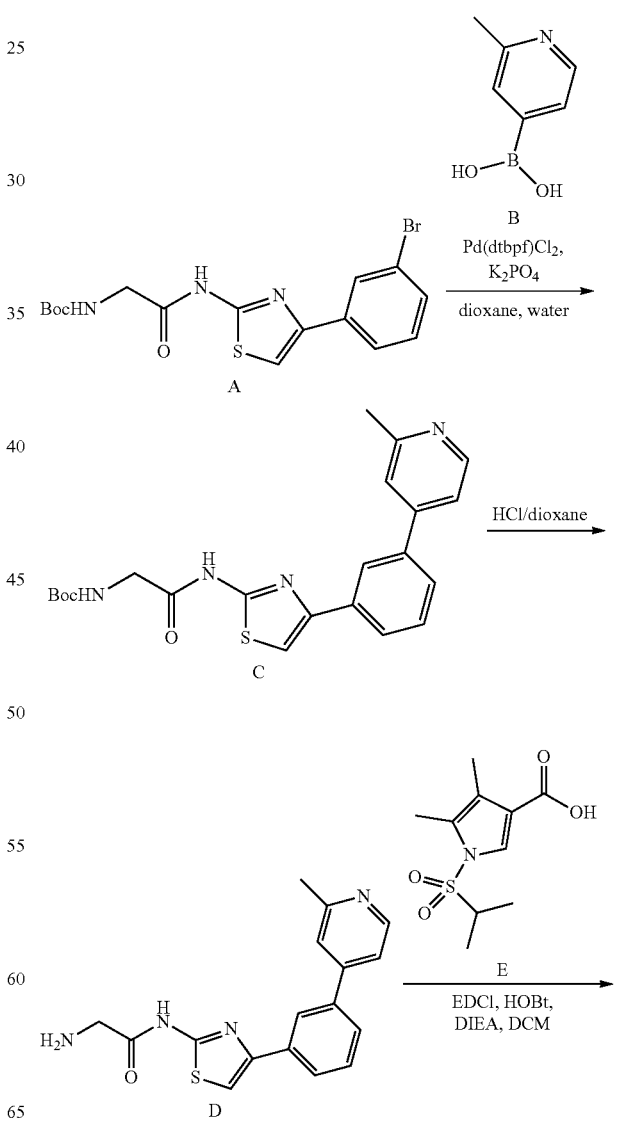

-continued

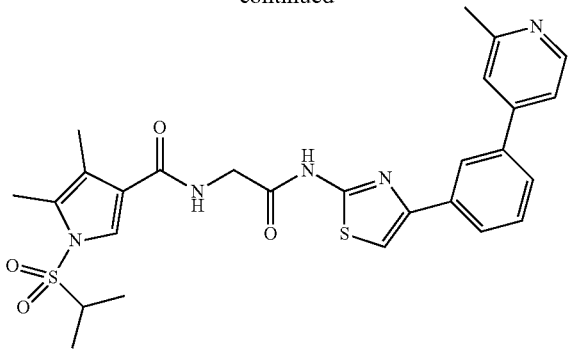

13

Step 1: Preparation of tert-butyl (2-((4-(3-(2-methylpyridin-4-yl)phenyl)thiazol-2-yl)amino)-2-oxoethyl) carbamate

C

To a solution of tert-butyl N-[2-[[4-(3-bromophenyl)thiazol-2-yl]amino]-2-oxo-ethyl]carbamate (500 mg, 1.21 mmol), (2-methyl-4-pyridyl)boronic acid (498.22 mg, 3.64 mmol), ditert-butyl(cyclopentyl)phosphane;dichloropalladium; iron (79.04 mg, 121.27 μmol) in dioxane (5 mL) and water (1.2 mL) was added $K_3PO_4$ (772.25 mg, 3.64 mmol) under $N_2$, the mixture was stirred at 80 0C for 2 hours. The reaction mixture was diluted with water (50 mL) and extracted with ethyl acetate (100 mL*3). The combined organic layers were washed with brine (100 mL), dried over $Na_2SO_4$, filtered and concentrated under reduced pressure to give Intermediate C (500 mg, crude) as a yellow solid, which was used to the next step without further purification.

LCMS (ESI) m/z: $[M+H]^+$=425.3.

Step 2: Preparation of 2-amino-N-(4-(3-(2-methylpyridin-4-yl)phenyl)thiazol-2-yl)acetamide

D

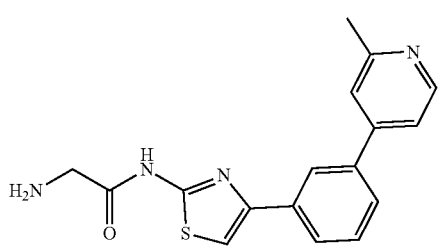

A solution of Intermediate C (500 mg, 1.18 mmol) in 4 M hydrochloric acid/dioxane (10 mL) was stirred at 30° C. for 2 hours. The reaction mixture was concentrated under reduced pressure to give a residue. The residue was triturated with ethyl acetate (10 mL) and methyl-tert-butyl ether (5.0 mL), then filtered and dried in vacuum to give Intermediate D (400 mg, 1.11 mmol, 94.11% yield, HCl) as a yellow solid.

LCMS (ESI) m/z: $[M+H]^+$=325.1.

$^1$H NMR (400 MHz, DMSO-$d_6$) δ=12.83 (m, 1H), 8.86 (d, J=6.4 Hz, 1H), 8.50-8.41 (m, 5H), 8.29-8.27 (m, 1H), 8.14 (d, J=8.0 Hz, 1H), 8.01-7.96 (m, 2H), 7.72-7.68 (m, 1H), 3.93-3.90 (m, 2H), 2.83 (s, 3H) ppm.

Step 3: Preparation of 1-(isopropylsulfonyl)-4,5-dimethyl-N-(2-((4-(3-(2-methylpyridin-4-yl)phenyl)thiazol-2-yl)amino)-2-oxoethyl)-1H-pyrrole-3-carboxamide (Compound 13)

13

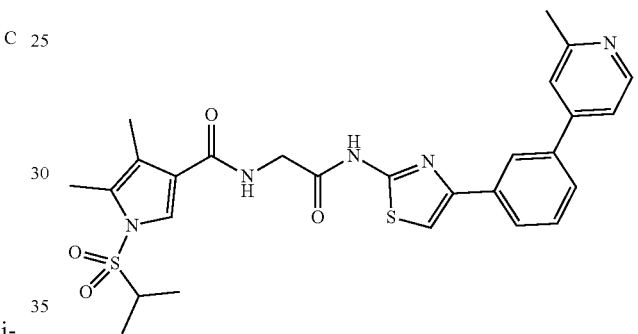

To a solution of 1-isopropylsulfonyl-4,5-dimethyl-pyrrole-3-carboxylic acid (135.95 mg, 554.23 μmol), 1-Ethyl-3-(3-dimethylaminopropyl)carbodiimide (159.37 mg, 831.35 μmol), hydroxybenzotriazole (112.33 mg, 831.35 μmol) and di-isopropyl-ethyl amine (358.15 mg, 2.77 mmol, 482.68 μL) in dichloromethane (4 mL) was added Intermediate D (200 mg, 554.23 μmol, HCl), the mixture was stirred at 30° C. for 2 hours. The reaction mixture was diluted with water (50 mL) and extracted with ethyl acetate (50 mL*3). The combined organic layers were washed with brine (100 mL), dried over $Na_2SO_4$, filtered and concentrated under reduced pressure to give a residue. The residue was triturated with MeOH (10.0 mL) and methyl-tert-butyl ether (5 mL), then filtered and dried in vacuum to give Compound 13 (132.05 mg, 236.18 μmol, 42.61% yield) as a white solid.

LCMS (ESI) m/z: $[M+H]^+$=552.2.

$^1$H NMR (400 MHz, DMSO-$d_6$) δ=12.40 (s, 1H), 8.54-8.49 (m, 2H), 8.28 (s, 1H), 7.99 (d, J=7.6 Hz, 1H), 7.82-7.72 (m, 3H), 7.63-7.53 (m, 3H), 4.09 (d, J=5.6 Hz, 2H), 3.77-3.71 (m, 1H), 2.55 (s, 3H), 2.29 (s, 3H), 2.11 (s, 3H), 1.23 (d, J=7.2 Hz, 6H) ppm.

Example 17. Preparation of Compounds of the Invention

The following compounds in Table 2 below were prepared using standard chemical manipulations and procedures similar to those used for the preparation of Example 4, Compound 1.

TABLE 2

| # | Name | LC-MS data(m/z) | 1H NMR |
|---|---|---|---|
| 22 | N-(2-((4-(6-(2-methylpyrimidin-4-yl)pyridin-2-yl)thiazol-2-yl)amino)-2-oxoethyl)-1-(methylsulfonyl)-1H-indole-3-carboxamide | 548.2 | $^1$H NMR (400 MHz, DMSO-d6): δ = 13.60-11.54 (m, 1H), 9.11-8.80 (m, 2H), 8.54-8.34 (m, 3H), 8.26 (d, J = 6.0 Hz, 1H), 8.12 (d, J = 12.8 Hz, 3H), 7.89 (d, J = 7.2 Hz, 1H), 7.45-7.39 (m, 2H), 4.25 (s, 2H), 3.60 (s, 3H), 2.74 (s, 3H) ppm |
| 23 | N-(2-((4-(6-(6-methylpyrimidin-4-yl)pyridin-2-yl)thiazol-2-yl)amino)-2-oxoethyl)-1-(methylsulfonyl)-1H-indole-3-carboxamide | 548.1 | $^1$H NMR (400 MHz, DMSO-d6): δ = 12.64-12.51 (m, 1H), 9.17 (d, J = 1.2 Hz, 1H), 8.96-8.93 (m, 1H), 8.49-8.46 (m, 2H), 8.40-8.37 (m, 1H), 8.26-8.21 (m, 2H), 8.13-8.07 (m, 2H), 7.89 (d, J = 8.4 Hz, 1H), 7.46-7.37 (m, 2H), 4.23 (d, J = 4.4 Hz, 2H), 3.59 (s, 3H), 2.61 (s, 3H) ppm |
| 26 | N-(2-((4-(3-((cis)-2,6-dimethylmorpholino)phenyl)thiazol-2-yl)amino)-2-oxoethyl)-1-(methylsulfonyl)-1H-indole-3-carboxamide | 568.1 | $^1$H NMR (400 MHz, DMSO-d6): δ = 12.41 (s, 1H), 8.90-8.89 (m, 1H), 8.45 (s, 1H), 8.26 (d, J = 7.2 Hz, 1H), 7.89 (d, J = 8.4 Hz, 1H), 7.62 (s, 1H), 7.46-7.39 (m, 4H), 7.33-7.27 (m, 1H), 6.95-6.93 (m, 1H), 4.22 (d, J = 5.6 Hz, 2H), 3.73-3.71 (m, 2H), 3.63 (d, J = 10.8 Hz, 2H), 3.58 (s, 3H), 2.33-2.27 (m, 2H), 1.19 (s, 3H), 1.17 (s, 3H) ppm |
| 33 | N-(2-((4-(3-(2,6-dimethylpyridin-4-yl)phenyl)thiazol-2-yl)amino)-2-oxoethyl)-1-(methylsulfonyl)-1H-indole-3-carboxamide | 560.1 | $^1$H NMR (400 MHz, DMSO-d6): δ = 12.49 (s, 1H), 8.93-8.90 (m, 1H), 8.47-8.41 (m, 2H), 8.25 (d, J = 7.6 Hz, 1H), 8.16-8.05 (m, 3H), 7.93-7.85 (m, 3H), 7.71-7.67 (m, 1H), 7.49-7.36 (m, 2H), 4.22 (d, J = 5.6 Hz, 2H), 3.59 (s, 3H), 2.72 (s, 6H) ppm |
| 39 | N-(2-((4-(3-(4-hydroxypiperidin-1-yl)phenyl)thiazol-2-yl)amino)-2-oxoethyl)-1-(methylsulfonyl)-1H-indole-3-carboxamide | 554.2 | $^1$H NMR (400 MHz,CD3OD): δ = 8.28 (s, 1H), 8.23 (d, J = 8.0 Hz, 1H), 8.13 (s, 1H), 8.03 (d, J = 8.0 Hz, 1H), 7.95 (d, J = 8.4 Hz, 1H), 7.62-7.58 (m, 2H), 7.53-7.51 (m, 1H), 7.47-7.43 (m, 1H), 7.41-7.37 (m, 1H), 4.34 (s, 2H), 4.10-4.07 (m, 1H), 3.90-3.84 (m, 2H), 3.62-3.56 (m, 2H), 3.37 (s, 3H), 2.26-2.20 (m, 2H), 2.04-1.97 (m, 2H) ppm |

Example 18. Preparation of Compounds of the Invention

The following compounds in Table 3 below were prepared using standard chemical manipulations and procedures similar to those used for the preparation of Example 7, Compound 4.

Example 19. Preparation of Compounds of the Invention

The following compounds in Table 4 below were prepared using standard chemical manipulations and procedures similar to those used for the preparation of Example 8, Compound 5.

TABLE 3

| # | Name | LC-MS data(m/z) | 1H NMR |
|---|---|---|---|
| 21 | N-(2-((4-(3-((cis)-2,6-dimethylmorpholino)-5-fluorophenyl)thiazol-2-yl)amino)-2-oxoethyl)-1-(isopropylsulfonyl)-1H-indole-3-carboxamide | 614.0 | $^1$H NMR (400 MHz, DMSO-d6): δ = 12.43 (s, 1H), 8.95-8.86 (m, 1H), 8.44 (s, 1H), 8.25 (d, J = 7.6 Hz, 1H), 7.88 (d, J = 8.4 Hz, 1H), 7.74 (s, 1H), 7.48-7.33 (m, 2H), 7.29 (s, 1H), 7.14-7.03 (m, 1H), 6.82-6.68 (m, 1H), 4.21 (d, J = 5.6 Hz, 2H), 3.97-3.85 (m, 1H), 3.77-3.61 (m, 4H), 2.37-2.27 (m, 2H), 1.26 (d, J = 6.8 Hz, 6H), 1.17 (d, J = 6.0 Hz, 6H) ppm |
| 31 | N-(2-((4-(3-((cis)-2,6-dimethylmorpholino)phenyl)thiazol-2-yl)amino)-2-oxoethyl)-1-(isopropylsulfonyl)-1H-indole-3-carboxamide | 596.2 | $^1$H NMR (400 MHz, DMSO-d6): δ = 12.43 (s, 1H), 8.94-8.91 (m, 1H), 8.44 (s, 1H), 8.25 (d, J = 7.2 Hz, 1H), 7.88 (d, J = 8.4 Hz, 1H), 7.63 (s, 1H), 7.45-7.35 (m, 3H), 7.35-7.32 (m, 1H), 7.28-7.24 (m, 1H), 6.94-6.92 (m, 1H), 4.20 (d, J = 5.6 Hz, 2H), 3.95-3.87 (m, 1H), 3.74-3.69 (m, 2H), 3.64-3.61 (m, 2H), 2.31-2.25 (m, 2H), 1.26 (d, J = 6.8 Hz, 6H), 1.17 (d, J = 6.0 Hz, 6H) ppm |
| 34 | N-(2-((4-(3-(2,6-dimethylpyridin-4-yl)phenyl)thiazol-2-yl)amino)-2-oxoethyl)-1-(isopropylsulfonyl)-1H-indole-3-carboxamide | 588.2 | $^1$H NMR (400 MHz, DMSO-d6): δ = 12.47 (s, 1H), 8.93-8.90 (m, 1H), 8.44 (s, 1H), 8.26-8.24 (m, 2H), 7.99 (d, J = 8.0 Hz, 1H), 7.88 (d, J = 8.0 Hz, 1H), 7.82 (s, 1H), 7.71 (d, J = 8.4 Hz, 1H), 7.58-7.54 (m, 1H), 7.45-7.35 (m, 4H), 4.22 (d, J = 6.0 Hz, 2H), 3.94-3.88 (m, 1H), 2.51-2.50 (m, 6H), 1.26 (d, J = 6.8 Hz, 6H) ppm |

TABLE 4

| # | Name | LC-MS data(m/z) | 1H NMR |
|---|------|-----------------|--------|
| 18 | N-(2-((4-(6-(2-methylpyrimidin-4-yl)pyridin-2-yl)thiazol-2-yl)amino)-2-oxoethyl)-1-(methylsulfonyl)-4,5,6,7-tetrahydro-1H-indole-3-carboxamide | 552.3 | $^1$H NMR (400 MHz, DMSO-d6): δ = 12.45 (br s, 1H), 8.90 (d, J = 5.2 Hz, 1H), 8.48-8.45 (m, 1H), 8.40-8.36 (m, 2H), 8.13-8.07 (m, 3H), 7.78 (s, 1H), 4.11 (d, J = 5.6 Hz, 2H), 3.46 (s, 3H), 2.73 (s, 5H), 2.64-2.62 (m, 2H), 1.75-1.65 (m, 4H) ppm |
| 28 | N-(2-((4-(3-((cis)-2,6-dimethylmorpholino)phenyl)thiazol-2-yl)amino)-2-oxoethyl)-1-(methylsulfonyl)-4,5,6,7-tetrahydro-1H-indole-3-carboxamide | 572.1 | $^1$H NMR (400 MHz, DMSO-d6): δ = 12.34 (s, 1H), 8.46-8.45 (m, 1H), 7.78 (s, 1H), 7.62 (s, 1H), 7.45 (s, 1H), 7.36-7.30 (m, 1H), 7.30-7.24 (m, 1H), 6.94 (d, J = 7.6 Hz, 1H), 4.09 (d, J = 5.6 Hz, 2H), 3.75-3.68 (m, 2H), 3.64-3.61 (m, 2H), 3.47 (s, 3H), 2.75 (s, 2H), 2.63 (s, 3H), 2.29-2.25 (m, 1H), 1.75 (m, 2H), 1.66 (s, 2H), 1.18-1.17 (m, 6H) ppm |
| 35 | N-(2-((4-(3-(2,6-dimethylpyridin-4-yl)phenyl)thiazol-2-yl)amino)-2-oxoethyl)-1-(methylsulfonyl)-4,5,6,7-tetrahydro-1H-indole-3-carboxamide | 564.1 | $^1$H NMR (400 MHz, DMSO-d6): δ = 12.40 (s, 1H), 8.53-8.42 (m, 1H), 8.27 (s, 1H), 7.99 (d, J = 8.0 Hz, 1H), 7.82-7.81 (m, 2H), 7.72 (d, J = 8.4 Hz, 1H), 7.60-7.55 (m, 1H), 7.42 (s, 2H), 4.10-4.09 (m, 2H), 3.47 (s, 3H), 2.75 (s, 4H), 2.65-2.63 (m, 6H), 1.76(s, 2H), 1.66 (s, 2H) ppm |

Example 20. Preparation of 2-amino-N-(4-(6-((cis)-2,6-dimethylmorpholino)pyridin-2-yl)thiazol-2-yl)acetamide hydrochloride salt

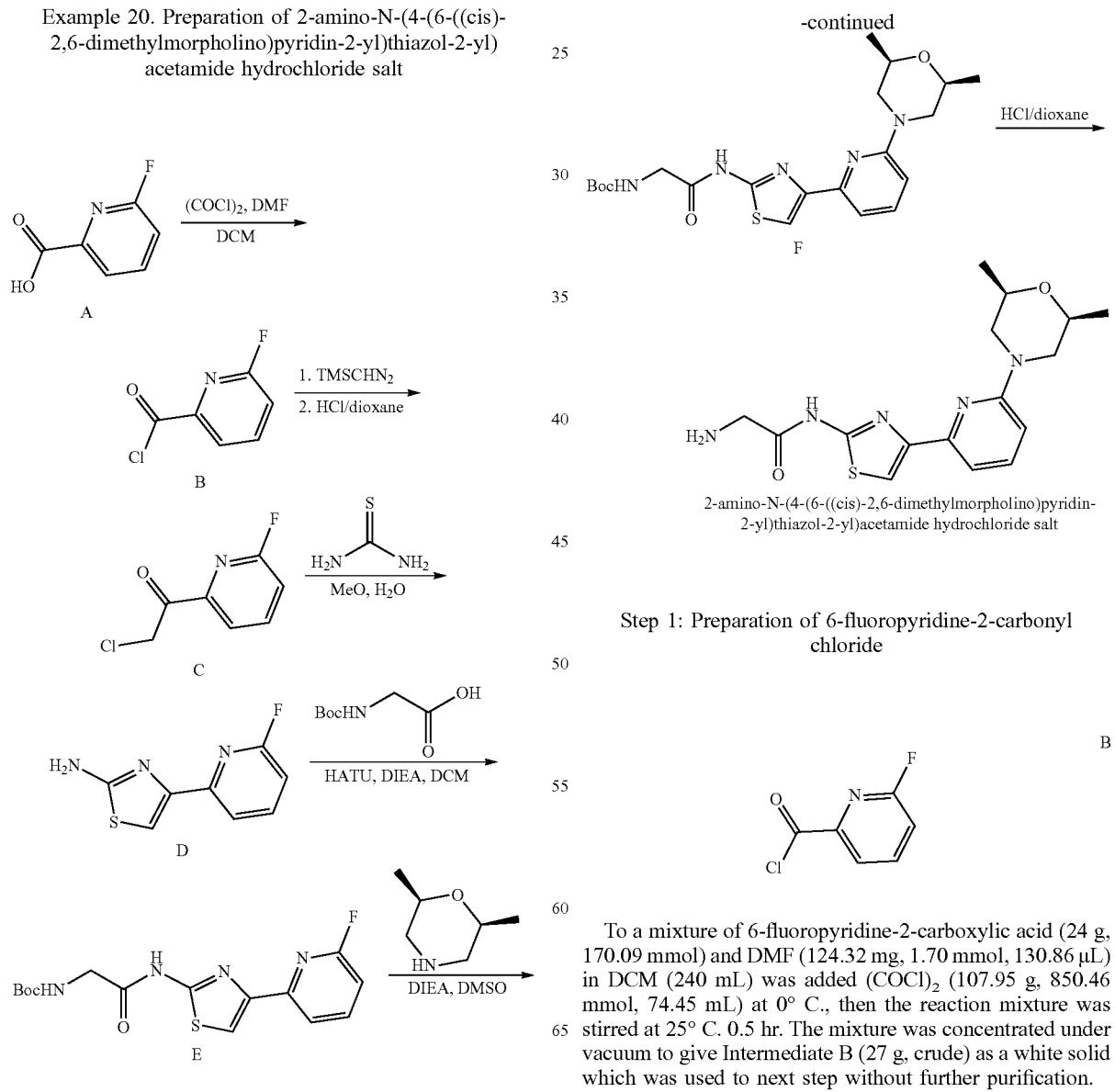

2-amino-N-(4-(6-((cis)-2,6-dimethylmorpholino)pyridin-2-yl)thiazol-2-yl)acetamide hydrochloride salt Step 1: Preparation of 6-fluoropyridine-2-carbonyl chloride To a mixture of 6-fluoropyridine-2-carboxylic acid (24 g, 170.09 mmol) and DMF (124.32 mg, 1.70 mmol, 130.86 μL) in DCM (240 mL) was added (COCl)$_2$ (107.95 g, 850.46 mmol, 74.45 mL) at 0° C., then the reaction mixture was stirred at 25° C. 0.5 hr. The mixture was concentrated under vacuum to give Intermediate B (27 g, crude) as a white solid which was used to next step without further purification.

Step 2: Preparation of 2-chloro-1-(6-fluoro-2-pyridyl)ethanone

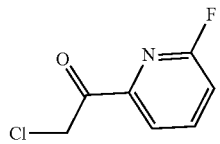
C

To a mixture of Intermediate B (27 g, 169.23 mmol) in dioxane (300 mL) was added TMSCHN2 (2 M, 169.23 mL) drop wise at 0° C., then the reaction mixture was stirred at 25° C. 10 hrs. The reaction mixture was quenched with HCl/dioxane (4 M, 300 mL) and stirred at 25° C. for 2 hrs. Then mixture the concentrated under vacuum to give a residue, the residue was diluted with NaHCO₃ (450 mL), extracted with EA (300 mL*3). The combined organic layers were washed with brine (200 mL*2), dried over Na₂SO₄, filtered and concentrated under reduced pressure to give Intermediate C (29 g, crude) as a white solid, which was used to next step directly. LCMS (ESI) m/z: [M+H]⁺=174.1.

Step 3: Preparation of 4-(6-fluoro-2-pyridyl)thiazol-2-amine

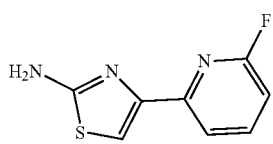
D

A mixture of Intermediate C (29 g, 167.08 mmol), thiourea (12.72 g, 167.08 mmol) in MeOH (250 mL) and H₂O (250 mL) was stirred at 25° C. 10 hrs. The mixture was diluted with NaHCO₃ (100 mL), then concentrated under vacuum to removed MeOH, then filtered to give a crude product. The residue was triturated with PE (100 mL) at 25° C. for 10 min, filtered and the solid was dried in vacuum to give Intermediate D (27 g, 83% yield) as a white solid. LCMS (ESI) m/z: [M+H]⁺=195.8.

Step 4: Preparation of tert-butyl N-[2-[[4-(6-fluoro-2-pyridyl)thiazol-2-yl]amino]-2-oxo-ethyl]carbamate

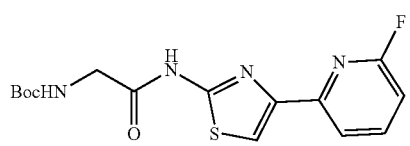
E

To a solution of 2-(tert-butoxycarbonylamino)acetic acid (26.92 g, 153.68 mmol), HATU (58.43 g, 153.68 mmol) and DIEA (66.20 g, 512.25 mmol, 89.23 mL) in DCM (250 mL) was added Intermediate D (25 g, 128.06 mmol). The reaction mixture was stirred at 25° C. for 4 hrs. The reaction mixture was concentrated under vacuum, then diluted with water (200 mL) and extracted with EtOAc (300 mL*4). The combined organic layers were washed with brine (300 mL*2), dried over Na₂SO₄, filtered and concentrated under reduced pressure to give a residue. The crude product was triturated with MeOH (50 mL) at 25° C. for 15 min, then filtered to give filter cake, the filter cake was washed with MTBE (50 mL*2), dried in vacuum to give Intermediate E (25 g, 55% yield) as a white solid. LCMS (ESI) m/z: [M+H]⁺=352.9. 1 H NMR (400 MHz, DMSO-d₆) δ=12.35 (s, 1H), 8.10-8.04 (m, 1H), 7.85-7.82 (m, 2H), 7.17-7.10 (m, 2H), 3.88-3.81 (m, 2H), 1.39 (s, 8H) ppm.

Step 5: Preparation of tert-butyl N-[2-[[4-[6-[(cis)-2,6-dimethylmorpholin-4-yl]-2-pyridyl]thiazol-2-yl]amino]-2-oxo-ethyl]carbamate

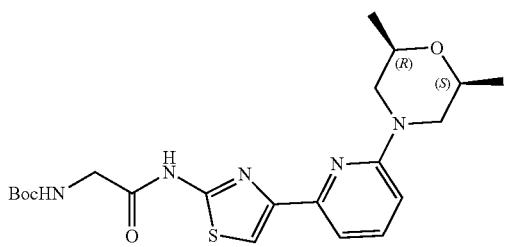
F

To a solution of (cis)-2,6-dimethylmorpholine (16.34 g, 141.89 mmol), DIEA (11.00 g, 85.13 mmol, 14.83 mL) in DMSO (200 mL) was added Intermediate E (10 g, 28.38 mmol). The reaction mixture was stirred at 120° C. for 2 hrs at a seal tube. The reaction mixture was concentrated under vacuum, then diluted with water (600 mL) and extracted with EtOAc (300 mL*3). The combined organic layers were washed with brine (200 mL*2), dried over Na₂SO₄, filtered and concentrated under reduced pressure to give a residue.

The residue was purified by column chromatography (Petroleum ether/Ethyl acetate=50/1 to 1/1), the fraction was concentrated under vacuum to give a crude product. The crude product was triturated with MeOH (30 mL) at 25° C. for 15 min, filtered and dried in vacuum to give Intermediate F (6.4 g, 76% yield) as a white solid. LCMS (ESI) m/z: [M+H]⁺=448.1.

Step 6: Preparation of 2-amino-N-[4-[6-[(cis)-2,6-dimethylmorpholin-4-yl]-2-pyridyl]thiazol-2-yl]acetamide hydrochloride salt

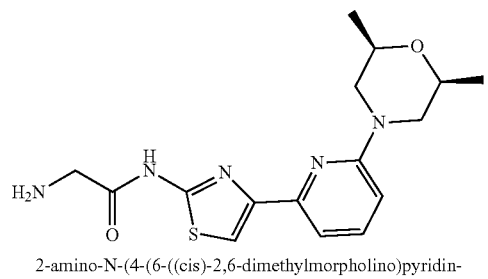

2-amino-N-(4-(6-((cis)-2,6-dimethylmorpholino)pyridin-2-yl)thiazol-2-yl)acetamide hydrochloride salt A solution of Intermediate F (3.6 g, 8.04 mmol) in HCl/dioxane (4 M, 72.00 mL) was stirred at 25° C. for 1 hr.

The mixture was concentrated under vacuum to give residue as a crude product, and crude product was triturated with MTBE (100 mL) at 25° C. for 15 min, filtered and dried in the vacuum to afford the title compound (4.4 g, crude, HCl salt) as a white solid. LCMS (ESI) m/z: [M+H]$^+$=348.0. 1 H NMR (400 MHz, METHANOL-d4) δ=8.17 (s, 1H), 8.11-8.07 (m, 1H), 7.54 (d, J=7.2 Hz, 1H), 7.36 (d, J=9.2 Hz, 1H), 4.08 (d, J=8.8 Hz, 4H), 3.85-3.81 (m, 2H), 2.98-2.92 (m, 2H), 1.30 (d, J=6.4 Hz, 6H) ppm.

Example 21. Preparation of N-(2-((4-(6-((cis)-2,6-dimethylmorpholino)pyridin-2-yl)thiazol-2-yl)amino)-2-oxoethyl)-1-(isopropylsulfonyl)-5-methyl-1H-pyrrole-3-carboxamide (Compound 38)

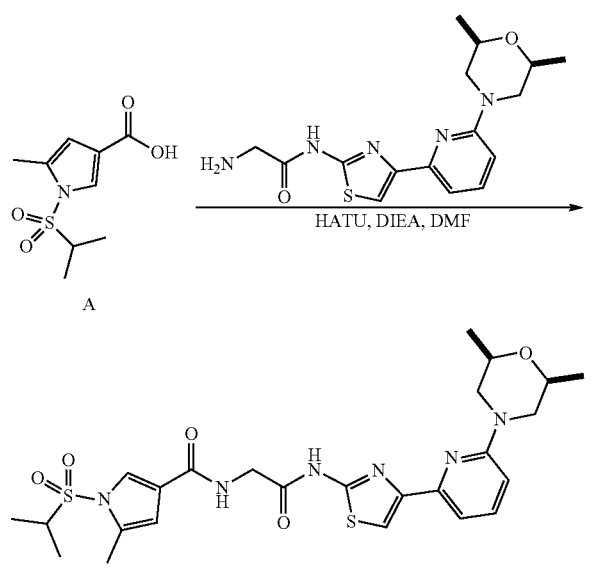

2-amino-N-[4-[6-[(2S,6R)-2,6-dimethylmorpholin-4-yl]-2-pyridyl]thiazol-2-yl]acetamide (Prepared according to Example 20) (80 mg, 208.39 μmol), Intermediate A (57.83 mg, 250.07 μmol) and HATU (95.08 mg, 250.07 μmol) in DMF (1 mL) was added DIPEA (134.66 mg, 1.04 mmol, 181.48 μL) and stirred at 25° C. for 1 hour. Water (10 mL) was added to the reaction mixture and extracted with EA (30 mL*3). The combined organic layers were washed with brine (10 mL*3), dried over Na$_2$SO$_4$, filtered and concentrated under reduced pressure to give a residue. The residue was purified by prep-HPLC (FA condition, Column: Phenomenex Synergi C18 150*25*10 um;mobile phase: [water (0.225% FA)-ACN];B %: 39%-69%,10 min).

Then, remove MeCN by rotary evaporation and lyophilized to give Compound 38 (40.59 mg, 70.95 μmol, 34.04% yield, 98% purity) as a white solid. LCMS (ESI) m/z: [M+H]$^+$=561.2.

$^1$H NMR (400 MHz, DMSO-d$_6$) δ=12.37 (s, 1H), 8.65-8.61 (m, 1H), 7.75 (s, 1H), 7.72 (d, J=2.0 Hz, 1H), 7.65-7.60 (m, 1H), 7.26 (d, J=7.2 Hz, 1H), 6.81 (d, J=8.4 Hz, 1H), 6.51 (s, 1H), 4.26 (d, J=11.2 Hz, 2H), 4.11 (d, J=6.0 Hz, 2H), 3.86-3.80 (m, 1H), 3.68-3.59 (m, 2H), 2.45-2.41 (m, 2H), 2.39 (s, 3H), 1.25 (d, J=6.8 Hz, 6H), 1.19 (d, J=6.4 Hz, 6H) ppm.

Example 22. Preparation of 4,5-dichloro-1-isopropylsulfonyl-N-[2-oxo-2-[[4-[3-(4-pyridyl)phenyl]thiazol-2-yl]amino]ethyl]pyrrole-3-carboxamide (Compound 30)

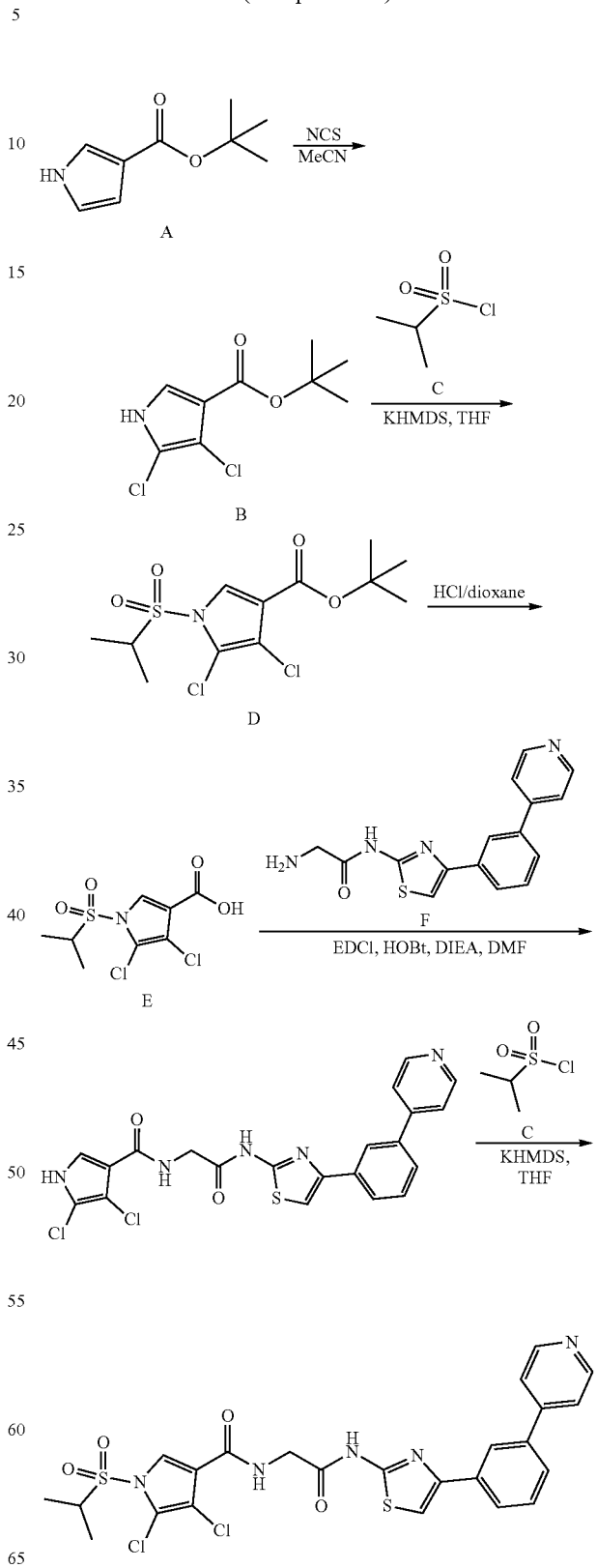

Step 1: Preparation of tert-butyl 4,5-dichloro-1H-pyrrole-3-carboxylate

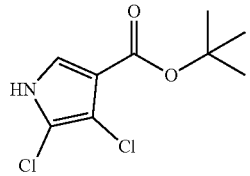

B

To a stirred solution of tert-butyl 1H-pyrrole-3-carboxylate (500 mg, 2.69 mmol) in MeCN (5 mL) was added NCS (718.74 mg, 5.38 mmol). The mixture was stirred at 20° C. for 16 hrs. The reaction was poured into H$_2$O (10 mL) and extracted with EA (5 mL*3). The aqueous phase was extracted with ethyl acetate (5 mL*3). The combined organic phase was concentrated in vacuum to afford a residue. The residue was purified by prep-HPLC (column: Phenomenex Synergi Max-RP 150*50 mm*10 μm;mobile phase: [water(0.225% FA)-ACN];B %: 36%-66%,10 min) and lyophilized to give Intermediate B (140 mg, 18% yield) as a white solid. LCMS (ESI) m/z: [M-56+H]$^+$=179.9. $^1$H NMR (400 MHz, CDCl$_3$) δ=12.56 (br s, 1H), 7.38 (s, 1H), 1.48 (s, 9H) ppm.

Step 2: Preparation of tert-butyl 4,5-dichloro-1-isopropylsulfonyl-pyrrole-3-carboxylate

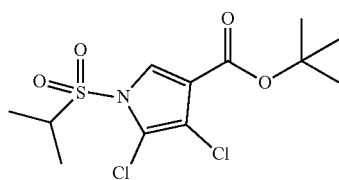

D

To a solution of Intermediate B (130 mg, 550.63 μmol), KHMDS (1 M, 1.65 mL) in THF (2 mL) was added propane-2-sulfonyl chloride (117.78 mg, 825.94 μmol, 92.02 μL). Then the mixture was stirred at 25° C. for 1 hr. The reaction mixture was poured into water (5 mL) and extracted with EA (5 mL*2). The organic layer was washed with brine (5 mL) and dried over Na$_2$SO$_4$, concentrated to get the crude product. The crude product was purified by reverse phase column (FA) to give Intermediate D (100 mg, 49% yield) as a colorless oil. LCMS (ESI) m/z: [M-56+H]$^+$=286.0.

Step 3: Preparation of 4,5-dichloro-1-isopropylsulfonyl-pyrrole-3-carboxylic acid

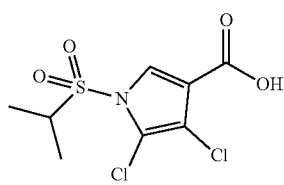

E

A solution of Intermediate D (100 mg, 292.19 μmol) in HCl/dioxane (2 mL, 4M) was stirred at 25° C. for 16 hrs. The reaction mixture was concentrated to give Intermediate E (80 mg, 80% yield) as a yellow solid which was used for next step without further purification. LCMS (ESI) m/z: [M+H]$^+$=286.0.

Step 4: Preparation of 4,5-dichloro-N-[2-oxo-2-[[4-[3-(4-pyridyl)phenyl]thiazol-2-yl]amino]ethyl]-1H-pyrrole-3-carboxamide

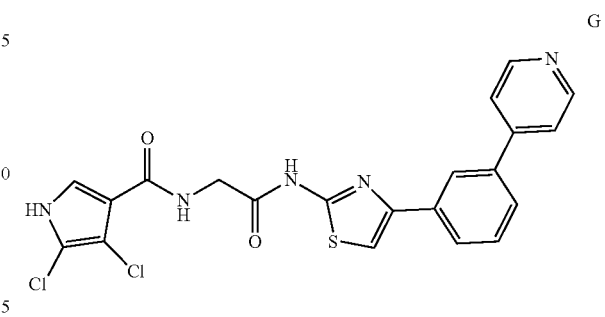

G

To a solution of Intermediate E (80 mg, 279.59 μmol), 2-amino-N-[4-[3-(4-pyridyl)phenyl]thiazol-2-yl]acetamide hydrochloride salt (96.97 mg, 279.59 μmol), EDCl (107.20 mg, 559.18 μmol), HOBt (75.56 mg, 559.18 μmol) in DMF (2 mL) was added DIEA (180.68 mg, 1.40 mmol, 243.50 μL). Then the mixture was stirred at 25° C. for 1 hr. The reaction mixture was poured into water (2 mL) and filtered to give Intermediate G (80 mg, 32% yield) as an off-white solid which was used for next step without further purification. LCMS (ESI) m/z: [M+H]$^+$=472.0. $^1$H NMR (400 MHz, DMSO-d$_6$) δ=12.45 (br s, 1H), 8.69-8.67 (m, 2H), 8.32 (s, 1H), 8.02 (d, J=7.6 Hz, 1H), 7.85 (d, J=1.6 Hz, 1H), 7.80-7.73 (m, 3H), 7.66-7.55 (m, 1H), 7.47 (s, 1H), 4.20-4.10 (m, 2H) ppm.

Step 5: Preparation of 4,5-dichloro-1-isopropylsulfonyl-N-[2-oxo-2-[[4-[3-(4-pyridyl)phenyl]thiazol-2-yl]amino]ethyl]pyrrole-3-carboxamide (Compound 30)

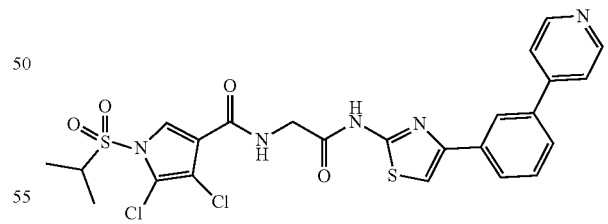

To a solution of Intermediate G (80 mg, 88.24 μmol), KHMDS (1 M, 264.72 μL) in THF (1 mL) was added propane-2-sulfonyl chloride (18.88 mg, 132.36 μmol, 14.75 μL). Then the mixture was stirred at 25° C. for 16 hrs. The reaction mixture was poured into water (5 mL) and extracted with EA (5 mL*2). The organic layer was washed with brine (5 mL) and dried over Na$_2$SO$_4$, concentrated to get the crude product. The crude product was purified by prep-HPLC (column: Phenomenex Synergi C18 150*25*10 um;mobile phase: [water(0.225% FA)-ACN];B %: 24%-54%,10 min)

and lyophilized to afford Compound 30 (28.69 mg, 56% yield) as an off-white solid. LCMS (ESI) m/z: [M+H]⁺= 578.0. ¹H NMR (400 MHz, DMSO-d₆) δ=12.49 (br s, 1H), 8.84-8.75 (m, 1H), 8.72-8.62 (m, 2H), 8.32 (d, J=1.6 Hz, 1H), 8.09-7.98 (m, 2H), 7.85 (s, 1H), 7.81-7.72 (m, 3H), 7.65-7.57 (m, 1H), 4.16 (d, J=5.6 Hz, 2H), 4.05-3.95 (m, 1H), 1.33 (d, J=6.8 Hz, 6H) ppm.

Example 23. Preparation of N-(2-((4-(3-(2,6-dimethylpyridin-4-yl)phenyl)thiazol-2-yl)amino)-2-oxoethyl)-5-(hydroxymethyl)-1-(isopropylsulfonyl)-1H-pyrrole-3-carboxamide (Compound 25)

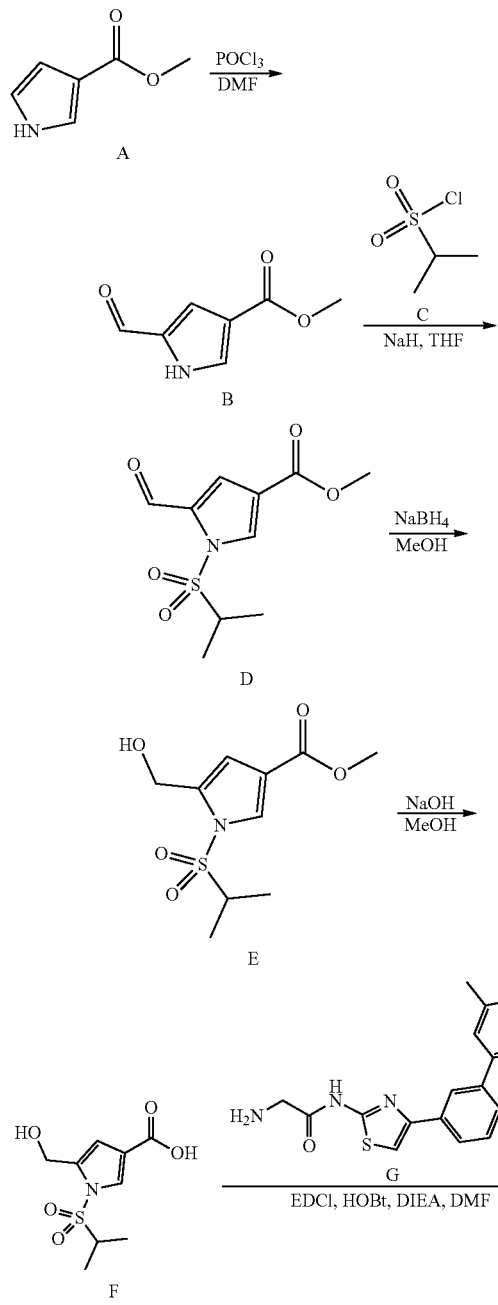

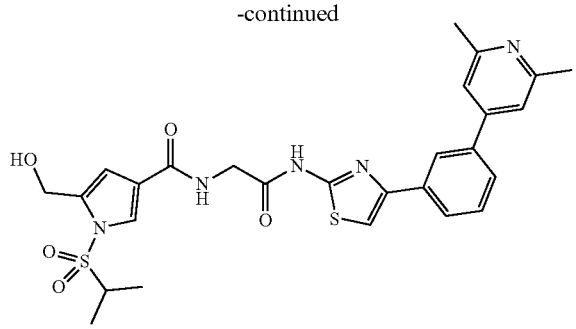

Step 1: Preparation of methyl 5-formyl-1H-pyrrole-3-carboxylate

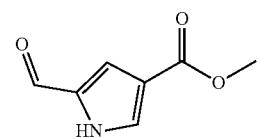

To a solution of methyl 1H-pyrrole-3-carboxylate (1.0 g, 7.99 mmol) in DMF (10 mL) was added POCl₃ (1.84 g, 11.99 mmol, 1.11 mL). The mixture was stirred at 80° C. for 20 hrs. The reaction was quenched by saturated of NaHCO₃ (8 mL) and extracted with EA (10 mL*3). The organic phase was concentrated to give a residue. The residue was purified by column chromatography (SiO2, Petroleum ether/Ethyl acetate=20:1 to 3:1) to give Intermediate B (520 mg, 43% yield) as a white solid. LCMS (ESI) m/z: [M+H]⁺=154.1. ¹H NMR (400 MHz, CDCl₃) δ=10.46-9.99 (m, 1H), 9.57 (s, 1H), 7.75-7.69 (m, 1H), 7.40 (m, 1H), 3.86 (s, 3H) ppm.

Step 2: Preparation of methyl 5-formyl-1-(isopropylsulfonyl)-1H-pyrrole-3-carboxylate

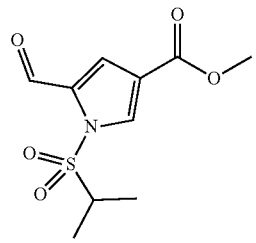

To a solution of Intermediate B (200 mg, 1.31 mmol) in THF (2.0 mL) was added NaH (78.35 mg, 1.96 mmol, 60% purity) at 0° C. The mixture was stirred at 0° C. for 10 min. Then propane-2-sulfonyl chloride (558.74 mg, 3.92 mmol, 436.51 μL) was added. The mixture was stirred at 0° C. for 20 min. Then the mixture was stirred at 20° C. for 1 hr. The reaction mixture was quenched by 1M HCl (0.5 mL) and extracted by EA (2 mL*3). The organic phase was concentrated to give a residue. The residue was purified by column chromatography (SiO₂, Petroleum ether/Ethyl acetate=20:1 to 3:1) to give Intermediate D (200 mg, 51% yield) as an off-white solid. LCMS (ESI) m/z: [M+H]$^+$=260.0. $^1$H NMR (400 MHz, CDCl$_3$) δ=9.76 (d, J=0.8 Hz, 1H), 8.08-8.07 (m, 1H), 7.57 (d, J=1.6 Hz, 1H), 4.35-4.23 (m, 1H), 3.89 (s, 3H), 1.44 (s, 3H), 1.42 (s, 3H) ppm.

Step 3: Preparation of methyl 5-(hydroxymethyl)-1-(isopropylsulfonyl)-1H-pyrrole-3-carboxylate

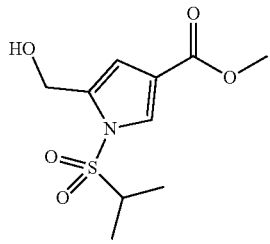

E

To a solution of Intermediate D (200 mg, 771.37 μmol) in MeOH (2.0 mL) was added NaBH$_4$ (58.37 mg, 1.54 mmol). The mixture was stirred at 0° C. for 1 hr. The reaction was quenched by 1M HCl (0.5 mL) and extracted by EA (2 mL*3). The organic phase was concentrated to give Intermediate E (230 mg, 98% yield) as colorless oil. LCMS (ESI) m/z: [M+H]$^+$=262.1. $^1$H NMR (400 MHz, CDCl$_3$) δ=7.73 (d, J=1.8 Hz, 1H), 6.70 (d, J=1.8 Hz, 1H), 4.73 (d, J=5.4 Hz, 2H), 3.86-3.83 (s, 3H), 3.83-3.79 (m, 1H), 2.43-2.41 (m, 1H), 1.38 (s, 3H), 1.36 (s, 3H) ppm.

Step 4: Preparation of 5-(hydroxymethyl)-1-(isopropylsulfonyl)-1H-pyrrole-3-carboxylic acid

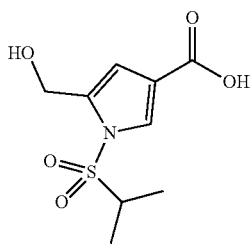

F

To a solution of Intermediate E (100 mg, 382.71 μmol) in MeOH (0.5 mL) was added NaOH (30.61 mg, 765.42 μmol) in H$_2$O (0.5 mL). The mixture was stirred at 25° C. for 1 hr. The reaction was quenched by 1M HCl (1.0 mL) and extracted by EA (2.0mL*5). The organic phase was concentrated to give Intermediate F (100 mg, 85% yield) as a white solid. LCMS (ESI) m/z: [M-OH]$^+$=230.1. $^1$H NMR (400 MHz, CDCl$_3$) δ=7.82 (d, J=1.8 Hz, 1H), 6.74 (d, J=1.8 Hz, 1H), 4.76 (s, 2H), 3.85 (d, J=6.8 Hz, 1H), 1.39 (s, 3H), 1.38 (s, 3H) ppm.

Step 5: Preparation of N-(2-((4-(3-(2,6-dimethylpyridin-4-yl)phenyl)thiazol-2-yl)amino)-2-oxoethyl)-5-(hydroxymethyl)-1-(isopropylsulfonyl)-1H-pyrrole-3-carboxamide (Compound 25)

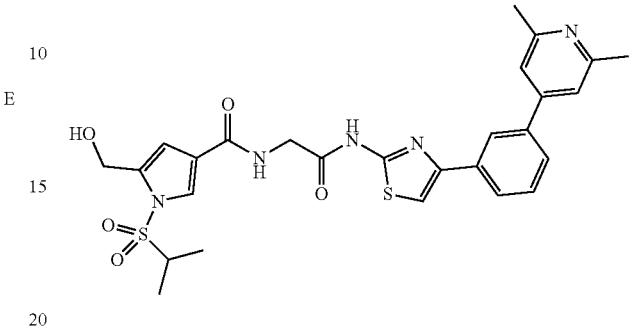

To a solution of Intermediate F (50 mg, 202.21 μmol) and 2-amino-N-(4-(3-(2,6-dimethylpyridin-4-yl)phenyl)thiazol-2-yl)acetamide (68.43 mg, 202.21 μmol) in DMF (0.5 mL) was added EDCl (58.15 mg, 303.31 μmol), HOBt (40.98 mg, 303.31 μmol) and DIEA (78.40 mg, 606.63 μmol, 105.66 μL). The mixture was stirred at 25° C. for 12 hrs. The reaction mixture was quenched by water (0.5 mL) to give a mixture. The mixture was purified by prep-HPLC (column: Waters Xbridge 150*25 mm*5 um; mobile phase: [water (10 mM NH$_4$HCO$_3$)-ACN]; B %: 22%-52%, 10 min) to give Compound 25 (16.22 mg, 28.57 μmol, 14.13% yield, 100% purity) as a white solid. LCMS (ESI) m/z: [M+H]$^+$=568.3. $^1$H NMR (400 MHz, CD$_3$OD) δ=8.27 (s, 1H), 7.98 (d, J=8.0 Hz, 1H), 7.82 (d, J=2.0 Hz, 1H), 7.66 (d, J=8.0 Hz, 1H), 7.57-7.50 (m, 2H), 7.43 (s, 2H), 6.77 (d, J=2.0 Hz, 1H), 4.73 (s, 2H), 4.25 (s, 2H), 4.16-4.14 (m, 1H), 2.58 (s, 6H), 1.33 (d, J=7.2 Hz, 6H) ppm.

Example 24. Preparation of N-(2-((4-(3-(2,6-dimethylpyridin-4-yl)phenyl)thiazol-2-yl)amino)-2-oxoethyl)-1-(isopropylsulfonyl)-4,5,6,7-tetrahydro-1H-indole-3-carboxamide (Compound 20)

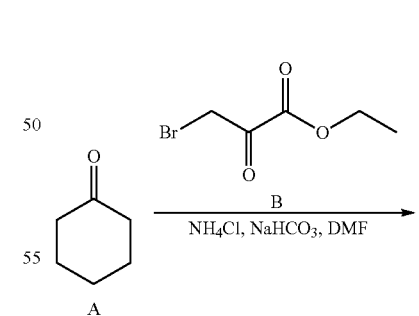

-continued

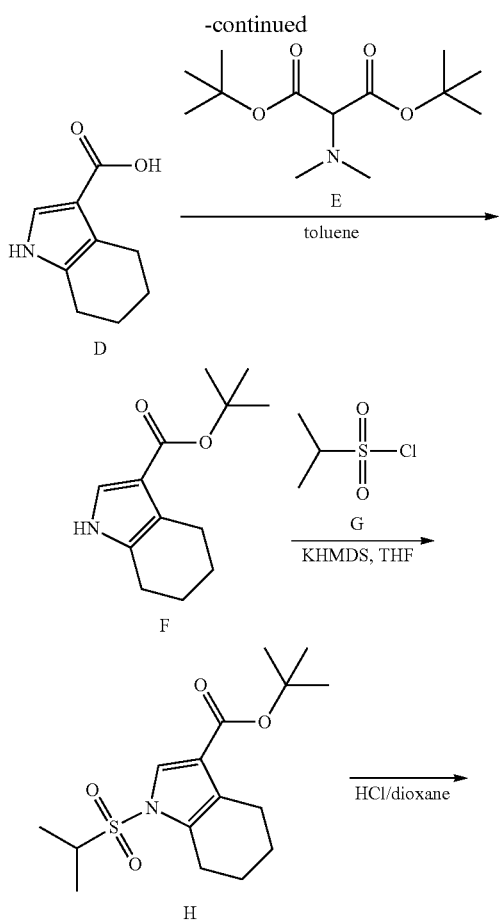

Step 1: Preparation of ethyl 4,5,6,7-tetrahydro-1H-indole-3-carboxylate

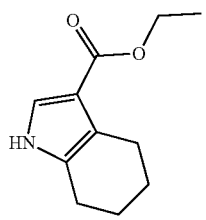

C

To a solution of cyclohexanone (20 g, 203.79 mmol, 21.12 mL) and NaHCO$_3$ (17.12 g, 203.79 mmol, 7.93 mL) in DMF (100 mL) was added NH$_4$Cl (10.90 g, 203.79 mmol) at 20° C. After addition, the mixture was stirred at this temperature for 15 min, then the mixture was cooled to 0° C., NaHCO$_3$ (17.12 g, 203.79 mmol, 7.93 mL) and ethyl 3-bromo-2-oxo-propanoate (39.74 g, 203.79 mmol, 25.47 mL) was added at 0° C. The resulting mixture was stirred at 16° C. for 16 hrs. The reaction mixture was diluted with water (600 mL) and extracted with EA (300 mL*3). The combined organic layers were washed with brine (300 mL*2), dried over Na$_2$SO$_4$, filtered and concentrated under reduced pressure to give a residue. The residue was purified by column chromatography (PE:EA=3:1, Rf=0.4; SiO$_2$, Petroleum ether/Ethyl acetate=50/1 to 10/1) and the fraction was concentrated in vacuum to give brown oil. Then the oil was further purified by reversed phase (0.1% FA condition) and the fraction was concentrated in vacuum to give Intermediate C (2.8 g, 7% yield) as a brown oil. LCMS (ESI) m/z: [M+H]$^+$=194.2. $^1$H NMR (400 MHz, METHANOL-d4) δ=10.70-10.23 (m, 1H), 7.24-7.17 (m, 1H), 4.20 (d, J=7.2 Hz, 2H), 2.70-2.64 (m, 2H), 2.52 (d, J=6.0 Hz, 2H), 1.80-1.72 (m, 4H), 1.31 (d, J=7.2 Hz, 3H) ppm.

Step 2: Preparation of 4,5,6,7-tetrahydro-1H-indole-3-carboxylic acid

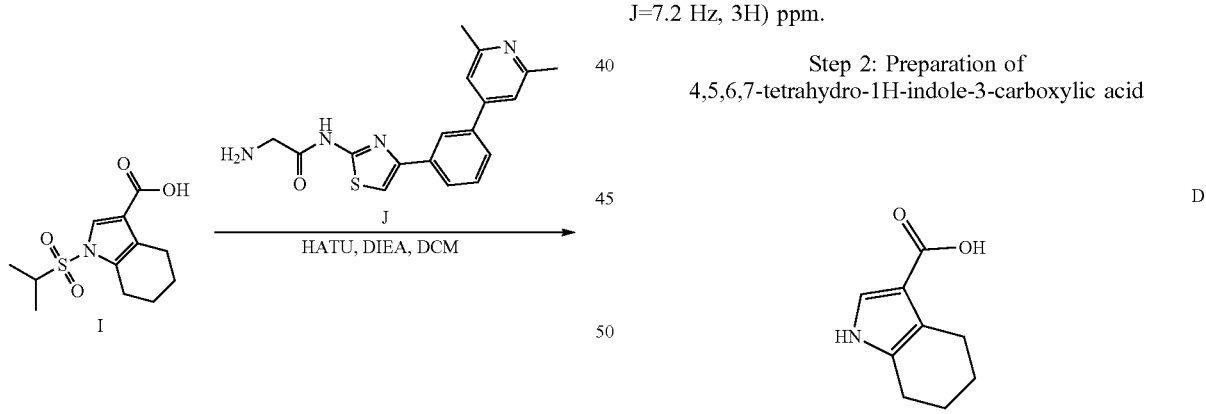

D

To a solution of Intermediate C (1.3 g, 6.73 mmol), NaOH (4 M, 5.05 mL) in EtOH (7 mL) was added NaOH (4 M, 5.05 mL), the mixture was stirred at 80° C. for 16 hrs. The reaction mixture was diluted with water (30 mL), acidized with 1 N HCl to pH 4.0 and extracted with EtOAc (30 mL*2). The combined organic layers were washed with brine (30 mL), dried over Na$_2$SO$_4$, filtered and concentrated under reduced pressure to give a residue. The residue was purified by reverse phase (FA), then concentrated under reduced pressure to remove MeCN and lyophilized to give Intermediate D (600 mg, 54% yield) as a yellow solid which was used to the next step without further purification. LCMS (ESI) m/z: [M+H]$^+$=166.2.

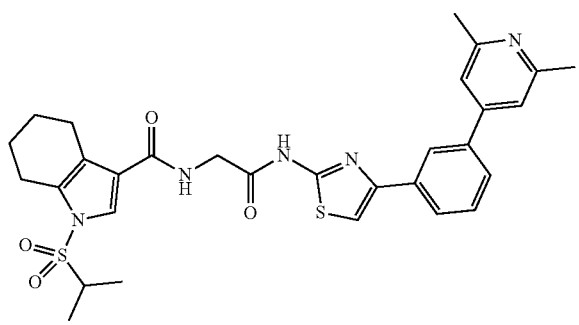 [SMILES: Cc1cc(-c2cccc(-c3csc(NC(=O)CNC(=O)c4cn(S(=O)(=O)C(C)C)c5c4CCCC5)n3)c2)cc(C)n1]

Step 3: Preparation of tert-butyl 4,5,6,7-tetrahydro-1H-indole-3-carboxylate

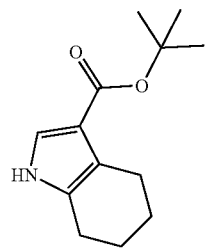

F

To a solution of Intermediate D (600 mg, 3.63 mmol) in toluene (6 mL) was drop wise added 1,1-ditert-butoxy-N,N-dimethyl-methanamine (3.69 g, 18.16 mmol, 4.35 mL) slowly at 80° C., then the mixture was stirred at 80° C. for 2 hrs. The reaction mixture was combined with another batch. The mixture was concentrated under reduced pressure to give a residue. The residue was purified by column chromatography (SiO$_2$, PE/EA=2:1) and concentrated under reduced pressure to give Intermediate F (500 mg, 57% yield) as a yellow solid. LCMS (ESI) m/z: [M-55]$^+$=166.1. $^1$H NMR (400 MHz, DMSO-d$_6$) δ=10.88 (br s, 1H), 7.08 (d, J=2.8 Hz, 1H), 2.57-2.56 (m, 2H), 2.47-2.45 (m, 2H), 1.70-1.61 (m, 4H), 1.45 (s, 9H) ppm.

Step 4: Preparation of tert-butyl 1-(isopropylsulfonyl)-4,5,6,7-tetrahydro-1H-indole-3-carboxylate

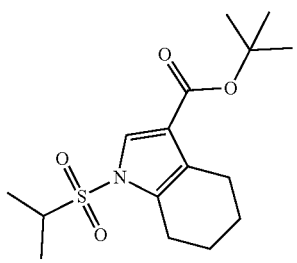

H

To a solution of Intermediate F (350 mg, 1.58 mmol) in THF (14 mL) was added dropwise KHMDS (1 M, 3.16 mL) at 0° C., then propane-2-sulfonyl chloride (270.65 mg, 1.90 mmol, 211.45 µL) was added to the mixture at 0° C., then warmed to 30° C. and stirred at 30° C. for 2 hrs. The reaction mixture was quenched by addition sat. NH$_4$Cl (50 mL), and then extracted with EtOAc (50 mL*2). The combined organic layers were washed with brine (50 mL), dried over Na$_2$SO$_4$, filtered and concentrated under reduced pressure to give a residue. The residue was combined with another batch. The mixture was purified by column chromatography (SiO$_2$, PE/EA=3:1) and concentrated under reduced pressure to give Intermediate H (300 mg, 58% yield) as a yellow solid. $^1$H NMR (400 MHz, DMSO-d$_6$) δ=7.43 (s, 1H), 3.78 (d, J=6.8 Hz, 1H), 2.77-2.57 (m, 4H), 1.80-1.56 (m, 4H), 1.48 (s, 9H), 1.21 (d, J=6.8 Hz, 6H) ppm.

Step 5: Preparation of 1-(isopropylsulfonyl)-4,5,6,7-tetrahydro-1H-indole-3-carboxylic acid

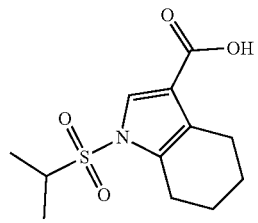

I

To a solution of Intermediate H (300 mg, 916.20 µmol) in HCl/dioxane (4 M, 3 mL) was stirred at 30° C. for 4 hrs. The reaction mixture was concentrated under reduced pressure to give Intermediate I (250 mg, crude) as a brown solid which was used to the next step without further purification. LCMS (ESI) m/z: [M+H]$^+$=272.0.

Step 6: Preparation of N-(2-((4-(3-(2,6-dimethylpyridin-4-yl)phenyl)thiazol-2-yl)amino)-2-oxoethyl)-1-(isopropylsulfonyl)-4,5,6,7-tetrahydro-1H-indole-3-carboxamide (Compound 20)

To a solution of Intermediate 1 (36.19 mg, 133.37 µmol), 2-amino-N-[4-[3-(2,6-dimethyl-4-pyridyl)phenyl]thiazol-2-yl]acetamide (50 mg, 133.37 µmol, HCl) and HATU (76.07 mg, 200.06 µmol) in DCM (0.5 mL) was added DIEA (86.19 mg, 666.87 µmol, 116.16 µL), the mixture was stirred at 30° C. for 2 hrs The reaction mixture was concentrated under reduced pressure to give a residue. The residue was purified by reverse phase (0.1% FA) and concentrated under reduced pressure to remove MeCN, then lyophilized to give Compound 20 (14.89 mg, 18% yield) as a white solid. LCMS (ESI) m/z: [M+H]$^+$=592.3. $^1$H NMR (400 MHz, CD$_3$OD) δ=8.28-8.27 (m, 1H), 8.01-7.98 (m, 1H), 7.68-7.66 (m, 2H), 7.55-7.48 (m, 4H), 0.22 (s, 2H), 3.61-3.54 (m, 1H), 2.81-2.72 (m, 4H), 2.59 (s, 6H), 1.86-1.71 (m, 4H), 1.31 (d, J=6.4 Hz, 6H) ppm.

Example 25. Preparation of 5-cyclopropyl-N-(2-((4-(3-(2,6-dimethylpyridin-4-yl)phenyl)thiazol-2-yl)amino)-2-oxoethyl)-1-(methylsulfonyl)-1H-pyrrole-3-carboxamide (Compound 19)

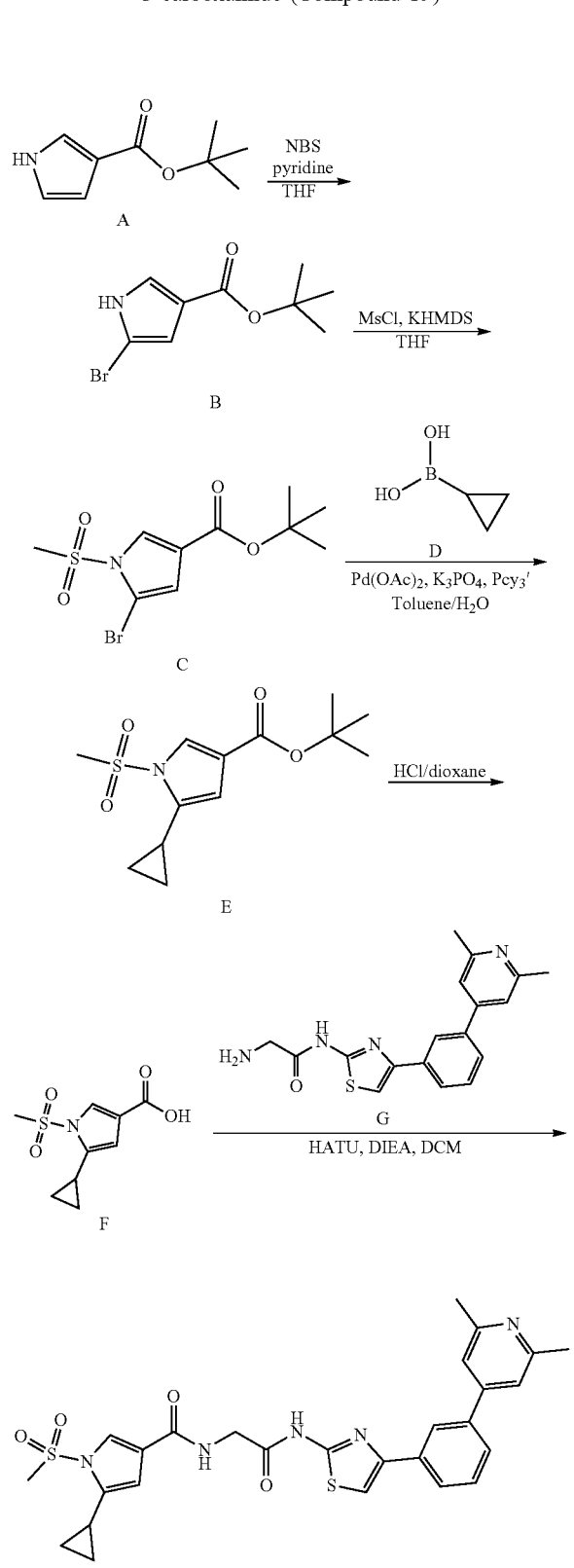

Step 1: Preparation of tert-butyl 5-bromo-1H-pyrrole-3-carboxylate

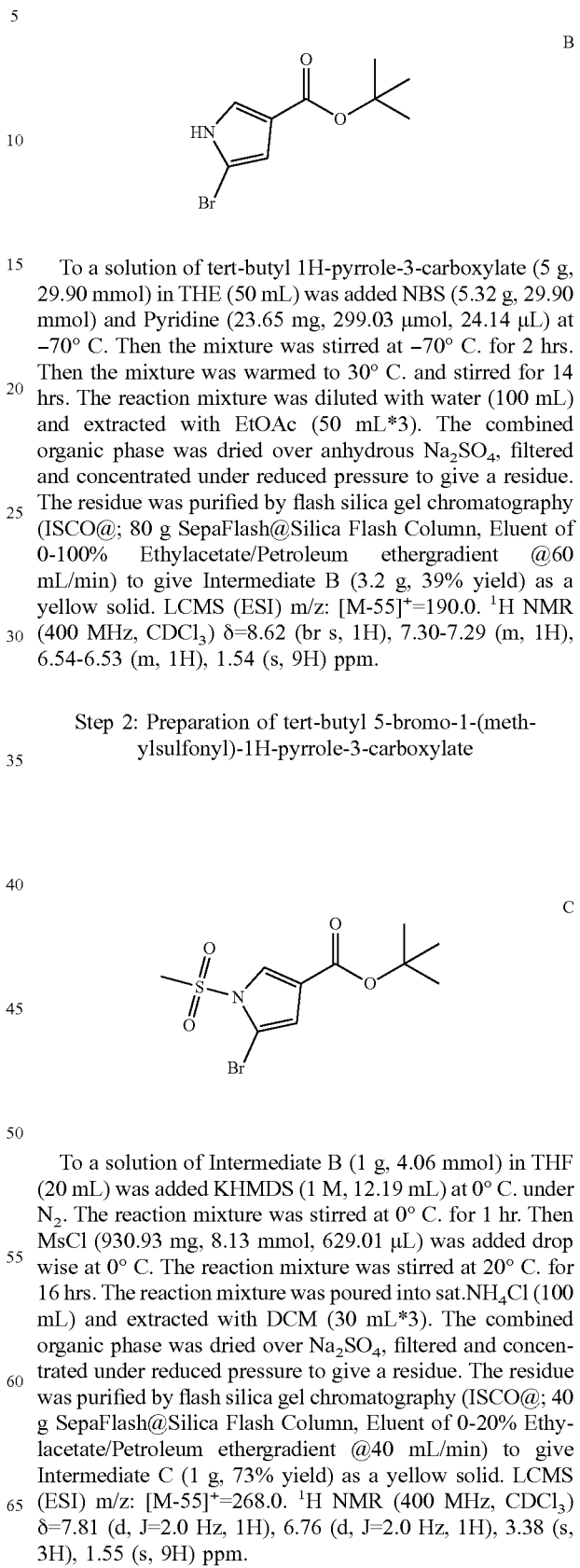

To a solution of tert-butyl 1H-pyrrole-3-carboxylate (5 g, 29.90 mmol) in THF (50 mL) was added NBS (5.32 g, 29.90 mmol) and Pyridine (23.65 mg, 299.03 μmol, 24.14 μL) at −70° C. Then the mixture was stirred at −70° C. for 2 hrs. Then the mixture was warmed to 30° C. and stirred for 14 hrs. The reaction mixture was diluted with water (100 mL) and extracted with EtOAc (50 mL*3). The combined organic phase was dried over anhydrous $Na_2SO_4$, filtered and concentrated under reduced pressure to give a residue. The residue was purified by flash silica gel chromatography (ISCO@; 80 g SepaFlash@Silica Flash Column, Eluent of 0-100% Ethylacetate/Petroleum ethergradient @60 mL/min) to give Intermediate B (3.2 g, 39% yield) as a yellow solid. LCMS (ESI) m/z: $[M-55]^+$=190.0. $^1$H NMR (400 MHz, $CDCl_3$) δ=8.62 (br s, 1H), 7.30-7.29 (m, 1H), 6.54-6.53 (m, 1H), 1.54 (s, 9H) ppm.

Step 2: Preparation of tert-butyl 5-bromo-1-(methylsulfonyl)-1H-pyrrole-3-carboxylate To a solution of Intermediate B (1 g, 4.06 mmol) in THF (20 mL) was added KHMDS (1 M, 12.19 mL) at 0° C. under $N_2$. The reaction mixture was stirred at 0° C. for 1 hr. Then MsCl (930.93 mg, 8.13 mmol, 629.01 μL) was added dropwise at 0° C. The reaction mixture was stirred at 20° C. for 16 hrs. The reaction mixture was poured into sat.$NH_4Cl$ (100 mL) and extracted with DCM (30 mL*3). The combined organic phase was dried over $Na_2SO_4$, filtered and concentrated under reduced pressure to give a residue. The residue was purified by flash silica gel chromatography (ISCO@; 40 g SepaFlash@Silica Flash Column, Eluent of 0-20% Ethylacetate/Petroleum ethergradient @40 mL/min) to give Intermediate C (1 g, 73% yield) as a yellow solid. LCMS (ESI) m/z: $[M-55]^+$=268.0. $^1$H NMR (400 MHz, $CDCl_3$) δ=7.81 (d, J=2.0 Hz, 1H), 6.76 (d, J=2.0 Hz, 1H), 3.38 (s, 3H), 1.55 (s, 9H) ppm.

Step 3: Preparation of tert-butyl 5-cyclopropyl-1-(methylsulfonyl)-1H-pyrrole-3-carboxylate

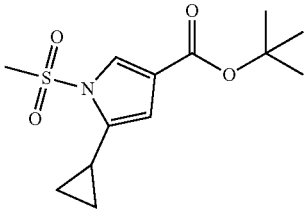

To a solution of Intermediate C (200 mg, 616.92 μmol) and cyclopropylboronic acid (105.98 mg, 1.23 mmol) in toluene (3 mL) and H₂O (0.3 mL) was added tricyclohexylphosphane (34.60 mg, 123.38 μmol, 40.00 μL), K₃PO₄ (523.80 mg, 2.47 mmol) and Pd(OAc)₂ (13.85 mg, 61.69 μmol) at 25° C. under N₂. Then the mixture was stirred at 100° C. for 16 hrs. The reaction mixture was diluted with H₂O (3 mL) and extracted with EtOAc (3 mL*3). The combined organic phase was dried over anhydrous Na₂SO₄, filtered and concentrated. The residue was purified by flash silica gel chromatography (ISCO@; 40 g SepaFlash@Silica Flash Column, Eluent of 0-100% Ethylacetate/Petroleum ethergradient @40 mL/min) and concentrated under reduced pressure to give Intermediate E (110 mg, 56% yield) as a red oil. LCMS (ESI) m/z: [M-55]⁺=230.1. ¹H NMR (400 MHz, CHLOROFORM-d) δ=7.64 (d, J=2.0 Hz, 1H), 6.24-6.23 (m, 1H), 3.30 (s, 3H), 2.24-2.19 (m, 1H), 1.53 (s, 9H), 1.02-0.98 (m, 2H), 0.72-0.70 (m, 2H) ppm.

Step 4: Preparation of 5-cyclopropyl-1-(methylsulfonyl)-1H-pyrrole-3-carboxylic acid

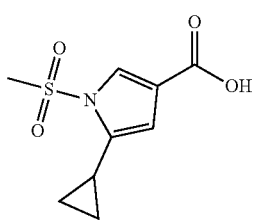

A solution of Intermediate E (100 mg, 350.44 μmol) in HCl/dioxane (4 M, 2 mL) was stirred at 30° C. for 5 hrs. The reaction mixture was concentrated to give Intermediate F (75 mg, 84% yield) as a red solid. LCMS (ESI) m/z: [M+H]⁺=230.0. ¹H NMR (400 MHz, CD30D) δ=7.69 (d, J=2.0 Hz, 1H), 6.29-6.26 (m, 1H), 3.44 (s, 3H), 2.25-2.14 (m, 1H), 1.03-0.97 (m, 2H), 0.77-0.71 (m, 2H) ppm.

Step 6: Preparation of 5-cyclopropyl-N-(2-((4-(3-(2,6-dimethylpyridin-4-yl)phenyl)thiazol-2-yl)amino)-2-oxoethyl)-1-(methylsulfonyl)-1H-pyrrole-3-carboxamide (Compound 19)

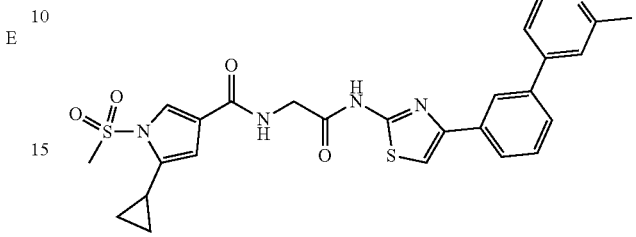

To a solution of Intermediate F (50 mg, 218.10 μmol) and 2-amino-N-[4-[3-(2,6-dimethyl-4-pyridyl)phenyl]thiazol-2-yl]acetamide hydrochloride salt (98.12 mg, 261.72 μmol) in DMF (0.8 mL) was added HATU (165.86 mg, 436.20 μmol) and DIPEA (140.94 mg, 1.09 mmol, 189.94 μL). The mixture was stirred at 20° C. for 4 hrs. The reaction mixture was diluted with water (10 mL) and extracted with EA (5 mL*3). The combined organic layer was washed with brine (10 mL), dried over Na₂SO₄, filtered and concentrated under reduced pressure to give a residue. The residue was purified by prep-HPLC (column:Phenomenex Synergi C18 150*25*10 um; [water (0.225% FA)-ACN];B %:28%-58%; 9 min), the solution was lyophilized to give Compound 19 (38.58 mg, 30% yield) as an off-white solid. LCMS (ESI) m/z: [M+H]⁺=550.4. ¹H NMR (400 MHz, DMSO-d₆) δ=12.41 (s, 1H), 8.63-8.55 (m, 1H), 8.43-8.37 (m, 1H), 8.15-7.99 (m, 3H), 7.88 (d, J=8.0 Hz, 1H), 7.85 (s, 1H), 7.74 (d, J=1.6 Hz, 1H), 7.70-7.64 (m, 1H), 6.41-6.36 (m, 1H), 4.12 (d, J=6.0 Hz, 2H), 3.58 (s, 3H), 2.70 (s, 6H), 2.18-2.08 (m, 1H), 1.00-0.91 (m, 2H), 0.74-0.67 (m, 2H) ppm.

Example 26. Preparation of 5-chloro-1-isopropylsulfonyl-N-[2-[[4-[3-(2-methylpyrimidin-4-yl)phenyl]thiazol-2-yl]amino]-2-oxo-ethyl]pyrrole-3-carboxamide (Compound 41)

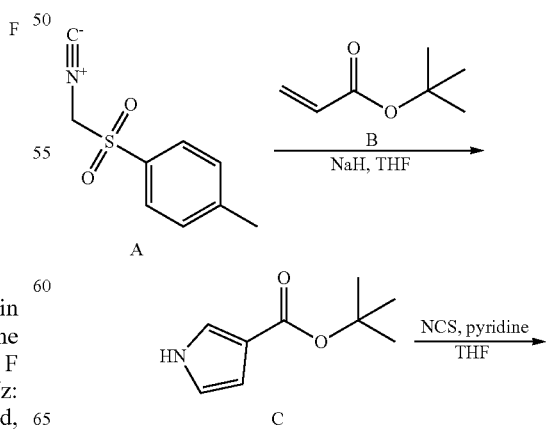

-continued

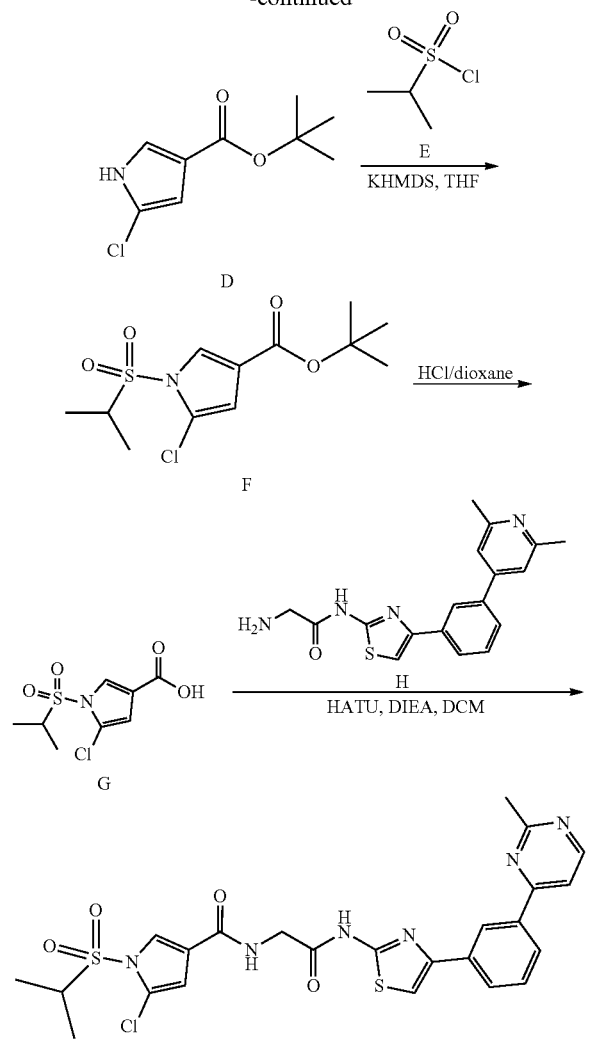

Step 1: Preparation of tert-butyl 1 H-pyrrole-3-carboxylate

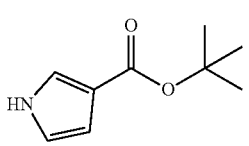

To a solution of tert-butyl prop-2-enoate (70 g, 546.15 mmol, 79.28 mL) and 1-(isocyanomethylsulfonyl)-4-methylbenzene (106.63 g, 546.15 mmol) in THF (1300 mL) was added NaH (26.21 g, 655.38 mmol, 9.10 mL, 60% purity) at 50° C. portion wise during 1 hr. Then the mixture was stirred at 70° C. for 1 hr. The reaction was quenched with saturated NH₄Cl solution (4000 mL) and extracted with EtOAc (2000 mL*2). The combined organic phase was dried over anhydrous Na₂sO4, filtered and concentrated under reduced pressure to give a residue. The residue was purified by column chromatography (SiO₂, Petroleum ether/Ethyl acetate=8/1 to 3/1) to give Intermediate C (37.5 g, 37% yield) as a yellow solid. LCMS (ESI) m/z: [M-55]⁺=112.1.
¹H NMR (400 MHz, CDCl₃) δ=8.72 (br s, 1H), 7.36-7.35 (m, 1H), 6.74-6.72 (m, 1H), 6.61-6.60 (m, 1H), 1.56 (s, 9H) ppm.

Step 2: Preparation of tert-butyl 5-chloro-1H-pyrrole-3-carboxylate

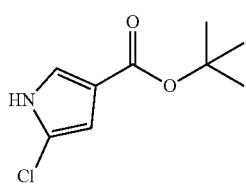

To a solution of tert-butyl 1H-pyrrole-3-carboxylate (500.00 mg, 2.99 mmol) in THF (5 mL) was added NCS (399.30 mg, 2.99 mmol) and pyridine (23.65 mg, 299.03 μmol, 24.14 μL) at −70° C. The reaction mixture was stirred at −70° C. for 2 hr. Then the reaction mixture was warmed to 30° C. and stirred at 30° C. for 14 hr. The reaction mixture was poured into H₂O (20 mL) and extracted with EA (20 mL*3). The combined organic layers were dried over anhydrous Na₂SO₄, filtered and concentrated under reduced pressure to afford a residue. The residue was purified by reverse phase column (0.1% NH₄₀H condition). The eluent was concentrated under reduced pressure to remove MeCN and extracted with EA (20 mL*2). The organic layers were dried over anhydrous Na₂SO₄, filtered and concentrated under reduced pressure to give Intermediate D (310 mg, 50% yield) as a yellow solid. LCMS (ESI) m/z: [M-56+H]⁺= 146.3. ¹H NMR (400 MHz, CDCl₃) δ=8.45-8.09 (m, 1H), 7.23-7.21 (m, 1H), 6.44-6.42 (m, 1H), 1.55 (s, 9H) ppm.

Step 3: Preparation of tert-butyl 5-chloro-1-isopropylsulfonyl-pyrrole-3-carboxylate

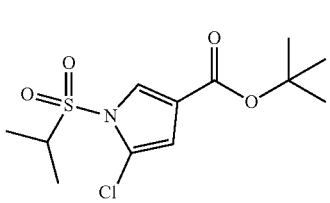

To a solution of Intermediate D (310 mg, 1.54 mmol) in THF (8 mL) was added KHMDS (1 M, 3.07 mL) slowly at 0° C. under N₂. The reaction mixture was stirred at 0° C. for 30 min. Then to the reaction mixture was added propane-2-sulfonyl chloride (328.84 mg, 2.31 mmol, 256.91 μL) slowly at 0° C. The reaction mixture was warmed to 15° C. and stirred at 15° C. for 30 min. The reaction mixture was poured into H₂O (10 mL) slowly and extracted with EA (10 mL*3). The combined organic layers were washed with brine (10 mL), dried over anhydrous Na₂SO₄, filtered and concentrated under reduced pressure to afford a residue. The residue was purified by reverse phase column (0.1% NH₄₀H condition). The eluent was concentrated under reduced pressure to remove MeCN and extracted with EA (20 mL*2). The organic layers were dried over anhydrous Na₂SO₄, filtered and concentrated under reduced pressure to give Intermediate F (460 mg, 97% yield) as a yellow oil. LCMS (ESI) m/z: [M+H]⁺=307.3. ¹H NMR (400 MHz, CDCl₃) δ=7.65 (d, J=2.0 Hz, 1H), 6.61 (d, J=2.0 Hz, 1H), 3.80-3.69 (m, 1H), 1.55 (s, 9H), 1.40 (d, J=6.8 Hz, 6H) ppm.

Step 4: Preparation of 5-chloro-1-isopropylsulfonyl-pyrrole-3-carboxylic acid

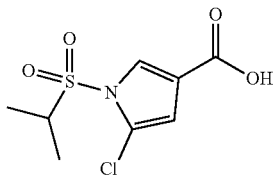

To a mixture of Intermediate F (90 mg, 292.40 µmol) in dioxane (0.5 mL) was added HCl/dioxane (4 M, 1.5 mL) at 30° C. The reaction mixture was stirred at 30° C. for 15 hr. The reaction mixture was concentrated under reduced pressure to give Intermediate G (73 mg, 98% yield) as a yellow solid which was taken to the next step without further purification. LCMS (ESI) m/z: [M+H]⁺=251.8. ¹H NMR (400 MHz, CD₃OD) δ=7.73 (d, J=2.0 Hz, 1H), 6.68 (d, J=2.0 Hz, 1H), 3.92-3.81 (m, 1H), 1.36 (d, J=6.8 Hz, 6H) ppm.

Step 5: Preparation of 5-chloro-1-isopropylsulfonyl-N-[2-[[4-[3-(2-methylpyrimidin-4-yl)phenyl]thiazol-2-yl]amino]-2-oxo-ethyl]pyrrole-3-carboxamide (Compound 41)

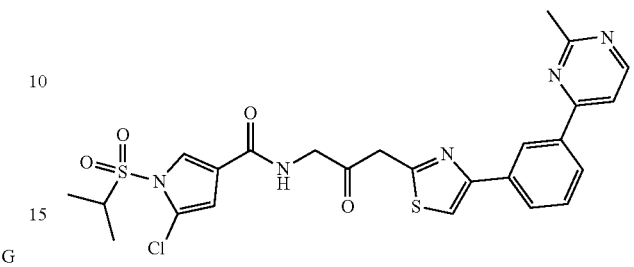

G

To a mixture of Intermediate G (70 mg, 278.12 µmol) in DCM (2 mL) was added DIEA (179.73 mg, 1.39 mmol, 242.22 µL), HATU (158.63 mg, 417.18 µmol) and 2-amino-N-[4-[3-(2-methylpyrimidin-4-yl)phenyl]thiazol-2-yl]acetamide hydrochloride (100.64 mg) at 30° C. The reaction mixture was stirred at 30° C. for 16 hr. The reaction mixture was filtered and the filter cake was washed with MeOH (30 mL) to give Compound 41 (38.13 mg, 25% yield) as a white solid. LCMS (ESI) m/z: [M+H]⁺=558.9. ¹H NMR (400 MHz, DMSO-d₆) δ=12.50 (s, 1H), 8.82-8.77 (m, 2H), 8.73 (s, 1H), 8.16-8.04 (m, 2H), 7.93 (d, J=5.2 Hz, 1H), 7.87 (d, J=2.0 Hz, 1H), 7.80 (s, 1H), 7.64-7.58 (m, 1H), 6.87 (d, J=2.0 Hz, 1H), 4.15 (d, J=6.0 Hz, 2H), 4.00-3.89 (m, 1H), 2.71 (s, 3H), 1.30 (d, J=6.8 Hz, 6H) ppm.

Example 27. Preparation of Compounds of the Invention

The following compounds in Table 5 below were prepared using standard chemical manipulations and procedures similar to those used for the preparation of Example 26, Compound 41.

TABLE 5

| # | Name | LC-MS data(m/z) | 1H NMR |
|---|------|-----------------|--------|
| 24 | 5-chloro-1-(isopropylsulfonyl)-N-(2-((4-(6-(2-methylpyrimidin-4-yl)pyridin-2-yl)thiazol-2-yl)amino)-2-oxoethyl)-1H-pyrrole-3-carboxamide | 559.8 | ¹H NMR (400 MHz, DMSO-d6): δ = 12.51 (s, 1H), 8.90 (d, J = 5.2 Hz, 1H), 8.82-8.78 (m, 1H), 8.41-8.37 (m, 2H), 8.14-8.10 (m, 3H), 7.87 (d, J = 2.0 Hz, 1H), 6.88 (d, J = 2.4 Hz, 1H), 4.17 (d, J = 5.6 Hz, 2H), 3.99-3.91 (m, 1H), 2.74 (s, 3H), 1.31 (d, J = 6.8 Hz, 6H) ppm |
| 27 | 5-chloro-1-(isopropylsulfonyl)-N-(2-((4-(6-(6-methylpyrimidin-4-yl)pyridin-2-yl)thiazol-2-yl)amino)-2-oxoethyl)-1H-pyrrole-3-carboxamide | 560.1 | ¹H NMR (400 MHz, DMSO-d6): δ = 12.49-12.40 (m, 1H), 9.18 (d, J = 1.2 Hz, 1H), 8.80 (d, J = 26.0 Hz, 1H), 8.50 (s, 1H), 8.39-8.38 (m, 1H), 8.21 (s, 1H), 8.16-8.05 (m, 2H), 7.88 (d, J = 2.0 Hz, 1H), 6.88 (d, J = 2.0 Hz, 1H), 4.17 (d, J = 5.6 Hz, 2H), 3.96 (d, J = 6.8 Hz, 1H), 2.63 (s, 3H), 1.31 (d, J = 6.8 Hz, 6H) ppm |
| 29 | 5-chloro-N-(2-((4-(6-(2,6-dimethoxypyrimidin-4-yl)pyridin-2-yl)thiazol-2-yl)amino)-2-oxoethyl)-1-(isopropylsulfonyl)-1H-pyrrole-3-carboxamide | 605.1 | ¹H NMR (400 MHz, DMSO-d6): δ = 8.62 (d, J = 1.6 Hz, 1H), 8.10-7.99 (m, 2H), 7.87 (d, J = 2.4 Hz, 1H), 7.61-7.49 (m, 2H), 7.01 (s, 1H), 6.81 (d, J = 2.0 Hz, 1H), 4.27 (s, 2H), 4.11 (s, 3H), 4.05 (s, 3H), 3.95-3.84 (m, 1H), 1.40(s, 3H), 1.39-1.38 (m, 3H) ppm |
| 32 | 5-chloro-N-(2-((4-(3-(2,6-dimethylpyrimidin-4-yl)phenyl)thiazol-2-yl)amino)-2-oxoethyl)-1-(isopropylsulfonyl)-1H-pyrrole-3-carboxamide | 573.1 | ¹H NMR (400 MHz, DMSO-d6): δ = 12.49 (s, 1H), 8.79 (d, J = 5.6 Hz, 1H), 8.71 (d, J = 1.6 Hz, 1H), 8.11(d, J = 7.6 Hz, 1H), 8.08-8.03 (m, 1H), 7.87 (d, J = 2.0 Hz, 1H), 7.83 (s, 1H), 7.81-7.78 (m, 1H), 7.60 (d, J = 7.6 Hz, 1H), 6.88(d, J = 2.0 Hz, 1H), 4.16 (d, J = 5.6 Hz, 2H), 4.01-3.88 (m, 1H), 2.67-2.65 (s, 3H), 2.53 (s, 3H), 1.31 (d, J = 7.2 Hz, 6H) ppm |

TABLE 5-continued

| # | Name | LC-MS data(m/z) | 1H NMR |
|---|------|-----------------|--------|
| 36 | 5-chloro-N-(2-((4-(3-(cis)-2,6-dimethylmorpholino)phenyl)thiazol-2-yl)amino)-2-oxoethyl)-1-(isopropylsulfonyl)-1H-pyrrole-3-carboxamide | 580.2 | $^1$H NMR (400 MHz, DMSO-d6): δ = 12.37 (s, 1H), 8.78-8.75 (m, 1H), 7.86 (d, J = 2.0 Hz, 1H), 7.62 (s, 1H), 7.45 (s, 1H), 7.35-7.32 (m, 1H), 7.30-7.25 (m, 1H), 6.95-6.92 (m, 1H), 6.87 (d, J = 2.0 Hz, 1H), 4.14 (d, J = 5.6 Hz, 2H), 3.97-3.93 (m, 1H), 3.75-3.70 (m, 2H), 3.65-3.60 (m, 2H), 2.33-2.26 (m, 2H), 1.31 (d, J = 6.8 Hz, 6H), 1.18 (d, J = 6.0 Hz, 6H) ppm |
| 37 | 5-chloro-N-(2-((4-(6-((cis)-2,6-dimethylmorpholino)pyridin-2-yl)thiazol-2-yl)amino)-2-oxoethyl)-1-(isopropylsulfonyl)-1H-pyrrole-3-carboxamide | 581.3 | $^1$H NMR (400 MHz, DMSO-d6): δ = 12.38 (s, 1H), 8.79-8.76 (m, 1H), 7.86 (d, J = 2.0 Hz, 1H), 7.78 (s, 1H), 7.65-7.61 (m, 1H), 7.26 (d, J = 7.2 Hz, 1H), 6.87 (d, J = 2.0 Hz, 1H), 6.81 (d, J = 8.4 Hz, 1H), 4.26 (d, J = 12.0 Hz, 2H), 4.14 (d, J = 6.0 Hz, 2H), 3.98-3.91 (m, 1H), 3.67-3.60 (m, 2H), 2.45-2.39 (m, 2H), 1.31 (d, J = 6.8 Hz, 6H), 1.19 (d, J = 6.4 Hz, 6H) ppm |
| 40 | 5-chloro-N-(2-((4-(3-(4-hydroxypiperidin-1-yl)phenyl)thiazol-2-yl)amino)-2-oxoethyl)-1-(isopropylsulfonyl)-1H-pyrrole-3-carboxamide | 566.2 | $^1$H NMR (400 MHz, CD$_3$OD): δ = 8.15 (s, 1H), 8.04 (d, J = 7.8 Hz, 1H), 7.84(d, J = 2.2 Hz, 1H), 7.64-7.59 (m, 1H), 7.59 (s, 1H), 7.56-7.52 (m, 1H), 6.78 (d, J = 2.2 Hz, 1H), 4.25 (s, 2H), 4.15-4.06 (m, 1H), 3.95-3.82 (m, 3H), 3.68-3.55 (m, 2H), 2.32-2.17 (m, 2H), 2.02 (dtd, J = 3.5, 7.0, 14.1 Hz, 2H), 1.37 (d, J = 6.7 Hz, 6H) ppm |
| 42 | 1-(tert-butyl)-N-(2-((4-(3-((2R,6S)-2,6-dimethylmorpholino)phenyl)thiazol-2-yl)amino)-2-oxoethyl)-5-methyl-1H-pyrazole-4-carboxamide | 511.3 | $^1$H NMR (400 MHz, DMSO-d6) δ 12.35 (s, 1H), 8.38-8.37 (m, 1H), 7.85 (s, 1H), 7.62 (s, 1H), 7.45 (s, 1H), 7.34-7.33 (m, 1H), 7.29-7.27 (m, 1H), 6.94 (d, J = 7.2 Hz, 1H), 4.09 (d, J = 6.0 Hz, 2H), 3.72-3.70(m, 2H), 3.63 (d, J = 10.8 Hz, 2H), 2.69 (s, 3H), 2.28 (d, J = 11.6 Hz, 2H), 1.59 (s, 9H), 1.18(d, J = 6.0 Hz, 6H) ppm |
| 43 | 1-(tert-butyl)-5-chloro-N-(2-((4-(3-((2R,6S)-2,6-dimethylmorpholino)phenyl)thiazol-2-yl)amino)-2-oxoethyl)-1H-pyrazole-4-carboxamide | 531.2 | $^1$H NMR (400 MHz, DMSO-d6) δ 12.54-12.20 (m, 1H), 8.46-8.45 (m, 1H), 7.99 (s, 1H), 7.61 (s, 1H), 7.45 (s, 1H), 7.35-7.30 (m, 1H), 7.29-7.23 (m, 1H), 6.93-6.92 (m, 1H), 4.12-4.11 (m, 2H), 3.75-3.68 (m, 2H), 3.62-3.61 (m, 2H), 2.29-2.28 (m, 2H), 1.67 (s, 9H), 1.17 (d, J = 6.2 Hz, 6H) ppm |
| 44 | 5-chloro-N-(2-((4-(3-((2R,6S)-2,6-dimethylmorpholino)phenyl)thiazol-2-yl)amino)-2-oxoethyl)-1-(methylsulfonyl)-1H-pyrrole-carboxamide | 552.2 | $^1$H NMR (400 MHz, DMSO-d6) δ 12.56-12.25 (m, 1H), 8.76-8.75 (m, 1H), 8.43 (s, 1H), 7.88 (s, 1H), 7.61 (s, 1H), 7.45-7.44 (m, 1H), 7.36-7.31 (m, 1H), 7.30-7.23 (m, 1H), 6.94-6.93 (m, 1H), 6.85 (s, 1H), 4.14-4.13 (m, 2H), 3.70 (s, 5H), 3.640-3.612 (m, 2H), 2.30 (d, J = 11.2 Hz, 2H), 1.18-1.17 (m, 6H) ppm |
| 45 | N-methyl-N-(4-(3-(2-(2-(5-methyl-1-(methylsulfonyl)-1H-pyrrole-3-carboxamido)acetamido)thiazol-4-yl)phenyl)pyridin-2-yl)glycine | 583.0 | $^1$H NMR (400 MHz, DMSO-d6) δ 12.42 (s, 1H), 8.63-8.60 (m, 1H), 8.31 (s, 1H), 8.14 (d, J = 6.4 Hz, 1H), 8.08 (d, J = 7.6 Hz, 1H), 7.89-7.82 (m, 2H), 7.74 (d, J = 2.0 Hz, 1H), 7.67-7.62 (m, 1H), 7.44 (s, 1H), 7.33 (d, J = 5.6 Hz, 1H), 6.48 (s, 1H), 4.61 (s, 2H), 4.12 (d, J = 5.6 Hz, 2H), 3.53 (s, 3H), 3.29 (s, 3H), 2.41 (s, 3H) ppm |
| 46 | 5-methyl-N-(2-((4-(3-(2-(methyl(2-(methylamino)-2-oxoethyl)amino)pyridin-4-yl)phenyl)thiazol-2-yl)amino)-2-oxoethyl)-1-(methylsulfonyl)-1H-pyrrole-3-carboxamide | 596.5 | $^1$H NMR (400 MHz, DMSO-d6) δ 8.20 (s, 1H), 8.14 (d, J = 5.2 Hz, 1H), 7.95-7.94 (m, 1H), 7.81-7.75 (m, 1H), 7.71 (s, 1H), 7.61-7.60 (m, 1H), 7.55-7.43 (m, 2H), 6.94 (d, J = 4.8 Hz, 1H), 6.86 (s, 1H), 6.50 (s, 1H), 4.19 (s, 2H), 3.98 (s, 2H), 3.54 (s, 3H), 3.13 (s, 3H), 2.87 (s, 1H), 2.59 (s, 3H), 2.42 (s, 3H) ppm |
| 47 | (S)-(3'-(2-(2-(5-methyl-1-(methylsulfonyl)-1H-pyrrole-3-carboxamido)-4-(methylthio)butanamido)thiazol-4-yl)-[1,1'-biphenyl]-3-yl)methanaminium chloride | 598.2 | $^1$H NMR (400 MHz, Methanol-d4) δ 8.20-8.19 (m, 1H), 7.93 (d, J = 8.0 Hz, 1H), 7.83 (d, J = 2.0 Hz, 1H), 7.80-7.75 (m, 2H), 7.62-7.57 (m, 2H), 7.53-7.49 (m, 2H), 7.47-7.45 (m, 1H), 6.53 (s, 1H), 4.87 (s, 1H), 4.21 (s, 2H), 3.34 (s, 3H), 2.72-2.57 (m, 2H), 2.46 (s, 3H), 2.29-2.19 (m, 2H), 2.18-2.13 (m, 3H) ppm |

Example 28. Assay for ATPase catalytic activity of BRM and BRG-1

The ATPase catalytic activity of BRM or BRG-1 was measured by the in vitro biochemical assay using ADP-Glo™ (Promega, V9102). The ADP-Glo™ kinase assay is performed in two steps once the reaction is complete. The first step is to deplete any unconsumed ATP in the reaction. The second step is to convert the reaction product ADP to ATP, which will be utilized by the luciferase to generate luminesce and be detected by a luminescence reader, such as Envision.

The assay reaction mixture (10 μL) contains 30 nM of BRM or BRG-1, 20 nM salmon sperm DNA (from Invitrogen, UltraPure™ Salmon Sperm DNA Solution, cat #15632011), and 400 μM of ATP in the ATPase assay buffer, which comprises of 20 mM Tris, pH 8, 20 mM MgCl2, 50 mM NaCl, 0.1% Tween-20, and 1 mM fresh DTT (Pierce™ DTT (Dithiothreitol), cat #20290). The reaction is initiated by the addition of the 2.5 μL ATPase solution to 2.5 μL ATP/DNA solution on low volume white Proxiplate-384 plus plate (PerkinElmer,cat #6008280) and incubates at room temperature for 1 hour. Then following addition of 5 μL of ADP-Glo™ Reagent provided in the kit, the reaction incubates at room temperature for 40 minutes. Then 10 μL of Kinase Detection Reagent provided in the kit is added to convert ADP to ATP, and the reaction incubates at room temperature for 60 minutes. Finally, luminescence measurement is collected with a plate-reading luminometer, such as Envision.

BRM and BRG-1 were synthesized from high five insect cell lines with a purity of greater than 90%. IP$_{50}$ data for compounds 1-47 from the ATPase catalytic activity assay described herein are shown in Table 6 below.

TABLE 6

| Compound No. | BRM IP$_{50}$ (μM)* | BRM Max % Inhibition | BRG1 IP$_{50}$ (μM)* | BRG1 Max % Inhibition |
|---|---|---|---|---|
| 1 | +++ | >70 | + | <30 |
| 2 | +++ | >80 | ++ | >70 |
| 3 | + | >40 | + | >40 |
| 4 | +++ | >60 | + | <30 |
| 5 | ++++ | >60 | + | <30 |
| 6 | +++ | >90 | ++ | >50 |
| 7 | ++++ | >95 | +++ | >95 |
| 8 | +++ | >95 | +++ | >70 |
| 9 | ++++ | >80 | ++++ | >60 |
| 10 | +++ | >70 | + | <30 |
| 11 | ++++ | >95 | ++++ | >80 |
| 12 | ++++ | >95 | +++ | >80 |
| 13 | +++ | >95 | ++ | >80 |
| 14 | ++++ | >95 | +++ | >90 |
| 15 | ++++ | >95 | +++ | >90 |
| 16 | ++++ | >95 | ++++ | >95 |
| 17 | ++++ | >95 | +++ | >80 |
| 18 | +++ | >70 | + | <30 |
| 19 | +++ | >95 | +++ | >80 |
| 20 | +++ | >95 | + | <30 |
| 21 | +++ | >90 | + | <30 |
| 22 | +++ | >80 | ++ | >40 |
| 23 | +++ | >90 | ++ | >40 |
| 24 | +++ | >60 | + | <30 |
| 25 | ++++ | >95 | +++ | >80 |
| 26 | +++ | >90 | ++ | >60 |
| 27 | +++ | >80 | +++ | >60 |
| 28 | +++ | >90 | ++ | >40 |
| 29 | +++ | >90 | ++ | >60 |
| 30 | ++++ | >50 | + | <30 |
| 31 | +++ | >80 | + | <30 |
| 32 | ++++ | >95 | +++ | >90 |
| 33 | ++++ | >95 | +++ | >90 |
| 34 | ++++ | >90 | ++ | >60 |
| 35 | ++++ | >95 | +++ | >80 |
| 36 | +++ | >90 | ++ | >60 |
| 37 | +++ | >80 | ++ | >40 |
| 38 | +++ | >95 | ++ | >70 |
| 39 | +++ | >80 | ++ | <30 |
| 40 | +++ | >80 | ++ | >50 |
| 41 | ++++ | >95 | +++ | >90 |
| 42 | +++ | NT | +++ | NT |
| 43 | ++++ | NT | +++ | NT |
| 44 | ++++ | NT | ++++ | NT |
| 45 | ++++ | NT | ++++ | NT |
| 46 | ++++ | NT | ++++ | NT |
| 47 | NT | NT | NT | NT |

"+" indicates inhibitory effect of >5 μM; "++" indicates inhibitory effect of 1-5 μM; "+++" indicates inhibitory effect of 0.1-1 μM, "++++" indicates inhibitory effect of <0.1 μM

Example 29. Synthesis of Compound A

BRG1/BRM Inhibitor compound A has the structure:

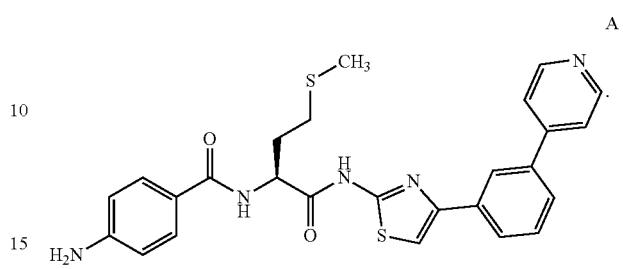

Compound A was synthesized as shown in Scheme 1 below.

Scheme 1. Synthesis of Compound A

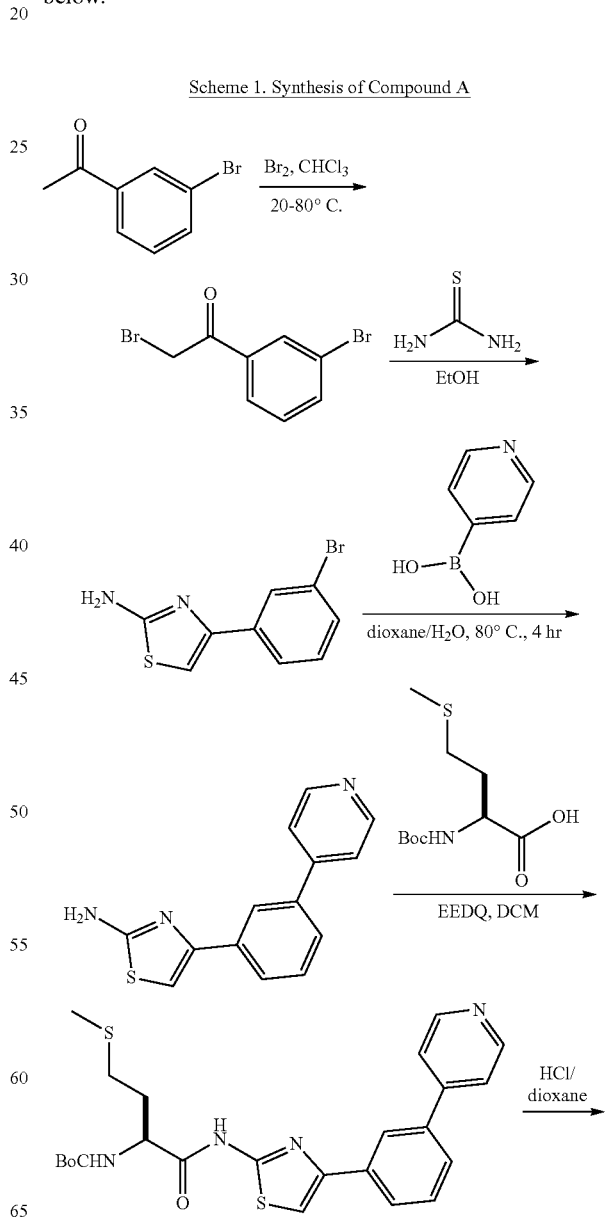

-continued

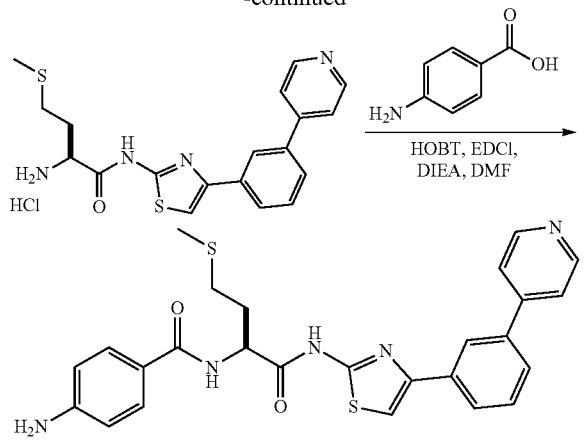

The ATPase catalytic activity of BRM or BRG-1 in the presence of compound A was measured by the in vitro biochemical assay using ADP-Glo™ (Promega, V9102). The ADP-Glo™ kinase assay is performed in two steps once the reaction is complete. The first step is to deplete any unconsumed ATP in the reaction. The second step is to convert the reaction product ADP to ATP, which will be utilized by the luciferase to generate luminesce and be detected by a luminescence reader, such as Envision.

The assay reaction mixture (10 µL) contains 30 nM of BRM or BRG1, 20 nM salmon sperm DNA (from Invitrogen, UltraPure™ Salmon Sperm DNA Solution, cat #15632011), and 400 µM of ATP in the ATPase assay buffer, which comprises of 20 mM Tris, pH 8, 20 mM $MgCl_2$, 50 mM NaCl, 0.1% Tween-20, and 1 mM fresh DTT (Pierce™ DTT (Dithiothreitol), cat #20290). The reaction is initiated by the addition of the 2.5 µL ATPase solution to 2.5 µL ATP/DNA solution on low volume white Proxiplate-384 plus plate (PerkinElmer,cat #6008280) and incubates at room temperature for 1 hour. Then following addition of 5 µL of ADP-Glo™ Reagent provided in the kit, the reaction incubates at room temperature for 40 minutes. Then 10 µL of Kinase Detection Reagent provided in the kit is added to convert ADP to ATP, and the reaction incubates at room temperature for 60 minutes. Finally, luminescence measurement is collected with a plate-reading luminometer, such as Envision.

BRM and BRG1 were synthesized from high five insect cell lines with a purity of greater than 90%. Compound A was found to have an $IP_{50}$ of 10.4 nM against BRM and 19.3 nM against BRG1 in the assay.

Example 30. Effects of BRG1/BRM ATPase Inhibition on the Growth of Uveal Melanoma and Hematological Cancer Cell Lines Procedure: Uveal melanoma cell lines (92-1, MP41, MP38, MP46), prostate cancer cell lines (LNCAP), lung cancer cell lines (NCIH1299), and immortalized embryonic kidney lines (HEK293T) were plated into 96 well plates with growth media (See Table 7). BRG1/BRM ATPase inhibitor, Compound A, was dissolved in DMSO and added to the cells in a concentration gradient from 0 to 10 micromolar at the time of plating. Cells were incubated at 37 degrees Celsius for 3 days. After three days of treatment, the media was removed from the cells, and 30 microliters of TrypLE (Gibco) was added to cells for 10 minutes. Cells were detached from the plates, and resuspended with the addition of 170 microliters of growth media. Cells from two DMSO-treated control wells were counted, and the initial number of cells plated at the start of the experiment, were re-plated into fresh-compound containing plates for an additional four days at 37 degrees Celsius. At day 7, cells were harvested as described above. On day 3 and day 7, relative cell growth was measured by the addition of Cell-titer glo (Promega), and luminescence was measured on an Envision plate reader (Perkin Elmer). The concentration of compound at which each cell line's growth was inhibited by 50% (GI50), was calculated using Graphpad Prism, and is plotted below. For multiple myeloma cell lines (OPM2, MM1S, LP1), ALL cell lines (TALL1, JURKAT, RS411), DLBCL cell lines (SUDHL6, SUDHL4, DB, WSUDLCL2, PFEIFFER), AML cell lines (OCIAML5), MDS cell lines (SKM1), ovarian cancer cell lines (OV7, TYKNU), esophageal cancer cell lines (KYSE150), rhabdoid tumor lines (RD, G402, G401, HS729, A204), liver cancer cell lines (HLF, HLE, PLCRPF5), and lung cancer cell lines (SW1573, NClH2444), the above methods were performed with the following modifications: Cells were plated in 96 well plates, and the next day, BRG1/BRM ATPase inhibitor, Compound A, was dissolved in DMSO and added to the cells in a concentration gradient from 0 to 10 micromolar. At the time of cell splitting on days 3 and 7, cells were split into new 96 well plates, and fresh compound was added four hours after re-plating.

Table 7 lists the tested cell lines and growth media used.

TABLE 7

Cell Lines and Growth Media

| Cell Line | Source | Growth Media |
|---|---|---|
| 92-1 | SIGMA | RPMI1640 + 20% FBS |
| A204 | ATCC | McCoy's 5A + 10% FBS |
| DB | ATCC | RPMI1640 + 10% FBS |
| G401 | ATCC | McCoy's 5A + 10% FBS |
| G402 | ATCC | McCoy's 5A + 10% FBS |
| HEK293T | ATCC | DMEM + 10% FBS |
| HLE | JCRB | DMEM + 10% FBS |
| HLF | JCRB | DMEM + 10% FBS |
| HS729 | ATCC | DMEM + 10% FBS |
| JURKAT | ATCC | RPMI1640 + 10% FBS |
| KYSE150 | DSMZ | RPMI1640/Ham's F12 + 10% FBS |
| LNCAP | ATCC | RPMI1640 + 10% FBS |
| LP1 | DSMZ | IMDM + 20% FBS |
| MM1S | ATCC | RPMI1640 + 10% FBS |
| MP38 | ATCC | RPMI1640 + 20% FBS |
| MP41 | ATCC | RPMI1640 + 20% FBS |
| MP46 | ATCC | RPMI1640 + 20% FBS |
| NCIH1299 | ATCC | RPMI1640 + 10% FBS |
| NCIH2444 | ATCC | RPMI1640 + 20% FBS |
| OCIAML5 | DSMZ | alpha-MEM + 20% FBS + 10 ng/ml GM-CSF |
| OPM2 | DSMZ | RPMI1640 + 10% FBS |
| OV7 | ECACC | DMEM/Ham's F12 (1:1) + 2 mM Glutamine + 10% FBS + 0.5 ug/ml hydrocortisone + 10 ug/ml insulin |
| PFEIFFER | ATCC | RPMI1640 + 10% FBS |
| PLCPRF5 | ATCC | EMEM + 10% FBS |
| RD | ATCC | DMEM + 10% FBS |
| RS411 | ATCC | RPMI1640 + 10% FBS |
| SKM1 | JCRB | RPMI1640 + 10% FBS |
| SUDHL4 | DSMZ | RPMI1640 + 10% FBS |
| SUDHL6 | ATCC | RPMI1640 + 20% FBS |
| SW1573 | ATCC | DMEM + 10% FBS |
| TALL1 | JCRB | RPMI1640 + 10% FBS |
| TYKNU | JCRB | EMEM + 20% FBS |
| WSUDLCL2 | DSMZ | RPMI1640 + 10% FBS |

Results: As shown in FIG. 1, the uveal melanoma and hematologic cancer cell lines were more sensitive to BRG1/BRM inhibition than the other tested cell lines. Inhibition of the uveal melanoma and hematologic cancer cell lines was maintained through day 7.

Example 31. Comparison of BRG1/BRM inhibitors to clinical PKC and MEK inhibitors in uveal melanoma cell lines Procedure: Uveal melanoma cell lines, 92-1 or MP41, were plated in 96 well plates in the presence of growth media (See Table 7). BAF ATPase inhibitors (Compound A), PKC inhibitor (LXS196; MedChemExpress), or MEK inhibitor (Selumetinib; Selleck Chemicals) were dissolved in DMSO and added to the cells in a concentration gradient from 0 to 10 micromolar at the time of plating. Cells were incubated at 37 degrees Celsius for 3 days. After three days of treatment, cell growth was measured with Cell-titer glow (Promega), and luminescence was read on an Envision plate reader (Perkin Elmer).

Figure 2:
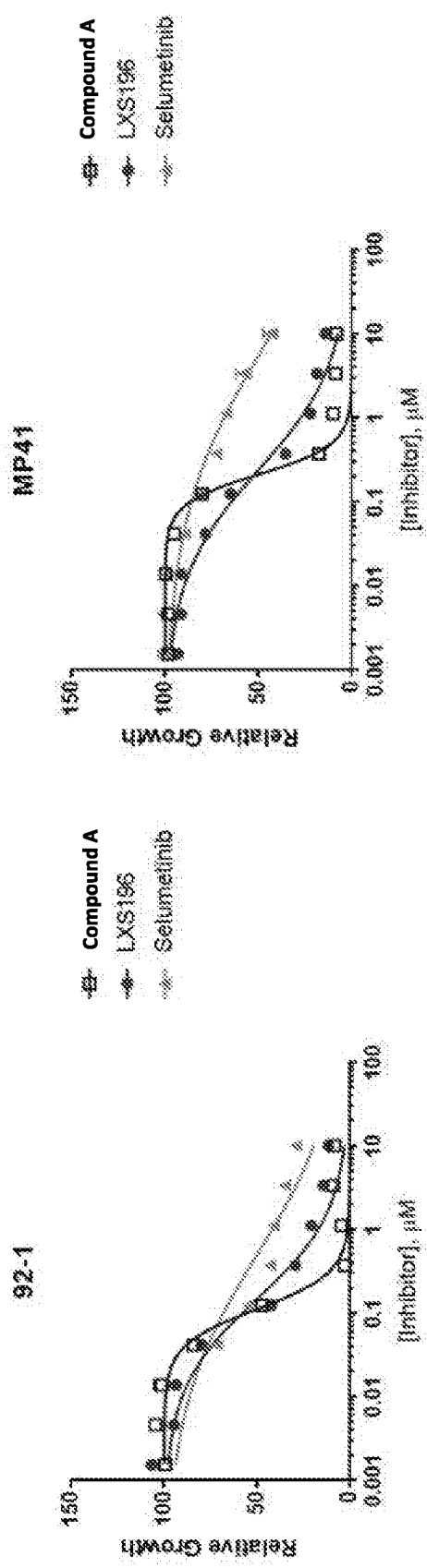
FIG. 2 is a graph illustrating inhibition of cell proliferation of uveal melanoma cells by a BRG1/BRM inhibitor (Compound A), a MEK inhibitor (Selumetinib), and a PKC inhibitor (LXS196).

Results: As shown in FIG. 2, Compound A showed comparable growth inhibition of uveal melanoma cells as the clinical PKC and MEK inhibitors. Further, compound A was found to result in a faster onset of inhibition than the clinical PKC and MEK inhibitors.

Example 32. Synthesis of Compound B

BRG1/BRM Inhibitor Compound B has the structure:

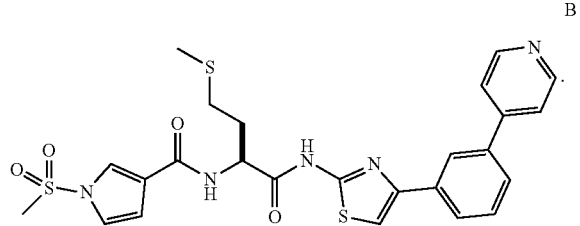 [SMILES: CSCC[C@H](NC(=O)c1ccn(S(C)(=O)=O)c1)C(=O)Nc1nc(-c2cccc(-c3ccncc3)c2)cs1]

B

Compound B was synthesized as shown in Scheme 2 below.

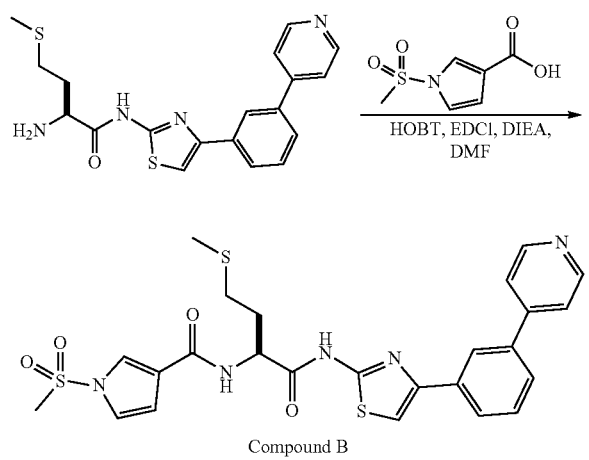

Compound B

Step 1: Preparation of (S)-1-(methylsulfonyl)-N-(4-(methylthio)-1-oxo-1-((4-(3-(pyridin-4-yl)phenyl)thiazol-2-yl)amino)butan-2-yl)-1H-pyrrole-3-carboxamide (Compound B)

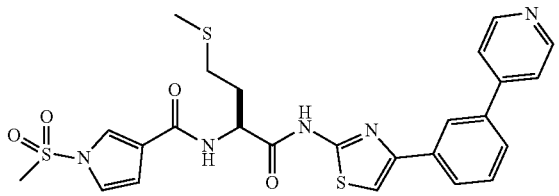 [SMILES: CSCC[C@H](NC(=O)c1ccn(S(C)(=O)=O)c1)C(=O)Nc1nc(-c2cccc(-c3ccncc3)c2)cs1]

To a mixture of (2S)-2-amino-4-methylsulfanyl-N-[4-[3-(4-pyridyl)phenyl]thiazol-2-yl]butanamide (2 g, 4.75 mmol, HCl salt) and 1-methylsulfonylpyrrole-3-carboxylic acid (898.81 mg, 4.75 mmol) in DMF (20 mL) was added EDCl (1.37 g, 7.13 mmol), HOBt (962.92 mg, 7.13 mmol) and DIEA (2.46 g, 19.00 mmol, 3.31 mL) and the mixture was stirred at 25° C. for 3 hours. The mixture was poured into H$_2$O (100 mL) and the precipitate was collected by filtration. The solid was triturated in MeOH (20 mL) and the precipitate was collected by filtration. The solid was dissolved in DMSO (10 mL) and then the mixture was poured into MeOH (50 mL) and the formed precipitate was collected by filtration and lyophilized to give Compound B (2.05 g, 3.66 mmol, 77.01% yield) as a white solid. LCMS (ESI) m/z [M+H]$^+$=555.9. $^1$H NMR (400 MHz, DMSO) δ 12.49 (s, 1H), 8.68-8.66 (m, 2H), 8.46 (d, J=7.2 Hz, 1H), 8.31-8.30 (m, 1H), 8.02-8.00 (m, 1H), 7.94-7.96 (m, 1H), 7.83 (s, 1H), 7.73-7.74 (m, 3H), 7.61-7.57 (m, 1H), 7.31-7.29 (m, 1H), 6.79-6.77 (m, 1H), 4.74-4.69 (m, 1H), 3.57 (s, 3H), 2.67-2.53 (m, 2H), 2.13-2.01 (m, 5H). SFC: AS-3-MeOH (DEA)-40-3 mL-35T.lcm, t=0.932 min, ee %=100%.

Example 33. Effects of BRG1/BRM ATPase inhibition on the growth of uveal melanoma, hematological cancer, prostate cancer, breast cancer, and Ewing's sarcoma cell lines Procedure: All cell lines described above in Example 30 were also tested as described above with Compound B. In addition, the following cell lines were also tested as follows. Briefly, for Ewing's sarcoma cell lines (CADOES1, RDES, SKES1), retinoblastoma cell lines (WERIRB1), ALL cell lines (REH), AML cell lines (KASUMI1), prostate cancer cell lines (PC3, DU145, 22RV1), melanoma cell lines (SH4, SKMEL28, WM115, COLO829, SKMEL3, A375), breast cancer cell lines (MDAMB415, CAMA1, MCF7, BT474, HCC1419, DU4475, BT549), B-ALL cell lines (SUPB15), CML cell lines (K$_{562}$, MEGO1), Burkitt's lymphoma cell lines (RAMOS2G64C$_{10}$, DAUDI), mantle cell lymphoma cell lines (JEKO1, REC1), bladder cancer cell lines (HT1197), and lung cancer cell lines (SBC5), the above methods were performed with the following modifications: Cells were plated in 96 well plates, and the next day, BRG1/BRM ATPase inhibitor, Compound B, was dissolved in DMSO and added to the cells in a concentration gradient from 0 to 10 micromolar. At the time of cell splitting on days 3 and 7, cells were split into new 96 well plates, and fresh compound was added four hours after re-plating.

Table 8 lists the tested cell lines and growth media used.

TABLE 8

| Cell Line | Source | Growth Media |
|---|---|---|
| 22RV1 | ATCC | RPMI1640 + 10% FBS |
| A375 | ATCC | DMEM + 10% FBS |
| BT474 | ATCC | Hybricare medium + 1.5 g/L sodium bicarbonate + 10% FBS |
| BT549 | ATCC | RPMI1640 + 0.023 IU/ml insulin + 10% FBS |
| CADOES1 | DSMZ | RPMI1640 + 10% FBS |
| CAMA1 | ATCC | EMEM + 10% FBS |
| COLO829 | ATCC | RPMI1640 + 10% FBS |
| DAUDI | ATCC | RPMI1640 + 10% FBS |
| DU145 | ATCC | EMEM + 10% FBS |
| DU4475 | ATCC | RPMI1640 + 10% FBS |
| HCC1419 | ATCC | RPMI1640 + 10% FBS |
| HT1197 | ATCC | EMEM + 10% FBS |
| JEKO1 | ATCC | RPMI1640 + 20% FBS |
| K562 | ATCC | IMDM + 10% FBS |
| KASUMI1 | ATCC | RPMI1640 + 10% FBS |
| MCF7 | ATCC | EMEM + 0.01 mg/ml bovine insulin + 10% FBS |
| MDAMB415 | ATCC | Leibovitz's L-15 + 2 mM L-glutamine + 10 mcg/ml insulin + 10 mcg/ml glutathione + 15% FBS |
| MEG01 | ATCC | RPMI1640 + 10% FBS |
| PC3 | ATCC | F-12K + 10% FBS |
| RAMOS2G64C10 | ATCC | RPMI1640 + 10% FBS |
| RDES | ATCC | RPMI1640 + 15% FBS |
| REC1 | ATCC | RPMI1640 + 10% FBS |
| REH | ATCC | RPMI1640 + 10% FBS |
| SBC5 | JCRB | EMEM + 10% FBS |
| SH4 | ATCC | DMEM + 10% FBS |
| SKES1 | ATCC | McCoy's 5A + 15% FBS |
| SKMEL28 | ATCC | EMEM + 10% FBS |
| SKMEL3 | ATCC | McCoy's 5A + 15% FBS |
| SUPB15 | ATCC | IMDM + 4 mM L-glutamine + 1.5 g/L sodium bicarbonate + 0.05 mM 2-mercaptoethanol + 20% FBS |
| WERIRB1 | ATCC | RPMI1640 + 10% FBS |
| WM115 | ATCC | EMEM + 10% FBS |

Figure 3:
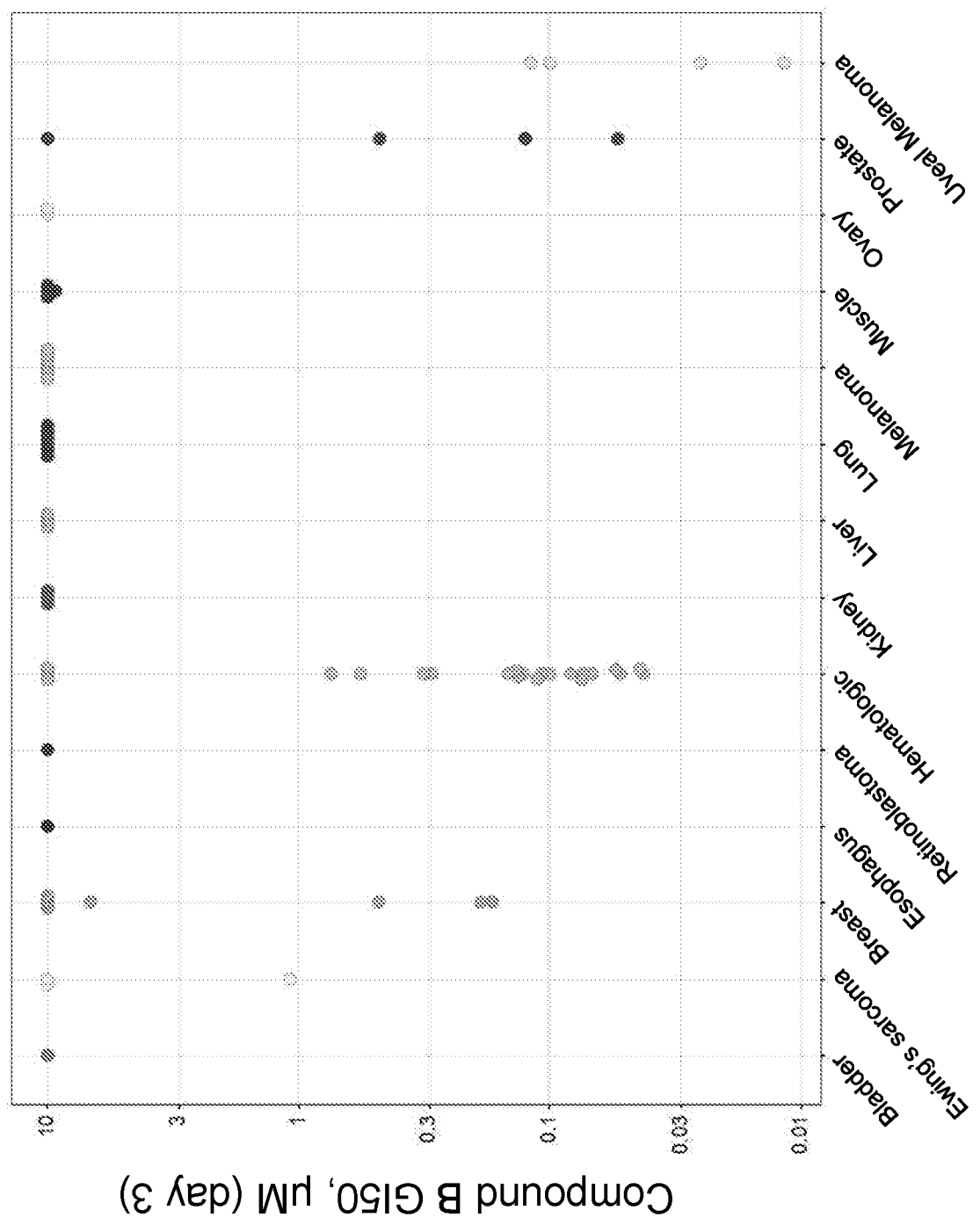
FIG. 3 is a graph illustrating inhibition of cell proliferation of several cancer cell lines by a BRG1/BRM inhibitor (Compound B).

Results: As shown in FIG. 3, the uveal melanoma, hematologic cancer, prostate cancer, breast cancer, and Ewing's sarcoma cell lines were more sensitive to BRG1/BRM inhibition than the other tested cell lines. Inhibition of the uveal melanoma, hematologic cancer, prostate cancer, breast cancer, and Ewing's sarcoma cell lines was maintained through day 7.

OTHER EMBODIMENTS

While the invention has been described in connection with specific embodiments thereof, it will be understood that invention is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are in the claim.

The invention claimed is:

1. A compound having the structure:

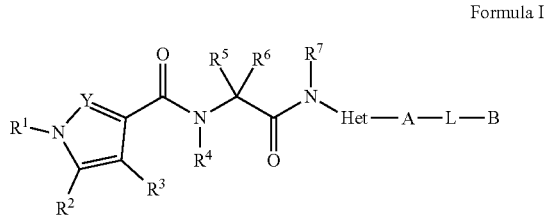

Formula I wherein Y is N or CH;

R$^1$ is hydrogen, optionally substituted C$_1$-C$_6$ acyl, optionally substituted C$_1$-C$_6$ alkyl, optionally substituted C$_1$-C$_6$ heteroalkyl, optionally substituted C$_2$-C$_9$ heterocyclyl, or —SO$_2$R$^8$;

R$^2$ is halo, or optionally substituted C$_1$-C$_6$ alkyl;

R$^3$ is halo, hydrogen or optionally substituted C$_1$-C$_6$ alkyl, or R$^2$ and R$^3$ combine with the carbons to which they are attached to form a 5- or 6-membered ring;

R$^4$, R$^5$, and R$^7$ are, independently, hydrogen or optionally substituted C$_1$-C$_6$ alkyl;

R$^6$ is hydrogen, optionally substituted C$_1$-C$_6$ alkyl, optionally substituted C$_1$-C$_6$ heteroalkyl, optionally substituted C$_1$-C$_6$ alkyl C$_6$-C$_{10}$ aryl, or optionally substituted C$_1$-C$_6$ alkyl C$_2$-C$_9$ heteroaryl;

R$^8$ is optionally substituted C$_1$-C$_6$ alkyl, or optionally substituted C$_3$-C$_8$ cycloalkyl, or —NR$^9$R$^{10}$;

R$^9$ and R$^{10}$ are, independently, optionally substituted C$_1$-C$_6$ alkyl;

Het is a 5- or 6-membered heteroaryl;

A is optionally substituted C$_6$-C$_{10}$ aryl, optionally substituted C$_2$-C$_9$ heterocyclyl, or optionally substituted C$_2$-C$_9$ heteroaryl;

L is absent, optionally substituted C$_1$-C$_6$ alkyl, optionally substituted C$_1$-C$_6$ alkenyl, or optionally substituted C$_1$-C$_6$ heteroalkyl; and B is cyano, optionally substituted C$_6$-C$_{10}$ aryl, optionally substituted C$_6$-C$_{10}$ cycloalkyl, optionally substituted C$_2$-C$_9$ heterocyclyl, or optionally substituted C$_2$-C$_9$ heteroaryl;

or a pharmaceutically acceptable salt thereof.

2. The compound of claim 1, wherein R$^5$ is hydrogen.

3. The compound of claim 1, wherein Het is

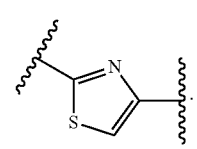

4. The compound of claim 1, wherein A is optionally substituted C$_6$-C$_{10}$ aryl or optionally substituted C$_2$-C$_9$ heteroaryl.

5. The compound of claim 1, wherein the compound has the structure:

Formula II

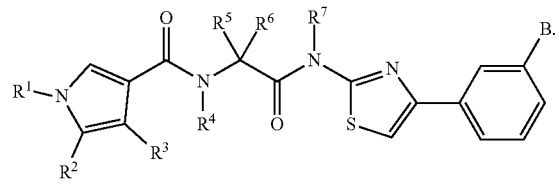

6. The compound of claim 1, wherein B is optionally substituted $C_2$-$C_9$ heterocyclyl, optionally substituted $C_6$-$C_{10}$ aryl, or optionally substituted $C_2$-$C_9$ heteroaryl.

7. The compound of claim 1, wherein $R^4$ is hydrogen.

8. The compound of claim 1, wherein $R^7$ is hydrogen.

9. The compound of claim 1, wherein $R^1$ is —$SO_2R^8$.

10. The compound of claim 9, wherein $R^8$ is optionally substituted $C_1$-$C_6$ alkyl.

11. The compound of claim 1, wherein $R^2$ is optionally substituted $C_1$-$C_6$ alkyl or halo.

12. The compound of claim 1, wherein $R^3$ is hydrogen.

13. The compound of claim 1, wherein $R^3$ is optionally substituted $C_1$-$C_6$ alkyl or halo.

14. The compound of claim 1, wherein $R^2$ and $R^3$ combine with the carbons to which they are attached to form a 5- or 6-membered ring.

15. The compound of claim 14, wherein the compound has the structure:

Formula III

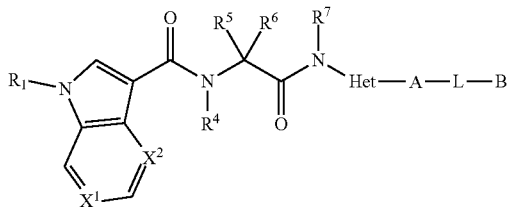

wherein $X^1$ and $X^2$ are N or CH.

16. The compound of claim 1, wherein the compound has the structure:

Formula IV

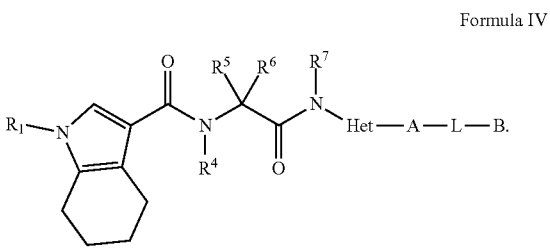

17. The compound of claim 1, wherein the compound is any one of compounds:

1

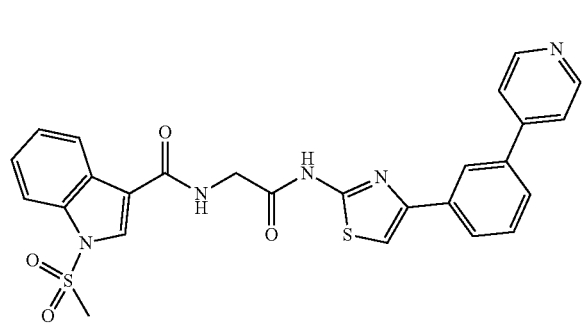

2

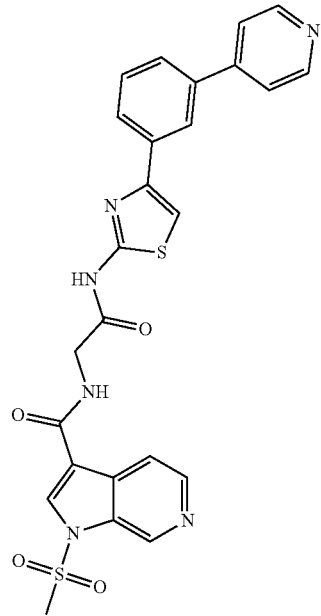

-continued
3
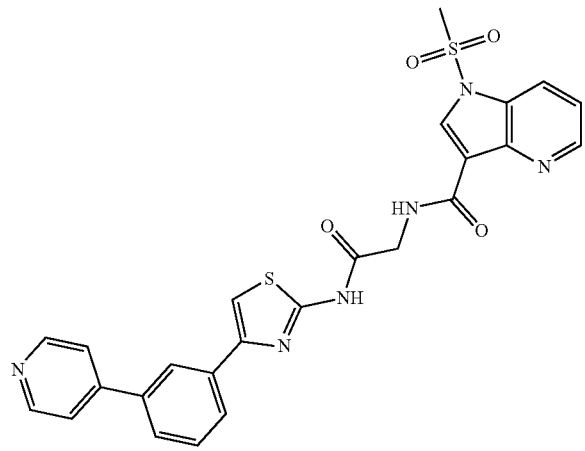
4
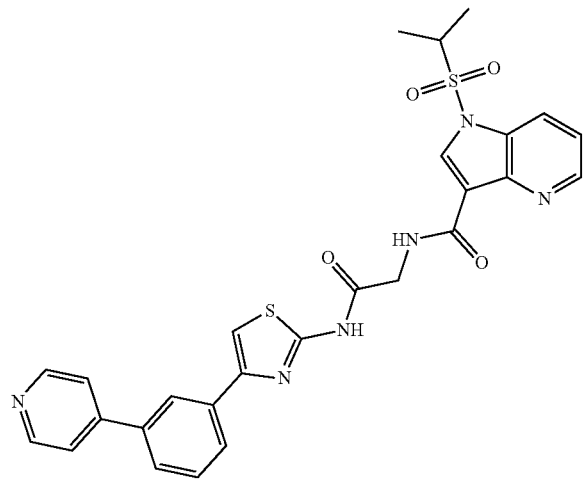
5
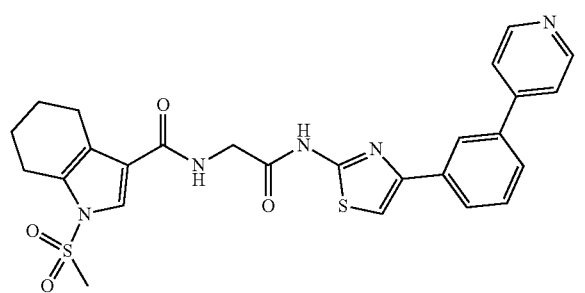
6
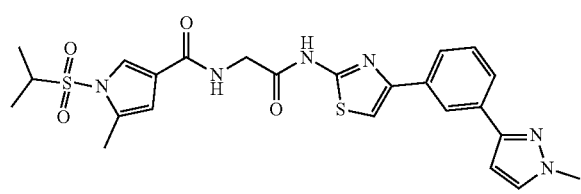
7
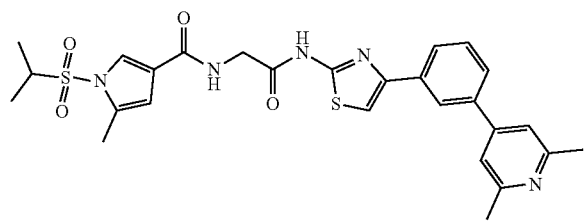
8
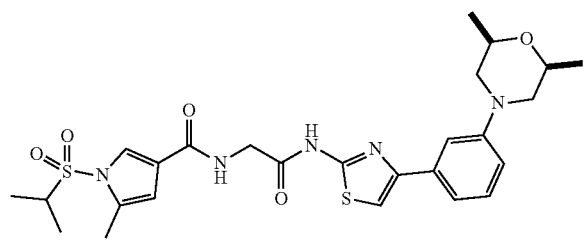
10
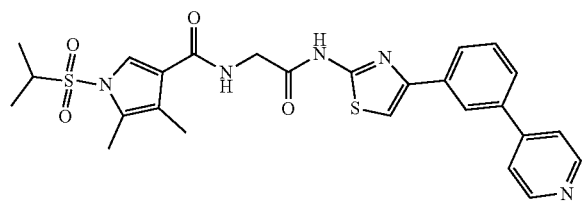
11
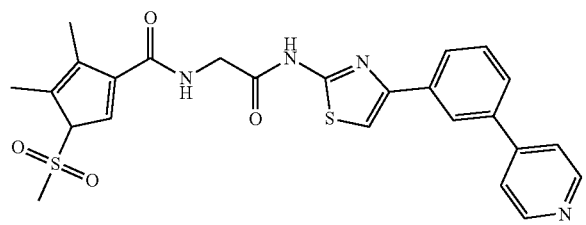
12
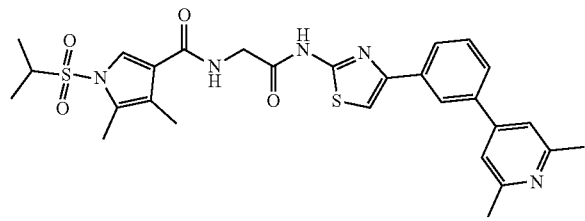
13
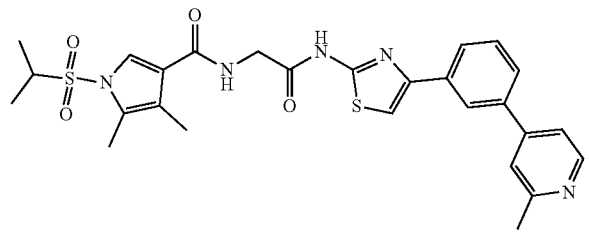

-continued
14
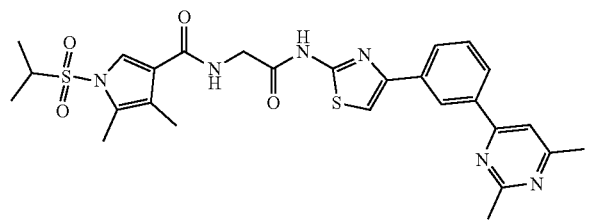
15
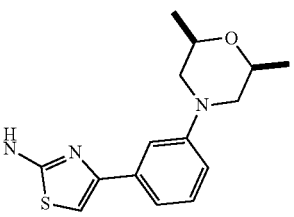
16
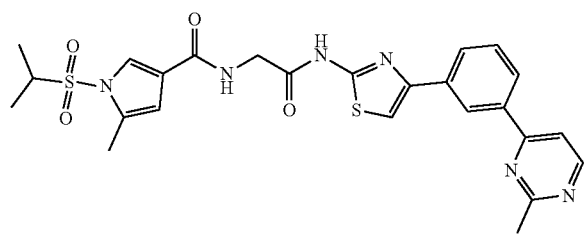
17
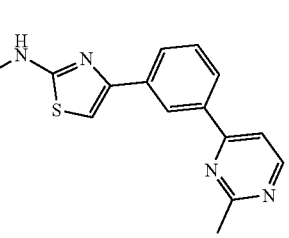
18
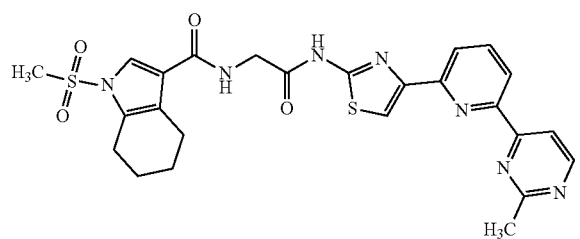
20
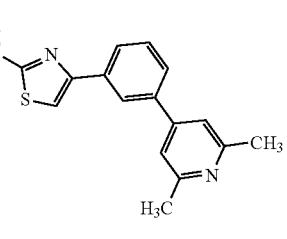
21
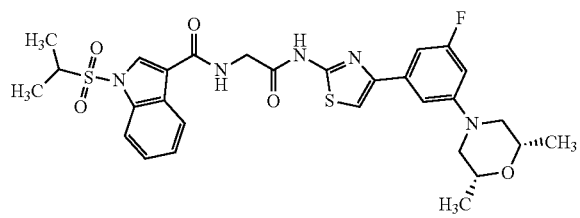
22
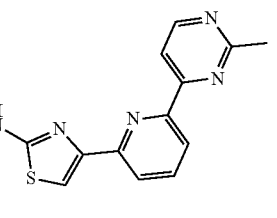
23
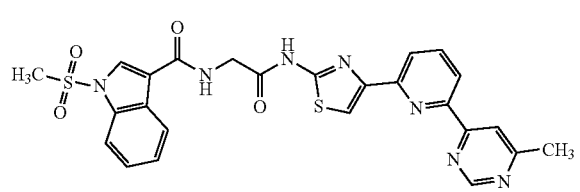
24
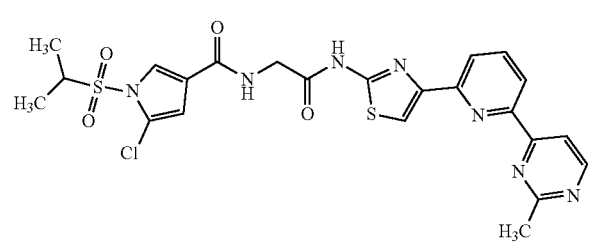
25
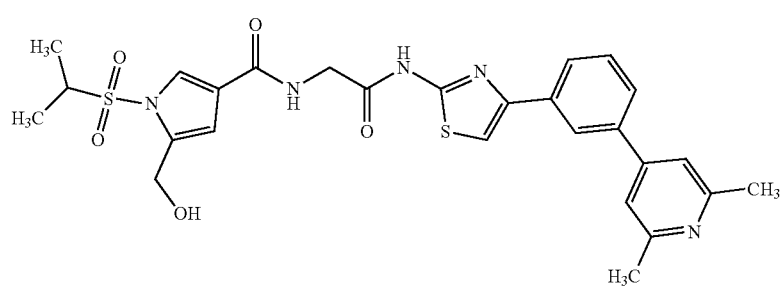

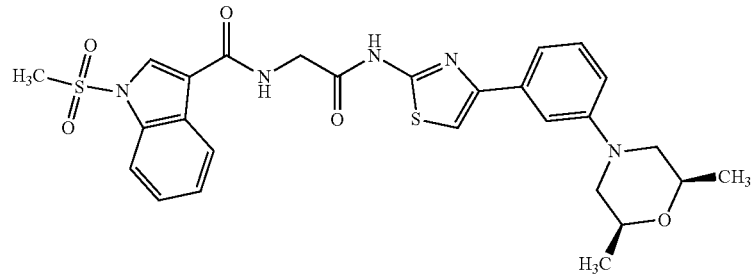
26
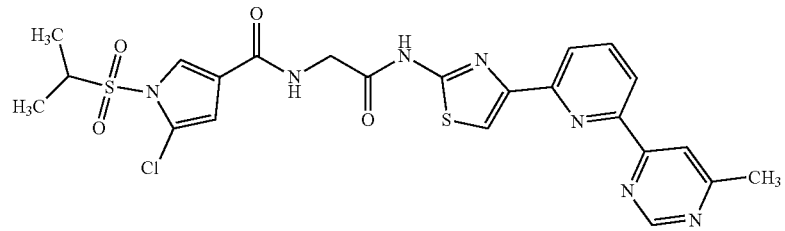
27
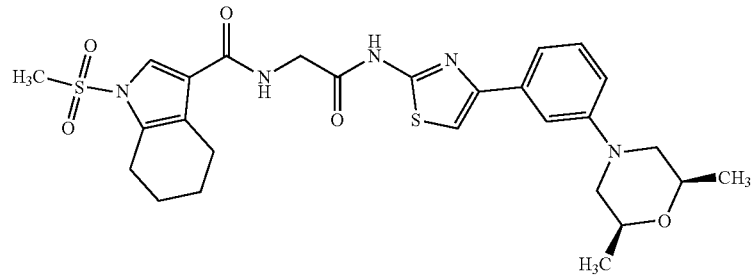
28
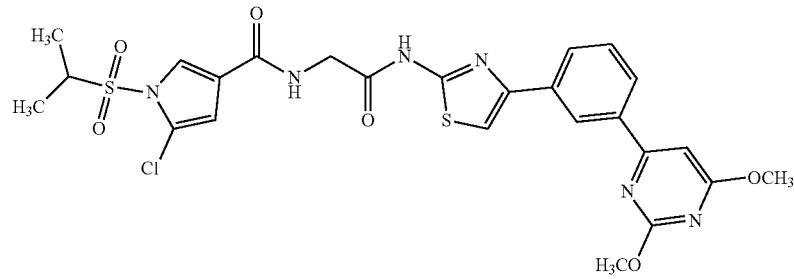
29
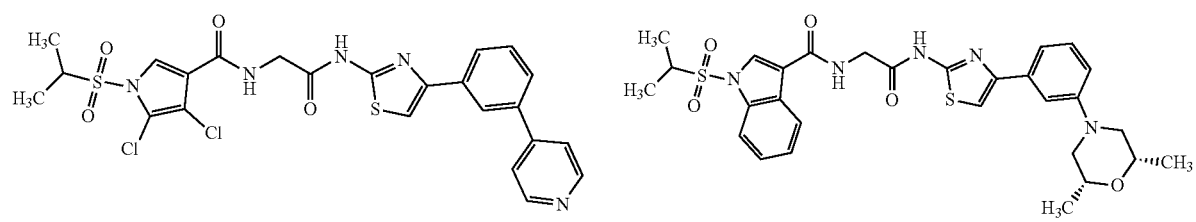
30
31
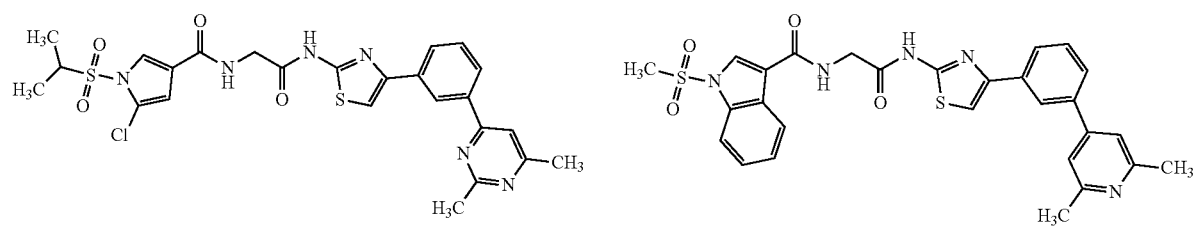
32
33

-continued
34
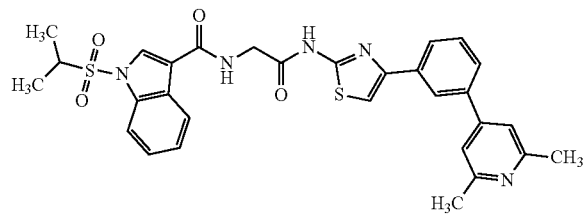
35
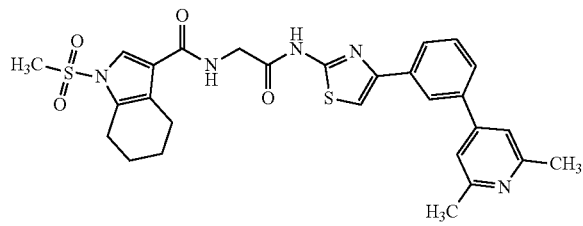
36
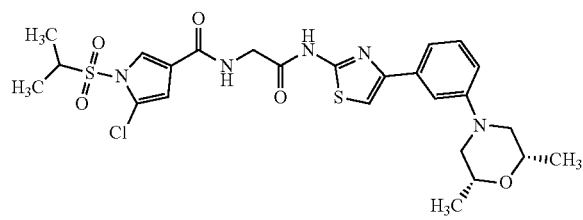
37
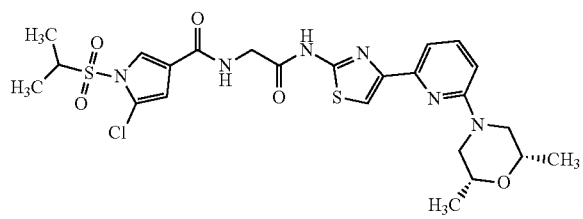
38
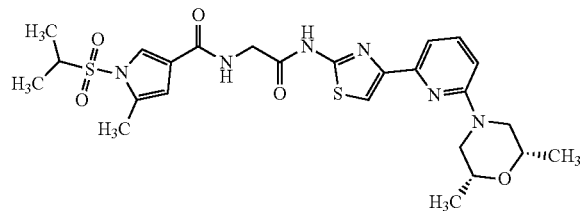
39
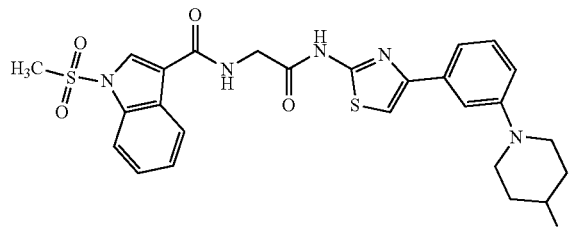
40
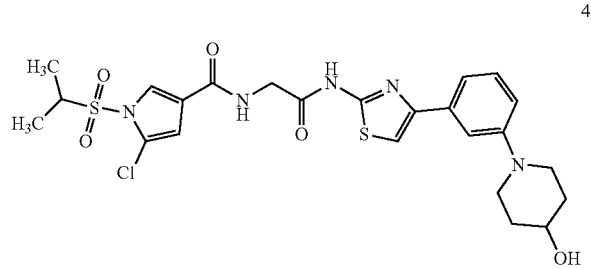
41
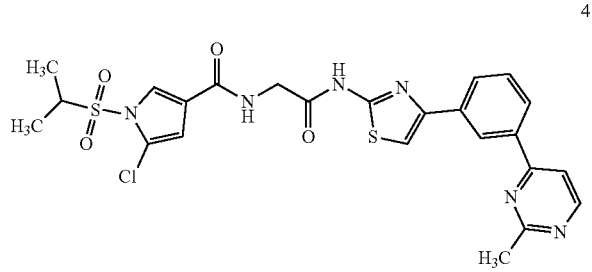
44
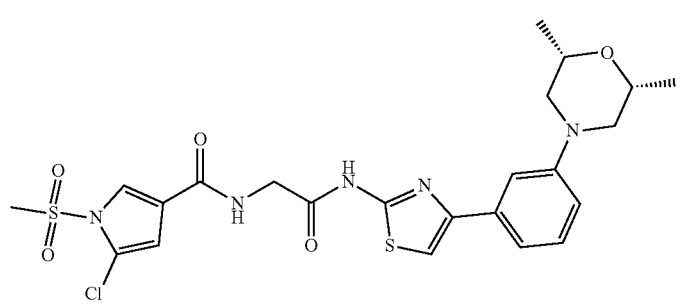
45
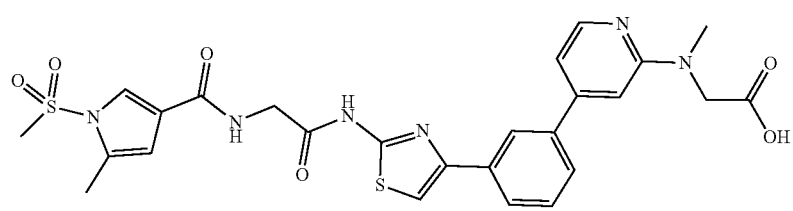

46
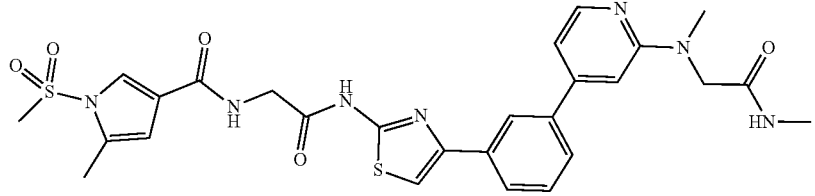
47
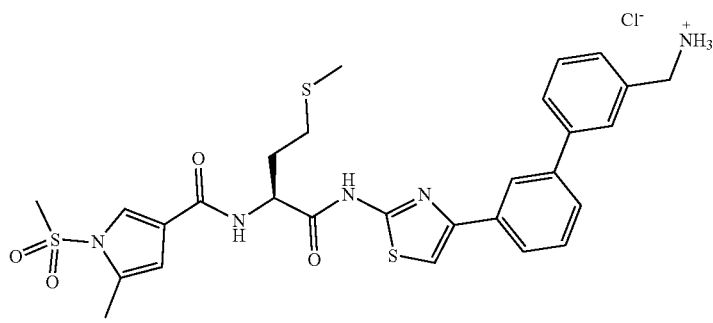
18. A pharmaceutical composition comprising a compound of claim 1 and a pharmaceutically acceptable excipient.
19. A method of treating melanoma, hematologic cancer, prostate cancer, breast cancer, or bone cancer in a subject in need thereof, the method comprising administering to the subject an effective amount of a compound of claim 1.
* * * * *